United States Patent [19]
Nagaoka et al.

[11] Patent Number: 5,616,994
[45] Date of Patent: Apr. 1, 1997

[54] DRIVE CIRCUIT FOR BRUSHLESS MOTOR

[75] Inventors: Hidetada Nagaoka; Atsuo Onoda; Yukio Izumi; Keiichi Nishikawa; Yuuji Oomura, all of Kanagawa; Mitinaga Suzuki; Kiyotaka Hoshi, both of Fukushima, all of Japan

[73] Assignee: Mitsubishi Denki Kabushiki Kaisha, Tokyo, Japan

[21] Appl. No.: 370,575

[22] Filed: Jan. 6, 1995

[30]    Foreign Application Priority Data

Jan. 12, 1994  [JP]  Japan ................................... 6-001637
Sep. 6, 1994   [JP]  Japan ................................... 6-212656

[51] Int. Cl.$^6$ ................................................ H02P 7/00
[52] U.S. Cl. ................................ 318/254; 318/439
[58] Field of Search ............................... 318/254, 138, 318/439

[56]           References Cited

U.S. PATENT DOCUMENTS

| | | | |
|---|---|---|---|
| 4,712,050 | 12/1987 | Nagasawa et al. | 318/254 |
| 4,743,815 | 5/1988 | Gee et al. | 318/254 |
| 5,004,965 | 4/1991 | Otokawa et al. | 318/254 |
| 5,036,264 | 7/1991 | Ueki | 318/138 X |
| 5,189,349 | 3/1993 | Haga | 318/254 |
| 5,194,787 | 3/1993 | Antognini | 318/254 |
| 5,198,733 | 3/1993 | Wright | 318/254 |

FOREIGN PATENT DOCUMENTS

| | | |
|---|---|---|
| 57-173385 | 10/1982 | Japan . |
| 58-51789 | 3/1983 | Japan . |
| 4-317585 | 11/1992 | Japan . |

*Primary Examiner*—Jonathan Wysocki
*Attorney, Agent, or Firm*—Wolf, Greenfield & Sacks, P.C.

[57]           ABSTRACT

A brushless motor driving circuit is provided for obtaining a reliable starting and stable rotation driving irrespective of the load condition of the motor. The brushless motor driving circuit has a terminal voltage detector located at each phase of the armature windings of the motor, a terminal voltage compensator for adding or subtracting a compensation value to/from the terminal voltage of the armature windings detected at respective phases during actual driving periods, and a comparator for comparing respective terminal voltages to obtain a rotor location signal after compensation has been performed. The compensation value is determined by a resistor of the armature winding and a winding current. The armature windings are driven by the rotor location signal detected at the comparator.

35 Claims, 108 Drawing Sheets

| | | |
|---|---|---|
| 100a | TERMINAL 164 =H | $V_{cc} - R3 \cdot ( \iota 2 + \frac{U-W}{R4} - \iota b )$ |
| | TERMINAL 164 =L | $V_{cc} - R3 \cdot ( \iota 2 + \frac{U-W}{R4} + \frac{Vir}{R5} - \iota b )$ |
| 100b | TERMINAL 165 =H | $V_{cc} - R3 \cdot ( \iota 2 + \frac{W-U}{R4} - \iota b )$ |
| | TERMINAL 165 =L | $V_{cc} - R3 \cdot ( \iota 2 + \frac{W-U}{R4} + \frac{Vir}{R5} - \iota b )$ |
| 100c | TERMINAL 166 =H | $V_{cc} - R3 \cdot ( \iota 2 + \frac{V-U}{R4} - \iota b )$ |
| | TERMINAL 166 =L | $V_{cc} - R3 \cdot ( \iota 2 + \frac{V-U}{R4} + \frac{Vir}{R5} - \iota b )$ |
| 100d | TERMINAL 167 =H | $V_{cc} - R3 \cdot ( \iota 2 + \frac{U-V}{R4} - \iota b )$ |
| | TERMINAL 167 =L | $V_{cc} - R3 \cdot ( \iota 2 + \frac{U-V}{R4} + \frac{Vir}{R5} - \iota b )$ |
| 100e | TERMINAL 168 =H | $V_{cc} - R3 \cdot ( \iota 2 + \frac{W-V}{R4} - \iota b )$ |
| | TERMINAL 168 =L | $V_{cc} - R3 \cdot ( \iota 2 + \frac{W-V}{R4} + \frac{Vir}{R5} - \iota b )$ |
| 100f | TERMINAL 169 =H | $V_{cc} - R3 \cdot ( \iota 2 + \frac{V-W}{R4} - \iota b )$ |
| | TERMINAL 169 =L | $V_{cc} - R3 \cdot ( \iota 2 + \frac{V-W}{R4} + \frac{Vir}{R5} - \iota b )$ |

FIG. 10

CURRENT SUPPLYING PHASE

| TER-MINAL | V−W | U−W | U−V | W−V | W−U | V−U |
|---|---|---|---|---|---|---|
| 164 | X | X | H | X | X | L |
| 165 | X | X | L | X | X | H |
| 166 | H | X | X | L | X | X |
| 167 | L | X | X | H | X | X |
| 168 | X | L | X | X | H | X |
| 169 | X | H | X | X | L | X |

H : HIGH LEVEL

L : LOW LEVEL

X : ANY OF H OR L

| 9a | 9b | 9c | 9d | 9e | 9f | CURRENT SUPPLYING PHASE |
|----|----|----|----|----|----|-------------------------|
| H  | L  | H  | L  | L  | H  | V − W |
| L  | H  | H  | L  | L  | H  | U − W |
| L  | H  | H  | L  | H  | L  | U − V |
| H  | H  | L  | L  | H  | L  | W − V |
| H  | H  | L  | H  | L  | L  | W − U |
| H  | L  | H  | H  | L  | L  | V − U |

| 9a | 9b | 9c | 9d | 9e | 9f | 3a | 3b | 3c |
|----|----|----|----|----|----|----|----|----|
| H  | L  | H  | L  | L  | H  | H  | H  | L  |
| L  | H  | H  | L  | L  | H  | H  | L  | L  |
| L  | H  | H  | L  | H  | L  | H  | L  | H  |
| H  | H  | L  | L  | H  | L  | L  | L  | H  |
| H  | H  | L  | H  | L  | L  | L  | H  | H  |
| H  | L  | H  | H  | L  | L  | L  | H  | L  |

| IMPUT PULSE NUMBER | 7a | 7b | 7c |
|---|---|---|---|
| 0 | L | L | L |
| 1 | H | L | L |
| 2 | L | H | L |
| 3 | L | L | H |
| 4 | H | L | H |
| 5 | L | H | H |
| 6 | L | L | L |
| 7 | H | L | L |
| ⋮ | ⋮ | ⋮ | ⋮ |

FIG. 24

| 7a | 7b | 7c | 7d |
|---|---|---|---|
| L | L | L | 253a |
| H | L | L | 254a |
| L | H | L | 251a |
| L | L | H | 252a |
| H | L | H | 255a |
| L | H | H | 250a |

FIG. 25

| 9a | 9b | 9c | 9d | 9e | 9f | 7a | 7b | 7c |
|----|----|----|----|----|----|----|----|----|
| H  | L  | H  | L  | L  | H  | L  | L  | L  |
| L  | H  | H  | L  | L  | H  | H  | L  | L  |
| L  | H  | H  | L  | H  | L  | L  | H  | L  |
| H  | H  | L  | L  | H  | L  | L  | L  | H  |
| H  | H  | L  | H  | L  | L  | H  | L  | H  |
| H  | L  | H  | H  | L  | L  | L  | H  | H  |

| 3a | 3b | 3c | 7a | 7b | 7c |
|----|----|----|----|----|----|
| H | H | L | L | L | L |
| H | L | L | H | L | L |
| H | L | H | L | H | L |
| L | L | H | L | L | H |
| L | H | H | H | L | H |
| L | H | L | L | H | H |

FIG. 31

| 301a | 9a | 9b | 9c | 9d | 9e | 9f | 7a | 7b | 7c |
|---|---|---|---|---|---|---|---|---|---|
| H | H | L | H | L | L | H | L | L | L |
|   | L | H | H | L | L | H | H | L | L |
|   | L | H | H | L | H | L | L | H | L |
|   | H | H | L | L | H | L | L | L | H |
|   | H | H | L | H | L | L | H | L | H |
|   | H | L | H | H | L | L | L | H | H |
| L | H | H | L | L | H | L | L | L | L |
|   | H | H | L | H | L | L | H | L | L |
|   | H | L | H | H | L | L | L | H | L |
|   | H | L | H | L | L | H | L | L | H |
|   | L | H | H | L | L | H | H | L | H |
|   | L | H | H | L | H | L | L | H | H |

| 301a | 7a | 7b | 7c | 7d |
|---|---|---|---|---|
| H | L | L | L | 253a |
|   | H | L | L | 250a |
|   | L | H | L | 251a |
|   | L | L | H | 252a |
|   | H | L | H | 255a |
|   | L | H | H | 250a |
| L | L | L | L | 252a |
|   | H | L | L | 255a |
|   | L | H | L | 250a |
|   | L | L | H | 253a |
|   | H | L | H | 254a |
|   | L | H | H | 251a |

FIG. 72

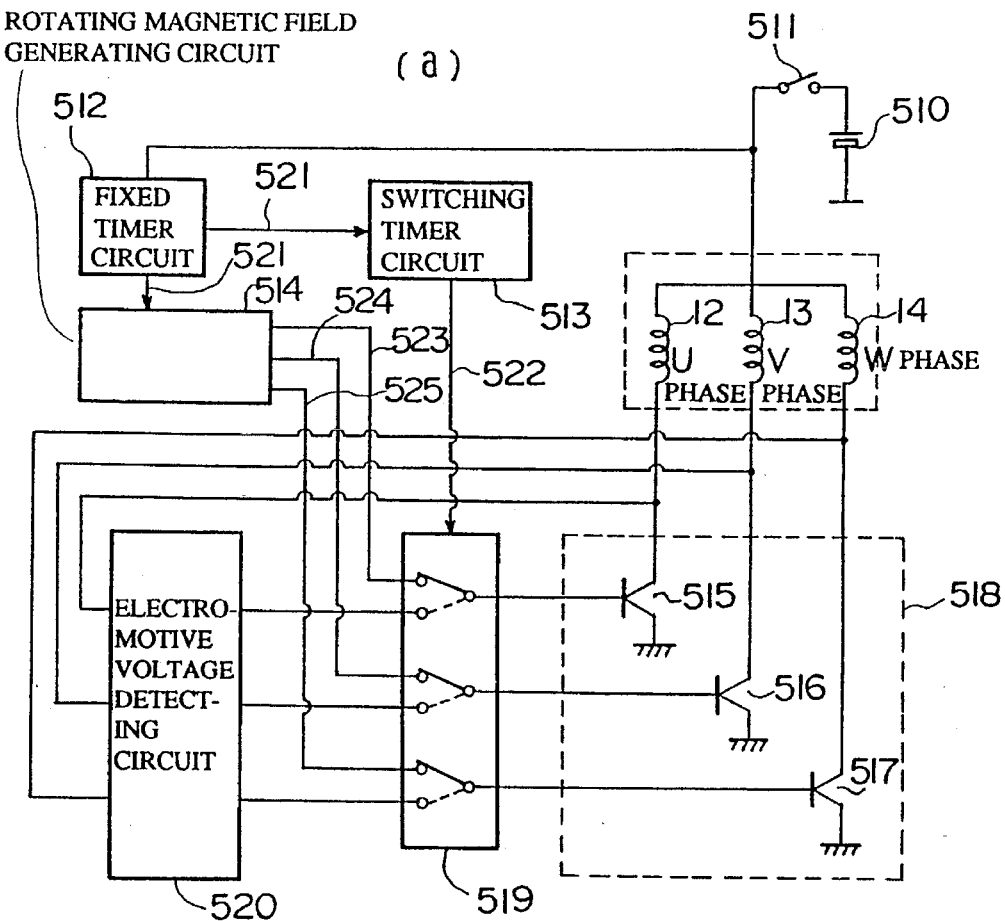
(a)
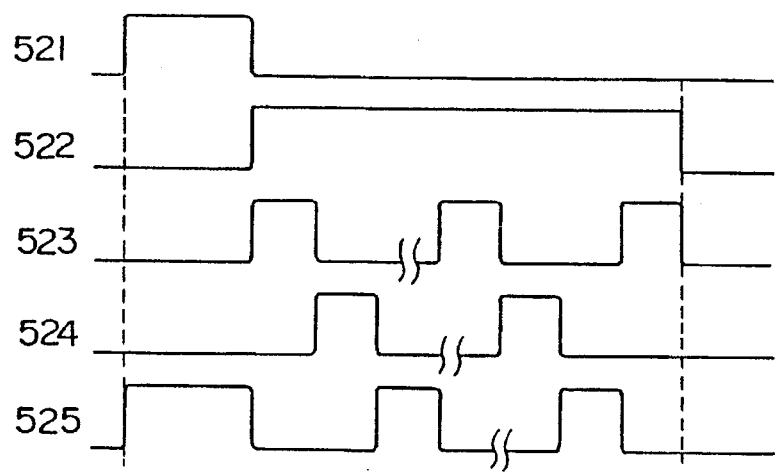
(b)
FIG. 121

DRIVE CIRCUIT FOR BRUSHLESS MOTOR

BACKGROUND OF THE INVENTION

1. Field of the Invention

The invention relate to a drive circuit for the brushless motor.

2. Description of the Prior Art

The rotation driving control of a brushless motor can be classified roughly into two functions. One of which is a commutation control for controlling the timing of respective phase current which flows through respective armature winding. Another is a speed control which maintains the rotation speed constant.

In the commutation control, a rotor location signal is necessary which indicates the relative position of the armature winding and the rotor. On the other hand, in the speed control, a speed signal is necessary for indicating rotation speed of the rotor.

For the commutation change control of conventional typical brushless motor, a rotor location detecting element such as Hall device is used. But, since the rotor location detecting element is no so cheap and needs further many electric wiring, there is some demerit which is complicated and causes an increase of cost.

Further, by using the rotor location detecting element, the thinness and small sizing of the motor is restricted. Since an output of the rotor location detecting element changes by temperature and humidity, there remain some problems from the view point of reliability.

To avoid this demerit, some driving systems for the brushless motor are proposed for detecting a rotor location using a counter electromotive voltage signal induced in the armature winding. The typical driving system for detecting the rotor location from the counter electromotive voltage signal is disclosed in the laid-open Japanese Patent Publication No. 58-25038. In the above publication, two systems are disclosed, one of which is a system for detecting a location by comparing both terminal voltages of respective armature winding and the other system by comparing the terminal voltage and the neutral voltage of the armature winding.

FIG. 120 shows a general construction of the system for detecting the location by comparing the terminal voltage and the neutral voltage of the armature winding. In FIG. 120, 12, 13 and 14 are the armature windings of a star connection brushless motor, 11 is a bridge circuit which switches the current flowing in the armature windings 12, 13 and 14. A comparator 500 compares the terminal voltages U, V, W, each of which is not neutral terminal of the armature winding, with a neutral voltage M, respectively, to detect the rotor location. A commutation control means 501 controls the bridge circuit 11 according to the rotor location which is detected by the comparator 500 and makes the rotor rotate by supplying a current into the predetermined phase of the armature winding.

Further, the laid-open Japanese Patent Publication No. 51-100216 discloses a method for compensating a phase delay generated when comparing the terminal voltages, where ohmic drop of the armature winding resistor is assumed to be constant and the phase delay is compensated using a shunt resister.

By the way, in the driving system for detecting a rotor location using the counter electromotive voltage induced in the armature winding, the rotor location can not be detected if the counter electromotive voltage is less than a predetermined value by the reason of low rotation speed of the rotor. On this occasion, since the rotor location can not be obtained at starting, it is necessary to forcefully apply a rotating magnetic field to the rotor from outside.

But, in case applying forcefully the rotating magnetic field to the rotor from outside, the relative position of the rotor and the armature winding do not always stop to a location where the rotor can rotate to a normal direction, but some torque may be generated toward a counter rotation direction at the beginning of starting at some location of the rotor, which involves serious problems in which a normal starting is prevented.

To solve this problems, some improvements are proposed, for example, in the laid-open Japanese Patent Publications No. 57-173385 and No. 2-237490. In the laid-open Japanese Patent Publication No. 57-173385, it is disclosed a starting system, which starts to rotate a rotor after having fixed the rotor to a predetermined position at starting, comprises a means for supplying a current to a predetermined phase of the armature winding at starting for a predetermined period and a means for forcefully applying a rotating magnetic field to an armature winding from the outside.

The system of the laid-open Japanese Patent Publication No. 57173385 explains using FIG. 121(*a*) that a fixed timer circuit 512, the armature windings 12 (U phase), 13 (V phase) and 14 (W phase) of a three phase DC brushless motor are connected to a power supply 510 through a power switch 511. The armature windings 12, 13 and 14 is connected to collector of transistor 515, 516 and 517, respectively and an emitter of this transistor is connected to earth, which comprises a driving circuit 518.

A switching timer circuit 513 and a rotating magnetic field generating circuit 514 are connected to the fixed timer circuit 512, and a switching circuit 519 is connected to this switching timer circuit 513. The switching circuit 519 switches currents outputted from the rotating magnetic field generating circuit 514 which drives the driving circuit 518 and driving currents detected at the armature windings 12, 13 and 14 according to the electromotive voltage to supply to the driving circuit 518. The output terminals of this switching circuit 519 are connected to respective phases of the bases of the transistors 515, 516 and 517. An electromotive voltage detecting circuit 520 is connected to inputs of the switching circuit 519. The armature windings 12, 13 and 14 are connected to the input terminals of this electromotive voltage detecting circuit 520. Respective three phase output signals from the rotating magnetic field generating circuit 514 is inputted to the input terminals of this switching circuit 519.

Since the device is constituted in this way, when the power switch 511 is turned on, one of the armature windings 12, 13 and 14 is connected to the power supply 510 and the fixed timer circuit 512 operates simultaneously. The fixed timer circuit 512 outputs a control signal 521 to the rotating magnetic field generating circuit 514 for a predetermined period, the control signal 521 excites one of the armature windings 12, 13 and 14, specifically, for example, a W phase shown in FIG. 121(*b*). The fixed timer circuit 512 also outputs a control signal 521 to the switching timer circuit 513. After a predetermined period when the control signal 521 is outputted from the fixed timer circuit 512, the fixed timer circuit 512 turns off. When the fixed timer circuit 512 turns off, the rotating magnetic field generating circuit 514 outputs driving signals 523, 524 and 525 as shown in FIG.

121(b) to the bases of the transistors 515, 516 and 517 through the switching circuit 519, where the driving signals 523, 524 and 525 excite the armature windings 12, 13 and 14, respectively. This switching circuit 519 is switched to a state of solid line shown in FIG. 121(a) according to a switching indication signal 522 shown to FIG. 121(b), and this state is maintained until the switching indication signal 522 outputted from the switching timer circuit 513 becomes low (L) state.

The driving signals outputted from the rotating magnetic field generating circuit 514 applies driving signals sequentially to the bases of the transistors 515, 516 and 517 in the driving circuit 518. The sequential currents are supplied into the armature windings 12, 13 and 14 from the power supply 510. Therefore, the rotating magnetic field is generated in the armature windings 12, 13 and 14, which causes the rotor to begin rotating.

The motor is started in this way. When a predetermined period is passed, a switching signal 522 which is outputted from the switching timer circuit 513 becomes L state and the switching circuit 519 switches its contacts the driving signals outputted from the voltage detecting circuit 520 is applied to the driving circuit 518, which drives the transistors 515, 516 and 517 sequentially and maintains rotation of the three phase brushless motor.

The prior art of the laid-open Japanese patent publication No. 2-237490 is explained below. This brushless motor has an electromagnetic transducer for detecting a rotation position of the rotor. This brushless motor selects one predetermined current switching pattern corresponding to a rotor stopping location from the predetermined current patterns set for starting according to the rotating location detected by the electromagnetic transducer at starting, then switches the driving current to be supplied to the stator armature winding by this selected current switching pattern to generate a rotating magnetic field and to cause the rotor to start. When the electromotive voltage generated in the stator armature winding reaches a predetermined value which is necessary to detect the rotation position of the rotor, the rotation position of the rotor is determined from the detected electromotive voltage. By the detected output, the driving current for driving the armature winding is switched to generate the rotating magnetic field and to cause the rotor to rotate.

On the other hand, in a speed control of the brushless motor, it is generally used a system for maintaining the rotating speed constant by controlling the current quantity flowing in the armature winding.

FIG. 122 shows a block diagram of a speed control system of the driving circuit for conventional brushless motor. In FIG. 122, 530 is a speed detecting circuit which detects actual rotation speed of the rotor and outputs a speed signal, 531 is a speed difference detecting circuit which outputs a speed difference signal having a pulse width corresponding to the speed difference by counting the speed signal period using reference clock. A speed difference compensation filter 532 outputs a current indication value to a current supplying circuit 533 so that a speed difference becomes zero according to the speed difference signal. The current supplying circuit 533 regulates a current quantity supplied to the armature winding of the brushless motor 534 according to the current indication value. In the driving circuit of such conventional brushless motor, the speed difference compensation filter is constituted of an analog filter in which a PI filter 460 and a first order delay filter 464 are connected serially as shown in FIG. 123.

In the driving circuit of the conventional brushless motor, the speed signal period is counted by the reference clock and therefore the reference clock frequency inputted into the speed difference detecting circuit is switched in proportion to the indicated rotation speed when the indicated rotation speed to the motor is switched.

Regarding the system which detects the speed signal for controlling the rotation speed of the brushless motor, there are a system which is popularly called a FG system which exclusively use a frequency generator for speed detection and a system which detects speed according to a feature that a magnitude of the counter electromotive voltage signal induced in the armature winding is in proportion to the rotation speed.

In the conventional driving system in which the location detection is carried out by comparing the terminal voltages each other, since one of the terminal is a current supplying phase and another is a non-current supplying phase, when the current in the current supplying phase increases at load state, the ohmic drop in the armature winding of current supplying phase becomes large, and therefore the rotor location signal of the current supplying phase delays.

This delay causes a commutation timing to delay, then the torque decreases, which causes a rotation speed to decrease. When the rotation speed decreases, the current increases in order to rise the rotation speed, and the ohmic drop further becomes large, that is, there occurs a vicious circle. In the worst case, the motor can not generate a torque which is larger than the load, and then the motor will fall into stopping state.

On the other hand, in the conventional driving system in which the location detection is carried out by comparing the neutral voltage with the terminal voltages, although the phase delay of the location detecting signal can be solved, it is necessary to draw out the neutral leads from inside of the brushless motor.

The rotor location signal obtained by comparing the neutral voltage with the terminal voltages is shifted around 30 degrees in electrical angle against the actually needed rotor location signal, then the compensation must be carried out. The integration filter is usually used for phase compensation, therefore, when the motor is derived in a variable speed, the integration filter constant must be changed. Accordingly, if the constant is fixed, the commutation operation becomes unstable at transient state.

Further, in the above both driving system, by the influence of spike shaped noise generated on the terminal voltage waveform accompanied with the switching of the driving transistor, the rotor location signal becomes incorrect.

In the detection system for detecting a speed by a private frequency generator, it is necessary to provide a frequency generator having a high machining accuracy. Therefore, it is necessary to provide a wide space for installing the private detecting apparatus and then there is a cost disadvantage.

In the detecting system for detecting a speed by an amplitude of the counter electromotive voltage, since the voltage generated by the current flowing in the armature winding is superposed to the counter electromotive voltage, it is difficult to detect only the amplitude of the counter electromotive voltage, and also the magnitude is followed by a change of environment.

In the conventional brushless motor, it needs a predetermined time to start after a starting switch is turned on.

In the conventional starting system, when the starting is failed, it is necessary to restart and so it takes a lot of time for starting the motor.

In the conventional speed difference compensation filter in the driving circuit, when disturbance at low pass area is large, the disturbance can not be satisfactorily compressed. Therefore, the specification of the rotation accuracy can not be well satisfied.

In the conventional driving circuit for the brushless motor, when the indicated rotation speed to the motor has changed, it is necessary to change the reference clock inputted into the speed difference detector in proportion to the indicated rotation speed.

In the conventional driving circuit for the brushless motor, a commutation timing is not synchronized with a timing for increasing or decreasing the armature winding current. Therefore, it is difficult to add or subtract a compensation value which is determined by the resistance value of the armature winding and the current flowing in the current supplying phase to/from the winding voltage during the actual driving period.

In the conventional driving circuit for the brushless motor, the transistors are switched by the rectangular shaped wave, there occurs noise at commutation.

It is an object of the present invention to provide a driving circuit for the brushless motor having no phase delay in the rotor location signal even at load state, having a stable rotation irrespective of steady state or transient state, and a simple lead connection.

Further, it is an object of the present invention to provide a driving circuit for the brushless motor for correctly detecting a rotor location signal even if spike shaped voltage fluctuation is generated on the terminal voltage waveform accompanied with switching of driving transistor.

Further, it is an object of the present invention to provide a driving circuit for the brushless motor for obtaining a speed signal without providing a private speed detecting circuit.

Further, it is an object of the present invention to provide a driving circuit for the brushless motor for being started in a short time without influenced by the load condition.

Further, it is an object of the present invention to provide a driving circuit for the brushless motor for providing a high accurate rotation mode with fully compressed disturbance even if the disturbance at low pass area is large.

Further, it is an object of the present invention to provide a driving circuit for the brushless motor for changing the rotation stably by switching a target rotation speed and a gain of the speed difference compensation filter.

Further, it is an object of the present invention to provide a driving circuit for the brushless motor for synchronizing the commutation timing with a timing for increasing or decreasing the armature winding current.

Further, it is an object of the present invention to provide a driving circuit for the brushless motor having less noise at commutation operation.

SUMMARY OF THE INVENTION

A brushless motor driving circuit for driving a plurality of the armature windings of a brushless motor of the present invention comprises a plurality of the terminal voltages detection means located at every phase of the armature windings; a terminal voltage compensation means for adding or subtracting a compensation value to/from the terminal voltage of an armature windings detected at respective phases during actual driving period, the compensation value is determined by a resistor of the armature winding and a winding current; and a comparator means for comparing respective terminal voltages after compensation has carried out to obtain a rotor location signal; the armature windings are driven by the rotor location signal detected at the comparator means.

Since the neutral point is not used and a location signal is obtained by compensating the compensation value determined by the armature winding current only during the actual driving period, the lead may be small and correct driving timing having less delay may be obtained.

A brushless motor driving circuit for driving a plurality of the armature windings of a brushless motor of the present invention comprises a plurality of the terminal voltages detection means located at every phase of the armature windings; a terminal voltage difference compensation means between respective phases for adding or subtracting a compensation value to/from the terminal voltage difference of respective phases detected between the armature windings during actual driving period, the compensation value is determined by a resistor of the armature winding and a winding current; and a comparator means for comparing respective terminal voltage difference between respective phases after compensation has carried out to obtain a rotor location signal; the armature windings are driven by the rotor location signal detected at the comparator means.

Since the neutral point is not used and a location signal is obtained from the inter-terminal voltage by compensating the compensation value determined by the armature winding current only during the actual driving period, the lead may be small and correct driving timing having less delay may be obtained.

Further the brushless motor driving circuit of the present invention comprises a rising and falling signal detection means for detecting a rising and falling signal of the rotor location signal to speed-feedback-control by assuming the detected resultant signal as a detected speed signal.

Further, since a signal corresponding to the signal speed is obtained from the location signal, the speed control is simplified by using a simple apparatus.

Further, in the brushless motor driving circuit of the present invention, the driving signals being applied to a terminal voltage compensation means of respective phases during the driving signals is applied to a bridge circuit for exciting and driving armature windings of respective phases.

Since an actual driving is carried out during the driving signals is in a driving state, the phase delay is correctly compensated.

Further, in the brushless motor driving circuit of the present invention, the driving signals being applied to a terminal voltage difference compensation means between respective phases during the driving signals is given to a bridge circuit for exciting and driving armature windings of respective phases.

Since an actual driving for the compensation of difference between respective phases voltage is carried out during the driving signals is in a driving state, the phase delay is correctly compensated.

Further, the brushless motor driving circuit of the present invention comprises an actual current detection resistance which is connected serially to a bridge circuit for exciting the armature windings; the current flowing in the detection resistor is applied to terminal voltage compensation means as a winding current.

Since the compensation voltage was taken from the detection resistor for detecting the current flowing in the armature winding, the phase delay is correctly compensated.

Further, the brushless motor driving circuit of the present invention comprises an actual current detection resistance which is connected serially to a bridge circuit for exciting the armature windings; the current flowing in the detection resistor is applied to a terminal voltage difference compensation means between respective phases as a winding current.

Since the compensation voltage was taken from the detection resistor for detecting the current flowing in the armature winding, the phase delay between the respective phases voltage difference is correctly compensated.

Further, the brushless motor driving circuit of the present invention comprises a differentiation circuit for detecting a rising and falling edge of comparison signal of the terminal voltages and a voltage differences between respective phases; and a latch circuit for latching the comparison signal at the timing when the edge is detected in the differentiation circuit; the armature windings of respective phases are driven as a rotor location signal by combining the output signals of latch circuit.

Since a new the location signal is obtained by latching the location signal, a correct location signal is obtained even if the noise is included in the detected signal.

Further, the brushless motor driving circuit of the present invention comprises a rotor location signal generation means for detecting a rotor location signal of the brushless motor from the terminal voltages or a voltage differences between respective phases; a counter for detecting a rising and falling edge of the rotor location signal of the output, selecting one of the necessary edge signal from the respective detection edge signals and counting necessary edge signals and applying it to the armature windings of respective phases at starting; and a pulse generating counter, one input of which is connected to the output of the counter, for counting up the counter when the input is not obtained for a predetermined of period; an output of the counter is applied to the armature winding at starting for driving the rotor of the brushless motor.

Since edge signals of rising and falling of the location signal are selected and counted for making a driving signal and forcefully counted when there is no further input, stable starting can be obtained.

Further, the brushless motor driving circuit of the present invention comprises a rotor location signal generation means for detecting a rotor location signal of the brushless motor from the terminal voltages or a voltage differences between respective phases; a counter for detecting a rising and falling edge of the rotor location signal of the output, selecting one of the necessary edge signal from the respective detection edge signals and counting necessary edge signal and applying it to the armature windings of respective phases at starting; a pulse generating counter, one input of which is connected to the output of the counter, for counting up the counter when the input is not obtained for a predetermined of period; and a normal rotation detecting means for monitoring motor rotation by combining the rotor location signal with the counter output; the normal rotation detecting means generates a restart pulse for restarting the motor and applies an output of the counter to the armature windings for driving the rotor of the brushless motor at abnormal rotation.

Since edge signals of rising and falling of the location signal are selected and counted for making a driving signal and forcefully counted when there is no further input, and further being restarted at abnormal rotation state, stable starting can be obtained even at abnormal rotation state.

Further, the brushless motor driving circuit of the present invention comprises a switching means for switching the armature windings of respective phases in response to the counter output at starting or restarting, or in response to the rotor location signal at normal rotation after starting or restarting; and a timer; the switching means switches a starting or a restarting period according the timer output.

Since the starting/restarting state and normal state are switched for every predetermined period, the operation can be surely changed to a normal driving.

Further, the brushless motor driving circuit of the present invention comprises a switching means for switching the armature windings of respective phases in response to the counter output at starting or restarting, or in response to the rotor location signal at normal rotation after starting or restarting; the switching means switches the armature windings when a counter output reaches a predetermined value as the starting or restarting period is completed.

Since the starting/restarting state and normal state can be switched by the count number of the counter, the operation can be surely changed to a normal driving.

Further, the brushless motor driving circuit of the present invention comprises a switching means for switching the armature windings of respective phases in response to the counter output at starting or restarting, or in response to the rotor location signal at normal rotation after starting or restarting; and a rotor speed signal detection means; the switching means switches the armature windings when a detected speed signal reaches a predetermined value as the starting or restarting period is completed.

Since the starting/restarting state and normal state are switched when the rotor speed has reached a predetermined speed, the operation can be surely changed to a normal driving.

Further, the brushless motor driving circuit of the present invention comprises a switching means for switching the armature windings of respective phases in response to the counter output at starting or restarting, or in response to the rotor location signal at normal rotation after starting or restarting; and the switching means switches the armature windings when a detected the rotor location signal reaches a predetermined combined value as the starting or restarting period is completed.

Since the starting/restarting state and normal state are switched when the detected location signals become a predetermined combination, the operation can be surely changed to a normal driving.

Further, the brushless motor driving circuit of the present invention comprises a switching means for switching the armature windings of respective phases in response to the counter output at starting or restarting, or in response to the rotor location signal at normal rotation after starting or restarting; and the switching means switches the armature windings when a driving signals supplied to the respective armature winding reaches a predetermined combined value as the starting or restarting period is completed.

Since the starting/restarting state and normal state are switched when the driving signals become a predetermined combination, the operation can be surely changed to a normal driving.

Further, the brushless motor driving circuit of the present invention comprises a switching means for switching the armature windings of respective phases in response to the counter output at starting or restarting, or in response to the rotor location signal at normal rotation after starting or restarting; and a timer or a rotor speed signal detection means; the switching means switches the armature windings as the starting or restarting period is completed when all following conditions are satisfied, that is, when a setting time of the timer expires, when a detected speed signal reaches a predetermined value, when a counter output reaches a predetermined value, when a detected the rotor location signal reaches a predetermined combined value, when a driving signals supplied to the respective armature winding reaches a predetermined combined value.

Since the starting/restarting state and normal state are switched by a combination of the count number of the counter, predetermined period, the rotor speed which has reached a predetermined speed, a predetermined combination of the detected location signals or the driving signals, the operation can be surely changed to a normal driving.

Further, in the brushless motor driving circuit of the present invention, the counter outputs a restart pulse to make the rotor start as an abnormal rotation when the rotor location signal at the input has not changed for a predetermined period and counts up the counter forcefully.

Since the counter is forcefully counted when there is no input, and the motor is restarted at abnormal rotation state by monitoring the location signal inputted into the counter, restart is possible at an abnormal rotation state.

Further, the brushless motor driving circuit of the present invention comprises a location detector for detecting a location deviated by electrical angle $\pi/6$ against the rotor location signal which is detected from the terminal voltages or the voltage difference between respective phases; and a hold circuit for outputting a selection signal defined by an output of the location detector and a starting indication signal; the counter decides a combination of a driving signals supplied to armature of respective phases at starting or restarting using the selection signal.

Since the driving signals at starting and restarting are obtained from a location signal detected by other location detector which is set at a certain electrical angle, the motor can be surely started even at starting.

Further, the brushless motor driving circuit of the present invention comprises a location detector for detecting a location deviated by electrical angle $\pi/6$ against the rotor location signal which is detected from the terminal voltages or the voltage difference between respective phases; a hold circuit for outputting a selection signal defined by an output of the location detector and a starting indication signal; and an output of the location detector is used as a driving signals to the armature at starting or restarting; and the counter decides a combination of the driving signals supplied to armature of respective phases using the selection signal after starting or restarting.

Since the driving signals at starting and restarting are obtained from a location signal detected by other location detector which is set at a certain electrical angle, the motor can be surely started even at starting.

Further, the brushless motor driving circuit of the present invention comprises a differentiation circuit for detecting a rising and falling edge of comparison signal of the terminal voltages and voltage differences between respective phases; a timer for starting by a detected edge from the differentiation circuit and for stopping its operation after a predetermined period; and a latch circuit for latching the comparison signal at the timing when the edge is detected in the differentiation circuit and for releasing the latch at the timing when the timer has stopped; the armature windings of respective phases are driven as a rotor location signal by combining the output signals of latch circuit.

Since a logic signal obtained by comparing the terminal voltage is differentiated and latched, then the latch is released after a predetermined period, a correct rotor location signal is provided even if noise is included in the detected signal.

Further, the brushless motor driving circuit of the present invention the timer period during the latch circuit latches and releases the comparison signal is switched according to the indicated rotation speed to the armature.

Since the timer length is variable, noise can be masked for an appropriate period.

Further, the brushless motor driving circuit of the present invention comprises a rotor location signal generation means for detecting a rotor location signal from the terminal voltages or a voltage difference between respective phases; a pulse generating means for detecting a rising and falling edge of the rotor location signal of the output, selecting a necessary edge signal from the respective detection edge signals to make output pulse train, and for supplying pseudo-pulse train when a necessary edge signal can not be obtained for a predetermined period; a counter for counting an output of the pulse generation means; a normal rotation detection means for outputting an abnormal rotation signal when the rotor location signal and the count numbers has no predetermined relationship; and a restart pulse generating means for masking the abnormal rotation signal outputted from the abnormal rotation detection means during a predetermine period after starting and restarting and for outputting a restart pulse according to the abnormal rotation signal after the predetermined period; an output of the counter is applied to the armature winding for driving the rotor of the brushless motor at starting and during the predetermined period set by the restart pulse at restarting.

Since the current is switched and supplied forcefully to a current supplying phase which rotates the rotor toward a normal rotation direction for a predetermined period at starting, restarting and abnormal state, the motor can be started within a short time without influenced with the load condition.

Further, the brushless motor driving circuit of the present invention comprises a switching means for switching the armature windings of respective phases according to a value of the counter at starting or restarting and according to the rotor location signal during a steady period after starting or restarting; and a timer; the switching means switches a starting or a restarting period according the timer output.

Since the switching from the starting mode to the normal mode is carried out by setting the timer, the operation can be surely changed to a normal driving.

Further, the brushless motor driving circuit of the present invention comprises a speed detection means for detecting a rotor speed; a speed difference detecting means for outputting a difference between the detected actual rotation speed of the rotor and a target rotation speed as a speed difference signal; and a speed difference compensation filter comprised of the a proportion—integration (P/I) filter connected in parallel with a first order delay filter, the input of parallel circuit is the speed difference signal, the outputs of the parallel circuit are added and further supplied in series to another first order delay filter, the output of the another first order delay filter is supplied to the armature windings as a current indication value.

Since the speed difference compensation filter is comprised of serial connection of a parallel connection of a PI filter and a first order delay filter, and a first order delay filter, a good low pass compression characteristics for disturbance can be obtained.

Further, the brushless motor driving circuit of the present invention comprises a speed detection means for detecting a rotor speed; a speed difference detecting means for outputting a difference between the detected actual rotation speed of the rotor and a target rotation speed as a speed difference signal; and a speed difference compensation filter comprised of a serial circuit of a proportion—integration (P/I) filter and a first order delay filter, the input of circuit is the speed difference signal, the serial circuit is further supplied in parallel to another first order delay filter, the parallel output is added and supplied to the armature windings as a current indication value.

Since the speed difference compensation filter is comprised of parallel connection of a serial connection of a PI filter and a first order delay filter, and a first order delay filter, a good low pass compression characteristics for disturbance can be obtained.

Further, the brushless motor driving circuit of the present invention comprises a speed detection means for detecting a rotor speed; a speed difference detecting means for outputting a difference between the detected actual rotation speed of the rotor and a target rotation speed as a speed difference signal; and a speed difference compensation filter for obtaining a current indication value from the detected speed difference signal which is supplied to the armature windings; the target rotation speed of the speed difference detecting means and a gain of the speed difference compensation filter are changed according to the indicated rotation speed which is supplied to the driving circuit of the brushless motor.

Since a target of the speed difference detector and a gain of the speed difference compensation filter are switched according to the indicated rotation speed, it is not necessary to change the reference clock inputted into the speed difference detector.

Further, the brushless motor driving circuit of the present invention comprises a rotor location detection means for detecting a relative location of the armature windings and the rotor; a commutation control means for switching a current to an armature winding at a detected rotor location; a speed detection means for detecting a speed of actual rotor speed; a speed difference detecting means for outputting a difference between an actual rotation speed of the rotor and target rotation speed as a speed difference signal; the a speed difference compensation filter for obtaining a current indication value from detected speed difference signal in order to drive the armature winding; the commutation control means switch the current supplying phase and increase or decrease the current indication value which is applied to the armature winding after a predetermined period.

Since the current is sequentially increased or decreased after current phase is switched within a predetermined period, the current is easily feedbacked to compensate the terminal voltages.

Further, in the brushless motor driving circuit of the present invention, a maximum current is supplied to the armature windings during a period of starting and restarting.

Since a maximum current is supplied into the armature winding during starting and restarting, the motor can be started in a short time.

Further, the brushless motor driving circuit of the present invention comprises a rotor location signal generation means for detecting a location signal of rotor from each phase terminal voltage or voltage differences of respective phases; a pulse generation means for detecting a rising and falling edge of rotor location signal of output of the rotor location signal generation means, for providing an output pulse train by selecting a necessary edge signal from each detected edge signal, further for providing a pseudo-pulse train when the necessary edge signal is not detected for a predetermined period; and a counter for counting an output signal from the pulse generation means; the counter output is supplied to drive the armature winding.

Since a necessary signal in the rising and falling edge of rotor location signal is selected and the armature winding is driven by counting the necessary signal, the motor can be surely started in a short time and then moved surely to a normal rotation.

Further, the brushless motor driving circuit of the present invention comprises a commutation circuit for obtaining an armature winding driving signal from a rotor location signal detected in the rotor location signal detection means which includes a compensation means for compensating each terminal voltage or voltage differences of respective phases and a comparing means for comparing each terminal voltage or voltage differences between respective phases; and a trapezoid driving signal generation circuit for forming a trapezoid driving signal from the output of the commutation circuit; the trapezoid driving signal is supplied to drive the armature winding.

Since the armature windings are driven by the trapezoid shaped signal, it is possible to decrease noise at commutation.

Further, the brushless motor driving circuit of the present invention comprises a charging/discharging circuit in the trapezoid driving signal generating circuit for changing the gradient of the trapezoid driving signal by changing the time constant of the charging/discharging circuit using a control signal inputted from outside.

Since the gradient of the trapezoid shaped driving signal is changed by the outside controlling signal, it is possible to surely decrease noise at commutation, even if rotation speed of motor changes.

Further, the brushless motor driving circuit of the present invention comprises a phase leading circuit for leading a phase of the rotor location signal, the leading quantity of the phase leading circuit is set to substantially 1/2 of the gradient time of the trapezoid driving signal for driving the armature winding.

Since the phase of rotor location signal is led so that the grading center of the trapezoid shaped driving signal coincides with the commutation timing, it is possible to decrease noise without decreasing the torque generating efficiency.

BRIEF DESCRIPTION OF THE DRAWINGS

FIG. 10 shows a table which explains an operation of an inter-terminal voltage compensation circuits.

FIG. 24 shows a table which explains an operation of a counter circuit of embodiment 8.

FIG. 25 shows a table which explains an operation of a counter circuit of embodiment 8.

FIG. 31 shows a relationship between a rotor location signal and the count numbers.

FIG. 72 shows a table which explains an operation of embodiment 22.

FIG. 120 is a block diagram which shows a general construction of a conventional brushless motor driving device.

FIG. 121 shows another general construction of a conventional brushless motor driving device and operation timing.

FIG. 122 is a block diagram which shows a speed control system of a conventional brushless motor driving device.

FIG. 123 is a block diagram which shows a speed difference compensation filter of a conventional brushless motor driving device.

DETAILED DESCRIPTION OF THE PREFERRED EMBODIMENTS

Embodiment 1

In the prior art, when voltages of the armature windings of respective phases are detected, there occurs a phase delay during the detection. Therefore, in the present invention, an compensation voltage which is a product of the load resistance and the current in an actual loading state is applied to the armature windings in order to obtain a terminal voltages at a correct phase in an actual loading state. Thus, the driving voltages of the armature windings of respective phases are generated in the commutation circuit according to the winding the terminal voltages.

Further, in the present invention, equivalent motor speed is detected from the armature winding voltage of respective phases. This detected speed is feedbacked to the armature windings to control the rotor speed, which is explained below.

In this embodiment, a construction and an operation of the brushless motor driving device is explained.

Figure 1:
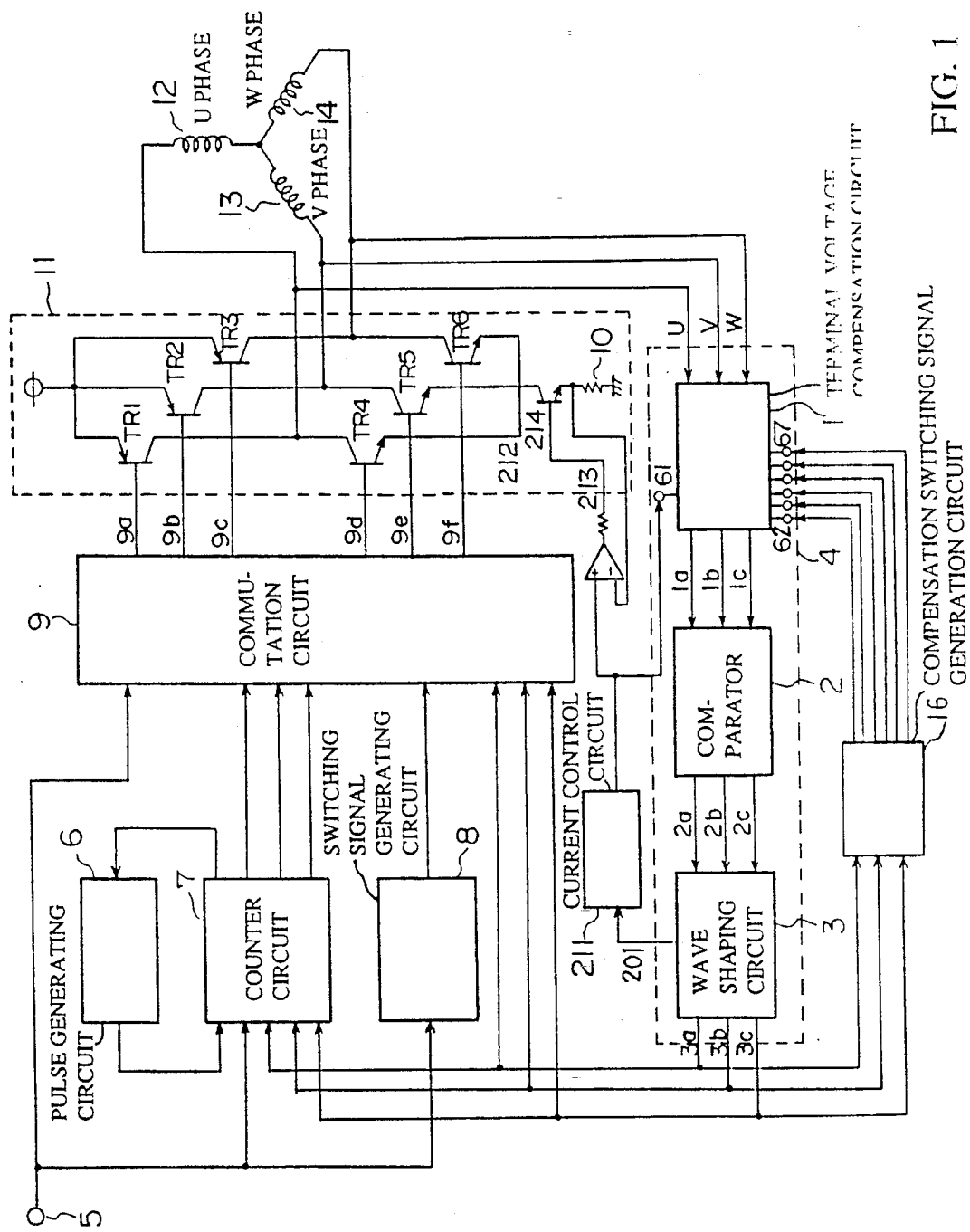
FIG. 1 is a block diagram of a first embodiment of the present invention which shows a general construction a brushless motor driving device.

FIG. 1 is a block diagram of a first embodiment of the present invention which shows a general construction a brushless motor driving device. In FIG. 1, the numerals 12, 13 and 14 denote the armature windings of neutral non-grounding three phase star connection brushless motor, the numeral 11 denotes a bridge circuit which supplies predetermined driving currents to the armature windings 12, 13 and 14 by controlling driving transistor group TR1~TR6. We call the armature windings 12, 13 and 14 as U phase, V phase, and W phase, respectively, in the following, for convenience' sake.

The numeral 1 denotes a terminal voltage compensation circuit which compensates the terminal voltages and outputs compensation terminal voltage signal 1a, 1b and 1c. The numeral 2 denotes a comparator which compares the compensated the terminal voltages of respective phases and obtain logic signals 2a, 2b and 2c. The numeral 3 denotes a waveform shaping circuit which obtains the rotor location signals 3a, 3b and 3c by shaping the waveform of logic signals 2a, 2b and 2c. The numeral 4 denotes a rotor location signal generating circuit which comprises elements 1, 2 and 3.

The numeral 5 denotes a terminal where the motor rotation signal is inputted in order to enable the motor rotation, the numeral 6 denotes a pulse generating circuit, the numeral 7 denotes a counter circuit, the numeral 8 denotes a switching signal generating circuit, the numeral 9 denotes a commutation circuit. The commutation circuit 9 outputs the driving signals 9a~9f and controls to switch the driving transistor group TR1~TR6 according to a state of signal input of the rotor location signal generating circuit 4, the terminal 5, the counter circuit 7, the switching signal generating circuit 8.

Figure 2:
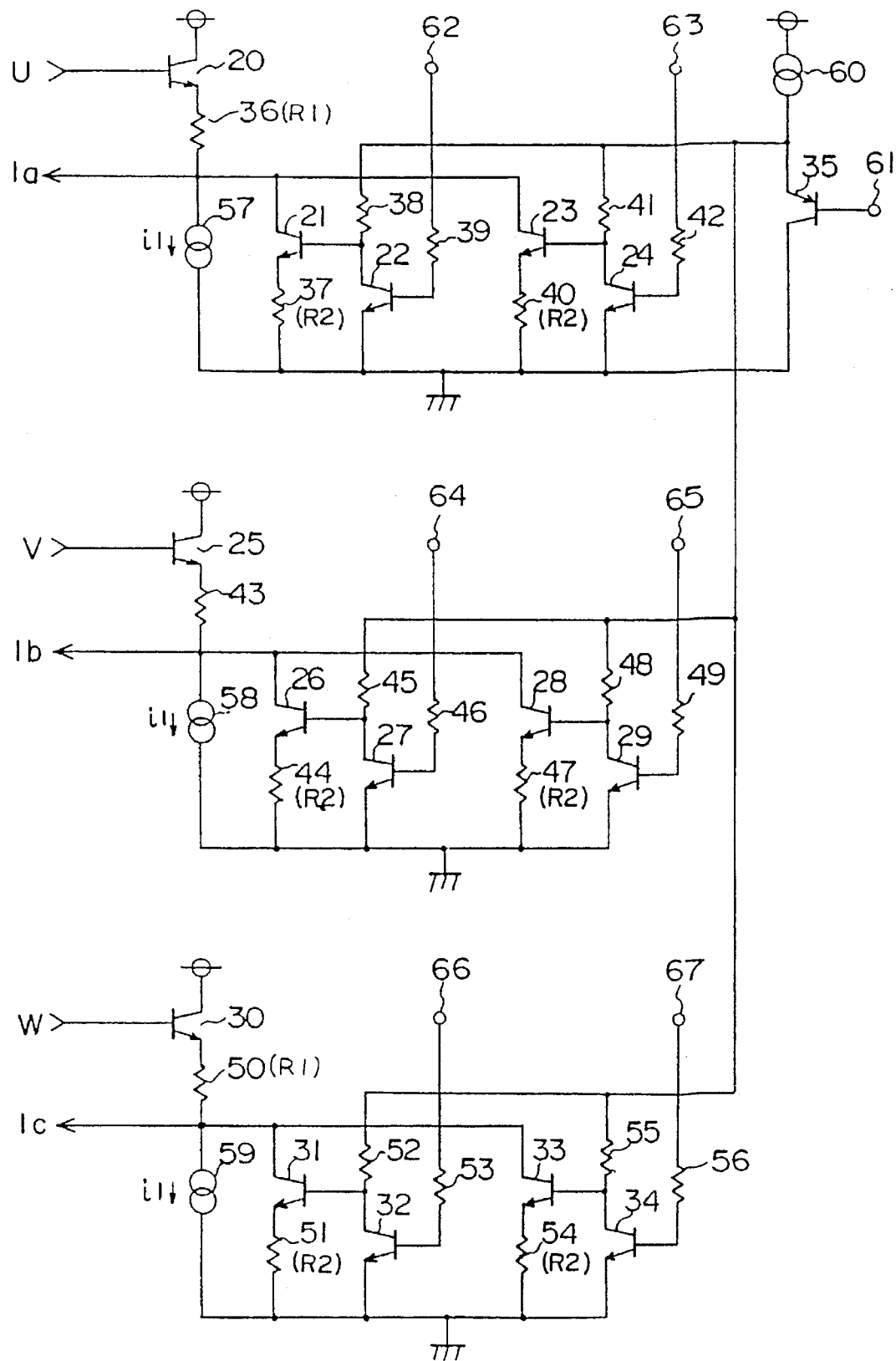
FIG. 2 shows a concrete construction example of a terminal voltage compensation circuit.

FIG. 2 shows a concrete construction example of a terminal voltage compensation circuit. In FIG. 2, the numerals 22~34 denote npn transistor, the numeral 35 denotes a pnp transistor, the numerals 36~56 denote resistors, the numerals 57~60 denote constant current sources. U phase terminal voltage is inputted to the base of the npn transistor 20, V phase terminal voltage is inputted to the base of the npn transistor 25, W phase terminal voltage is inputted to the base of the npn transistor 30, and a voltage generated by the armature winding ohmic drop which is applied to the base terminal 61 is inputted to the pnp transistor 35. The numerals 62~67 denote terminals where the compensation switching signal are inputted which switches terminal voltage. The compensated the terminal voltages of respective phases are outputted as shown by numerals 1a, 1b and 1c.

Figure 3:
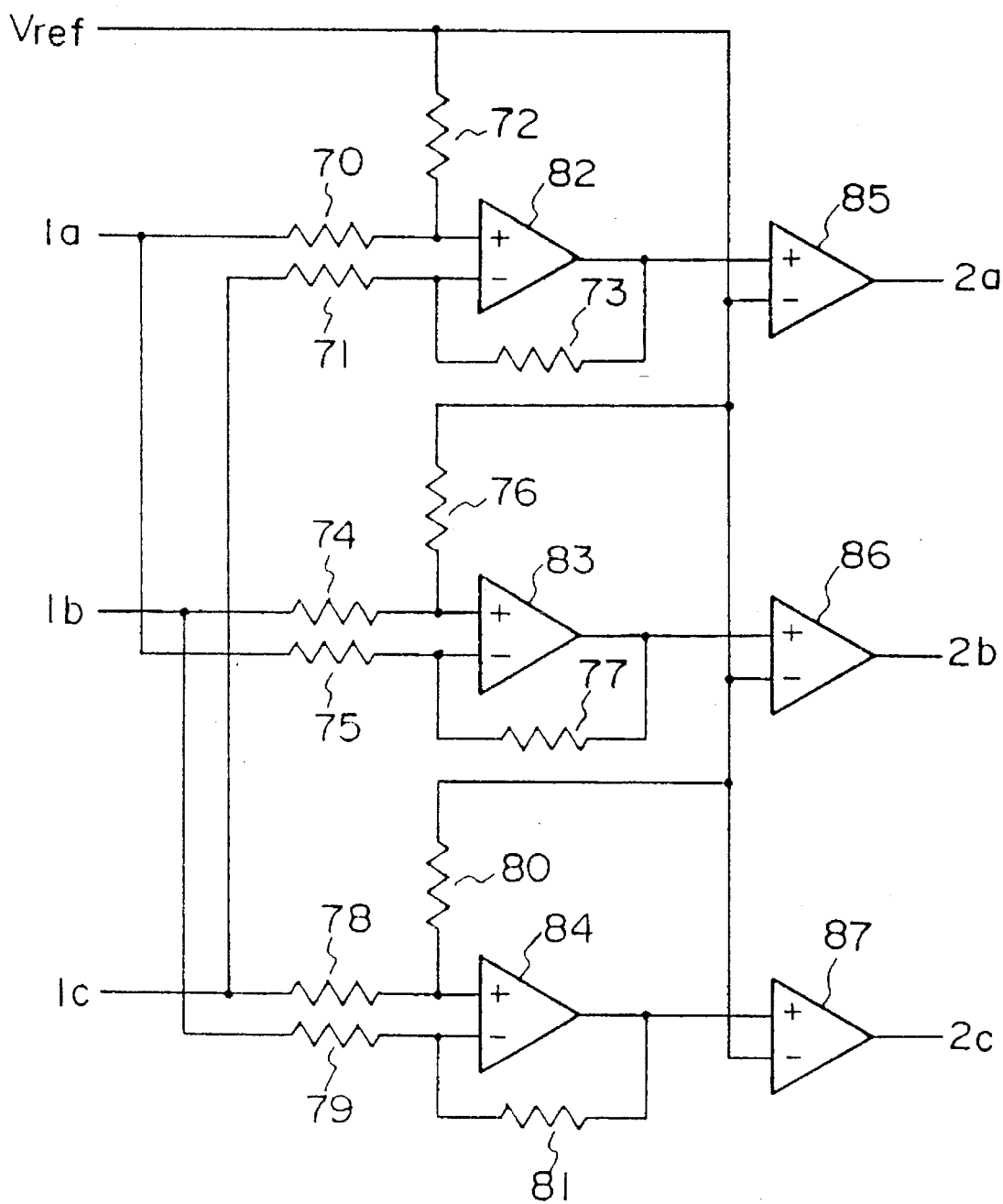
FIG. 3 shows a concrete construction example of a comparator of the embodiment 1.

FIG. 3 shows a concrete construction example of a comparator shown in FIG. 1. In FIG. 3, the numerals 70~81 denote resistors, the numerals 82~84 denote differential amplifier circuit, the numerals 85~87 denote comparators. The compensated U phase the terminal voltages 1a is applied to the non-inversion input terminal of differential amplifier circuit 82 and to the inversion input terminal differential amplifier circuit 83 through the resistors 70 and 75, respectively. The compensated V phase the terminal voltages 1b is applied to the non-inversion input terminal of differential amplifier circuit 83 and to the inversion input terminal differential amplifier circuit 84 through the resistors 74 and 79, respectively. The compensated W phase the terminal voltages 1c is applied to the non-inversion input terminal of differential amplifier circuit 84 and to the inversion input terminal differential amplifier circuit 82 through the resistors 78 and 71, respectively.

Inversion input terminals of the differential amplifier circuits 82, 83 and 84 are connected to the output terminals of the differential amplifier circuits 82, 83 and 84 through resistors 73, 77 and 81, respectively, and the output terminals of the differential amplifier circuits 82, 83 and 84 are connected to non-inversion input terminals of comparator 85, 86 and 87.

Further, a reference voltage Vref is inputted to the non-inversion input terminal of the differential amplifier circuit 82 and 83 and 84 and to the inversion input terminal of comparator 85, 86 and 87. The differential amplifier circuit 82 outputs a differential amplifier signal between 1a and 1b on both sides of the center voltage of Vref. This differential amplifier signal is compared with Vref in the comparator 85 and a logic signal 2a is obtained. In the similar process, the logic signals 2b and 2c can be obtained.

Figure 4:
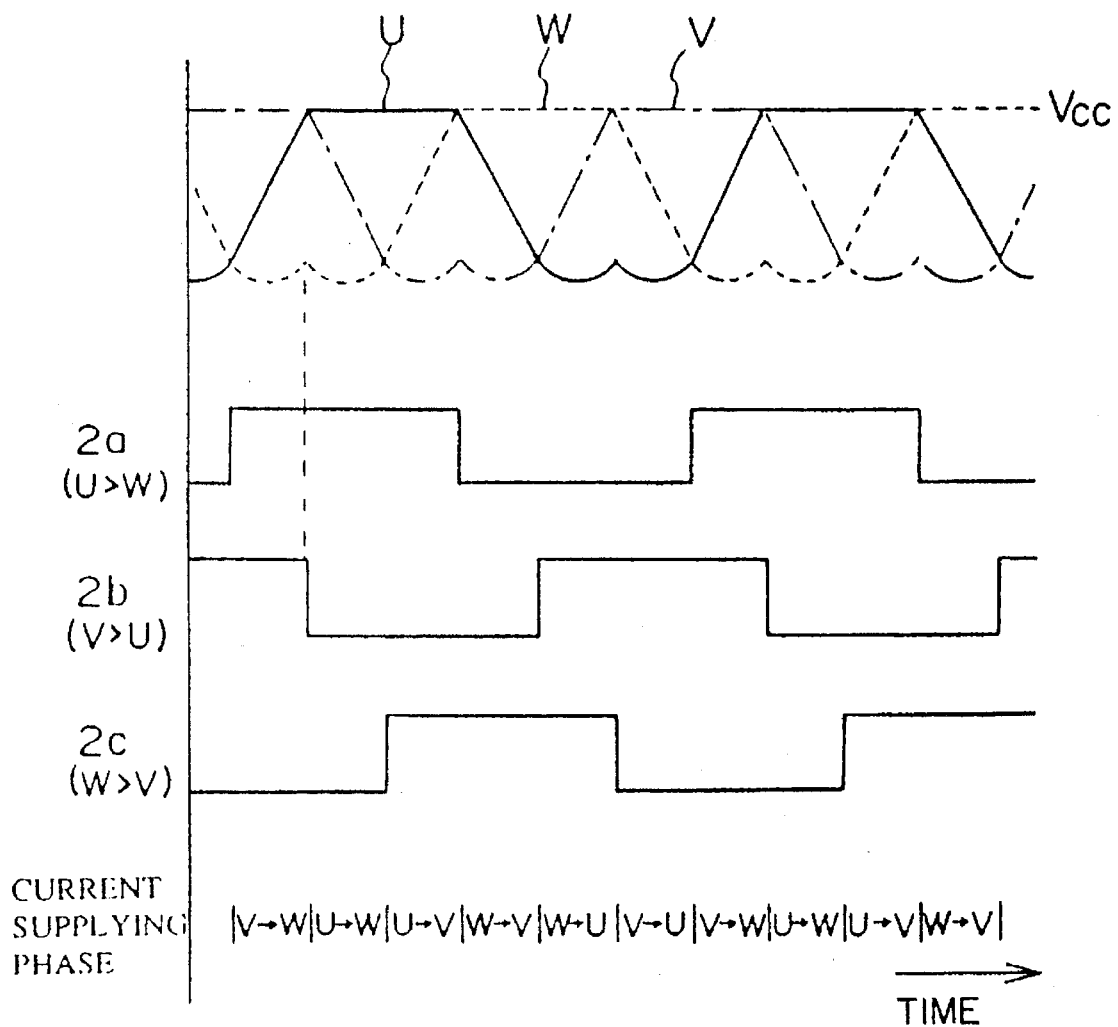
FIG. 4 shows a signal wave which explains operation of the embodiment 1 and 2.

FIG. 4 shows a relationship between terminal voltage waveforms of respective phases at no load state, logic signals 2a, 2b and 2c outputted from the comparator 2, and current supplying phase in case that the terminal voltages are not compensated.

In an actual terminal voltage waveform at commutation, spike shaped voltage fluctuation is generated, but it is omitted here in order to simplify the explanation. At no load status, since a quantity of current supply is small, ohmic drop in the armature winding can not be neglected. Therefore, waveforms of the terminal voltage have a symmetry shape toward right and left direction as shown in FIG. 4 and a certain logic signal having a predetermined phase relationship with the rotor can be obtained.

Figure 5:
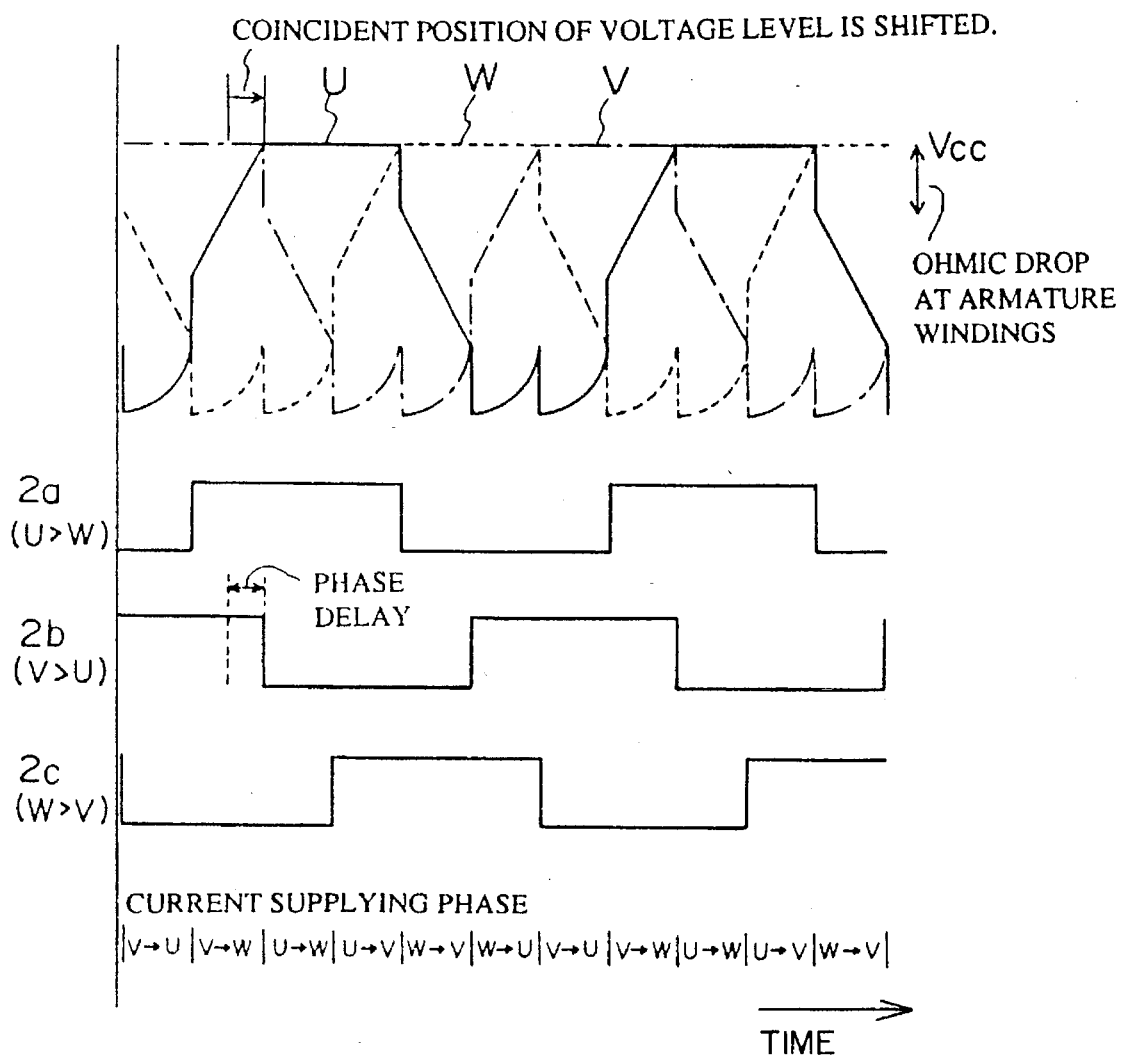
FIG. 5 shows a signal wave which explains operation of the embodiment 1 and 2.

On the other hand, FIG. 5 shows a relationship between terminal voltage waveforms of respective phases at load state, the logic signals 2a, 2b and 2c outputted from the comparator 2, and current supplying phase in case that the terminal voltages are not compensated. In the load state, since there is increased supplying currents, the effects of the ohmic drop in the armature windings can not be neglected. In the two the terminal voltages in comparison, one is a current supplying phase, and another is no current supplying phase.

For example, when the current supply is switched from V→W to U→W, the terminal voltages of U and V phase are compared. At this time, V phase is a current supplying phase and U phase is no current supplying phase. The ohmic drop voltage is superposed to the terminal voltage waveform of the current supplying phase V. On the other hand, since the current does not flow in U phase, only counter electromotive voltage is generated at the terminal. Since the voltages of the bridge circuit is fixed to Vcc, and the neutral point is not grounded, the neutral voltage deceases by only ohmic drop. Therefore, the actual terminal voltage waveform is actually observed as a decreased the terminal voltages of no current supplying phase U. Accordingly, there is a shifting at the positions where the terminal voltage level of U phase and the terminal voltages of V phase are coincident, and then the logic signal 2b delays, for example in of FIG. 5, in comparison with no-load state.

In order to solve the above problem in which the phase delay is generated, in the present invention, the ohmic drop voltage is added to and subtracted from the terminal voltages of current supply phase, and the terminal voltages are compared with each other to obtain logic signals 2a, 2b and 2c.

For example, at U phase, when the voltage is applied from U phase to V phase or W phase, the ohmic drop voltage is subtracted, and when the voltage is applied from V phase or W phase to U phase, the ohmic drop voltage is added.

An operation of the terminal voltage compensation circuit 1 is concretely explained using FIG. 2. Although FIG. 2, shows a terminal voltage compensation circuit of three phases for U, V, W, but the following explanation relates to only a terminal voltage compensation circuit of U phase.

First, in the following explanation, the terminal 62 and terminal 63 are assumed to be at H (high) level. Since collector voltages of npn transistor 22, npn transistor 24 become zero, the emitter voltage of npn transistor 21, npn transistor 23 also become zero, therefore, the current does not flow in the resistor 37 and the resistor 40. Accordingly, the current which flows in the resistor 36 (resistance value= R1) is only $i_1$ which is supplied by a constant current source 57. Therefore, the voltage which is observed at U phase output terminal of the terminal voltage compensation circuit becomes a voltage which subtracts the voltage between base-emitter ($V_{be}$) of the transistor 20 and the ohmic drop voltage in the resistor 36 from the input voltage of the terminal voltage compensation circuit such as indicated by the equation (1).

$$1a = U - V_{be} R1 \times i1 \qquad (1)$$

Next, the terminal 62 and terminal 63 are assumed to be at L (low) level.

Assume that a voltage $V_{ir}$ is applied to the terminal 61. Then, since collector voltages of npn transistor 22, npn transistor 24 become $V_{ir}+Vbe$, the emitter voltage of npn transistor 21, npn transistor 23 also become $V_{ir}$, therefore, the current flowing in the resistor 37 (resistance value=R2) and the resistor 40 (resistance value=R2) is $V_{ir}/R2$, respectively. Accordingly, the current which flows in the resistor 36 is $i_1$ which is supplied by a constant current source 57 plus a current which flows in the resistors 37, 40. Therefore, the voltage which is observed at U phase output terminal of the terminal voltage compensation circuit becomes below such as indicated by the equation (2).

$$1a = U - V_{be} 31\ R1 \times i_1 - 2\ R1 \times V_{ir}/R2 \qquad (2)$$

When the terminal 62 is H level and the terminal 63 is at L level, or the terminal 62 is at L level and the terminal 63 are set to H level, since a current $V_{ir}/R2$ flows only either of the resistor 37 or the resistor 40, the voltage which is observed at U phase output terminal of the terminal voltage compensation circuit becomes below such as indicated by the equation (3).

$$1a = U - V_{be} - R1 \times i_1 - R1 \times V_{ir}/R2 \qquad (3)$$

Finally, when the ohmic drop voltage is to be added (V→U, W→U), the terminal 62 and the terminal 63 is set to H level, and when the ohmic drop voltage is to be subtracted (U→V, U→W), the terminal 62 and the terminal 63 can be set to L level in order to compensate the terminal voltages.

Further, when U phase need not to be compensate (V→W, W→V), the terminal 62 can be set to H level and the terminal 63 can be set to L level, or the terminal 62 is set to L level and the terminal 63 is set to H level, and when the ohmic drop voltage is to be subtracted (U→V, U→W), the terminal 62 and the terminal 63 are set to L level in order to compensate the terminal voltages.

Similarly, in the V phase, when the ohmic drop voltage is to be added (U→V, W→V), the terminal 64 and the terminal 65 is set to H level, and when the ohmic drop voltage is to be subtracted (V→U, V→W), the terminal 64 and the terminal 65 can be set to L level in order to compensate the terminal voltages.

Further, when V phase need not to be compensate (U→W, W→U), the terminal 64 can be set to H level and the terminal 65 can be set to L level, or the terminal 64 is set to L level and the terminal 65 is set to H level.

Similarly, in the W phase, when the ohmic drop voltage is to be added (U→W, V→W),, the terminal 66 and the terminal 67 are set to H level, and when the ohmic drop voltage is to be subtracted (W→U, W→V), the terminal 66 and the terminal 67 can be set to L level in order to compensate the terminal voltages.

Further, when W phase need not to be compensate (U→V, V→U), the terminal 66 can be set to H level and the terminal 67 can be set to L level, or the terminal 66 is set to L level and the terminal 67 is set to H level.

Figure 6A:
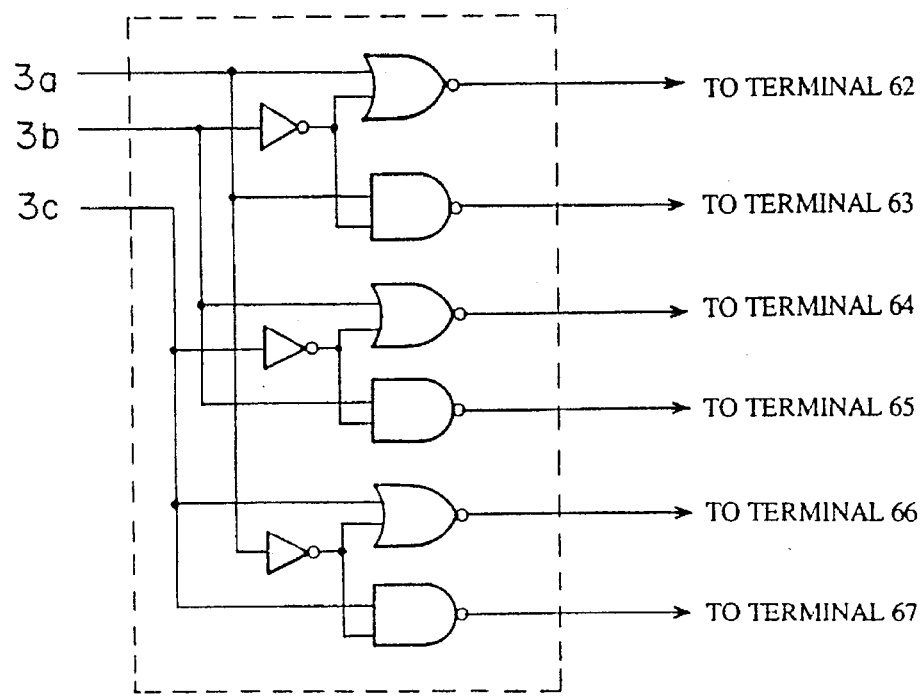
FIG. 6 show a construction of a compensation switching signal generating circuit and signal wave forms of a terminal voltages circuit.
Figure 6B:
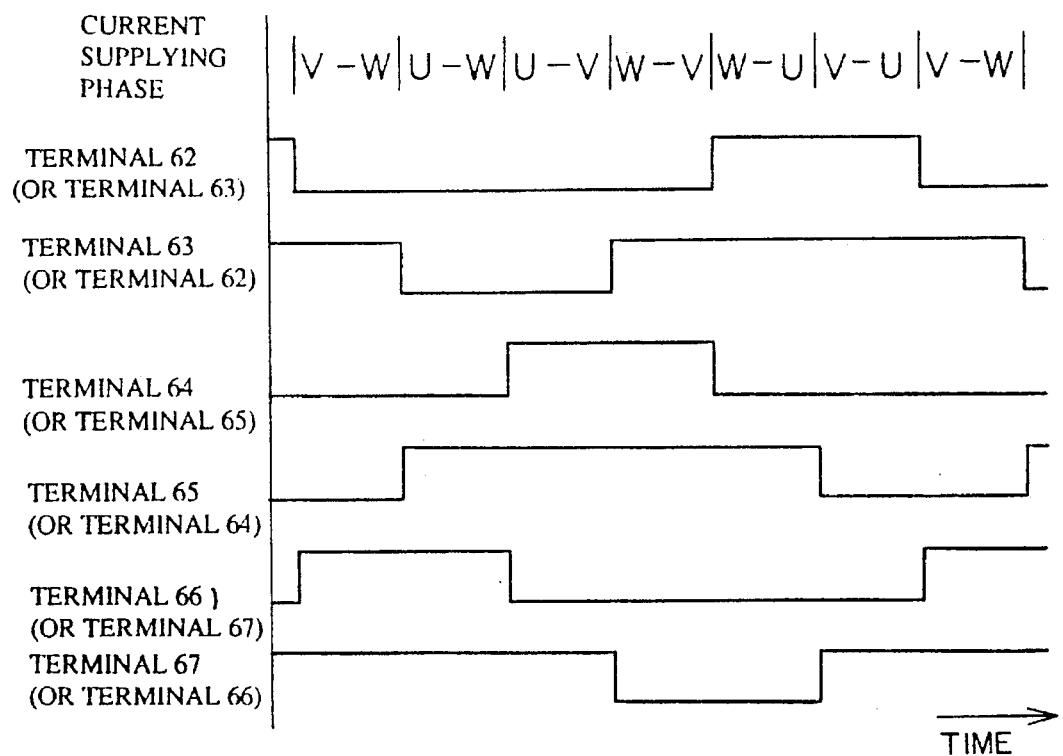

FIG. 6(b) shows a time chart having a relationship between the current supplying phase and the compensation switching signal inputted into the terminals 62–67.

FIG. 6(a) shows a detailed circuit diagram of concrete compensation switching signal generating circuit 16 in which the detected winding the terminal voltages are compensated by the product of the resistor and current only during actual driving period.

In this embodiment, the rotor location signals 3a, 3b and 3c are applied to input terminal of the concrete compensation switching signal generating circuit 16, and resultant output signals shown in FIG. 6(b) are supplied to the terminals 62–67 of the terminal voltage compensation circuit 1 after logical operation by the combination of the logical elements in the compensation switching signal generating circuit 16.

Further, as shown in FIG. 1, since the current control circuit 211 and the buffer amplifier 212, the resistor 213, the driving transistor 214 control the armature currents, the output of the control circuit 211 is applied to the terminal 61 of terminal voltage compensation circuit 1.

The current control circuit 211 detects a difference between the actual rotation speed obtained from the logic pulse signal 201 and the indicated rotation speed to control the armature current so that detected difference becomes zero.

Further, three phase brushless motor is explained above in this embodiment, but it is apparent that the invention can be applied to a brushless motor having more than three phases. The means which is constituted of transistor circuit in this embodiment may be constituted by Operational (OP) amplifier and digital integrated circuit.

Embodiment 2

In the prior art, when voltages of the armature windings of respective phases are detected, there occurs a phase delay during the detection. Therefore, in the present invention, an compensation voltage which is a product of the load resistance and the current in an actual loading state is applied to the voltage difference of the armature windings of respective phase in order to obtain a terminal voltages at a correct phase in an actual loading state. Thus, the deriving signals of the armature windings of respective phases are generated in the commutation circuit according to the winding the terminal voltages.

In this embodiment, a construction and an operation of the brushless motor driving device is explained.

Figure 8:
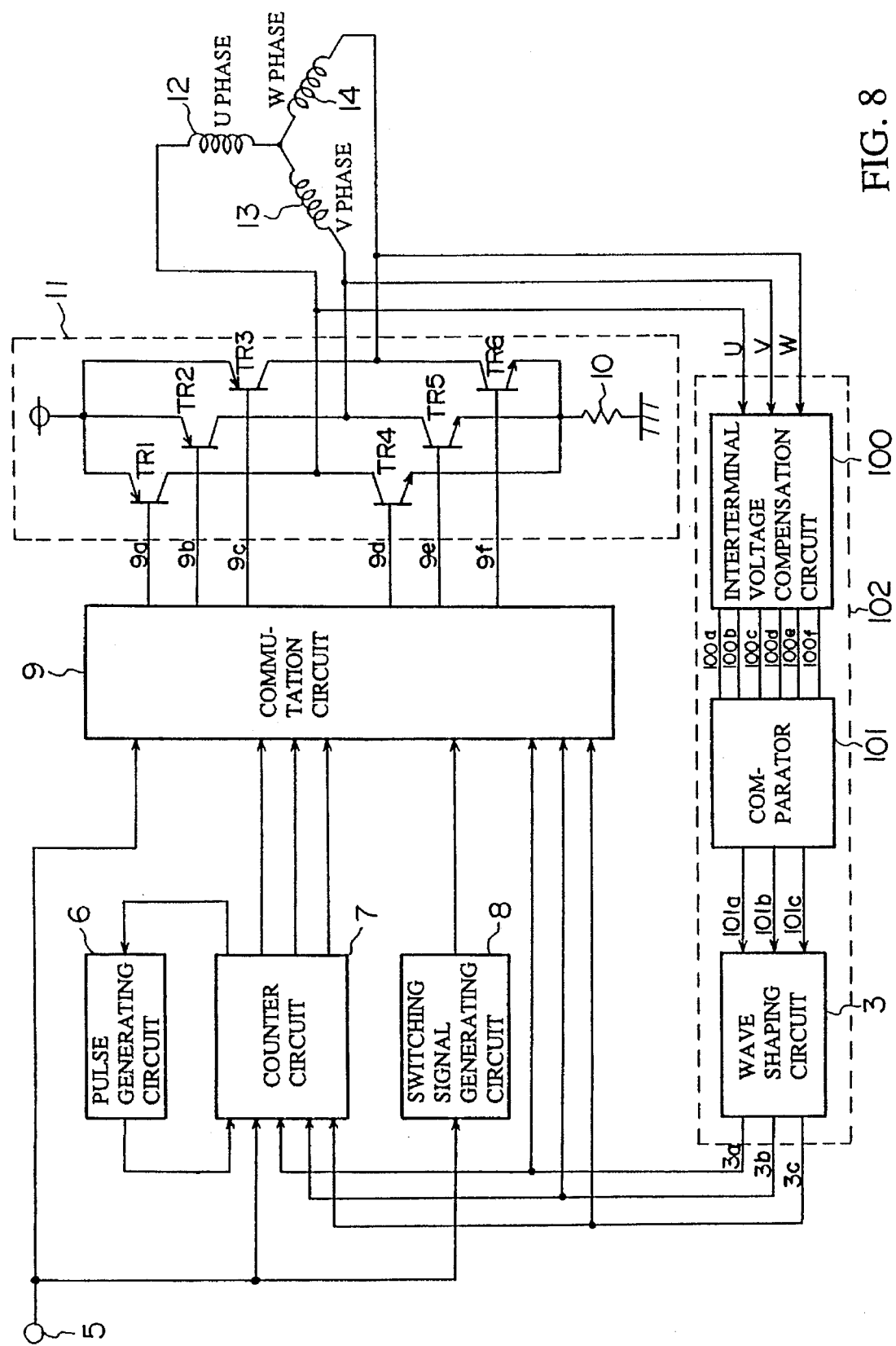
FIG. 8 is a block diagram of a second embodiment of the present invention which shows a general construction a brushless motor driving device.

FIG. 8 is a block diagram of a second embodiment of the present invention which shows a general construction a brushless motor driving device. In FIG. 8, the same elements are shown by the same numerals of the embodiment 1 in FIG. 1. The numeral 100 denotes an inter-terminal voltage compensation circuit which compensates the voltage between the terminals, and outputs inter-terminal compensation voltage signals 100a~100f. The numeral 101 denotes a comparator which obtains logic signals 101a, 101b and 101c by comparing the compensated voltages between the terminals. The numeral 102 denotes a rotor location signal generating circuit which includes the inter-terminal voltage compensation circuit 100, the comparator 101 and a waveform shaping circuit 3.

Figure 9:
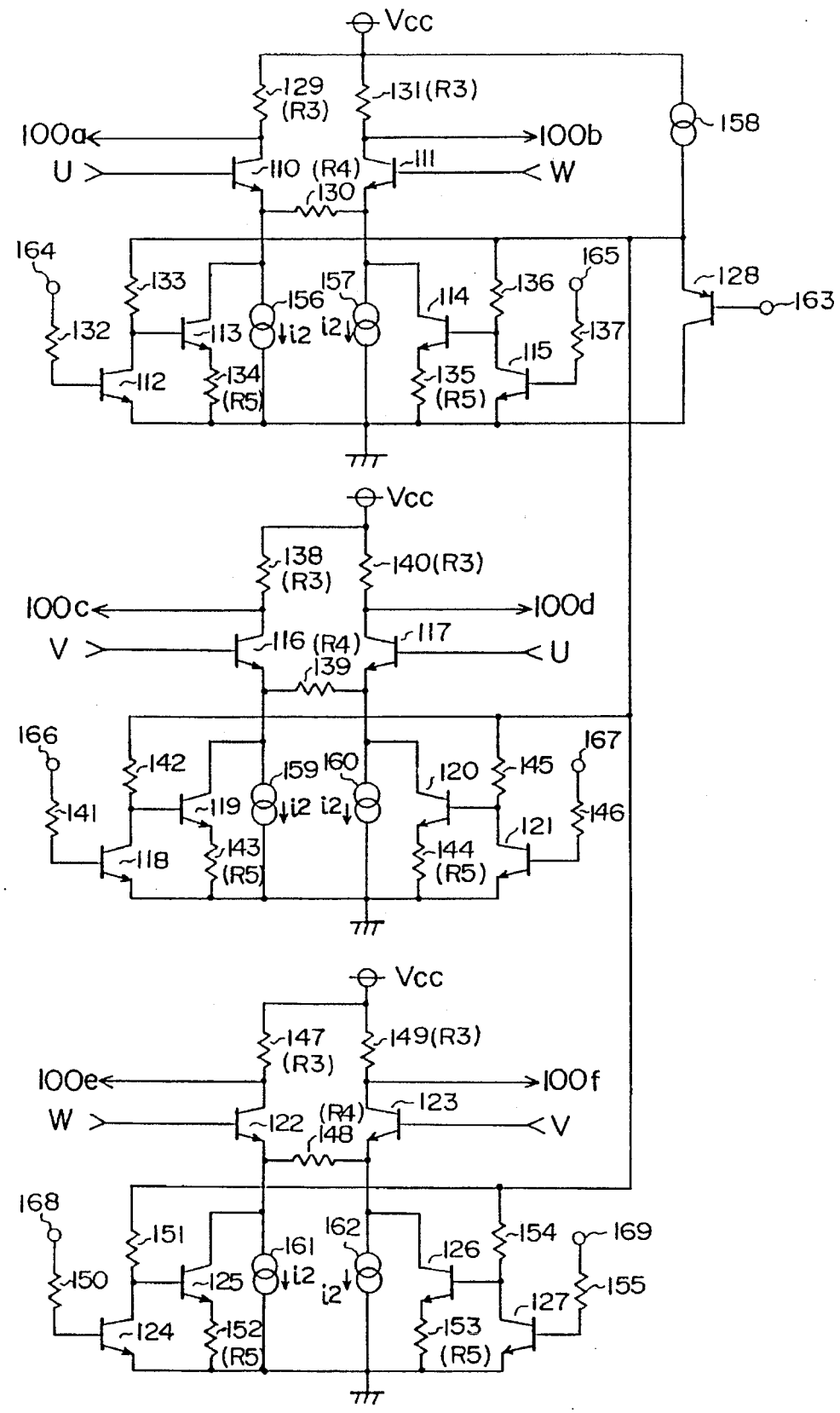
FIG. 9 shows a concrete inter-terminal voltage compensation circuits.

FIG. 9 shows a concrete inter-terminal voltage compensation circuits 100. In FIG. 9, the numerals 110–127 denote npn transistors, the numeral 128 denotes a pnp transistor, the numerals 129–155 denote resistors, the numerals 156–162 denote constant current sources. U phase the terminal voltages are applied to bases of the npn transistors 110 and 117, respectively, V phase the terminal voltages are applied to bases of the npn transistors 116 and 123, respectively, W phase the terminal voltages are applied to bases of the npn transistors 111 and 122, respectively the armature winding ohmic drop is applied to the terminal 163 which is connected to the base of pnp transistor 128. The numerals 164~169 denote terminals where the compensation switching signals for switching voltage between the terminals are applied. The compensated inter-terminal voltage is outputted to 100a~100f.

A concrete operation of the inter-terminal voltage compensation circuit is explained below. In FIG. 9, lets assume the power supply voltage is Vcc, ohmic value of resistors 129, 131, 138, 140, 147 and 149 is R3, ohmic value of resistors 130, 139 and 148 are R4, ohmic value of resistors 134, 135, 143, 144, 152 and 153 are R5, current value supplied by constant current sources 156, 157 and 159~162 are $i_2$, base current of npn transistor is $ib$, voltage inputted into terminal 163 is $V_{ir}$.

First, the terminal 164 being at H level is considered. The emitter voltage of the npn transistor 113 becomes zero volt, then the current does not flow in the resistor 134. In the resistor 130, a current of (U−W)/R4 flows from the emitter terminal of npn transistor 110 toward the emitter terminal of npn transistor 111.

Accordingly, the current which flow in the resistor 129 is $I_2+(U-W)/R4-i_b$, then the output 100a outputted from the inter-terminal voltage compensation circuits 100 is given by the equation (4).

$$100a = Vcc - R3 \times \{i_2 + (U-W)/R4 - i_b\} \tag{4}$$

On the other hand, when the terminal 164 is at L level, the current $V_{ir}/R5$ flows in the resistor 134 then the output 100a outputted from the inter-terminal voltage compensation circuits 100 is given by the equation (5).

$$100a = Vcc - R3 \times \{i_2 + (U-W)/R4 + V_{ir}/R5 - i_b\} \tag{5}$$

Considering the other inter-terminal voltage in the similar way, the relationship between the logic level of terminals 164~169 and the outputs 100a~100f is shown in FIG. 10.

Figures 11, 12:
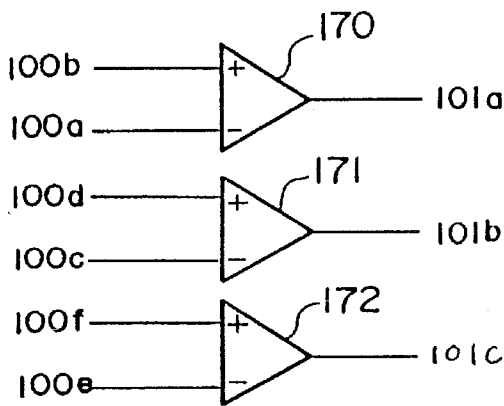
FIG. 11 shows a concrete construction example of a comparator of the embodiment 2.
FIG. 12 shows a table which explains an operation of an inter-terminal voltage compensation circuits.

FIG. 11 shows a concrete construction example of a comparator 101 of the embodiment 2. In FIG. 11, the numerals 170~172 denote comparators. The comparator 170 compares 100b with 100a and outputs a logic signal 101a, the comparator 171 compares 100d with 100c and outputs a logic signal 101b, and the comparator 172 compares 100f with 100e and outputs a logic signal 101c.

The concrete operation of the comparator 101 is considered below. When the terminal 164 and terminal 165 are at H levels, the comparator 170 outputs a logic signal 101a of U>W. When the terminal 164 is at L level and the terminal 165 is at H level, the comparator 170 outputs a logic signal 101a of $\{U+R4 \times V_{ir}/(2 \times R5)\}>W$. Adversely, when the terminal 164 is at H level and the terminal 165 is at L level, the comparator 170 outputs a logic signal 101a of $\{U-R4 \times V_{ir}/(2 \times R5)\}>W$.

As is shown in FIG. 4, the rotor location is detected by the coincidence of the terminal voltages of W phase and U phase at the time when switching current supply from U→V to W→V and at the time when switching current supply from V→U to V→W. But, since U phase is a current supplying phase and a W phase is a non-current supplying phase, an ohmic drop voltage is superposed to the U phase terminal voltage at both cases. Accordingly, it is necessary to compensate the ohmic drop voltage from U phase terminal voltage at a comparing point. When current supply is switched from U→V to W→V, it is necessary to subtracts an ohmic drop voltage from U phase the terminal voltages. When current supply is switched from V→U to V→W, it is necessary to adds an ohmic drop voltage to U phase the terminal voltages.

Accordingly, if R4 and R5 are set so that $(R4 \times V_{ir}/(2 \times R5)$ is to be an armature winding ohmic drop voltage, and terminal 164 is set to H level and the terminal 165 is set to L level at U→V current supply, or the terminal 164 is set to L level and the terminal 165 is set to H level at V→U current supply, the comparator 101 compares U phase terminal voltage with W phase terminal voltage in which the ohmic drop are compensated, then outputs the logic signal 101a. Accordingly, the same effect may be obtained in comparison with the embodiment 1.

It is possible to consider the other inter-terminal voltage in a similar way. If the terminal 166 is set to H level and the terminal 167 is set to L level at V→W current supply, or the terminal 166 is set to L level and the terminal 167 is set to H level at W→V current supply, the terminal 168 is set to H level and the terminal 169 is set to L level at W→U current supply, or the terminal 168 is set to L level and the terminal 169 is set to H level at U→W current supply, it is possible to get a similar effect in comparison with the embodiment 1. FIG. 12 shows a relationship between the current supplying phase and the compensation switching signal inputted into the terminals 164~169.

Embodiment 3

In this third embodiment, the voltages of the armature windings of respective phases are detected as described in the embodiment 1, an compensation voltage which is a product of the load resistance and a current in an actual loading state is applied to the armature windings of respective phase in order to obtain a terminal voltages at a correct phase in an actual loading state. Thus, the deriving signals of the armature windings of respective phases are generated. In the present embodiment, the above the driving signals is used as a compensation switching signal.

An operation of the brushless motor driving device of the present embodiment is explained below.

Figure 13:
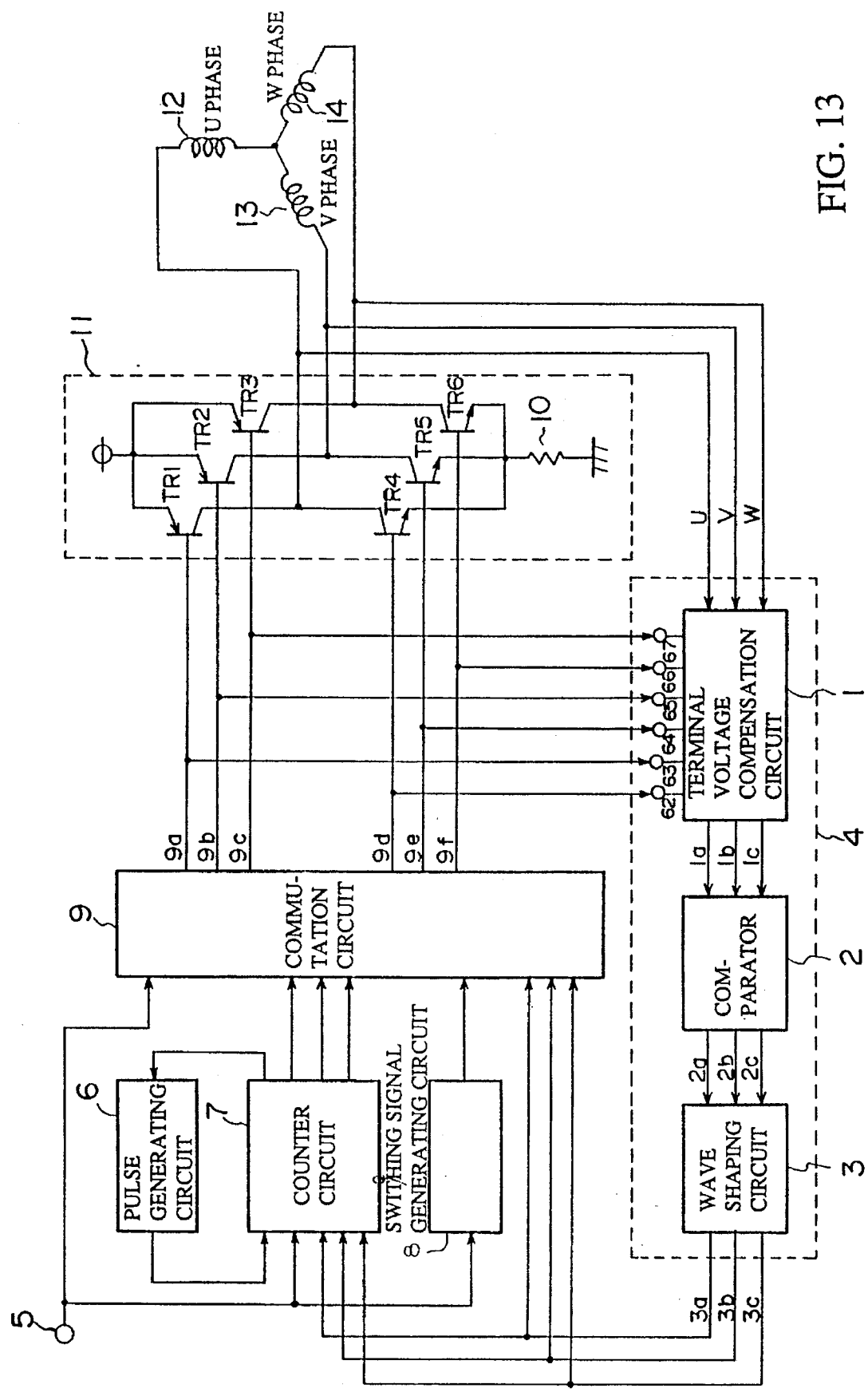
FIG. 13 is a block diagram of a third embodiment of the present invention which shows a general construction a brushless motor driving device.

FIG. 13 is a block diagram of a third embodiment of the present invention which shows a general construction a brushless motor driving device. In FIG. 13, the same elements are shown by the same numerals of the embodiment 1 in FIG. 1. In this embodiment, the driving signals 9a, 9b, 9c, 9d, 9e and 9f are inputted into the terminal 63, terminal 65, terminal 67, terminal 62, terminal 64 and terminal 66 of the terminal voltage compensation circuit 1, respectively.

Figure 7:
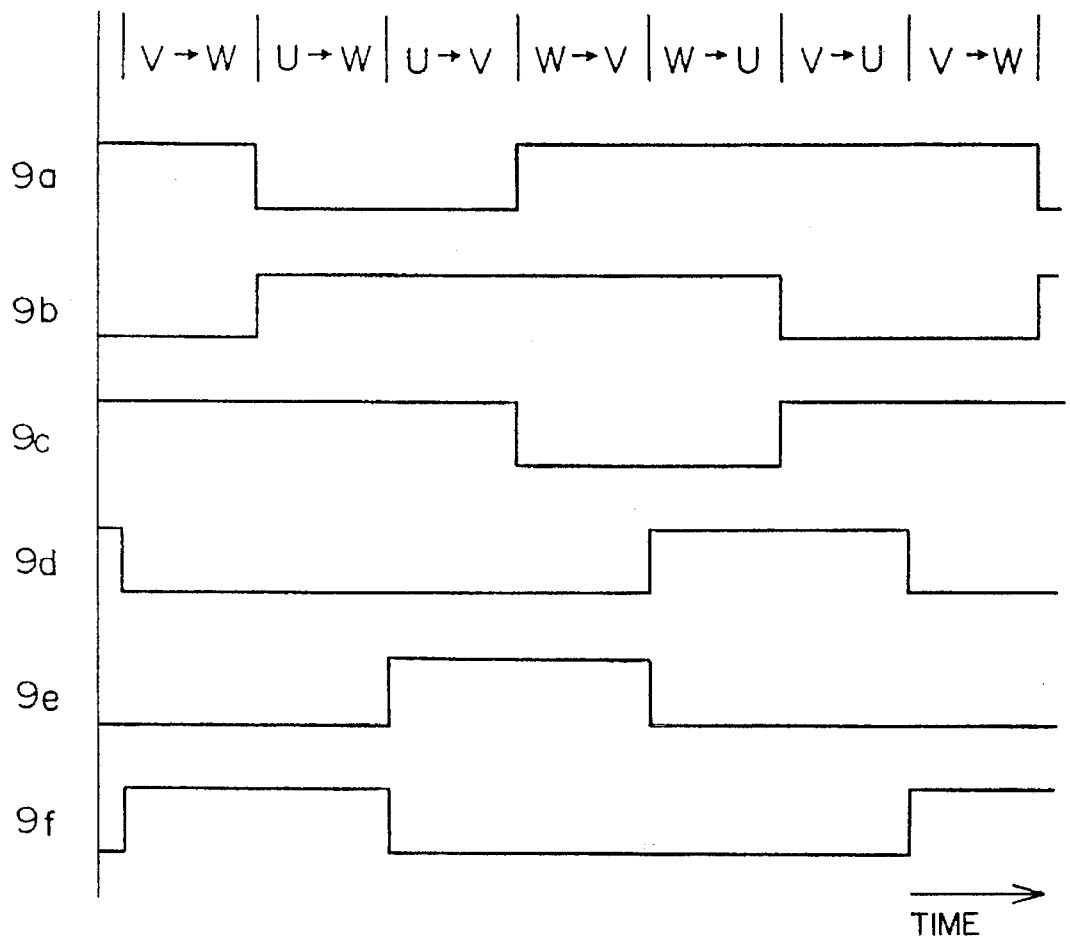
FIG. 7 show a relationship between the current supplying phase and the driving signals.

The compensation switching signal of the embodiment 1 shown in FIG. 6 is synchronized with the commutation. Accordingly, it is possible to use the driving signals for sequentially switching the driving transistors TR1~TR6 as compensation switching signals. FIG. 7 shows a relationship between the current supplying phase and the driving signals 9a~9f of the bridge circuit 11 such as shown in FIG. 1. The compensation switching signals for the terminal 62, terminal 63, terminal 64, terminal 65, terminal 66 and the terminal 67 of FIG. 6 correspond to the driving signals 9d, 9a, 9e, 9b, 9f and 9c, respectively. Accordingly, it is possible to supply a brushless motor driving device of the present invention as an embodiment shown in FIG. 13.

Embodiment 4

This fourth embodiment is an example which is combined by the embodiment 2 and embodiment 3. That is, in this third embodiment, the voltages of the armature windings of respective phases are detected as described in the embodiment 1, an compensation voltage which is a product of the load resistance and a current in an actual loading state is applied to the voltage difference of respective phases in order to obtain deriving signals of respective phases in the compensation circuit at a correct phase in an actual loading state. In the present embodiment, the above compensation switching signals are obtained from the driving signal.

Figure 14:
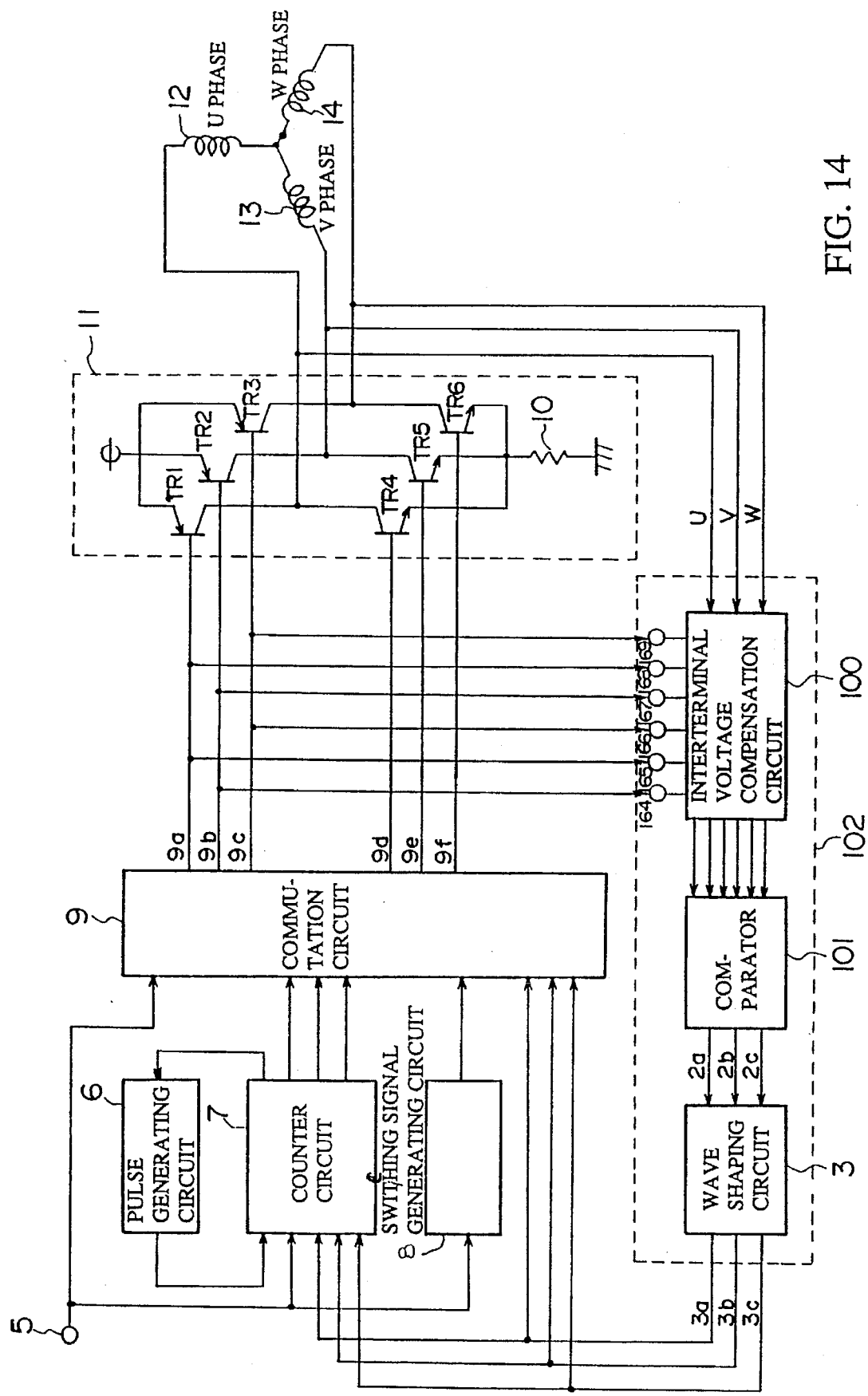
FIG. 14 is a block diagram of a fourth embodiment of the present invention which shows a general construction a brushless motor driving device.

FIG. 14 is a block diagram of a fourth embodiment of the present invention which shows a general construction a brushless motor driving device. In FIG. 14, the same elements are shown by the same numerals of the embodiment 2 in FIG. 8.

In the present embodiment, the driving signals 9a is inputted to the terminal 165 and terminal 168 of the inter-terminal voltage compensation circuit 100, the driving signals 9b is inputted to the terminal 164, terminal 167 of inter-terminal voltage compensation circuit 100 and the driving signals 9c is inputted to the terminal 166 and the terminal 169 of inter-terminal voltage compensation circuit 100.

When the inter-terminal voltage is compensated, it is possible to use the driving signals which sequentially switching the driving transistors TR1~TR6 as a compensation switching signal in a similar way as shown in the embodiment 3.

For example, the driving signals 9b, 9e may be used instead of the compensation switching signals inputted into the terminal 164, since they may be H level at U→V current supply, and L level at V→U current supply. It is also possible to use the compensation switching signals inputted into terminal 165 instead of the driving signals 9a, 9d in the same way, the compensation switching signal inputted into terminal 166 instead of the driving signals 9c, 9f, the compensation switching signals inputted into terminal 167 instead of the driving signals 9b, 9e, the compensation switching signals inputted into terminal 168 instead of the driving signals 9a, 9d, and the compensation switching signals inputted into terminal 169 instead of the driving signals 9c, 9f. Accordingly, it is possible to supply a brushless motor driving device of the present invention as an embodiment shown in FIG. 14.

Embodiment 5

In this fifth embodiment, a current value for applying the compensation voltage which is a product of the load resistance and a current in an actual loading state can be obtained by detecting the drop voltage of a sensing resistor for load current detection.

An operation of the brushless motor driving device of the present embodiment is explained below.

Figure 15:
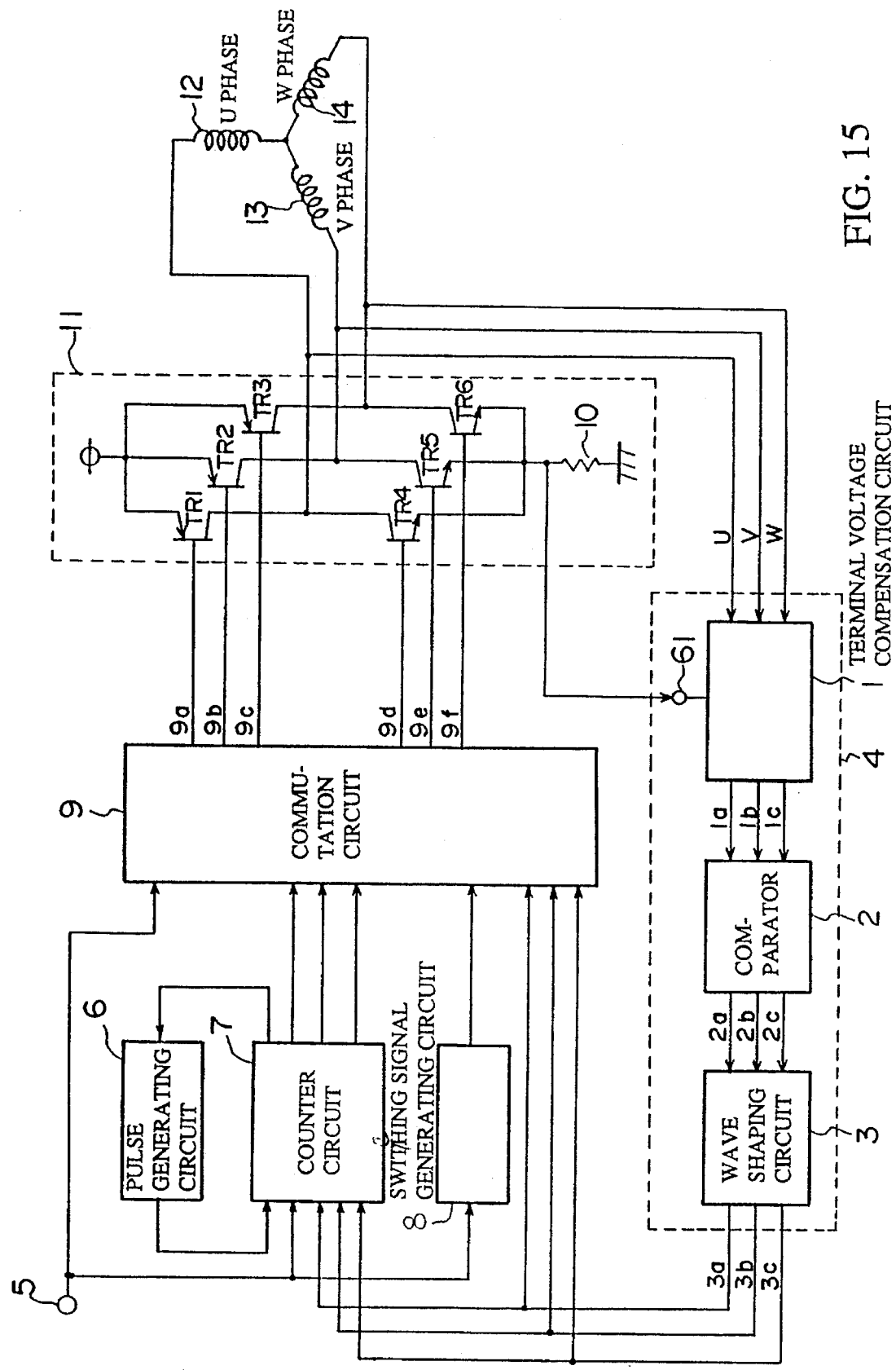
FIG. 15 is a block diagram of a fifth embodiment of the present invention which shows a general construction a brushless motor driving device.

FIG. 15 is a block diagram of a fifth embodiment of the present invention which shows a general construction a brushless motor driving device. In FIG. 15, the same elements are shown by the same numerals of the embodiment 1 in FIG. 1. In this embodiment, the common emitter terminals of transistors TR4~TR6 are connected to the terminal 61 of the terminal voltage compensation circuit 1.

In FIG. 15, the current flowing in the armature winding flows also through the resistor 10, since the resistor 10 is connected to the common emitter terminal of the driving transistors TR4~TR6. Accordingly, it is possible to detect current quantity flowing in the armature windings as a voltage drop in the resistor 10. Assume that the current flowing in the armature windings is $I_L$, ohmic value of the armature winding resistor for one phase is r, and ohmic value of the resistor 10 is Rs, then the ohmic drop of the armature winding is $I_L \times r$, and the voltage inputted to the terminal 61 is $I_L \times Rs$. Accordingly, since the voltage compensated at the terminal voltage compensation circuit is $R1 \times I_L \times Rs/R2$, then R1, R2 and Rs can be determined so that this value is equal to $I_L \times r$.

Embodiment 6

This sixth embodiment is an example in which the embodiment 5 is applied to the embodiment 2, which is explained below.

Figure 16:
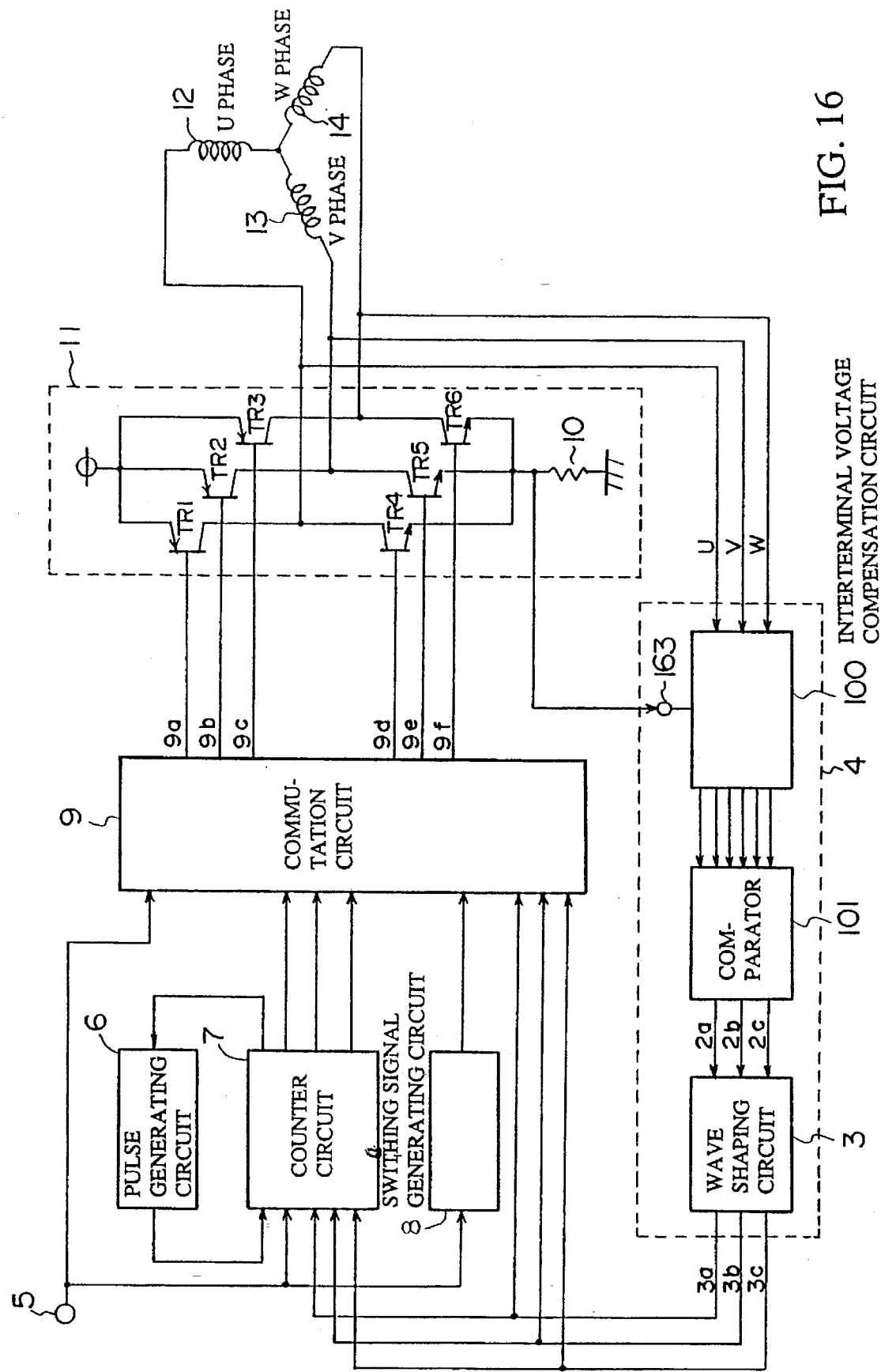
FIG. 16 is a block diagram of a sixth embodiment of the present invention which shows a general construction a brushless motor driving device.

FIG. 16 is a block diagram of a sixth embodiment of the present invention which shows a general construction a brushless motor driving device. In FIG. 16, the same elements are shown by the same numerals of the embodiment 2 in FIG. 8. In this embodiment, the common emitter terminals of transistors TR4~TR6 are connected to the terminal 163 of the inter-terminal voltage compensation circuit 100.

In case of compensating the inter-terminal voltage, it is also possible to detect an armature winding ohmic drop voltage from the emitter terminals of the transistors TR4~TR6 in a similar way as described in the embodiment 5. Accordingly, it is possible to supply a brushless motor driving device of the present invention as an embodiment shown in FIG. 16.

Embodiment 7

Figure 18:
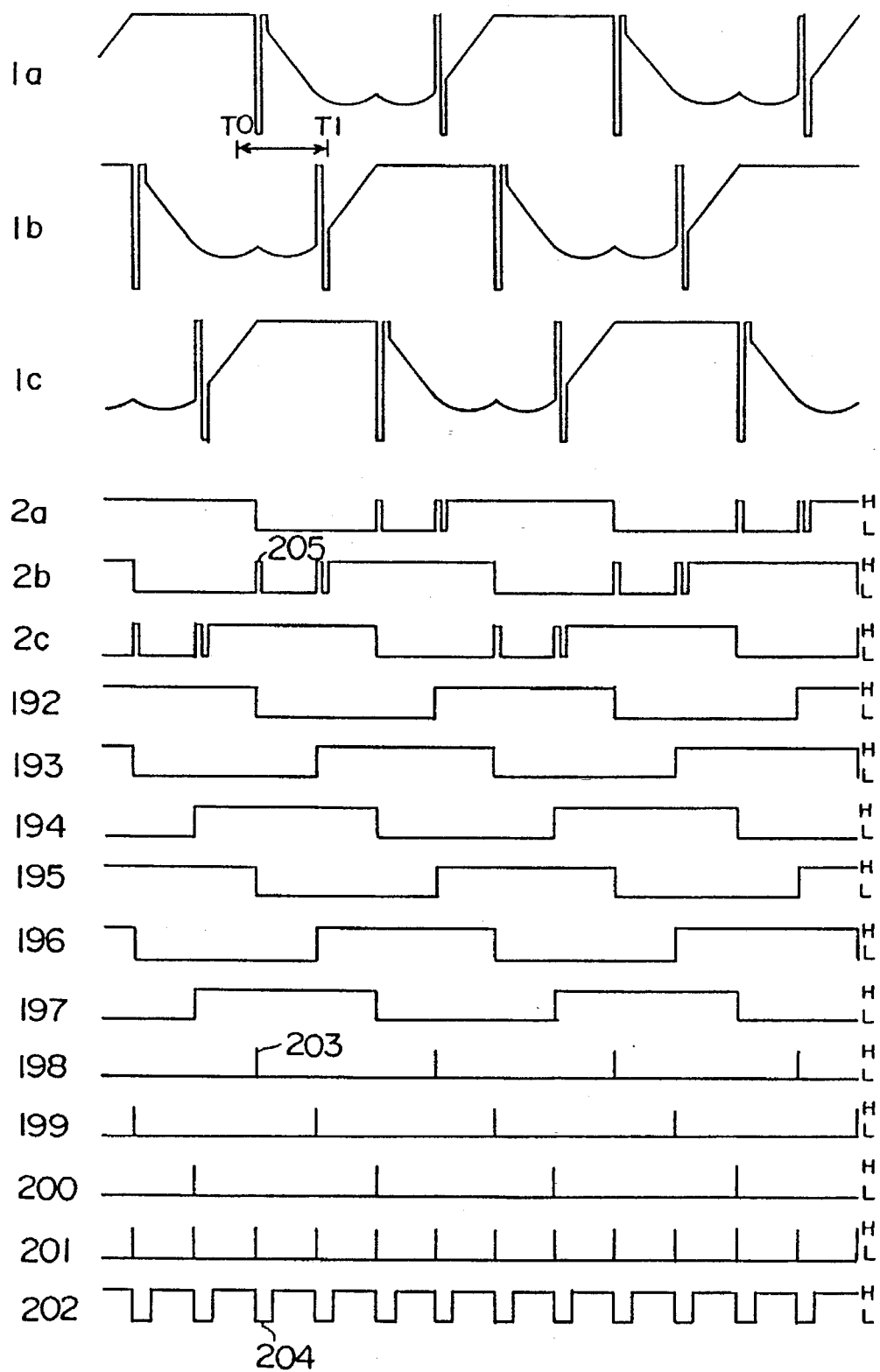
FIG. 18 shows a signal wave which explains operation of a waveform shaping circuit.

In the above embodiments, the current waveforms are described as ideal waveforms which have no distortion. But, in an actual waveform, noises, for example, spike shaped noise as shown in FIG. 18, are superposed to the ideal waveform, and the operation accompanies chattering. The present invention can be applied to such waveforms to normally operate in such condition. In the present invention, the detected signal waveform is shaped to a correct stable waveform in the waveform shaping circuit and then the compensation circuit is operated.

Figure 17:
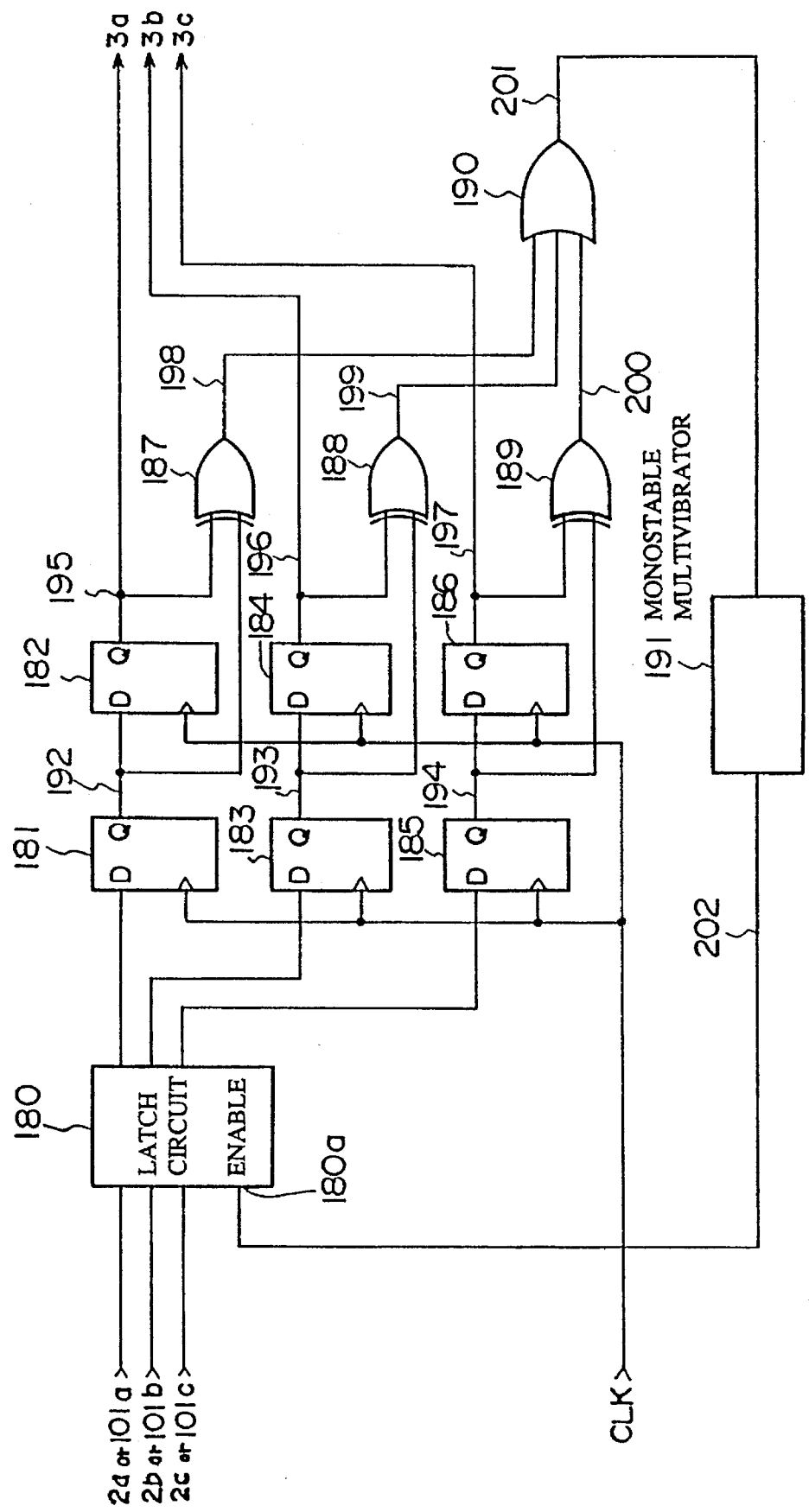
FIG. 17 shows a concrete construction example of a waveform shaping circuit.

FIG. 17 shows a concrete construction example of a waveform shaping circuit 3. In FIG. 17, the numeral 180 denotes a latch circuit, the numerals 181~186 denote a D flip-flops, the numerals 187~189 denote EOR circuits, the numeral 190 denotes an OR circuit, and the numeral 191 denotes a monostable multivibrator.

Figure 19:
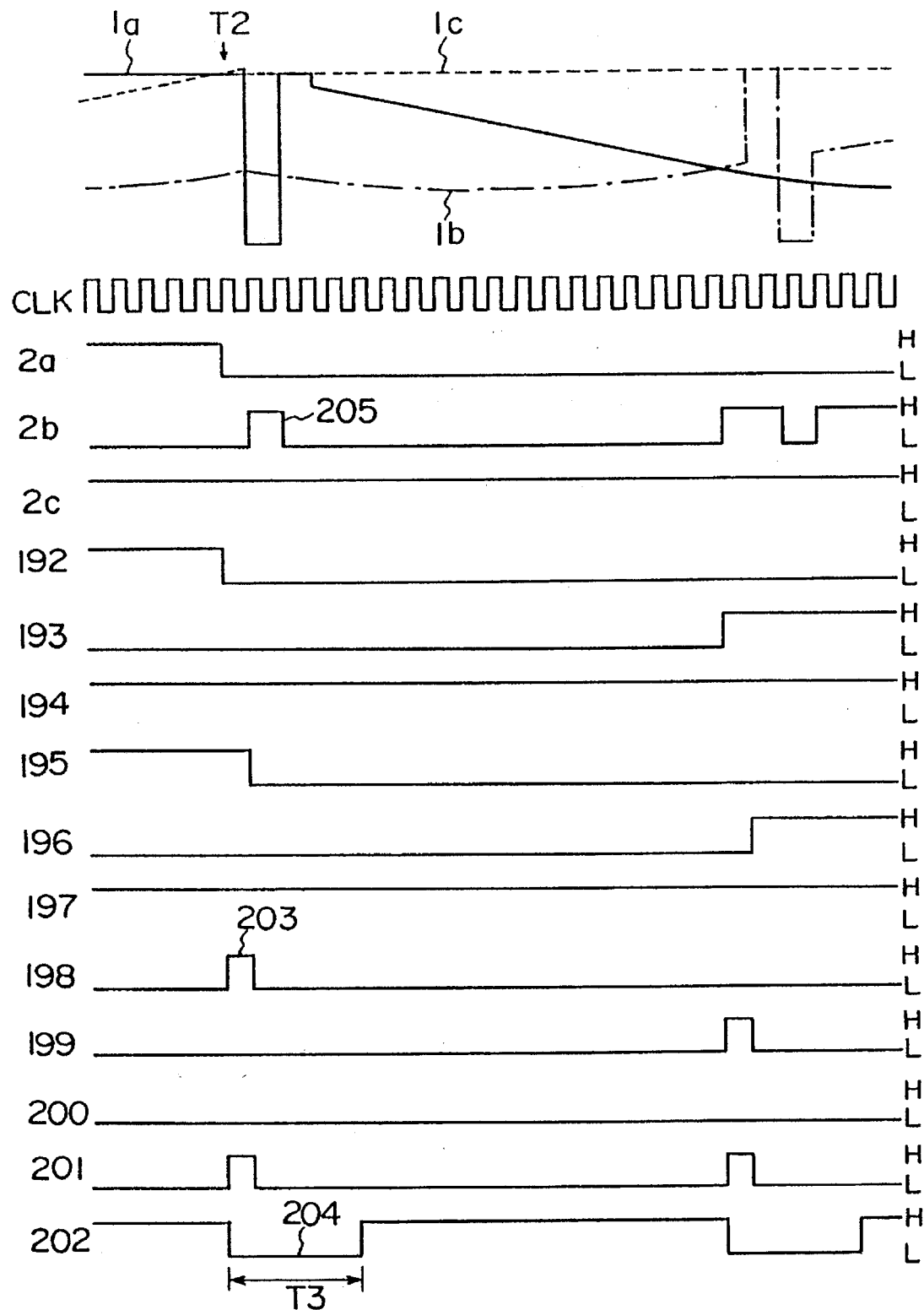
FIG. 19 shows a signal wave which explains operation of a waveform shaping circuit.

FIG. 18 shows terminal voltage waveforms in the normal rotation state and signal waveforms at respective portions of the waveform shaping circuit. FIG. 19 shows enlarged portions between the time points T0~T1 of FIG. 18.

The concrete operation of the waveform shaping circuit is explained in reference to FIG. 18 and FIG. 19.

Input signals inputted to the waveform shaping circuit 3 are logic signals 2a, 2b and 2c or 101a, 101b and 101c which are outputted from the comparator 2 or comparator 101, respectively.

In the embodiment 1, or in the embodiment 2, spike shaped voltage fluctuation has been neglected so far which is superposed to the terminal voltage waveform and generated when switching the driving transistors. But, actually, since the terminal voltage waveform includes spike shaped voltage fluctuation, the voltage fluctuation remains in the terminal voltage waveform which is obtained by compensating the armature winding ohmic drop. Accordingly, the logic signals 2a, 2b and 2c, which are obtained by comparing the terminal voltages, contains spike shaped noise as shown in FIG. 18.

First, this logic signal is inputted into latch circuit 180. The latch circuit 180 is a circuit for carrying out latching operation according to a state of enable terminal 180a, which outputs the input data as it is when the enable terminal 180a is at H level. When the enable terminal 180a changes its state to L level, the input data is latched, and the latch circuit 180 continues to output the latched data during the terminal 180a is at L level. In an initial condition, the terminal 180a of the latch circuit 180 is at H level, then the logic signals 2a, 2b and 2c are inputted into the respective D flip-flops 181, 183 and 185 as it is. The D flip-flops 181~186 and EOR circuits 187~189 comprise a both edged differentiation circuit, respectively. The EOR circuit 187~189 output differential pulse at the timing of rising and falling edges of the logic signals 2a, 2b and 2c.

At the timing point of T2, when compensated the terminal voltages 1a and 1c coincident and the polarity of 2a changes, the both edged differentiation circuit detects edges to generate a differential pulse 203. The output signals 187~189 of EOR circuit is summed in the OR circuit 190 to make a logic pulse signal 201 and inputted into the monostable multivibrator 191. The monostable multivibrator 191 triggers a rising edge of the logic pulse signal 201 and outputs a pulse 204 of L level during a predetermined period T3. The pulse 204 is inputted into the enable terminal 180a of the latch circuit. After the enable terminal 180a becomes L level, the latch circuit 180 latches the logic signals 2a, 2b and 2c and continues to output latched data during the latch pulse 204 is at L level.

The respective output signals 195, 196 and 197 of the D flip-flops 182, 184 and 186 is waveform shaped the rotor location signals 3a, 3b and 3c and inputted into the commutation circuit 9 of next stage. When the commutation operation is carried out in the commutation circuit 9, the driving transistors operates the switching. Therefore, spike shaped voltage fluctuation is generated in the U phase terminal voltage waveform. As a result, spike shaped noise 205 is generated at undesirable location as shown in 2b of FIG. 18. But, at the timing point where the spike shaped noise 205 is generated, the data input to the latch circuit is disabled by the pulse 204 transmitted from the monostable multivibrator 191. Accordingly, spike shaped noise 205 is masked in the latch circuit 180, then the spike shaped noise is not included in the waveform-shaped the rotor location signals 3a, 3b and 3c.

In the above mentioned waveform shaping circuit 3, a logic pulse signal 201 outputted from the OR circuit 190 has a predetermined interval between respective pulse at a normal rotation. Accordingly, it is possible to use this logic pulse signal 201 as a speed signal for controlling the rotation speed.

Further, although an example of three phase brushless motor was explained in this embodiment, but it is apparent that this invention can be applied generally to a brushless motor having a plurality of phases.

Embodiment 8

In the eighth embodiment, an example of a brushless motor is explained which is not influenced by the load at a starting and also stably started in a short time.

That is, the driving is carried out by the combined signal which is obtained from the detected voltage of respective phases at starting. Concretely stated, the location signal of the rotor is detected from the winding voltage of respective phases of the brushless motor, then rising and falling edge signals of the rotor location signal are detected and selected to obtain a necessary edge signal. Further, necessary edge signal is counted to obtain a driving signals which is applied to the armature windings of respective phases at starting. Further, if this input signal can not be applied for a predetermined period, a certain the driving signals is applied forcefully.

Figure 20:
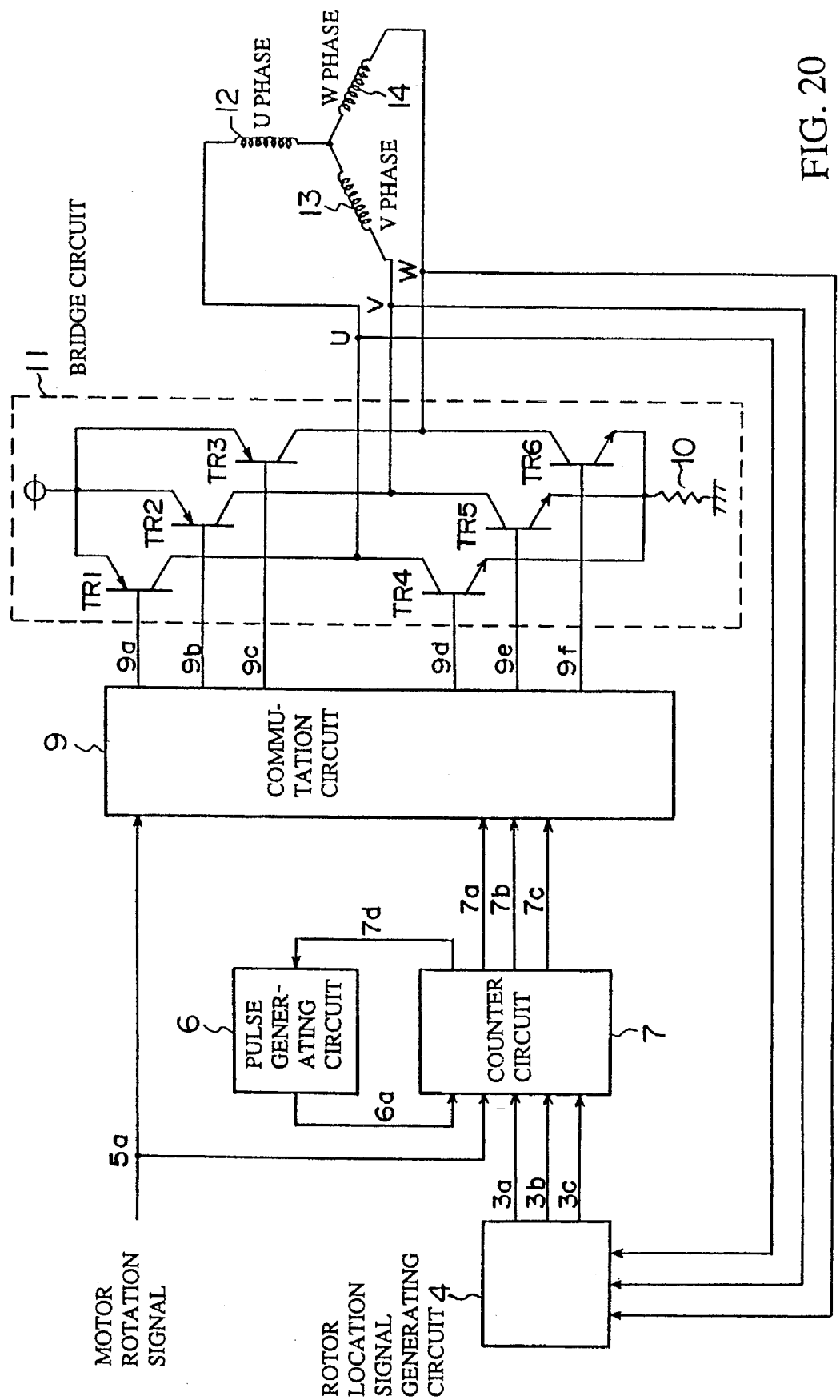
FIG. 20 is a block diagram of an eighth embodiment of the present invention which shows a general construction a brushless motor driving device.

FIG. 20 is a block diagram of an eighth embodiment of the present invention which shows a general construction a brushless motor driving device. In FIG. 20, the numeral 9 denotes a commutation circuit for outputting the driving signals 9a, 9b, 9c, 9d, 9e and 9f, the numeral 11 denotes a bridge circuit for supplying a current to a predetermined phase of the brushless motor, the numeral 4 denotes a rotor location signal generating circuit for generating the location signals 3a, 3b and 3c from respective terminal voltages of the brushless motor. The numeral 7 denotes a counter circuit for generating a necessary edge signal by detecting and selecting the rising and falling edges of the location signals 3a, 3b and 3c and for counting the necessary edge signal, the numeral 6 denotes a pulse generating circuit for outputting a pseudo pulse 6a.

The operation of the embodiment is explained below. The motor rotation signal 5a is inputted from outside, which indicates "rotation" at "enable" state and "stop" at "disable" state. In this embodiment, "enable" indicates H level and "disable" indicates L level.

In FIG. 20, the motor rotation signal 5a is connected to the commutation circuit 9 and the counter circuit 7 the driving signals 9a, 9b, 9c, 9d, 9e and 9f which are outputted from the commutation circuit 9 are connected to the bases of respective transistors TR1, TR2, TR3, TR4, TR5 and TR6. In this embodiment, the transistors TR1, TR2 and TR3 are comprised of pnp type transistors, and the transistors TR4, TR5 and TR6 are comprised of npn type transistors the emitters of transistors TR1, TR2 and TR3 are connected to the power supply, the collectors are connected to collectors of respective transistors TR4, TR5 and TR6, the emitters of the transistors TR4, TR5 and TR6 are connected the ground through the resistor 10. The bridge circuit 11 is comprised of these transistor groups TR1~TR6.

Figures 21, 22:
FIG. 21 shows a relationship between the current supplying phase and the driving signals of the embodiment 8.
FIG. 22 shows a relationship between the location signal of the rotor and the driving signals of the embodiment 8.

The collectors of transistors TR1, TR2, TR3, TR4, TR5 and TR6 are connected with respective terminals (U phase, V phase and W phase) of the armature windings of three phase brushless motor which is connected by star connection. Accordingly, by carrying out on—off operation for respective transistors, current is supplied to respective armature windings. FIG. 21 shows a current relation ship between the driving signals 9a, 9b, 9c, 9d, 9e and 9f of the present embodiment. FIG. 21 is a table which indicates FIG. 7. In FIG. 21, if the current supplying is switched sequentially as shown in the arrow direction, the rotor continues to rotate.

Each terminal of the armature windings connected to the bridge circuit 11 is also connected to the rotor location signal generating circuit 4. The rotor location signal generating circuit 4 generates three bits location signals 3a, 3b and 3c from the terminal voltages U, V and W of the respective U phase, V phase and W phase. FIG. 22 shows a logical relation between the driving signals 9a, 9b, 9c, 9d, 9e and 9f and the location signals 3a, 3b and 3c of the present invention. The location signals 3a, 3b and 3c outputted from the rotor location signal generating circuit 4 are inputted into the counter circuit 7.

Figure 23:
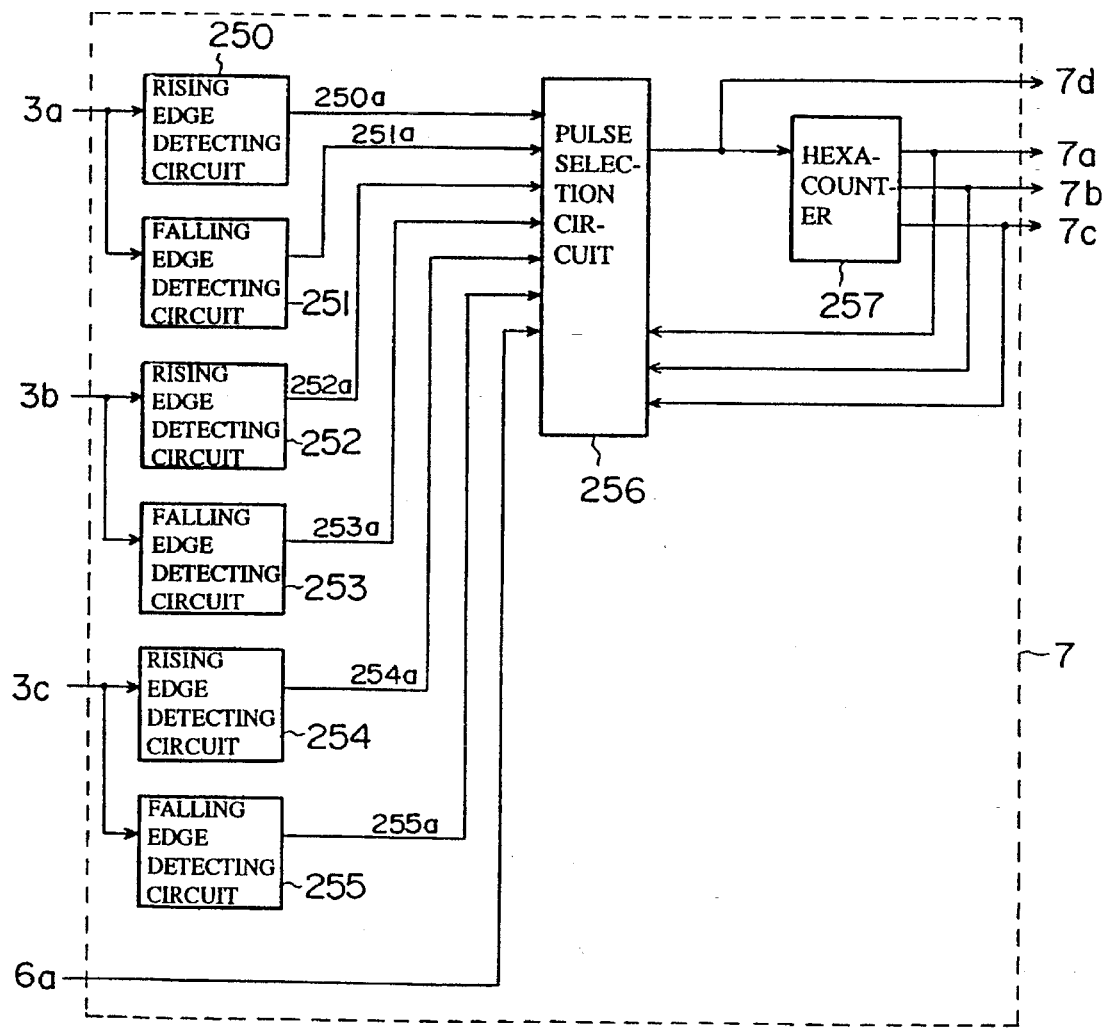
FIG. 23 shows a concrete construction example of a counter circuit of the embodiment 8.

FIG. 23 shows a concrete construction of a counter circuit 7. The location signals 3a, 3b and 3c are inputted into the rising edge detecting circuits 250, 252 and 254 and the falling edge detecting circuit 251, 253 and 255. The rising edge detecting circuits 250, 252 and 254 output rising the edge pulses 250a, 252a and 254a, and the falling edge detecting circuits output the falling the edge pulses 251a, 253a and 255a, respectively. The detected the edge pulses 250a, 252a, 254a, 251a, 253a and 255a are inputted into the pulse selection circuit 256.

The pseudo pulse 6a outputted from the generating circuit 6 as shown in FIG. 20 is also inputted into the pulse selection circuit 256. The pulse train 7d which is outputted from the pulse selection circuit 256 is input into the counter. In this embodiment 8, the counter pulse train 7d is counted by the hexa counter 257.

FIG. 24 shows a logical relationship between the pulse number inputted into the hexa counter 257 and its output number of this embodiment. In FIG. 24, in case that the input pulses are more than 6, the count numbers 7a, 7b and 7c are counted again from L-L-L level, respectively. The pulse train 7d is inputted into the generating circuit 6 from the counter circuit 7 as shown in FIG. 20. The count numbers 7a, 7b and 7c outputted from the hexa counter 257 are inputted into the pulse selection circuit 256 in the counter circuit 7 and also into the commutation circuit 9 in FIG. 20. The pulse selection circuit 256 refers the current the count numbers 7a, 7b and 7c and outputs an edge pulse of theoretical location signal which should be detected next at normal rotation or a pseudo pulse 6a.

FIG. 25 shows a relationship between the count numbers 7a, 7b and 7c and the edge pulse 250a, 252a, 254a, 251a, 253a and 255a of theoretical location signals which should be detected next at normal rotation. From FIG. 25, for example, the count numbers 7a, 7b and 7c is at L-L-L level, only the edge pulse 253a is outputted and other the edge pulse 250a, for example, is not output. But, the pseudo pulse 6a is outputted irrespective of the count numbers 7a, 7b and 7c.

Figures 26, 27:
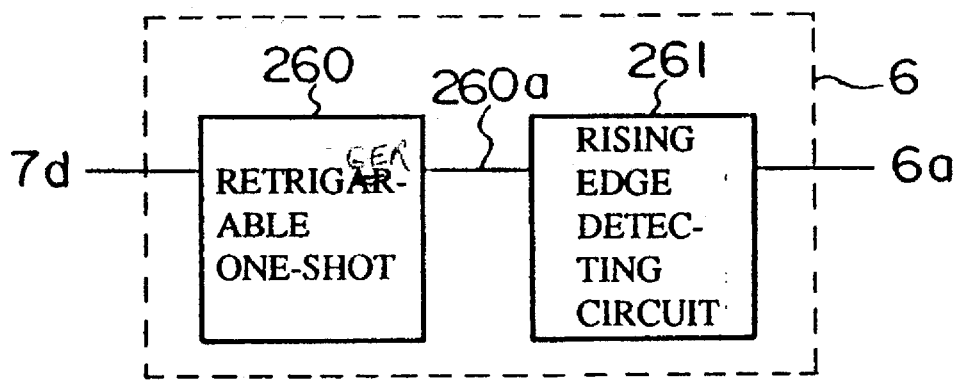
FIG. 26 shows a concrete construction example of a pulse generating circuit of embodiment 8.
FIG. 27 shows a relationship between an output value of the counter circuit and the driving signals of embodiment 8.

FIG. 26 shows a concrete construction example of a pulse generating circuit 6. The pulse generating circuit 6 comprises a retriggerable one-shot 260 and a rising edge detecting circuit 261. The pulse train 7d which is outputted from the pulse selection circuit 256 is inputted into a retriggerable one-shot 260. Output 260a of the retriggarable one-shot 260 is inputted into the rising edge detecting circuit 261. The rising edge detecting circuit 261 detects a rising edge of output 260a of the retriggarable one-shot 260 and outputs a pseudo pulse 6a as similar way as the rising edge detecting circuit 250, 252 and 254 arranged in the counter circuit 7.

In such a construction, when the pulse train 7d is inputted into the retriggarable one-shot 260 within the predetermined period, the retriggarable one-shot 260 is cleared, therefore the output 260a does not change its state. Accordingly, the pseudo pulse 6a is not outputted. But, when the pulse train 7d is not inputted into the retriggarable one-shot 260 within the predetermined period, the output 260a of the retriggarable one-shot 260 is changed from L state to H state. Therefore, the pulse generating circuit 6 outputs a pseudo pulse 6a by detecting the rising edge.

In this embodiment, the pulse generating circuit 6 is constructed such as when retriggarable one-shot 260 is cleared, the output 260a is L state and when the pulse train 7d is not inputted within a predetermined period, the output is H state. But it is possible to construct a pulse generating circuit 6, using a falling edge detecting circuit, such as when retriggarable one-shot 260 is cleared and, the output 260a is H state and when the pulse train 7d is not inputted within a predetermined period, the output is L state. Even the latter case, a similar the pseudo pulse 6a is obtained.

The commutation circuit 9 sets the driving signals 9d, 9e and 9f to L state and the driving signals 9a, 9b and 9c to H state when the motor rotation signal 5a is at L state, and causes the transistor group of the bridge circuit 11 to off state and causes the brushless motor to no-current supplying state.

Next, in the starting mode just after the motor rotation signal 5a became H state, the driving signals 9a, 9b, 9c, 9d, 9e and 9f are outputted by combining the count numbers 7a, 7b and 7c so that the rotor rotates toward a normal direction.

FIG. 27 shows a combination example between the driving signals 9a, 9b, 9c, 9d, 9e and 9f and the count numbers 7a, 7b and 7c of the counter circuit 7 of the present embodiment. In FIG. 27, if the driving signals 9a, 9b, 9c, 9d, 9e and 9f are switched to the arrow direction, the rotor rotates toward a normal direction.

An operation of a brushless motor of the eighth embodiment is explained below. Just after the motor rotation signal 5a became H state, since the count numbers 7a, 7b and 7c becomes L-L-L state, respectively, the driving signals 9b becomes L state from FIG. 27, and the driving signals 9f becomes H state, current is supplied to V-W phase as shown in FIG. 21. At this time, there are three modes, that is, the rotor of the brushless motor rotates toward normal direction and the location signal changes, the rotor rotates toward reverse direction and the location signal changes or the rotor stops at the current supply stability point and the location signal does not change.

Figure 28:
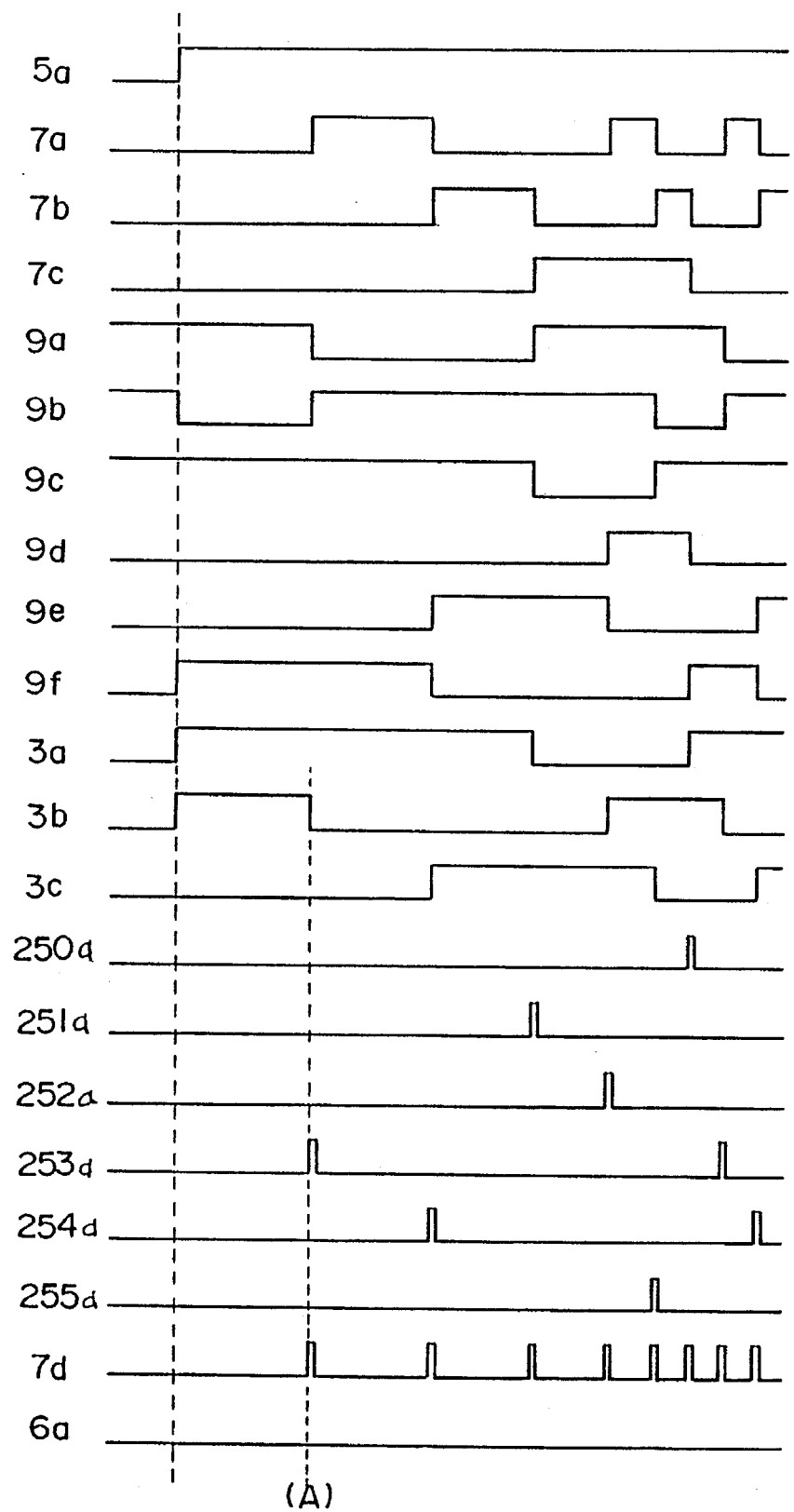
FIG. 28 is a timing chart which explains an operation of embodiment 8.

First, the mode in which the rotor rotates toward normal rotational direction is explained. FIG. 28 shows respective portions of signal waveforms when the rotor rotates toward normal rotational direction. When the current is supplied to V-W phase, the location signals 3a, 3b and 3c become H-H-L states as shown in FIG. 21 and FIG. 22. Since the count numbers 7a, 7b and 7c are L-L-L state at this time, the hexa counter 257 does not count so long as the edge pulse 253a or the pseudo pulse 6a is not detected as shown in FIG. 25. When the rotor rotates further toward normal rotational direction by inertia, the terminal voltages U, V, W change by the counter electromotive force which is induced in the armature winding, the location signals 3a, 3b and 3c becomes H-L-L state, then the edge pulse 253a is detected as shown in FIG. 28 (A).

Accordingly, the hexa counter 257 is counted up, then the count numbers 7a, 7b and 7c become H-L-L states, the commutation circuit 9 set the driving signals 9a, 9b, 9c, 9d, 9e and 9f to L-H-H-L-L-H states, respectively, so that a current is supplied to U-W phase as shown in FIG. 21 and FIG. 27. After then the brushless motor is accelerated by switching the current sequentially until the rotation speed reaches to a normal value by referring the combination of the count numbers 7a, 7b and 7c according to the relation shown in FIG. 27.

Figure 29:
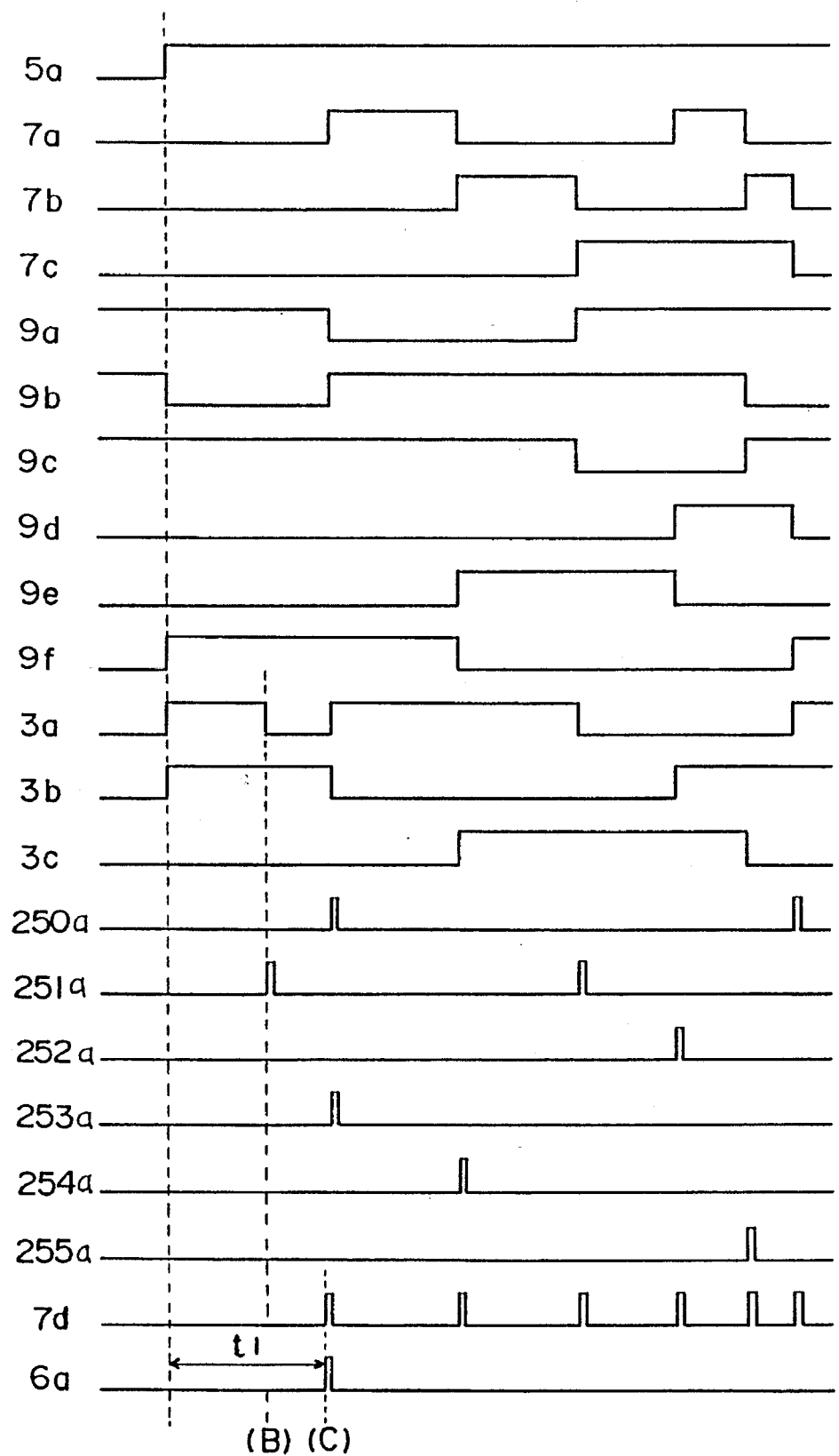
FIG. 29 is a timing chart which explains an operation of embodiment 8.

Next, a mode in which the rotor rotates toward reverse direction and then the location signal changed is explained using FIG. 29. FIG. 29 shows respective portions of signal waveforms when the rotor rotates toward reverse direction.

When the rotor rotates toward reverse rotational direction location signal 3a changes and the edge pulse 251 a is detected as shown in FIG. 29 (B), but the hexa counter 257 is not counted up since the edge pulse 253a is not detected as described above.

Further, the edge pulse 253a can not be detected within a predetermined period $t_1$, a pseudo pulse 6a is outputted from the pulse generating circuit 6 as shown in FIG. 29 (C). The hexa counter 257 counts up the pseudo pulse 6a and the count numbers 7a, 7b and 7c change to H-L-L states. The commutation circuit 9 sets the driving signals 9a, 9b, 9c, 9d, 9e and 9f to L-H-H-L-L-H states so that current is supplied to U-W phase as shown in FIG. 21 and FIG. 27. Thereby, the rotor rotates toward normal rotational direction, after then the brushless motor is accelerated by switching the current sequentially until the rotation speed reaches to a normal value by referring the combination of the count numbers 7a, 7b and 7c according to the relation shown in FIG. 27.

Further a mode in which the rotor stops at the current supply stability point and the location signal does not change is explained below. In the similar way as described in the mode of the above reverse rotation, since the edge pulse 253a can not be detected within a predetermined period $t_1$, a pseudo pulse 6a is outputted from the pulse generating circuit 6. The hexa counter 257 also counts up the pseudo pulse 6a. As a result, that current is supplied to U-W phase as shown in FIG. 21 and FIG. 27. After then the brushless motor is accelerated by switching the current sequentially until the rotation speed reaches to a normal value by referring the combination of the count numbers 7a, 7b and 7c according to the relation shown in FIG. 27.

Embodiment 9

An operation of the brushless motor which restarts stably in a short time without influenced by the load at a starting even when the brushless motor stops by some reasons and needs to restart. Concretely stating, in this embodiment, the apparatus of the invention detects a location signal of the rotor from winding voltages at respective phases of the brushless motor and obtains a necessary edge signal by detecting and selecting a rising edge or a falling edge of the rotor location signal, further proving a normal rotation detecting circuit for monitoring the motor rotation in combination with the necessary edge signal. When abnormal state is detected, the edge signals are counted and the counted resultant is used as a forcefully supplied driving signal to the armature winding of respective phases at restarting.

Figure 30:
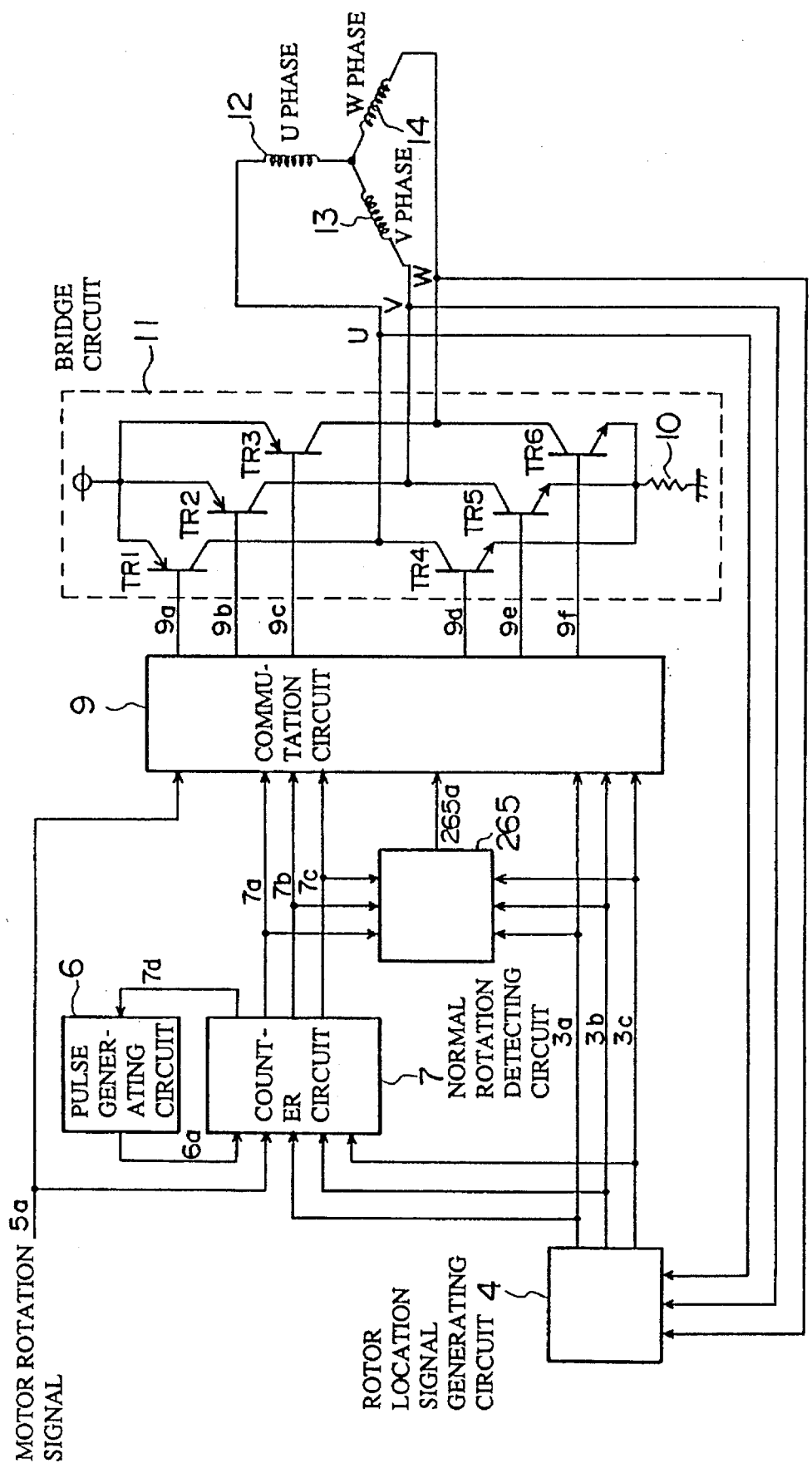
FIG. 30 is a block diagram of a ninth embodiment of the present invention which shows a general construction a brushless motor driving device.

FIG. 30 is a block diagram of a ninth embodiment of the present invention which shows a general construction a brushless motor driving device. Since the bridge circuit 11, the rotor location signal generating circuit 4, the counter circuit 7, the pulse generating circuit 6 are similar to the embodiment 8, the description is omitted. The numeral 265 denotes a normal rotation detecting circuit for comparing the count numbers 7a, 7b and 7c with the location signals 3a, 3b and 3c.

In this embodiment, the location signals 3a, 3b and 3c are also inputted into the commutation circuit 9. The commutation circuit 9 outputs the driving signals 9a, 9b, 9c, 9d, 9e and 9f in combination with the count numbers 7a, 7b and 7c at starting mode, and outputs the driving signals 9a, 9b, 9c, 9d, 9e and 9f in combination with the location signals 3a, 3b and 3c during a normal rotation, in a similar way as the embodiment 8. The location signals 3a, 3b and 3c and the count numbers 7a, 7b and 7c are also inputted into the normal rotation detecting circuit 265.

The normal rotation detecting circuit 265 compares the location signals 3a, 3b and 3c with the count numbers 7a, 7b and 7c after a predetermined time and after the count numbers are changed during a normal rotation state. FIG. 31 shows a theoretical logical relationship between the location signals 3a, 3b and 3c and the count numbers 7a, 7b and 7c in this embodiment. When the combination is not the ones shown in FIG. 31, the restart pulse 265a is outputted into the commutation circuit 9.

Figure 32:
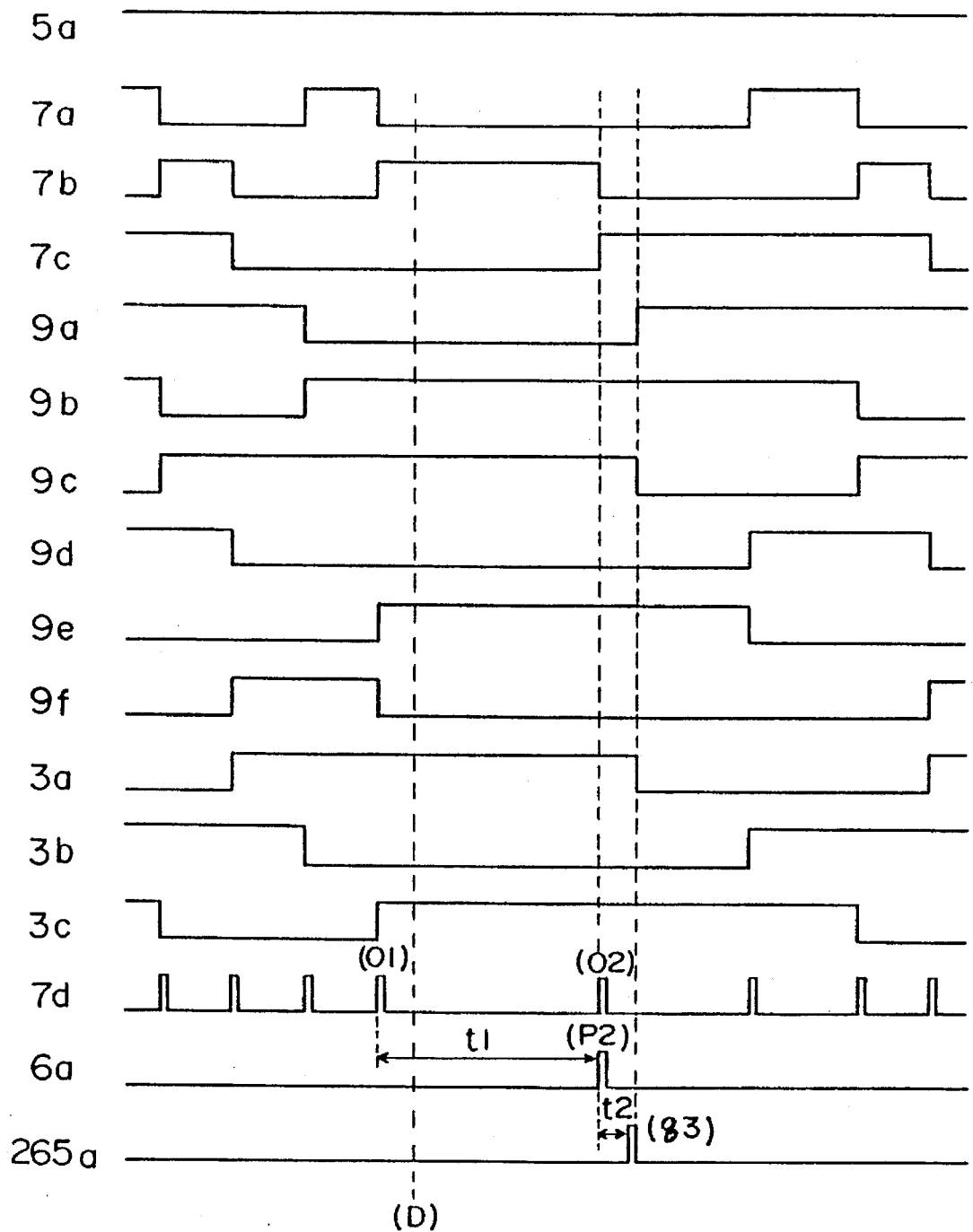
FIG. 32 is a timing chart which explains an operation of embodiment 9.

An operation where the rotor stops by any load during a normal rotation is explained using FIG. 32. In FIG. 32, lets assume that the rotor stopped after timing (D). In this case, after a predetermined time $t_1$ has passed from a pulse (o1) generation in the circuit 6, a pseudo pulse (p2) is outputted from the pulse generating circuit 6.

The pseudo pulse (p2) is output by the pulse selection circuit 256 as pulses (o2) in a pulse train 7d, the count numbers 7a, 7b and 7c change their states from L-H-L to L-L-H according to the logical relation example of FIG. 24. During a normal rotation, as described above, since the driving signals 9a, 9b and 9c, 9d, 9e and 9f is outputted by being combined with the location signals 3a, 3b and 3c, the current supplying phase are not switched even if the count numbers 7a, 7b and 7c are changed. After a predetermined time $t_2$ has passed from change of the count numbers 7a, 7b and 7c, the normal rotation detecting circuit 265 compares the location signals 3a, 3b and 3c and the count numbers 7a, 7b and 7c.

In this case, since this combination is not a theoretical combination as seen from FIG. 31, the normal rotation detecting circuit 265 outputs a restart pulse (q3) and the mode changes to a starting mode. In the starting mode, as described above, since the starting signals 9a, 9b, 9c, 9d, 9e and 9f are outputted by being combined with the count numbers 7a, 7b and 7c, the driving signals 9a, 9b, 9c, 9d, 9e and 9f becomes H-H-L-L-H-L and current supply is switched to cause the rotor to rotate toward normal rotational direction as shown in FIG. 27. After that, as describe in embodiment 8, the current supply is sequentially switched by the combination of the count numbers 7a, 7b and 7c according to the relationship of FIG. 27, until normal rotation is reached.

Embodiment 10

A motor driving circuit having a switching apparatus for switching from a starting or restarting operation to a normal operation is explained below.

In this embodiment, a switching time is set and the rotation of the rotor is switched to a normal operation after a predetermined period.

Figure 33:
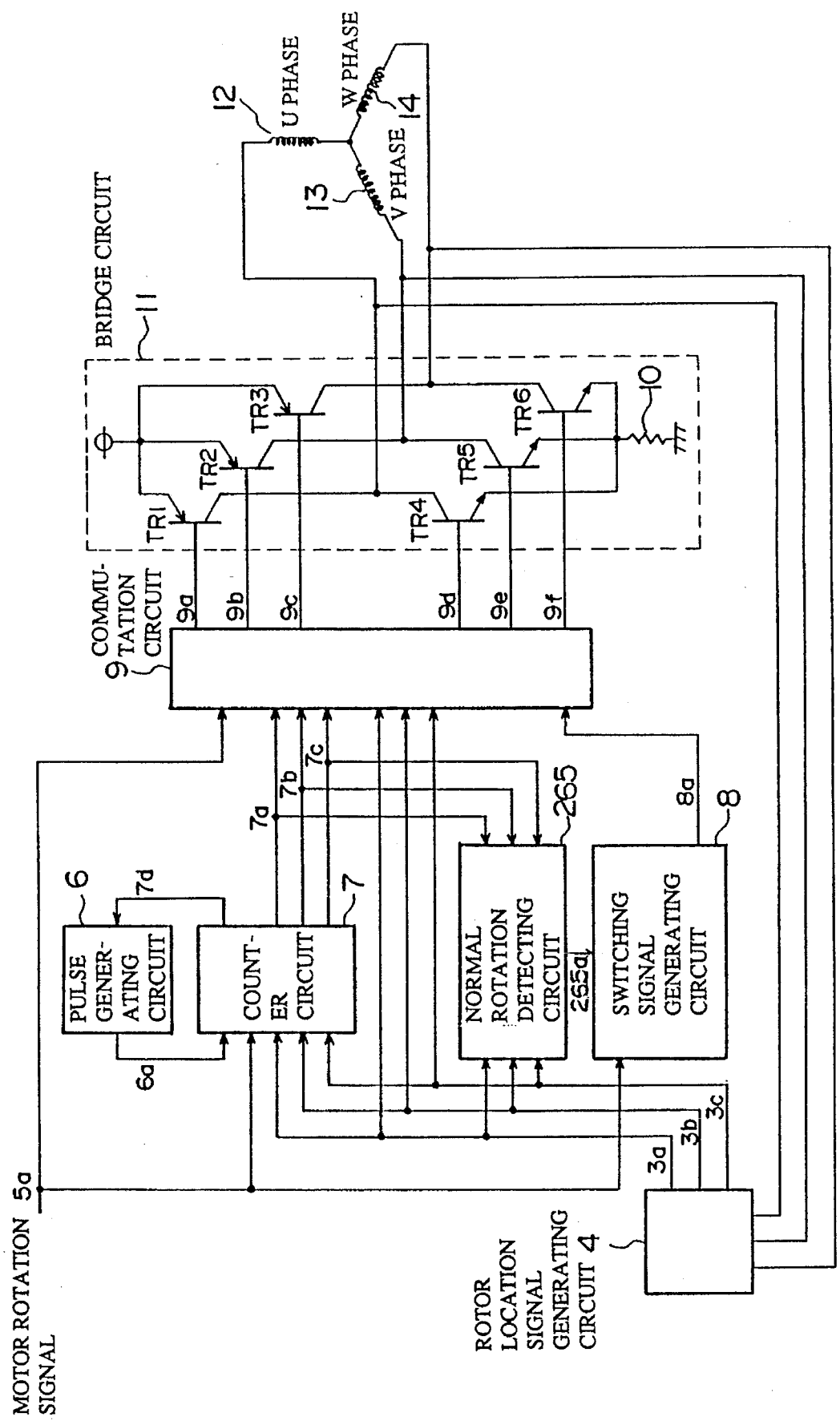
FIG. 33 is a block diagram of a tenth embodiment of the present invention which shows a general construction a brushless motor driving device.

FIG. 33 is a block diagram of a tenth embodiment of the present invention which shows a general construction a brushless motor driving device. Since the bridge circuit 11, the rotor location signal generating circuit 4, the counter circuit 7, the pulse generating circuit 6, the normal rotation detecting circuit 265 are similar to the above eighth and ninth embodiments, the description is omitted. The numeral 8 denotes a switching signal generating circuit which outputs a switching signal 8a for referring any of the count numbers 7a, 7b and 7c or the location signals 3a, 3b and 3c when outputting driving signals 9a, 9b, 9c, 9d, 9e and 9f in the commutation circuit 9. The switching signal generating circuit 8 is explained below.

In this embodiment, the motor rotation signal 5a and the restart pulse 265a are inputted into a switching signal generating circuit 8. The switching signal 8a is inputted into the commutation circuit 9.

Figure 34:
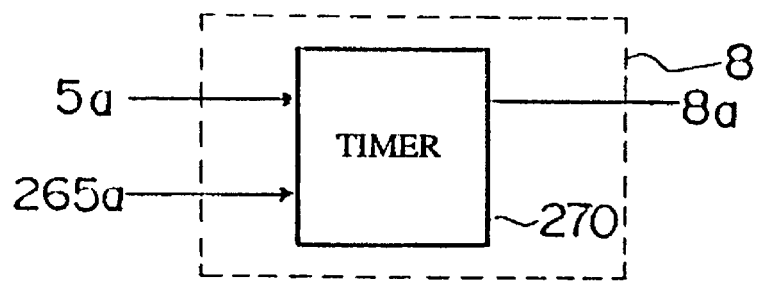
FIG. 34 shows a concrete switching signal generating circuit of embodiment 10.
Figure 35:
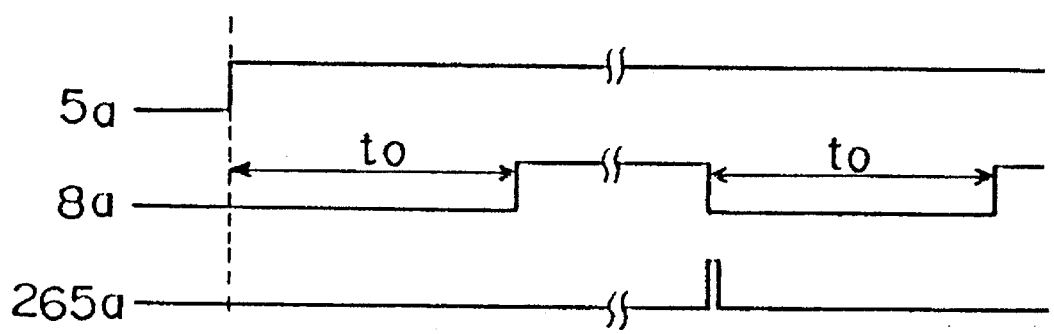
FIG. 35 shows a timing chart for explaining an operation of the switching signal generating circuit of embodiment 10.

FIG. 34 shows a concrete switching signal generating circuit 8 of embodiment 10. The switching signal generating circuit 8 is comprised of a timer 270 in this embodiment. FIG. 35 shows a timing chart for explaining an operation of the switching signal generating circuit of embodiment 10.

An operation of the switching signal generating circuit 8 of this embodiment is explained below using FIG. 35. In this embodiment, when the motor rotation signal 5a inputted into the timer 270 becomes H level, the timer 270 is changed to ON state, then the commutation circuit 9 outputs driving signals 9a, 9b, 9c, 9d, 9e and 9f by combining the count numbers 7a, 7b and 7c according to the relationship shown in FIG. 27. After a predetermined period $t_0$, the switching signal 8a changes from L to H, then the commutation circuit 9 outputs the driving signals 9a, 9b, 9c, 9d, 9e and 9f by combining the location signals 3a, 3b and 3c as shown in FIG. 22.

When the commutation circuit 9 outputs the driving signals 9a, 9b, 9c, 9d, 9e and 9f by combining the location signals 3a, 3b and 3c, and when the restart pulse 265a is inputted from the normal rotation detecting circuit 265, the timer 270 is reset, then the switching signal 8a changes from H to L. Then, the commutation circuit 9 outputs the driving signals 9a, 9b, 9c, 9d, 9e and 9f using the count numbers 7a, 7b and 7c. After a predetermined period $t_0$, the switching signal 8a changes from L to H, then the commutation circuit 9 outputs the driving signals 9a, 9b, 9c, 9d, 9e and 9f by combining the location signals 3a, 3b and 3c.

In this embodiment, the switching signal 8a is set to L when referring the count numbers 7a, 7b and 7c, and to H when referring the location signals 3a, 3b and 3c, but they can be set reversely.

Embodiment 11

In this embodiment, an switching operation carried out to a normal operation after the counter reaches a predetermined value. By this operation, the motor rotates without fail.

Figure 36:
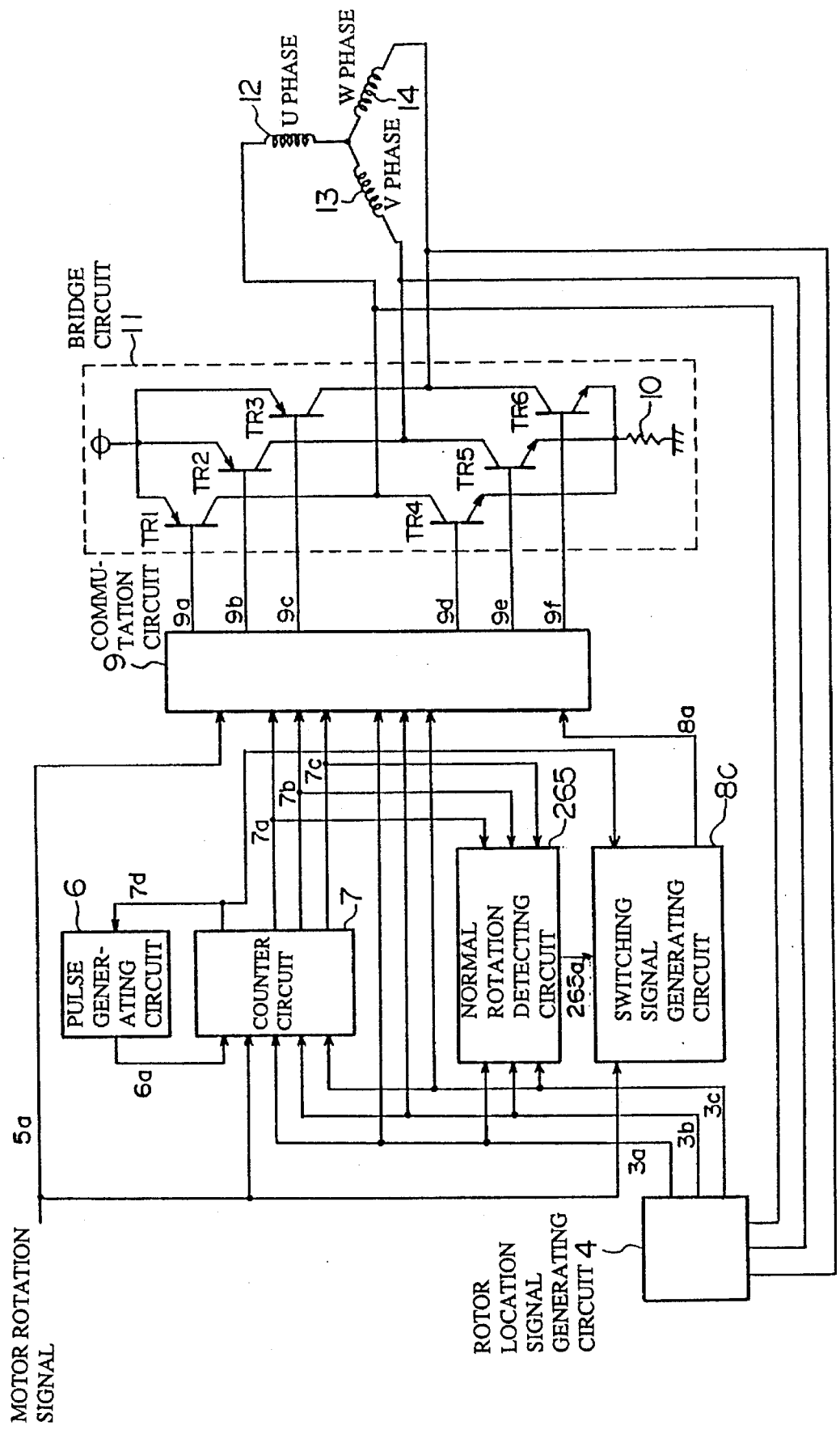
FIG. 36 is a block diagram of an eleventh embodiment of the present invention which shows a general construction a brushless motor driving device.

FIG. 36 is a block diagram of an eleventh embodiment of the present invention which shows a general construction a three phase brushless motor driving device. The numeral 8C denotes a switching signal generating circuit which outputs a switching signal 8a for referring any of the count numbers 7a, 7b and 7c or the location signals 3a, 3b and 3c when outputting driving signals 9a, 9b, 9c, 9d, 9e and 9f in the commutation circuit 9. The switching signal generating circuit 8C is explained below.

In this embodiment, the pulse train 7d, the motor rotation signal 5a and the restart pulse 265a are inputted into the switching signal generating circuit 8C. The switching signal 8a is inputted into the commutation circuit 9.

Figure 37:
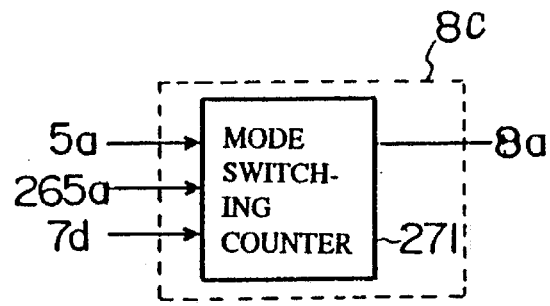
FIG. 37 shows a concrete switching signal generating circuit of embodiment 11.
Figure 38:
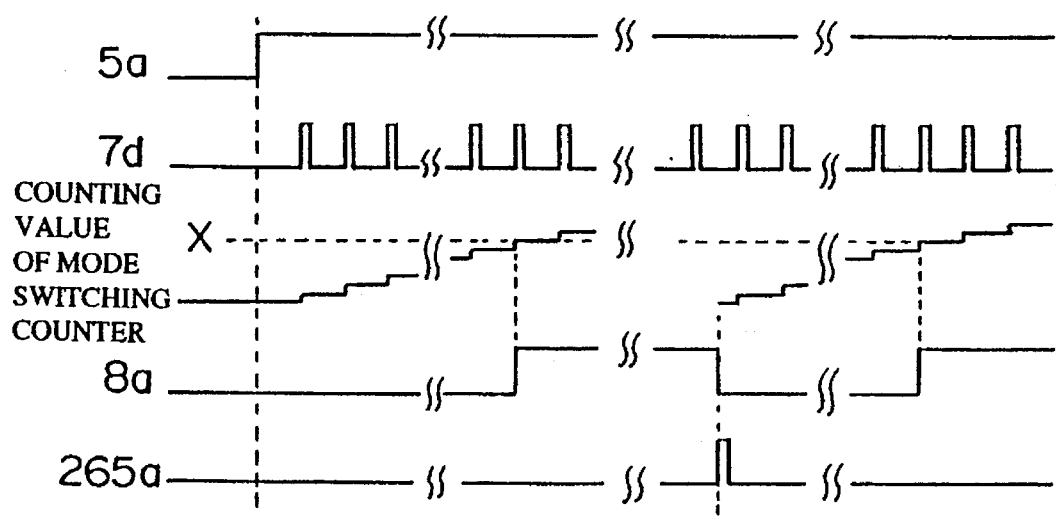
FIG. 38 is a timing chart which explains an operation of a switching signal generating circuit of embodiment 11.

FIG. 37 shows a concrete switching signal generating circuit 8C of embodiment 11. The switching signal generating circuit 8C is comprised of a mode switching counter 271. FIG. 38 is a timing chart which explains an operation of a switching signal generating circuit of embodiment 11.

FIG. 38 is used as next and a operation of switching signal generating circuit 8C of this embodiment is explained. The mode switching counter 271 begins to count the pulse train 7d when the motor rotation signal 5a becomes H, and the commutation circuit 9 outputs the driving signals 9a, 9b, 9c, 9d, 9e and 9f by combining the count numbers 7a, 7b and 7c according to the relationship as shown in FIG. 27. The mode switching counter 27 1 changes the switching signal 8a from L to H after the count number of the pulse train 7d reaches a predetermined number X and then the commutation circuit 9 outputs driving signal 9a, 9b, 9c, 9d, 9e and 9f by combining the location signals 3a, 3b and 3c as shown in FIG. 22.

When the commutation circuit 9 outputs the driving signals 9a, 9b, 9c, 9d, 9e and 9f by combining the location signals 3a, 3b and 3c, and when the restart pulse 265a is inputted from the normal rotation detecting circuit 265, the mode switching counter 271 is reset, then the switching signal 8a changes from H to L. Then, the commutation circuit 9 outputs the driving signals 9a, 9b, 9c, 9d, 9e and 9f using the count numbers 7a, 7b and 7c. The mode switching counter 271 begins to count the number of the pulse train 7d and changes the switching signal 8a from L to H after the count number of the pulse train 7d reaches a predetermined number X and then the commutation circuit 9 outputs driving signal 9a, 9b, 9c, 9d, 9e and 9f by combining the location signals 3a, 3b and 3c as shown in FIG. 22.

Embodiment 12

In this embodiment, an switching operation is carried out when the combination of detecting time and location signal, in other words, the both conditions are satisfied.

Figure 39:
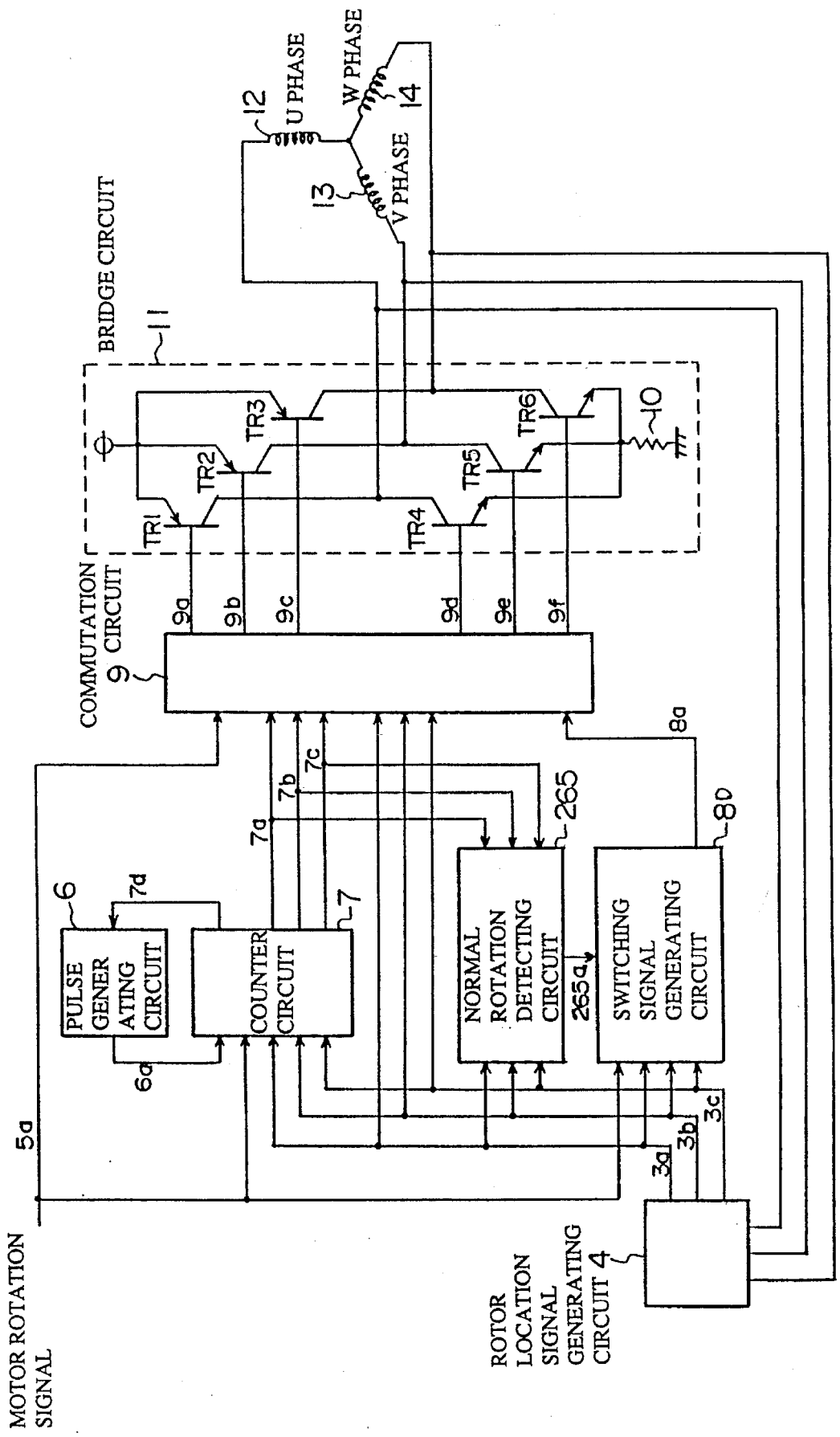
FIG. 39 is a block diagram of a twelfth embodiment of the present invention which shows a general construction a brushless motor driving device.

FIG. 39 is a block diagram of a twelfth embodiment of the present invention which shows a general construction a three phase brushless motor driving device. The numeral 8D denotes a switching signal generating circuit which outputs a switching signal 8a for referring any of the count numbers 7a, 7b and 7c or the location signals 3a, 3b and 3c. The switching signal generating circuit 8D is explained below.

In this embodiment, the motor rotation signal 5a, the restart pulse 265a and the location signals 3a, 3b and 3c are inputted into the switching signal generating circuit 8D. The switching signal 8a is inputted into the commutation circuit 9.

Figure 40:
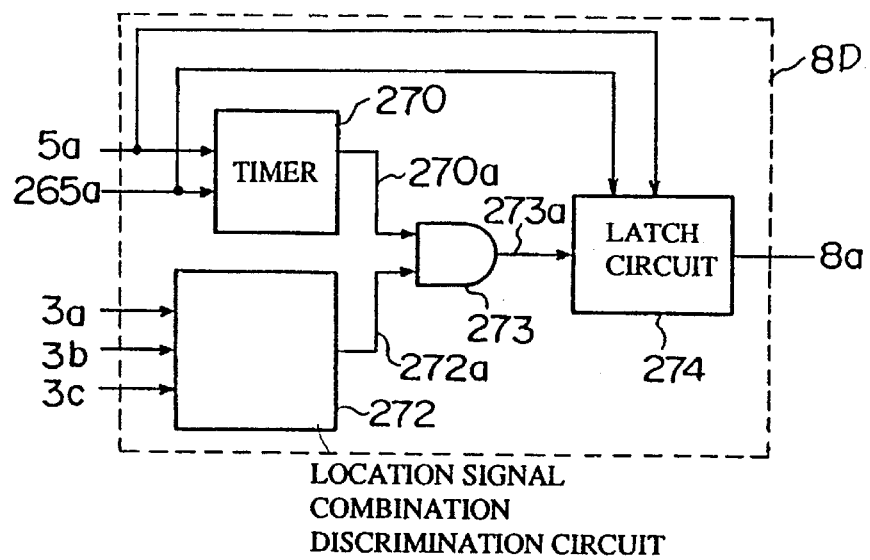
FIG. 40 shows a concrete switching signal generating circuit of embodiment 12.

FIG. 40 shows a concrete switching signal generating circuit 8D of embodiment 12. In this embodiment, the switching signal generating circuit 8D is comprised of a location signal combination discrimination circuit 272 and a timer 270. The timer 270 is similar to the construction of the embodiment 10.

The location signals 3a, 3b and 3c are inputted into the location signal combination discrimination circuit 272, the output from the location signal combination discrimination circuit 272 becomes H when the location signals 3a, 3b and 3c becomes a predetermined combination. In this embodiment, when the location signals 3a, 3b and 3c became a combination of H-L-L, its output changes to H. The output of the location signal combination discrimination circuit 272 and the timer 270 are inputted into the AND circuit 273, the output 273a of the AND circuit 273, the motor rotation signal 5a and the restart pulse 265a are inputted into the latch circuit 274. The latch circuit 274 is cleared by the motor rotation signal 5a and the restart pulse 265a. The latch circuit 274 also holds the output to H until the latch circuit 274 is cleared after the input signal once becomes H.

Figure 41:
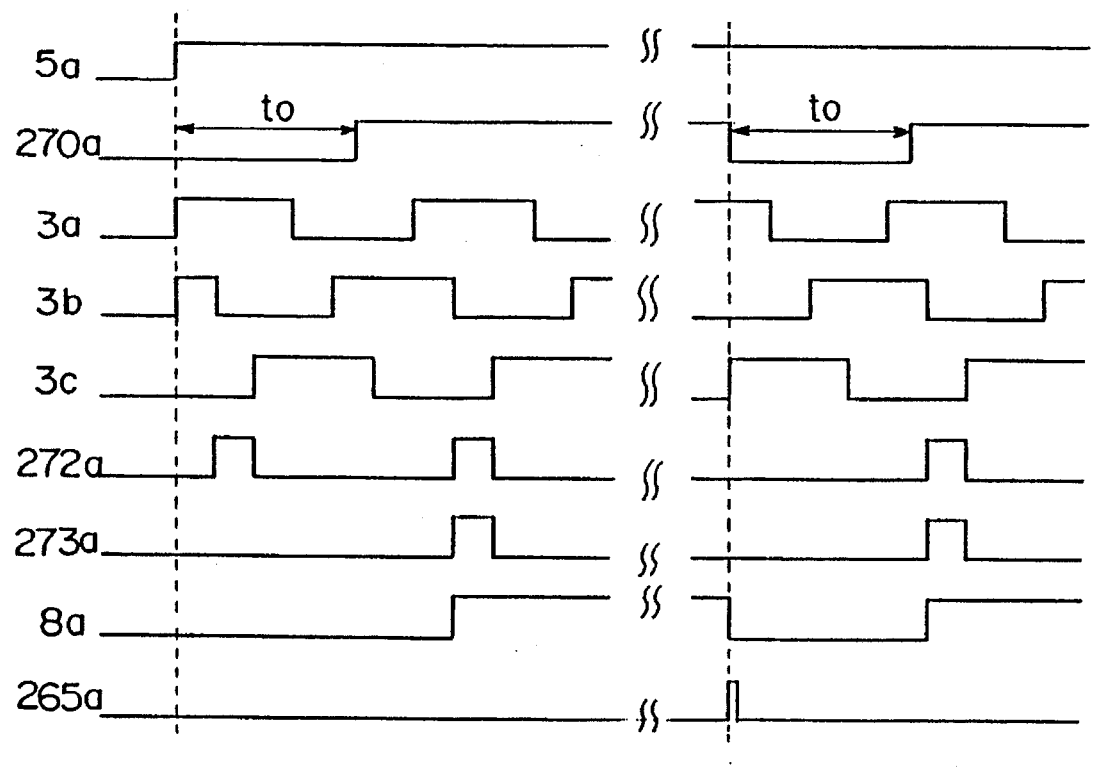
FIG. 41 is a timing chart which explains an operation of a switching signal generating circuit of embodiment 12.

An operation of the switching signal generating circuit 8D of this embodiment is explained below using FIG. 41. In this embodiment, when the motor rotation signal 5a becomes H level, the timer 270 is changed to ON state, then the commutation circuit 9 outputs driving signals 9a, 9b, 9c, 9d, 9e and 9f by combining the count numbers 7a, 7b and 7c according to the relationship shown in FIG. 27. After a predetermined period to, the timer lo output 270a changes to H.

When the timer output 270a changes to H and the location signals 3a, 3b and 3c became a combination of H-L-L, the AND circuit output 273a changes to H. The latch circuit 274 operates at the first rising edge of the AND circuit output 273a after the motor rotation signal 5a has changed to H, s then the switching signal 8a is held to H. Then the commutation circuit 9 outputs the driving signals 9a, 9b, 9c, 9d, 9e and 9f by combining the location signals 3a, 3b and 3c as shown in FIG. 22.

When the commutation circuit 9 outputs the driving signals 9a, 9b, 9c, 9d, 9e and 9f by combining the location signals 3a, 3b and 3c, and when the restart pulse 265a is inputted from the normal rotation detecting circuit 265, the timer 270 and the latch circuit 274 is reset, then the switching signal 8a changes from H to L. Then, the commutation circuit 9 outputs the driving signals 9a, 9b, 9c, 9d, 9e and 9f using the count numbers 7a, 7b and 7c. As described above, after a predetermined period to, the switching signal 8a changes from L to H, then the commutation circuit 9 outputs again the driving signals 9a, 9b, 9c, 9d, 9e and 9f by combining the location signals 3a, 3b and 3c as shown in FIG. 22.

Embodiment 13

In this embodiment, an switching operation is carried out when the counter reaches a predetermined value and the location signal having been detected correctly, that is, at the both conditions are satisfied.

Figure 42:
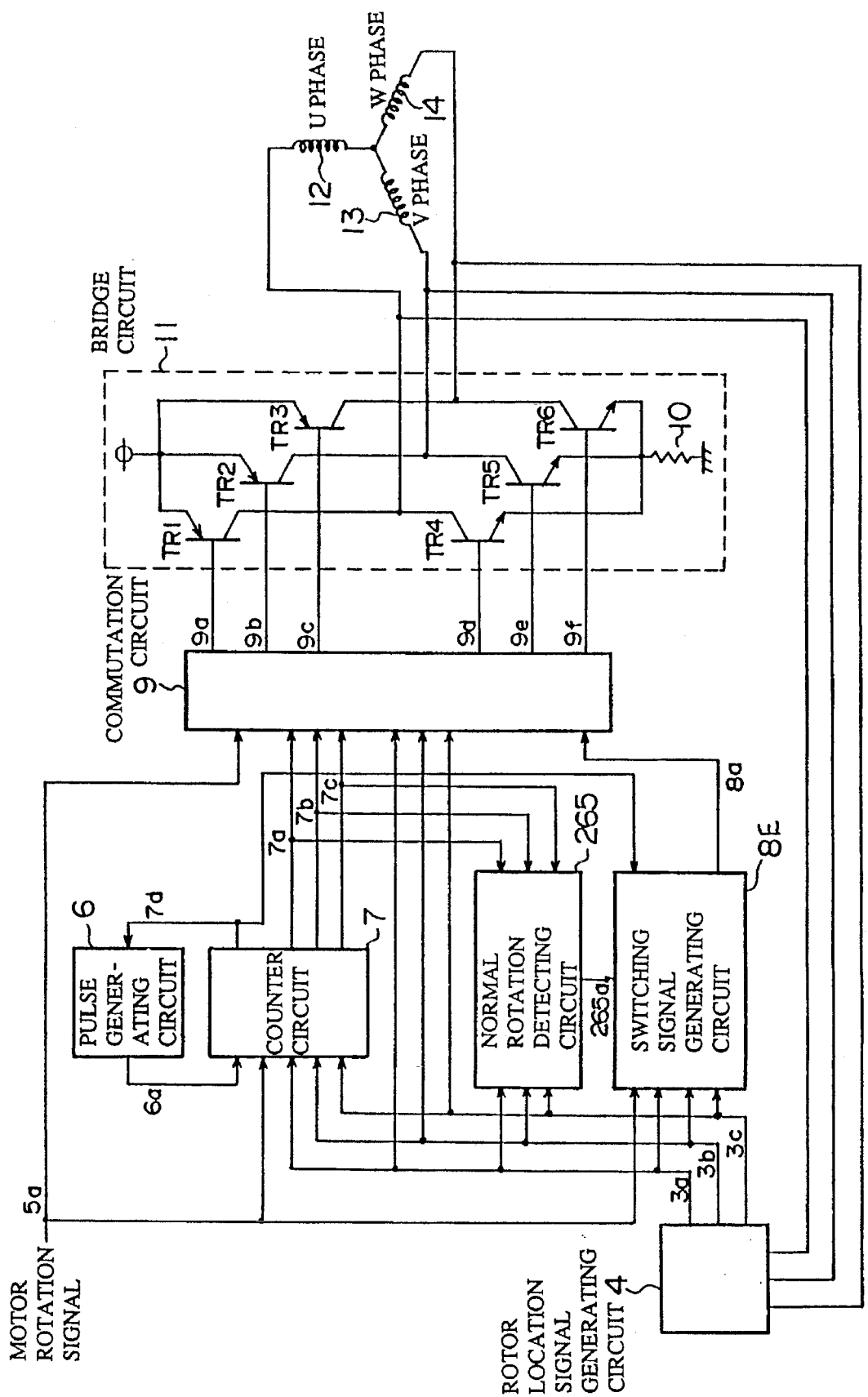
FIG. 42 is a block diagram of a thirteenth embodiment of the present invention which shows a general construction a brushless motor driving device.

FIG. 42 is a block diagram of a thirteenth embodiment of the present invention which shows a general construction a three phase brushless motor driving device.

A switching signal generating circuit 8E of this embodiment is explained below.

In this embodiment, the location signals 3a, 3b and 3c and the pulse train 7d and the motor rotation signal 5a and the restart pulse 265a are inputted into switching signal generating circuit 8E. The switching signal 8a is inputted into the commutation circuit 9.

Figure 43:
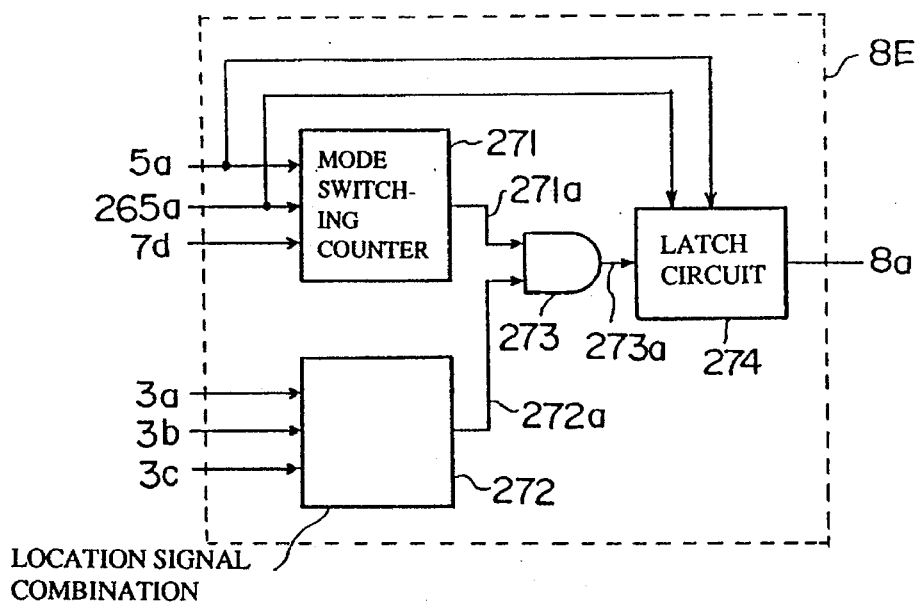
FIG. 43 shows a concrete switching signal generating circuit of embodiment 13.

FIG. 43 shows a concrete switching signal generating circuit 8E of embodiment 13. The switching signal generating circuit 8E is constituted by the location signal combination discrimination circuit 272 of the embodiment 12 and the mode switching counter 271.

Figure 44:
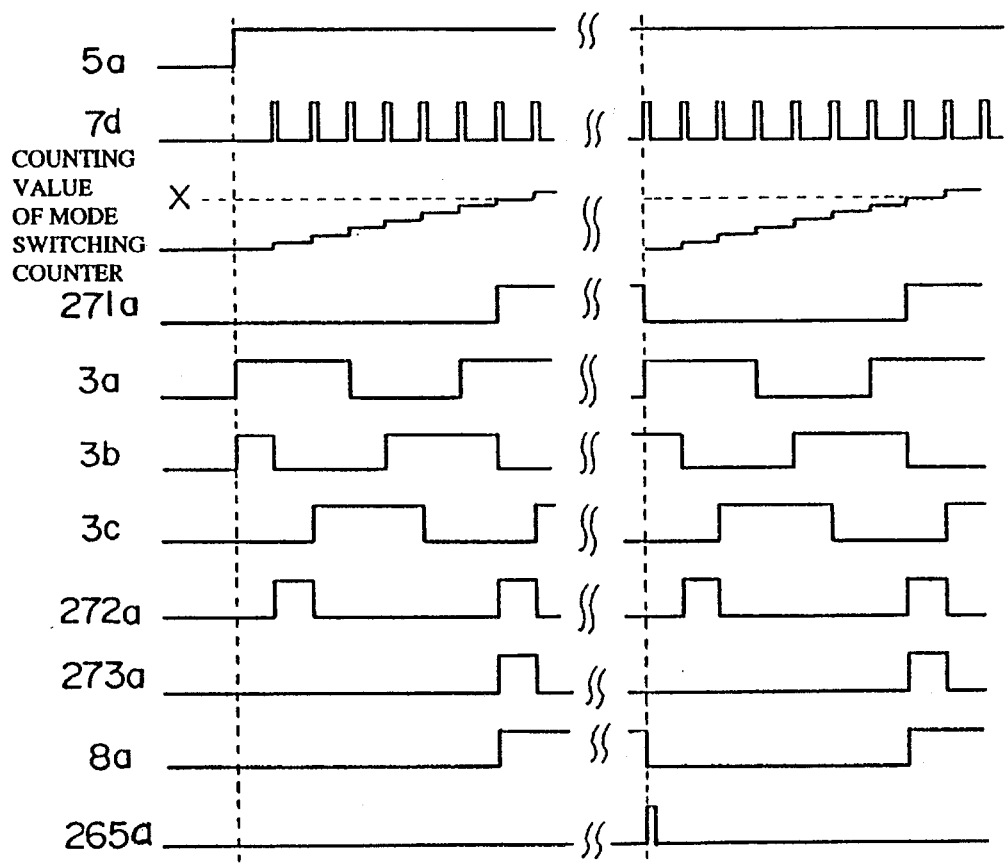
FIG. 44 is a timing chart which explains an operation of a switching signal generating circuit of embodiment 13.

An operation of the switching signal generating circuit 8E of this embodiment is explained below using FIG. 44. In this embodiment, when the motor rotation signal 5a becomes H level, the mode switching counter 271 begins to count the pulse train 7d, then the commutation circuit 9 outputs driving signals 9a, 9b, 9c, 9d, 9e and 9f by combining the count numbers 7a, 7b and 7c according to the relationship shown in FIG. 27. When the mode switching counter 271 counts the pulse train 7d for a predetermined number X, the output 271a of the mode switching counter 271 becomes H, and the location signals 3a, 3b and 3c became a combination of H-L-L, the AND circuit output 273a changes to H. The latch circuit 274 operates at the rising edge of the first AND circuit output 273a after the motor rotation signal 5a has changed to H, then the switching signal 8a changes from L to H, and holds H state. Then the commutation circuit 9 outputs the driving signals 9a, 9b, 9c, 9d, 9e and 9f by combining the location signals 3a, 3b and 3c as shown in FIG. 22.

When the commutation circuit 9 outputs the driving signals 9a, 9b, 9c, 9d, 9e and 9f by combining the location signals 3a, 3b and 3c, and when the restart pulse 265a is inputted from the normal rotation detecting circuit 265, the mode switching counter 271 and the latch circuit 274 is reset, then the switching signal 8a changes from H to L. Then, the commutation circuit 9 outputs the driving signals 9a, 9b, 9c, 9d, 9e and 9f using the count numbers 7a, 7b and 7c. When the mode switching counter 271 counts the pulse train 7d for a predetermined number X and when the location signal becomes a combination of a predetermined H-L-L state, the switching signal 8a changes from L to H, then the commutation circuit 9 outputs again the driving signals 9a, 9b, 9c, 9d, 9e and 9f by combining the location signals 3a, 3b and 3c as shown in FIG. 22.

Embodiment 14

In this embodiment, an switching operation is carried out when a setting period has expired and at the same time the driving signal is normal, that is, at the both conditions are satisfied.

Figure 45:
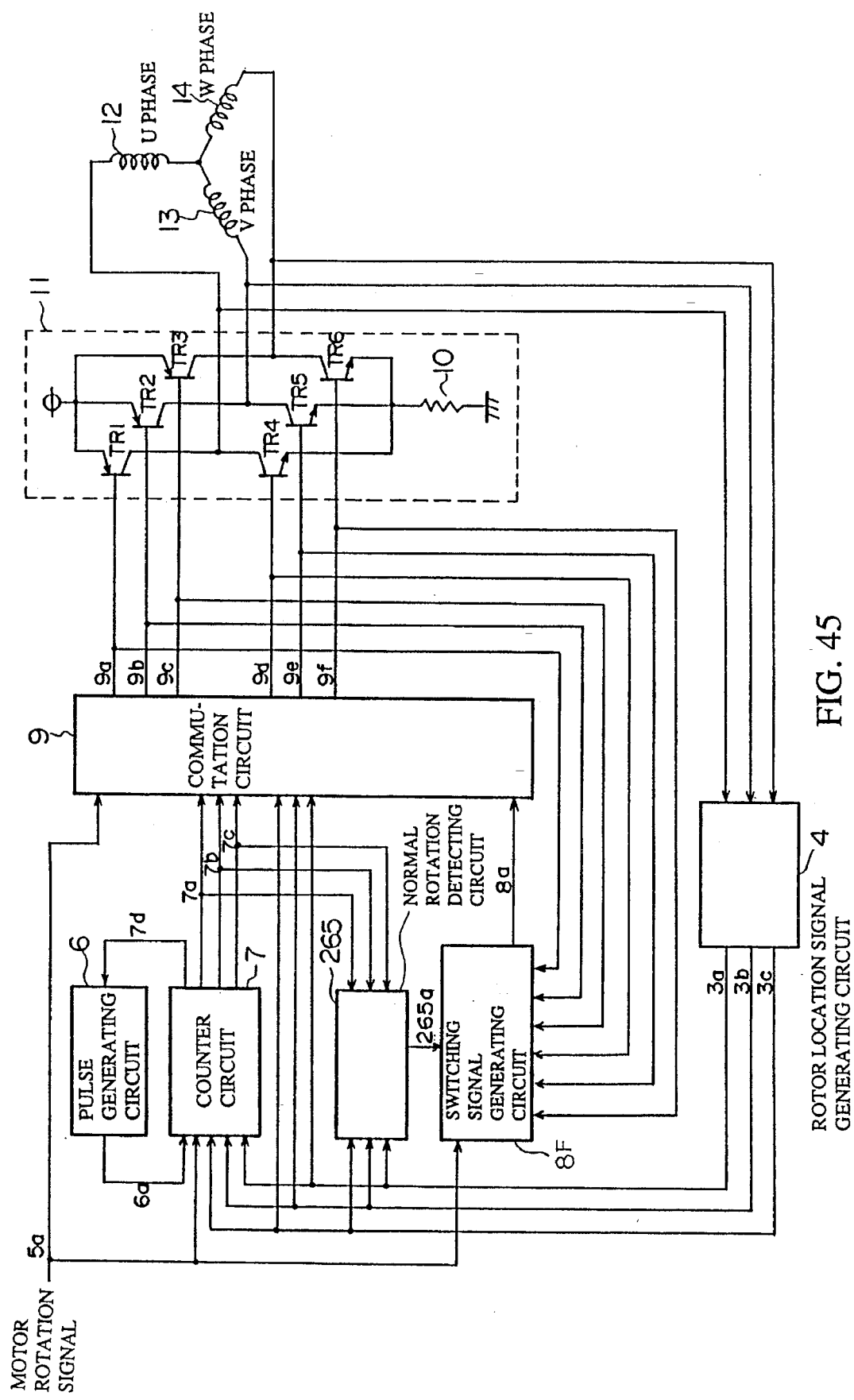
FIG. 45 is a block diagram of a fourteenth embodiment of the present invention which shows a general construction a brushless motor driving device.

FIG. 45 is a block diagram of a fourteenth embodiment of the present invention which shows a general construction a three phase brushless motor driving device. A switching signal generating circuit 8F of this embodiment is explained below.

In this embodiment, the driving signals 9a, 9b, 9c, 9d, 9e and 9f, the motor rotation signal 5a and the restart pulse 265a are inputted into switching signal generating circuit 8F. The switching signal 8a is inputted into the commutation circuit 9.

Figure 46:
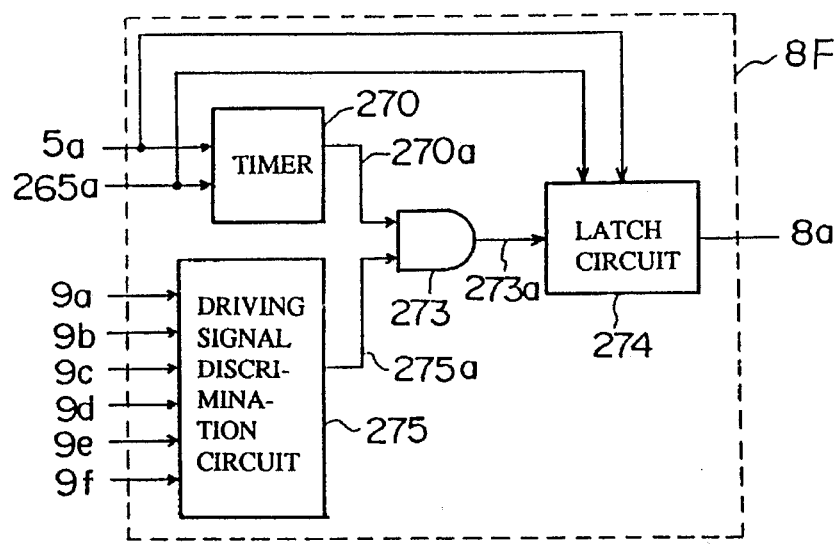
FIG. 46 shows a concrete switching signal generating circuit of embodiment 14.

An operation of the switching signal generating circuit 8F of this embodiment is explained below using FIG. 46. The switching signal generating circuit 8F of this embodiment, is constituted by the timer 270 described above and a driving signals combination discrimination circuit 275. The driving signals 9a, 9b 9c, 9d, 9e and 9f is inputted into the driving signal combination discrimination circuit 275. In the driving signal combination discrimination circuit 275, an output 275a becomes H, when the driving signals 9a, 9b, 9c, 9d, 9e and 9f became a predetermined combination.

In this embodiment, when the driving signals 9a, 9b, 9c, 9d, 9e and 9f became a combination of L-H-H-L-H-L, the output 275a becomes H. The output of the driving signal combination discrimination circuit 275 and the timer 270 are inputted into the AND circuit 273, and the AND circuit output 273a, the motor rotation signal 5a and the restart pulse 265a are inputted into the latch circuit 274 as described above.

Figure 47:
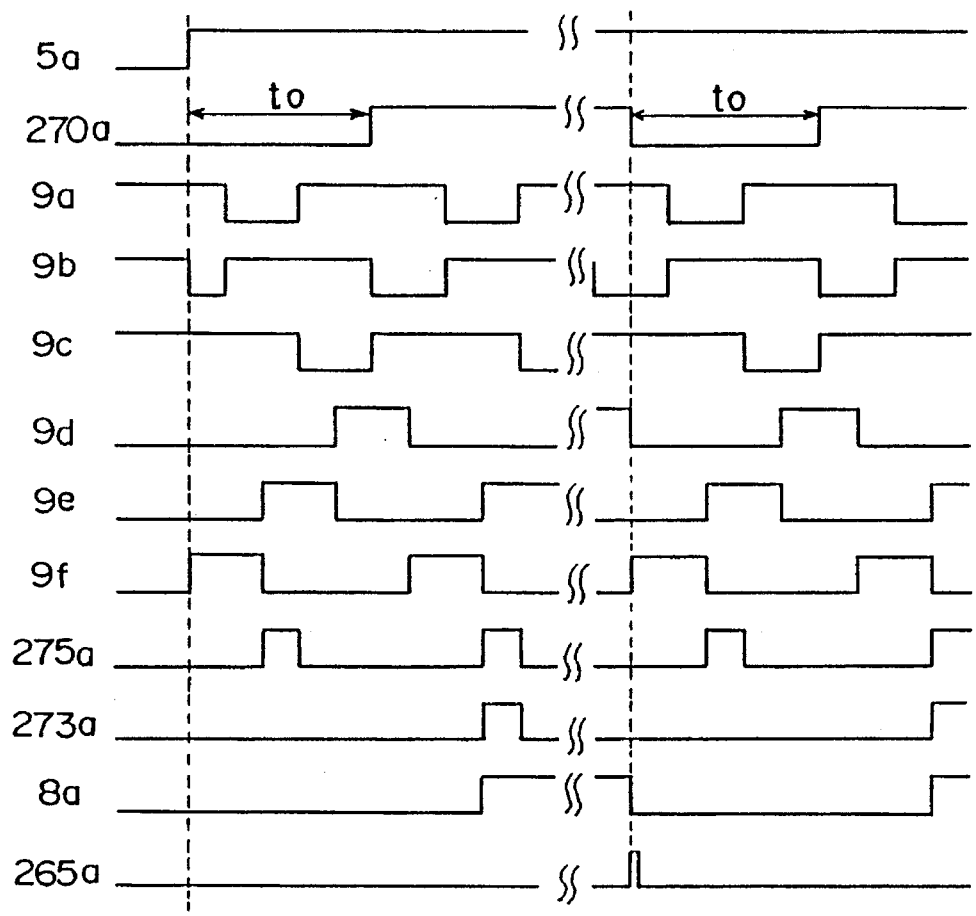
FIG. 47 is a timing chart which explains an operation of a switching signal generating circuit of embodiment 14.

FIG. 47 illustrates an operation of switching signal generating circuit 8F of this embodiment. When the motor rotation signal 5a becomes H, the timer 270 changes to ON state, the commutation circuit 9 outputs the driving signal using a combination of the count numbers. After a predetermined period to, the timer output 270a changes to H, and when the driving signals 9a, 9b, 9c, 9d, 9e and 9f became a combination of L-H-H-L-H-L, an output 273a of AND circuit 273 changes to H. Will change in the same way spoke it in former embodiment the commutation circuit 9 uses a combination of the location signals 3a, 3b and 3c again and the driving signals 9a, 9b, 9c, 9d, 9e and 9f is outputted.

Further, an operation when a restart pulse 265a is inputted into the switching signal generating circuit 8F is similar to the embodiment 13 as shown in FIG. 47. That is, the commutation circuit 9 outputs again the driving signals 9a, 9b, 9c, 9d, 9e and 9f using a combination of the location signals 3a, 3b and 3c after a period to.

Embodiment 15

In this embodiment, an switching operation is carried out when a counter counts a predetermined value and the driving signal is normal, that is, at the both conditions are satisfied.

Figure 48:
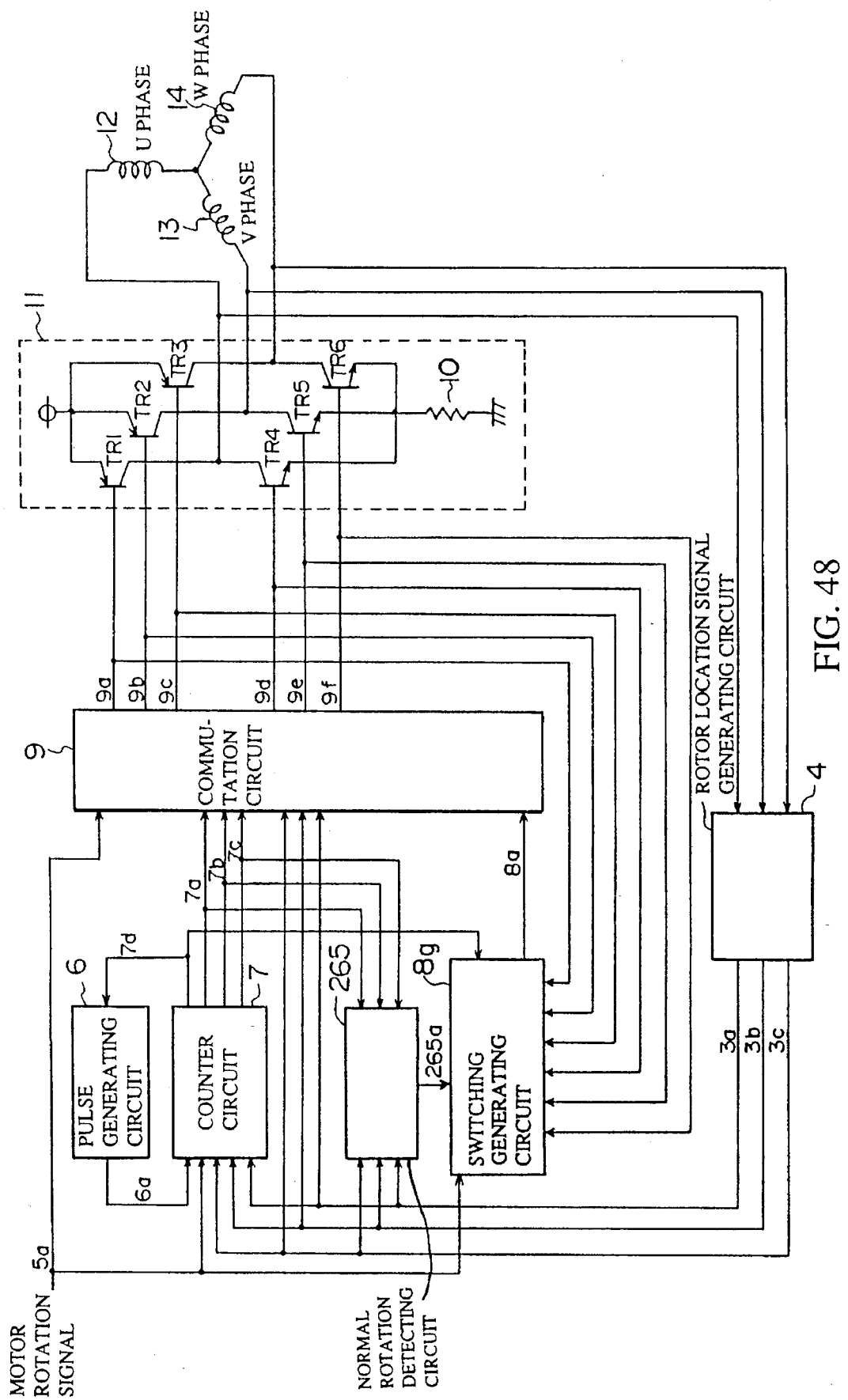
FIG. 48 is a block diagram of a fifteenth embodiment of the present invention which shows a general construction a brushless motor driving device.

FIG. 48 is a block diagram of a fifteenth embodiment of the present invention which shows a general construction a brushless motor driving device. A switching signal generating circuit 8G of this embodiment is explained below. In this embodiment, the driving signals 9a, 9b, 9c, 9d, 9e and 9f, the pulse train 7d and the motor rotate signal 5a and the restart pulse 265a are inputted into the switching signal generating circuit 8G.

Figure 49:
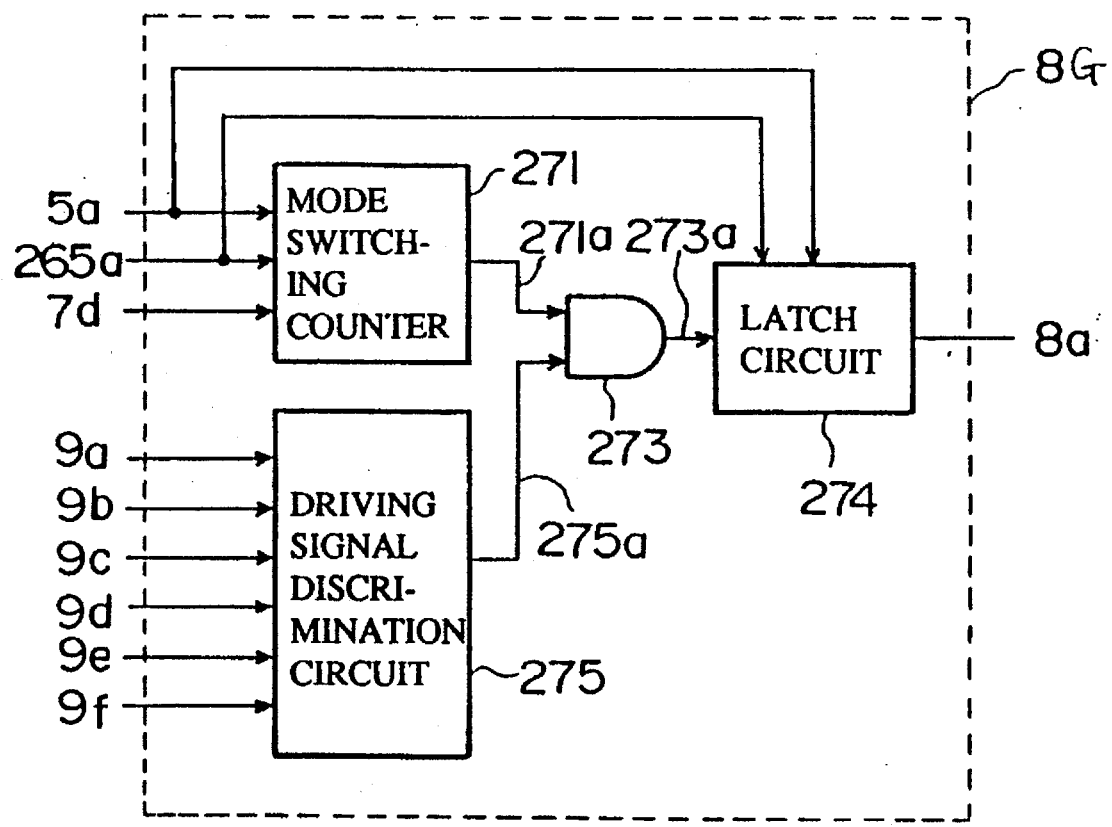
FIG. 49 shows a concrete switching signal generating circuit of embodiment 15.
Figure 50:
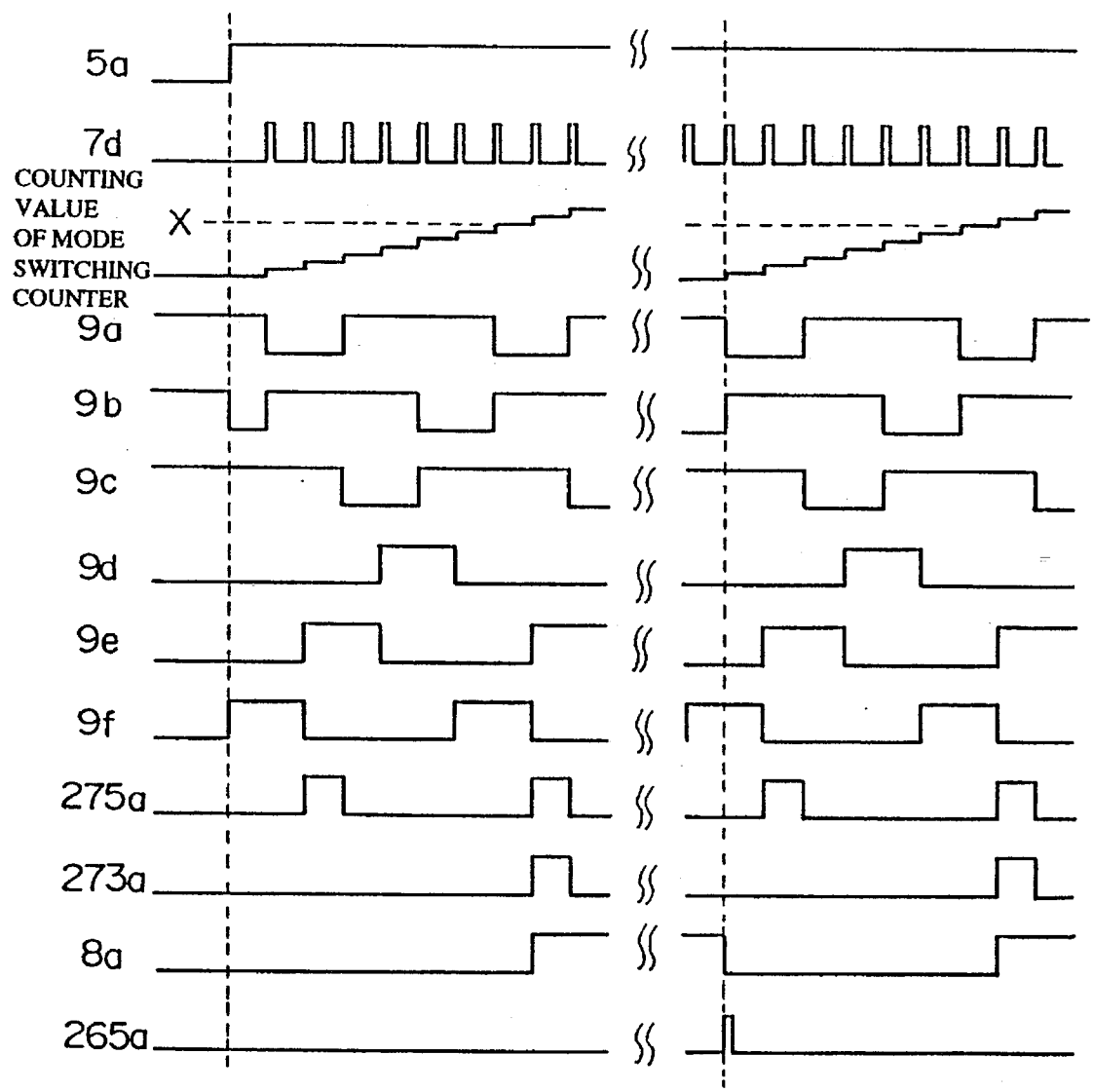
FIG. 50 is a timing chart which explains an operation of a switching signal generating circuit of embodiment 15.

FIG. 49 shows a concrete switching signal generating circuit of embodiment 15. The switching signal generating circuit 8G of this embodiment is constituted by a driving signal combination discrimination circuit 275 and a mode switching counter 271. FIG. 50 is a timing chart which explains an operation of a switching signal generating circuit 8G. Since the operation of this embodiment is the same as that described above, the detailed description is omitted.

Embodiment 16

In this embodiment, an example in which a switching is carried out by speed detection is explained.

Figure 51:
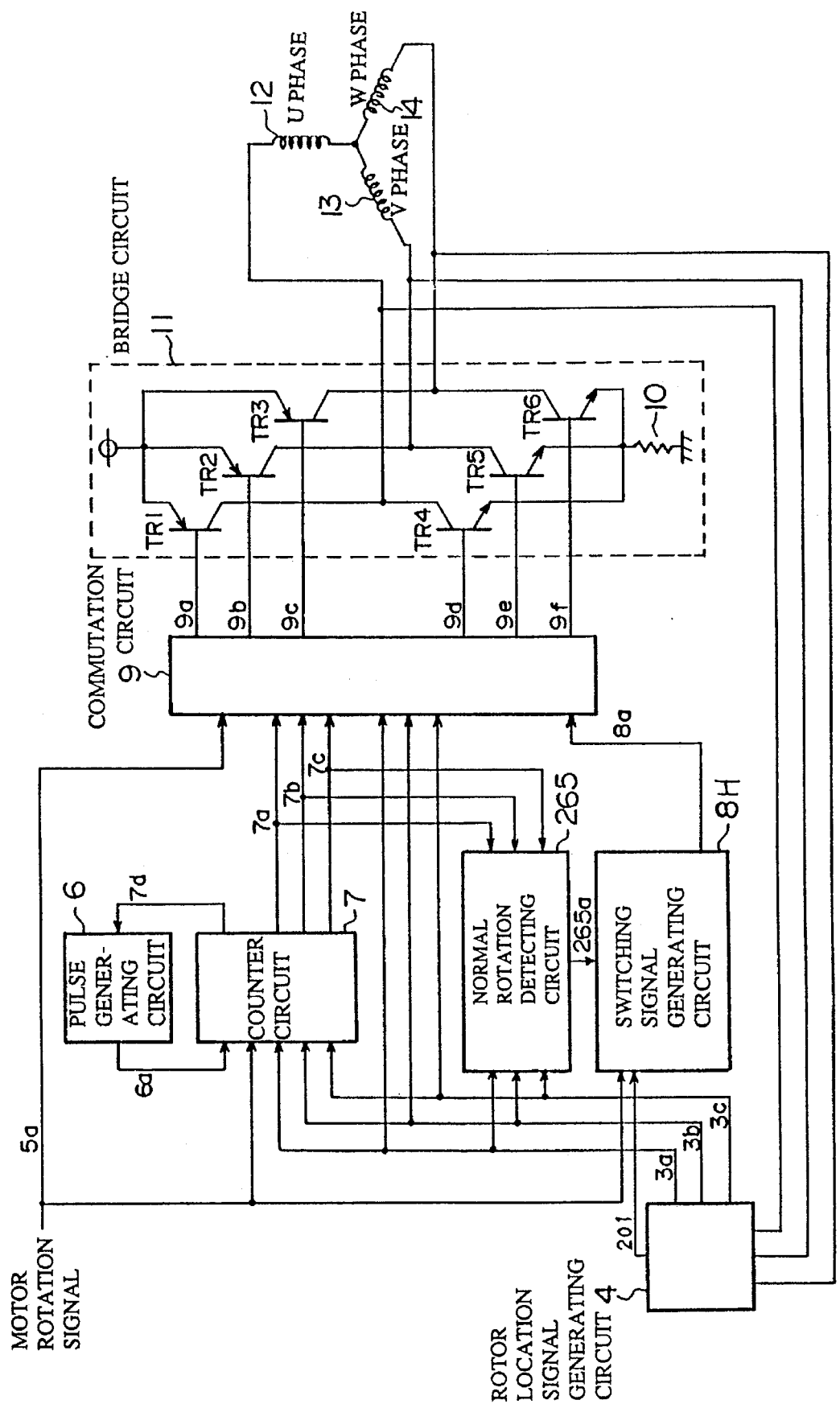
FIG. 51 is a block diagram of a sixteenth embodiment of the present invention which shows a general construction a brushless motor driving device.

FIG. 51 is a block diagram of a sixteenth embodiment of the present invention which shows a general construction a three phase brushless motor driving device. A switching signal generating circuit 8H of this embodiment is explained below.

In this embodiment, the logic pulse 201 which is outputted from the waveform shaping circuit 3 in the rotor location signal generating circuit 4 and the motor rotation signal 5a and the restart pulse 265a are inputted into switching signal generating circuit 8H.

Figure 52:
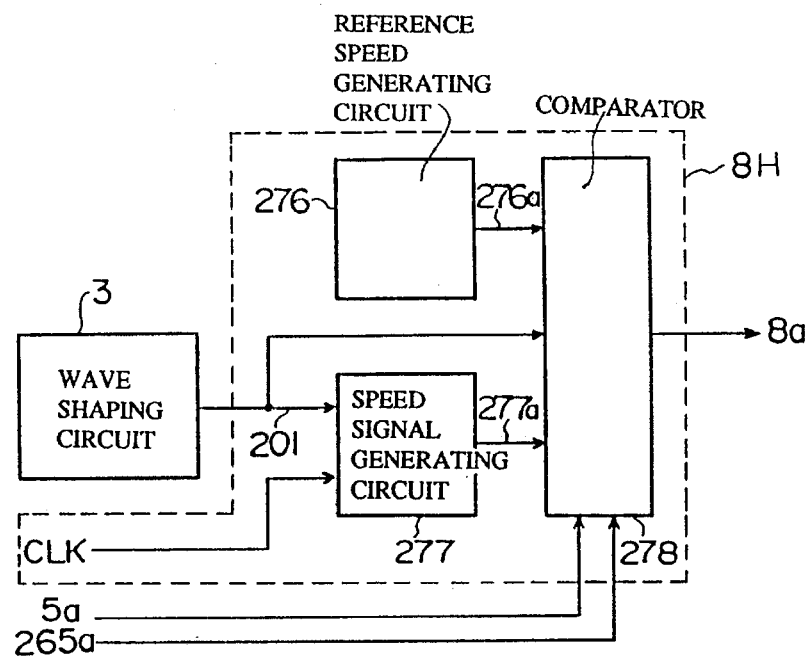
FIG. 52 shows a concrete switching signal generating circuit of embodiment 16.

FIG. 52 shows a concrete block diagram of the switching signal generating circuit 8H of embodiment 16. The switching signal generating circuit 8H of this embodiment is constituted by a speed signal generating circuit 277, a reference speed generating circuit 276, and a comparator 278. A logic pulse 201 and a CLK (clock) are inputted into the speed signal generating circuit 277. As described in the embodiments 1 and 7, since the logic pulse 201 is obtained for a certain period, it is possible to detect a rotation speed of the brushless motor from the logic pulse 201.

Figure 53:
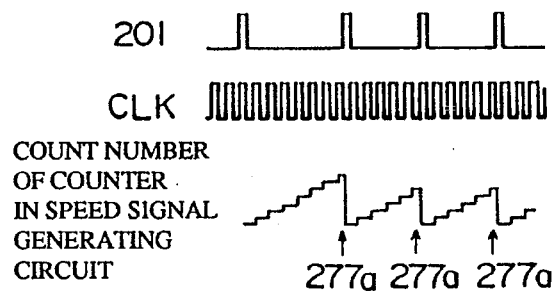
FIG. 53 is a timing chart which explains an operation of a speed signal generating circuit.

FIG. 53 is a timing chart for generating a speed signal 277a. The speed signal generating circuit 277 is counted up by the timing of CLK edge when the motor rotation signal 5a is H, and cleared by the timing of rising edge of logic pulse input which is inputted from the waveform shaping circuit 3 and the value shown by the arrow in FIG. 53 is outputted as a speed signal 277a. The reference speed generating circuit 276 outputs a reference speed signal 276a which switches the modes from the starting mode to a normal rotation mode. The comparator 278 compares the speed signal 277a with the reference speed signal 276a, for example, by voltage level or by bit numbers, at a timing of rising edge of the logic pulse, and outputs a switching signal 8a when the speed signal 277a reaches the reference speed signal 276a.

Figure 54:
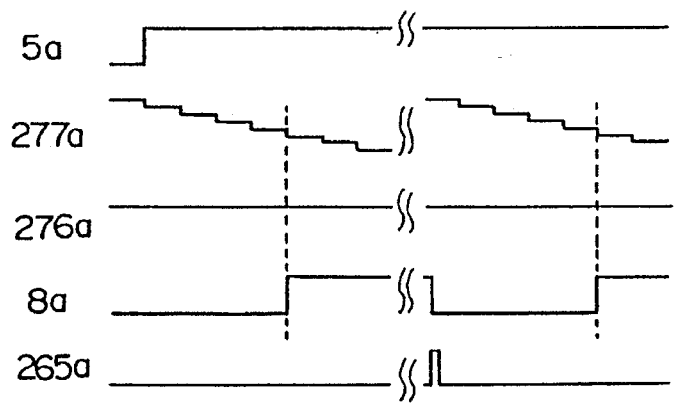
FIG. 54 is a timing chart which explains an operation of a switching signal generating circuit of embodiment 16.

FIG. 54 is a timing chart which explains an operation of a switching signal generating circuit 8H of embodiment 16. An operation of the switching signal generating circuit 8H of this embodiment is explained below using FIG. 54.

When the motor rotation signal 5a becomes H at starting, the comparator begins to compare the speed signal 277a with the reference speed signal 276a. When the speed signal 277a reaches the reference speed signal 276a, the switching signal 8a of the comparator 278 changes to H. And when the restart pulse 265a is inputted, the comparator 278 is reset and the switching signal 8a changes to L from H. When the speed signal 277a reaches the reference speed signal 276a, the switching signal 8a changes again to H from L.

Embodiment 17

In this embodiment, the switching is carried out when the time setting, the number counting and the location signal are normally detected.

Figure 55:
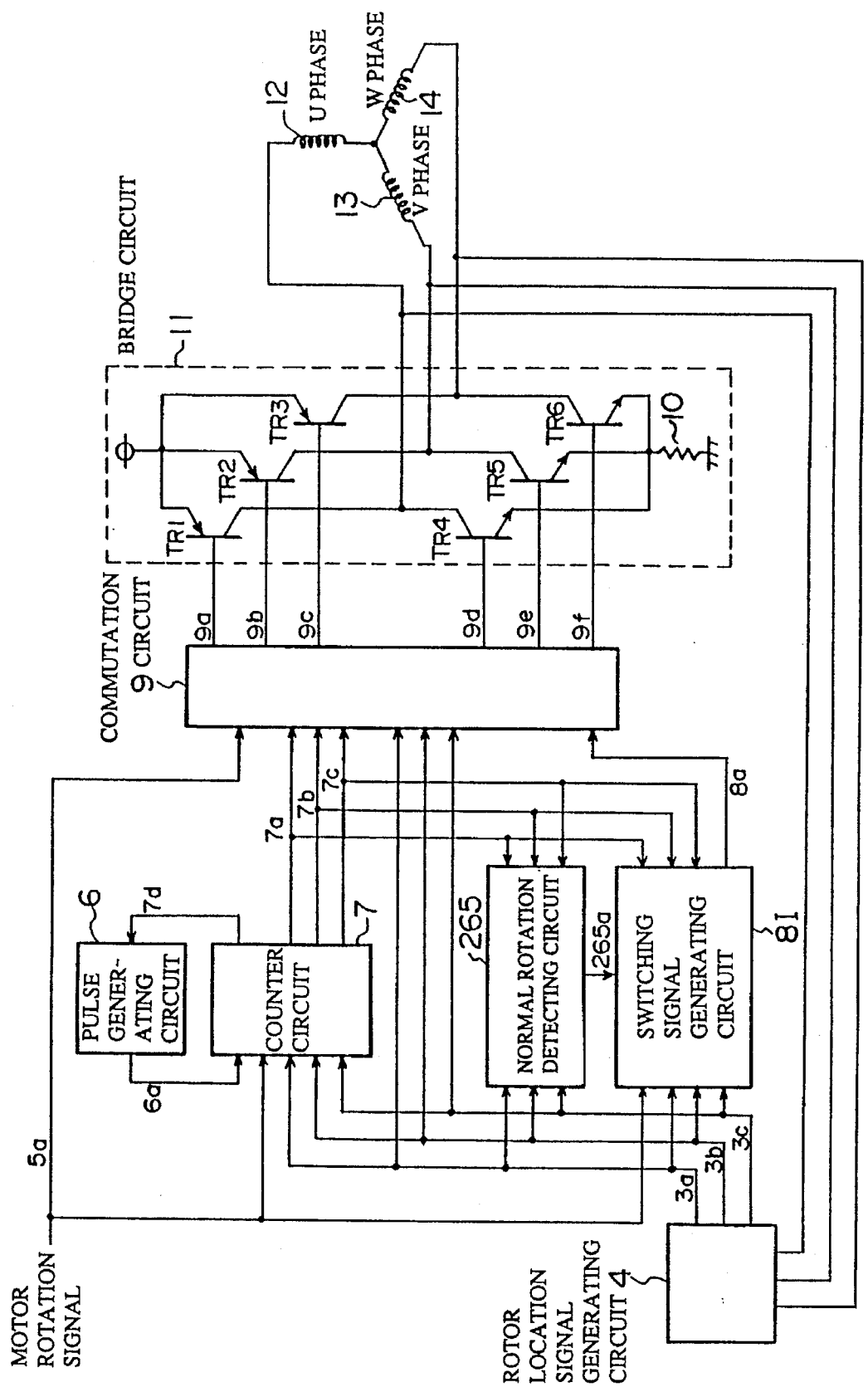
FIG. 55 is a block diagram of a seventeenth embodiment of the present invention which shows a general construction a brushless motor driving device.

FIG. 55 is a block diagram of a seventeenth embodiment of the present invention which shows a general construction a three phase brushless motor driving device. A switching signal generating circuit 8I of this embodiment is explained below. In this embodiment, the count numbers 7a, 7b and 7c, the location signals 3a, 3b and 3c, the motor rotate signal 5a and the restart pulse 265a are inputted into the switching signal generating circuit 8I.

Figure 56:
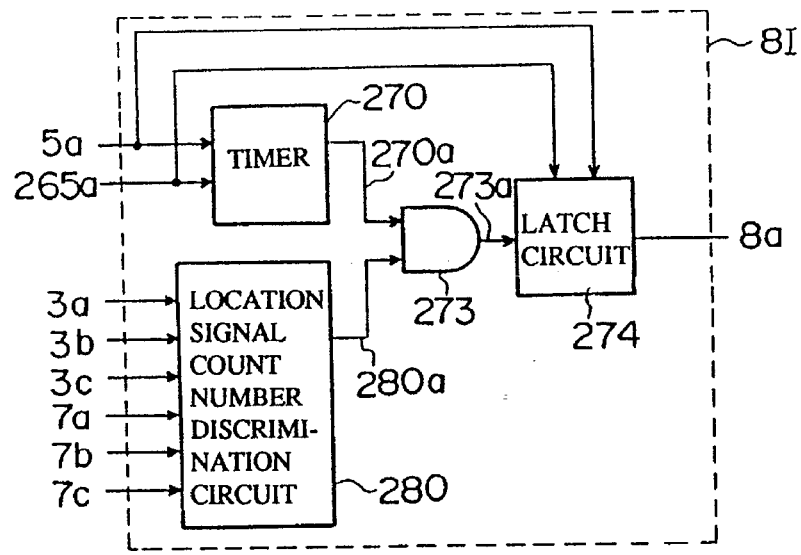
FIG. 56 shows a concrete switching signal generating circuit of embodiment 17.

FIG. 56 shows a concrete switching signal generating circuit 8I of embodiment 17. The switching signal generating circuit 8I of this embodiment is constituted by a location signal count number discrimination circuit 280 and a timer 270.

Figure 57:
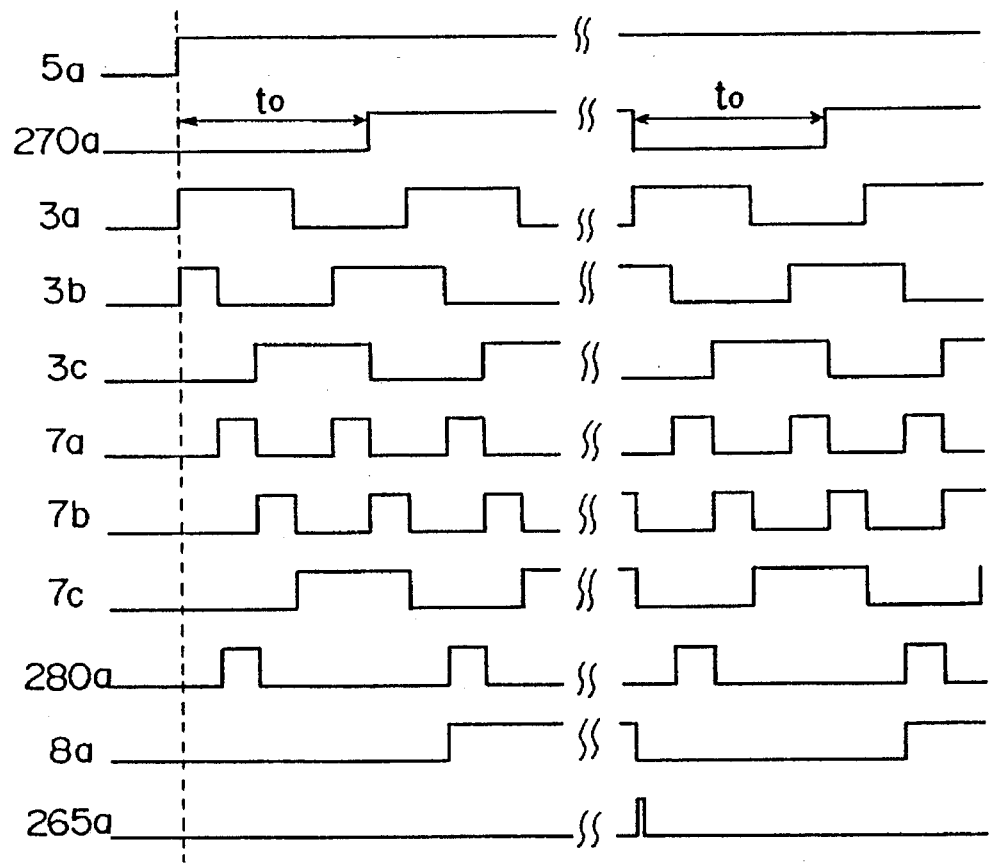
FIG. 57 is a timing chart which explains an operation of a switching signal generating circuit of embodiment 17.

FIG. 57 is a timing chart which explains an operation of a switching signal generating circuit 8I of embodiment 17. Since the operation this figure is similar to the above embodiment, the detailed description is omitted.

Embodiment 18

In this embodiment, the switching is carried out when both the speed detection and the location signal are normally detected.

Figure 58:
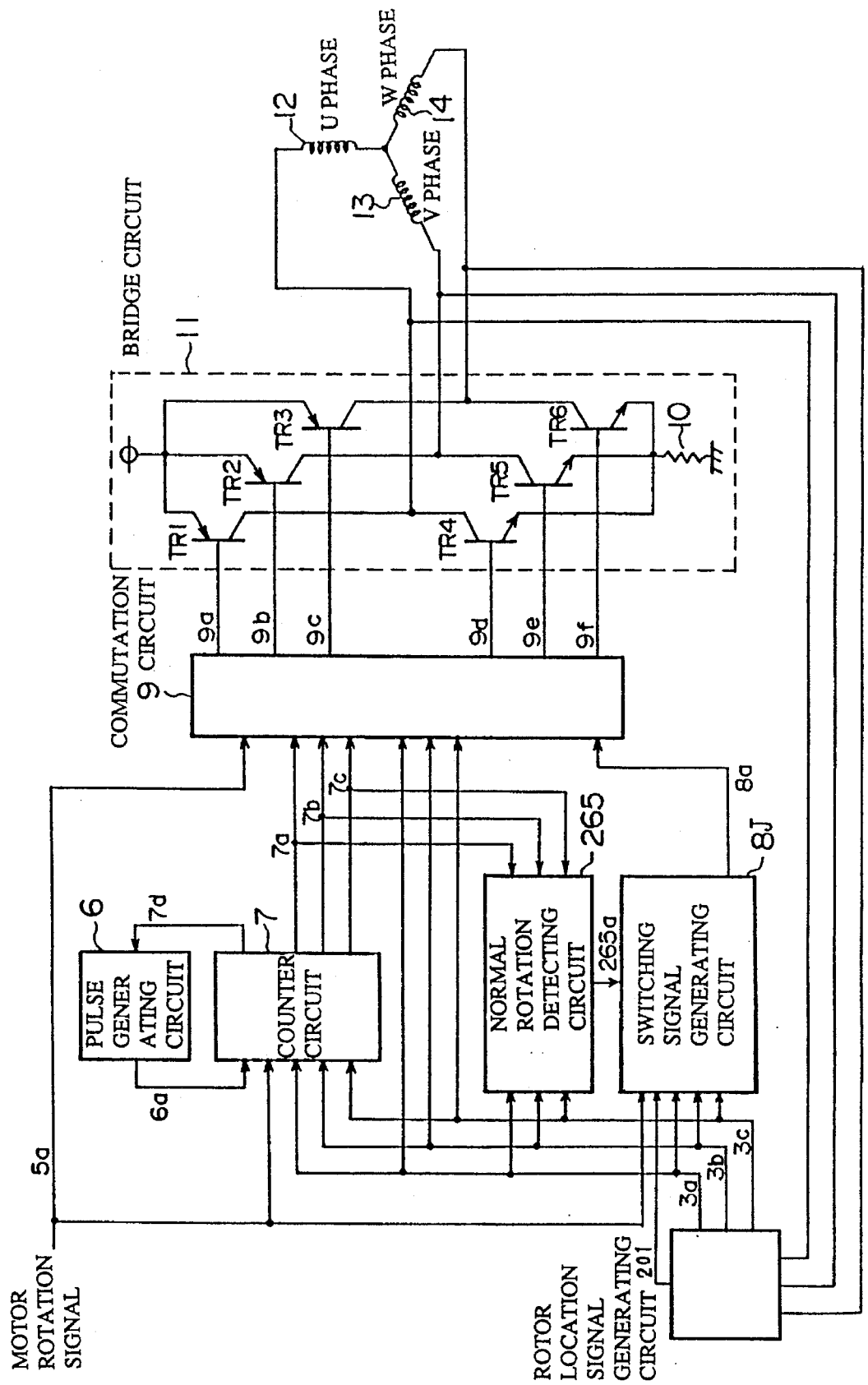
FIG. 58 is a block diagram of an eighteenth embodiment of the present invention which shows a general construction a brushless motor driving device.

FIG. 58 is a block diagram of an eighteenth embodiment of the present invention which shows a general construction a three phase brushless motor driving device. A switching signal generating circuit 8J of this embodiment is explained.

Figure 59:
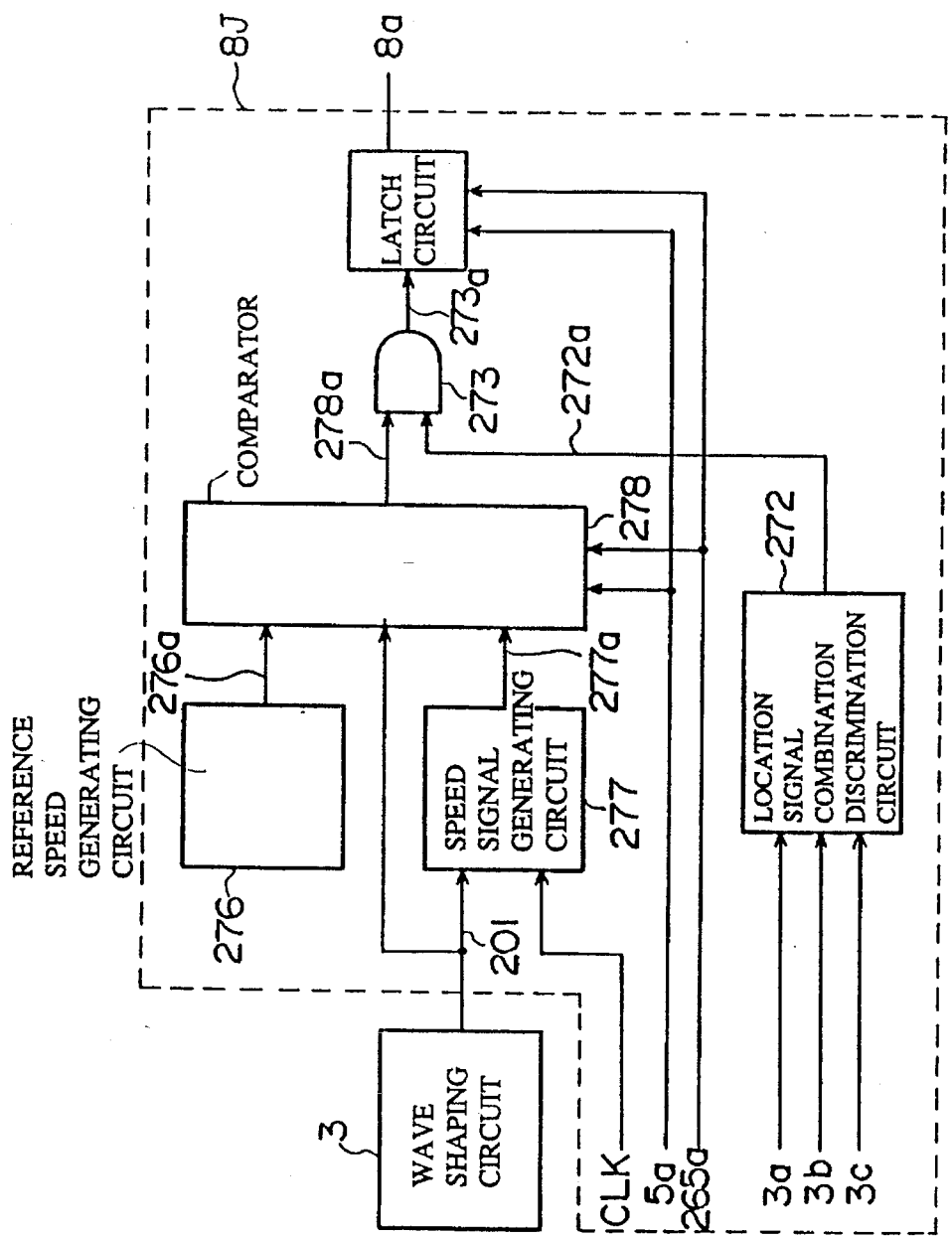
FIG. 59 shows a concrete switching signal generating circuit of embodiment 18.

FIG. 59 shows a concrete switching signal generating circuit 8J of embodiment 18. The switching signal generating circuit 8J of this embodiment is constituted of a reference speed signal generating circuit 276, a speed signal generating circuit 277, a comparator 278 and a location signal combination discrimination circuit 272.

Figure 60:
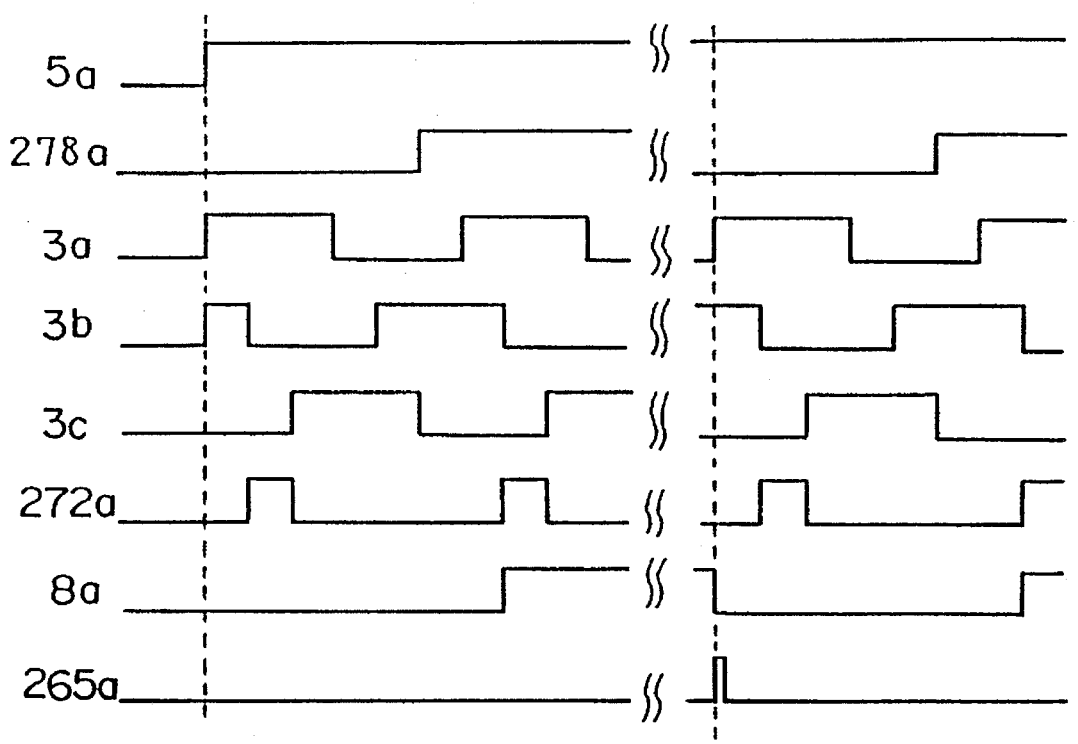
FIG. 60 is a timing chart which explains an operation of a switching signal generating circuit of embodiment 18.

Next, FIG. 60 is a timing chart which explains an operation of a switching signal generating circuit 8J of embodiment 18. Since the operation this figure is similar to the above embodiment, the detailed description is omitted.

Embodiment 19

In this embodiment, the switching is carried out by a logical product of speed detection and the normal detection of the driving signals.

Figure 61:
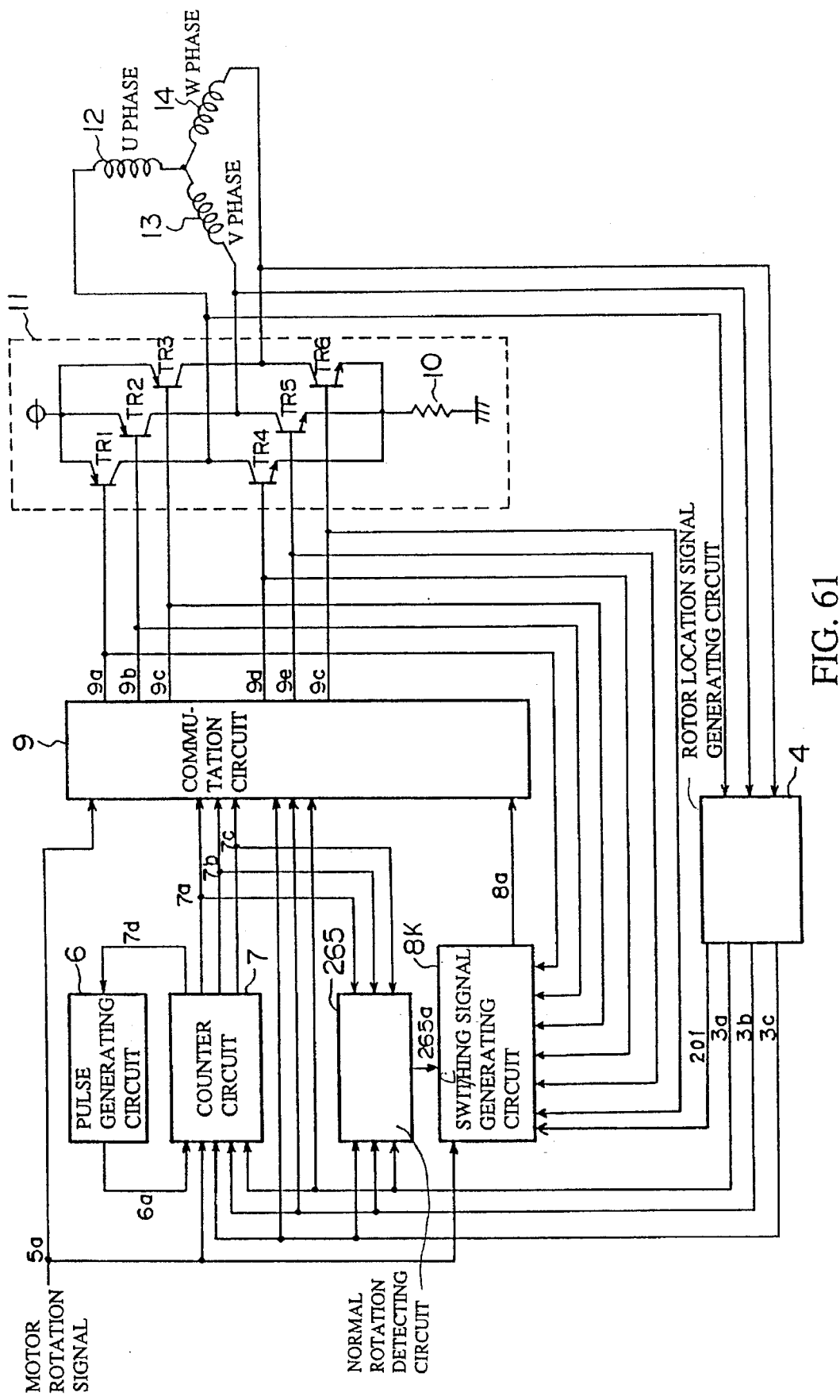
FIG. 61 is a block diagram of a nineteenth embodiment of the present invention which shows a general construction a brushless motor driving device.

FIG. 61 is a block diagram of a nineteenth embodiment of the present invention which shows a general construction a three phase brushless motor driving device. A switching signal generating circuit 8K of this embodiment is explained below.

Figure 62:
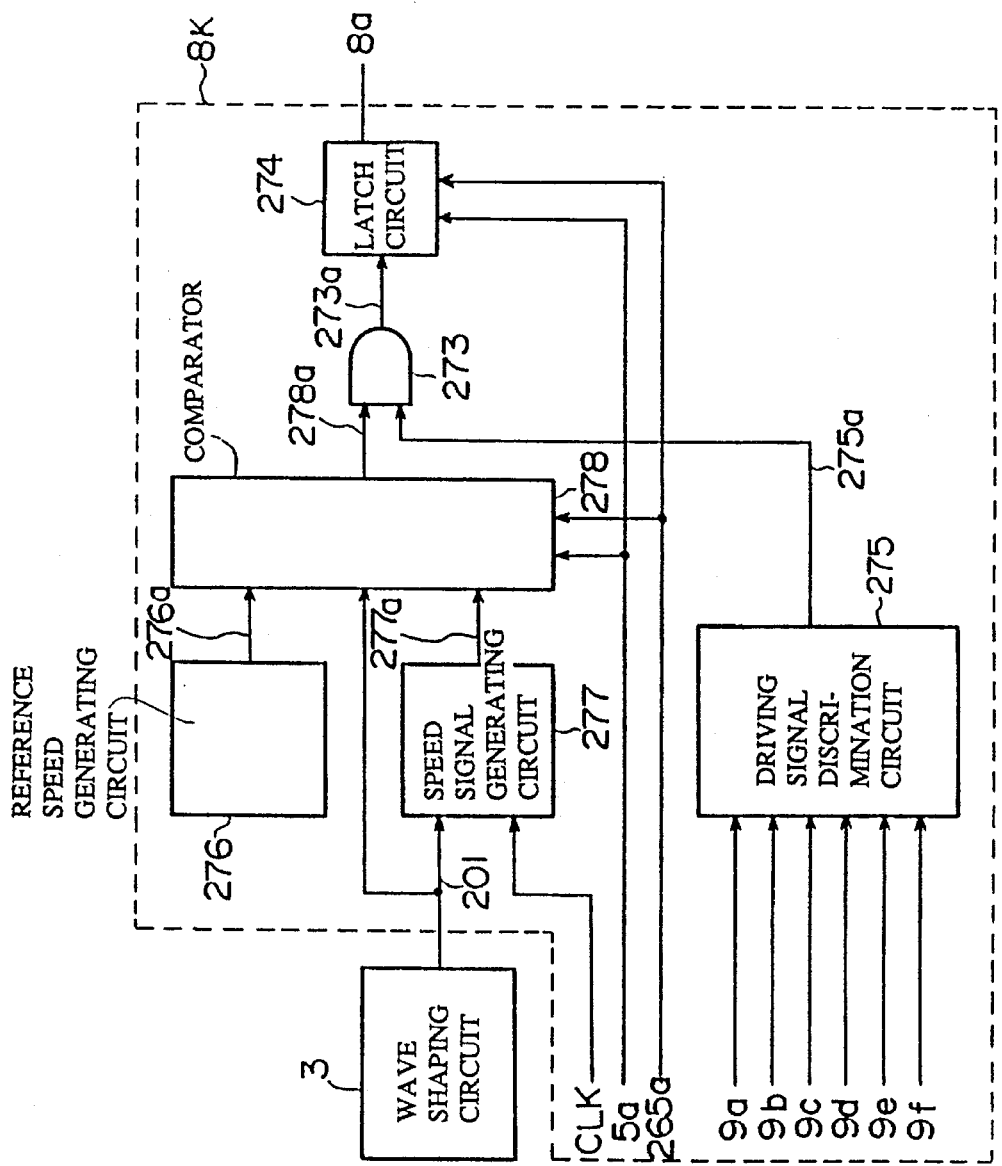
FIG. 62 shows a concrete switching signal generating circuit of embodiment 19.

FIG. 62 shows a concrete switching signal generating circuit 8K of embodiment 19. The switching signal generating circuit 8K of this embodiment is constituted of a reference speed generating circuit 276, a speed signal generating circuit 277, a comparator 278 and a driving signal combination discrimination circuit 275.

Figure 63:
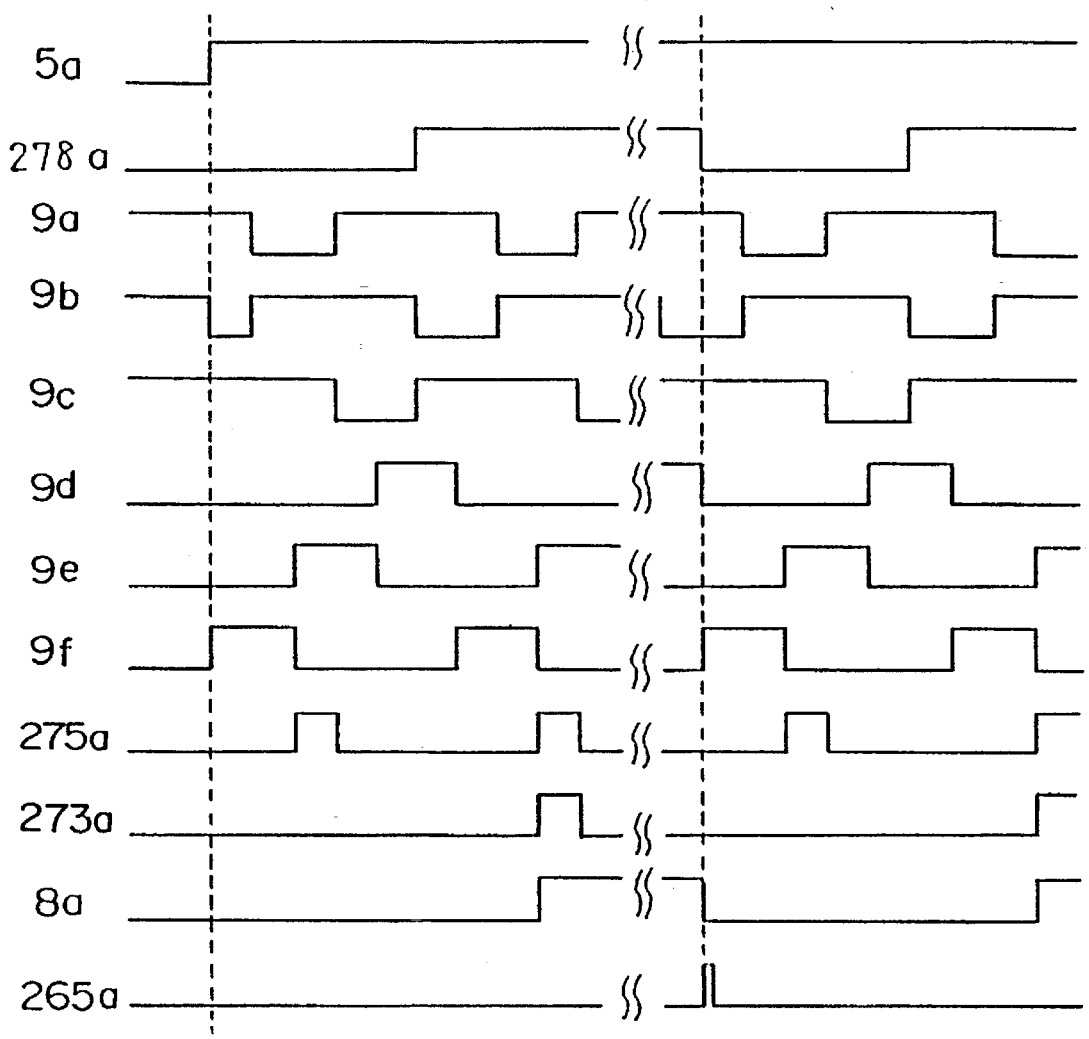
FIG. 63 is a timing chart which explains an operation of a switching signal generating circuit of embodiment 19.

FIG. 63 is a timing chart which explains an operation of a switching signal generating circuit 8K of embodiment 19. Since the operation this figure is similar to the above embodiment, the detailed description is omitted.

Embodiment 20

In this embodiment, the switching is carried out by a logical product of speed detection, the normal detection of the location signals and the count number.

Figure 64:
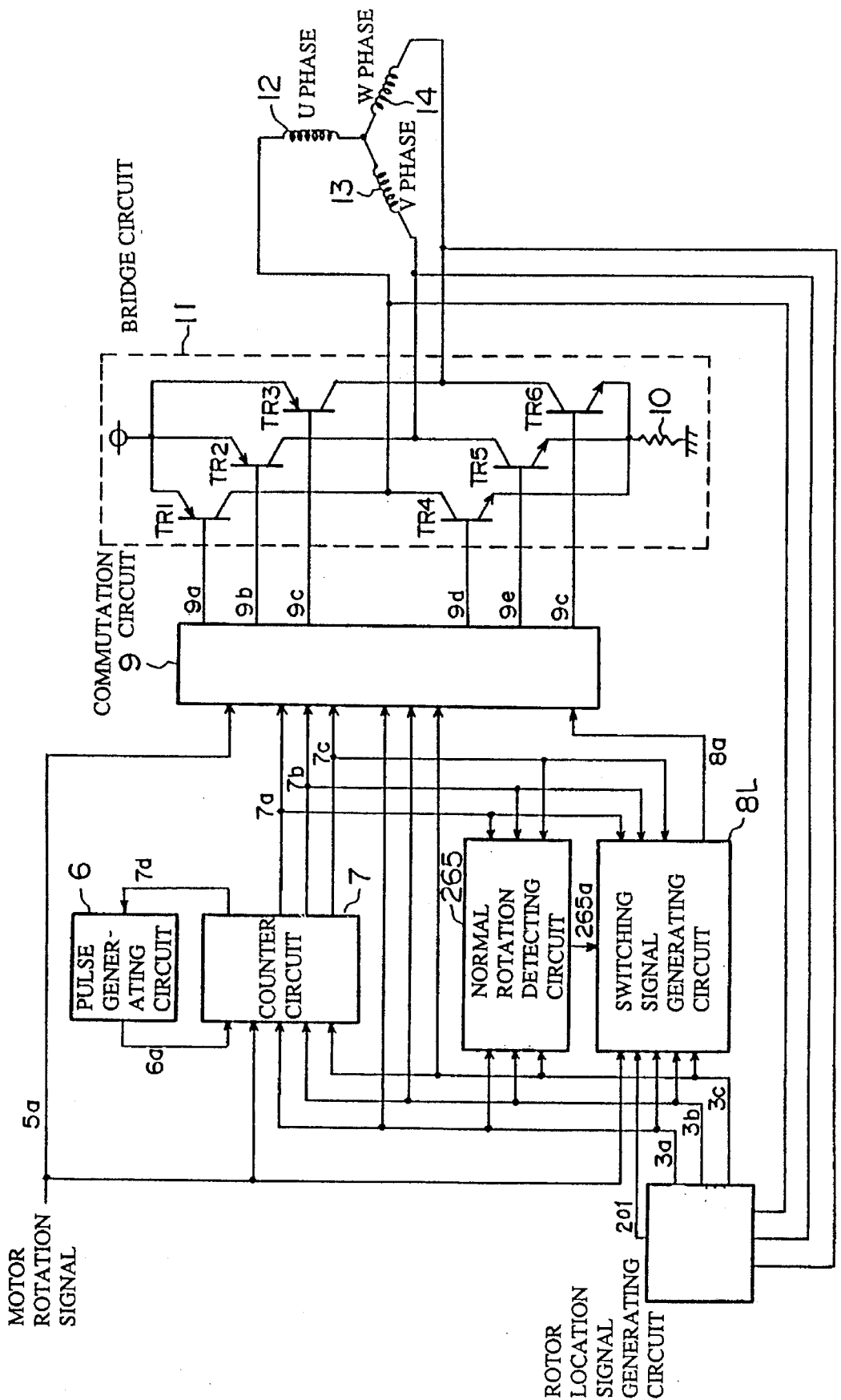
FIG. 64 is a block diagram of a twentieth embodiment of the present invention which shows a general construction a brushless motor driving device.

FIG. 64 is a block diagram of a twentieth embodiment of the present invention which shows a general construction a three phase brushless motor driving device. A switching signal generating circuit 8L of this embodiment is explained below.

Figure 65:
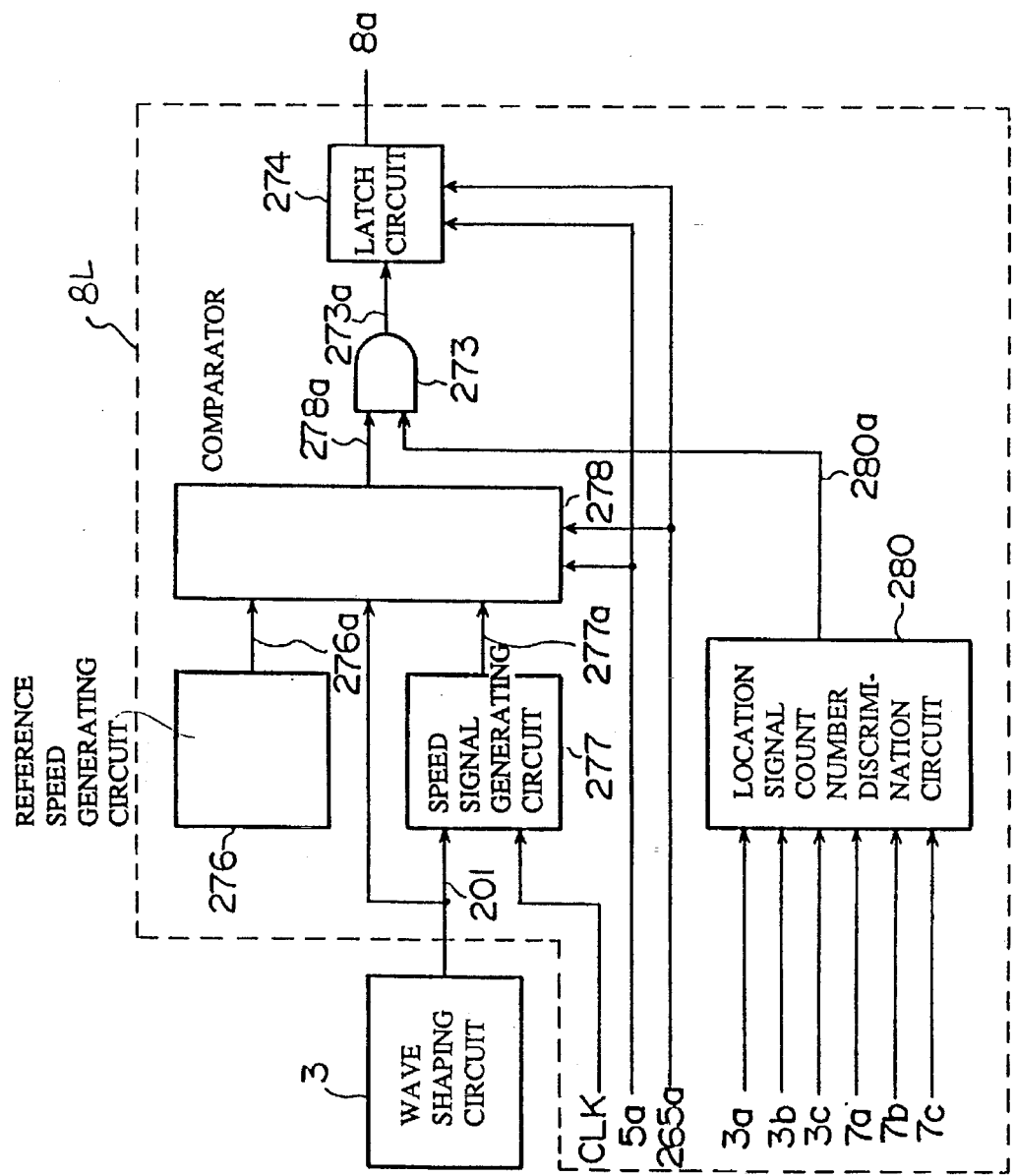
FIG. 65 shows a concrete switching signal generating circuit of embodiment 20.

FIG. 65 shows a block diagram of the switching signal generating circuit 8L of embodiment 20. The switching signal generating circuit 8 of this embodiment is constituted of a reference speed generating circuit 276, a speed signal generating circuit 277, a comparator 278 and a location signal count number discrimination circuit 280.

Figure 66:
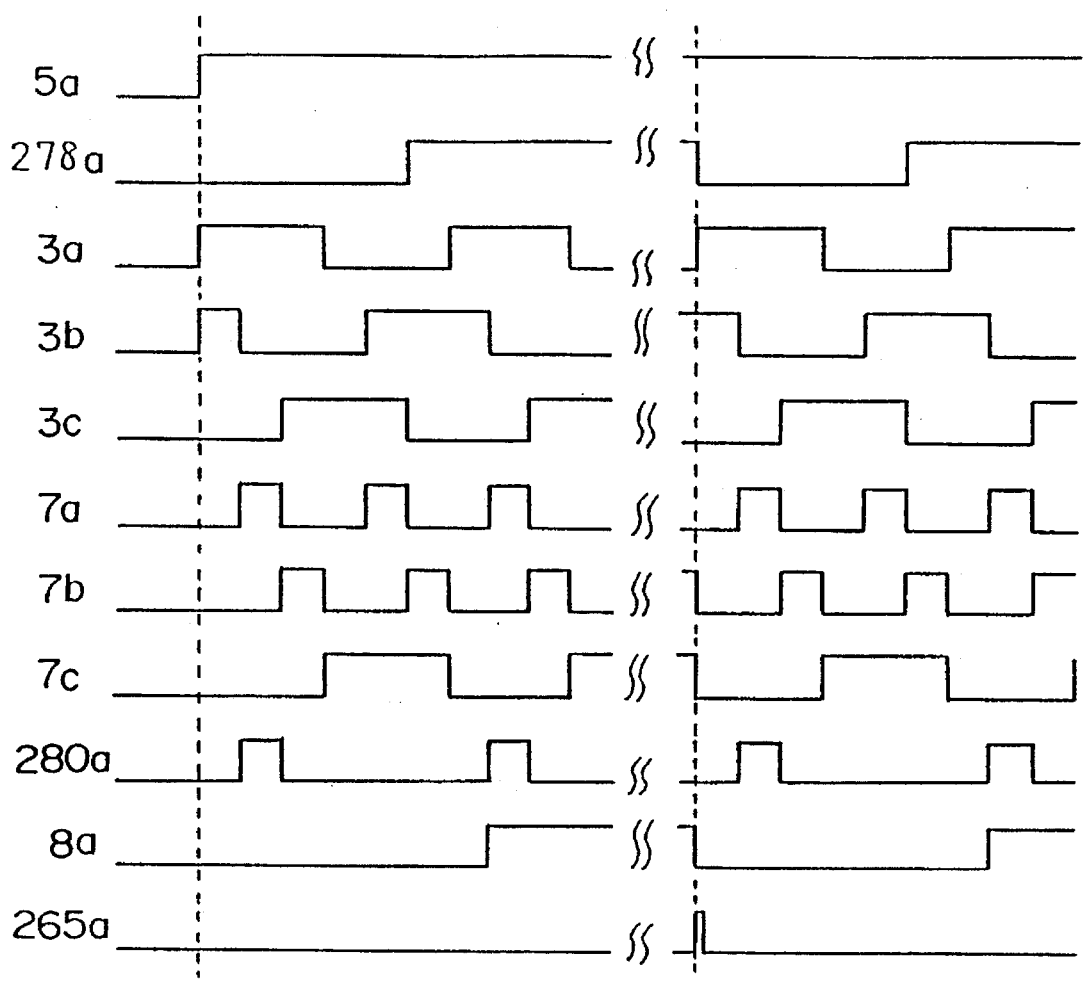
FIG. 66 is a timing chart which explains an operation of a switching signal generating circuit of embodiment 20.

FIG. 66 is a timing chart which explains an operation of a switching signal generating circuit 8L of embodiment 20. Since the operation this figure is similar to the above embodiment, the detailed description is omitted.

Embodiment 21

In this embodiment, a normal rotation detecting circuit is not provided independently at restarting, but a forced starting mode is set by the pseudo pulse inputted from the pulse generating circuit at restarting.

Figure 67:
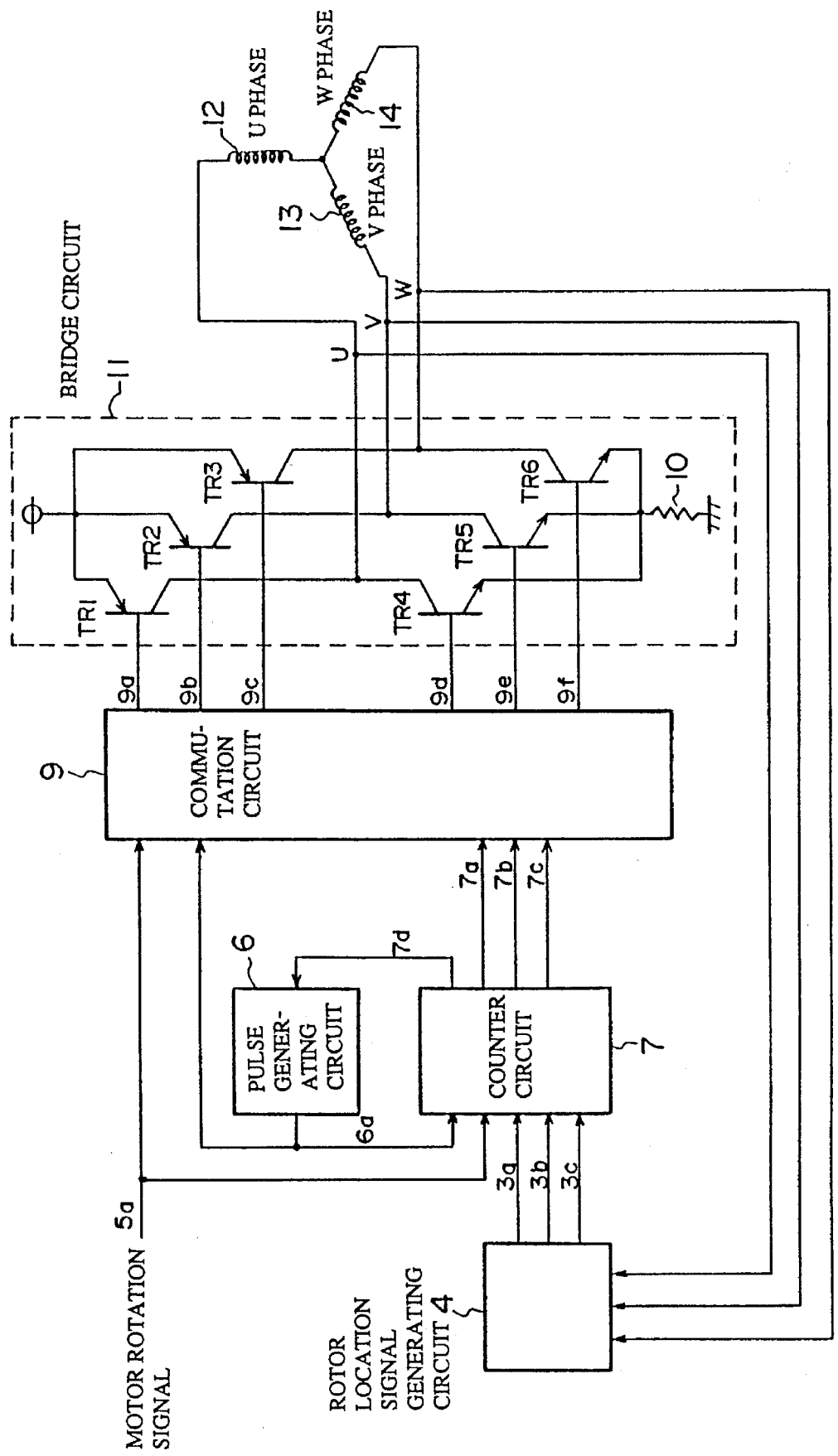
FIG. 67 is a block diagram of a twenty first embodiment of the present invention which shows a general construction a brushless motor driving device.

FIG. 67 is a block diagram of a twenty first embodiment of the present invention which shows a general construction a three phase brushless motor driving device.

In this embodiment, the location signals $3a$, $3b$ and $3c$, the count numbers $7a$, $7b$ and $7c$ and the pseudo pulse $6a$ outputted from the pulse generating circuit 6 are inputted into the commutation circuit 9. The commutation circuit 9 is reset by the pseudo pulse $6a$ and change to a starting mode.

In the above-mentioned construction, When the rotor has stopped by any reasons during a normal rotation is explained, the pseudo pulse $6a$ is outputted from the pulse generating circuit 6 and the pseudo pulse $6a$ is inputted into the commutation circuit 9. The commutation circuit 9 is reset by the pseudo pulse $6a$ and changes to a starting mode. Accordingly, until the rotation reaches normal speed, the driving signals $9a$, $9b$, $9c$, $9d$, $9e$ and $9f$ is outputted by combining the count numbers $7a$, $7b$ and $7c$.

Embodiment 22

In this embodiment, an independent location detecting element is used in addition to the winding voltage detecting circuit. The detected signal from the location detecting element and the location detection signal detected from the winding voltage are combined to obtain a driving signals having a correct direction.

Figure 68:
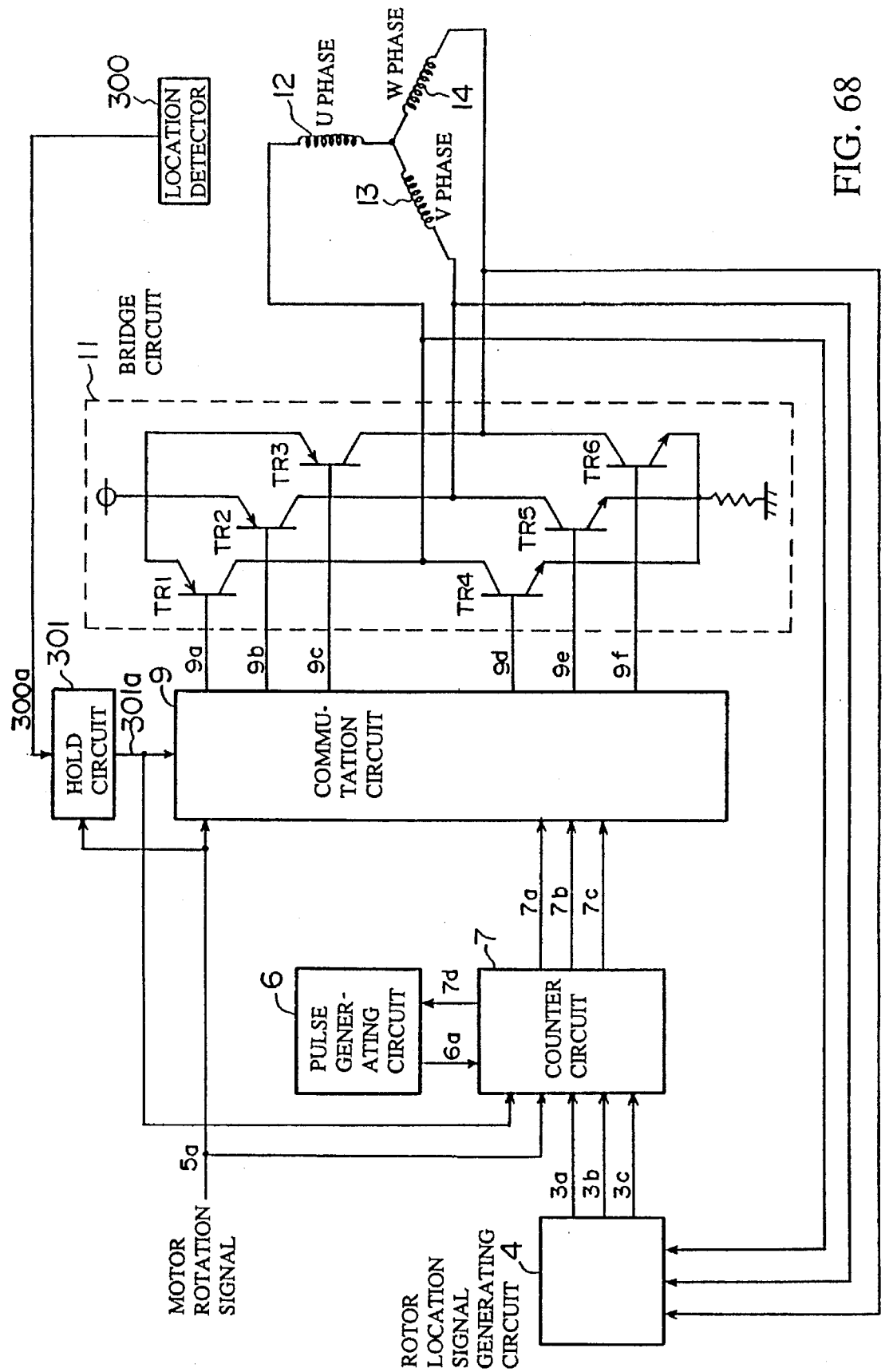
FIG. 68 is a block diagram of a twenty second embodiment of the present invention which shows a general construction a brushless motor driving device.
Figures 69, 70:
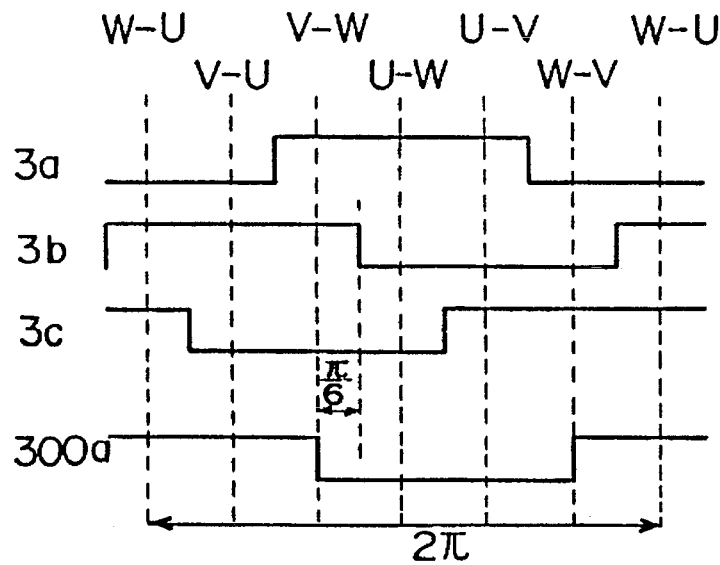
FIG. 69 is a timing chart which explains an operation of embodiment 22.
FIG. 70 shows a table which explains an operation of embodiment 22.

FIG. 68 is a block diagram of a twenty second embodiment of the present invention which shows a general construction a three phase brushless motor driving device. The numeral 300 denote a location detector for detecting a location of the rotor and outputs a location pulse signal $300a$, the numeral 301 denotes a hold circuit for holding an output after a rising edge of the input signal is detected. In FIG. 68, the location signal $300a$ is inputted into hold circuit 301. In this embodiment, the location signal $300a$ is shifted by electrical angle $\pi/6$ from the location signal $3b$ as shown in FIG. 69. The respective current supply stability point of the brushless motor is located on the broken line and coincides with the location of rising edge and falling edge of the location signal $300a$.

The hold circuit 301 in FIG. 68 holds the value of the location signal $300a$ just after the motor rotation signal $5a$ becomes H until the motor rotation signal $5a$ becomes L. For example, if the location signal $300a$ is H just after the motor rotation signal $5a$ becomes H, the hold circuit $301a$ is held H until the motor rotation signal $5a$ becomes L. The output $301a$ of the hold circuit 301 is inputted into the commutation circuit 9 and the pulse selection circuit 256 in the counter circuit 7 of FIG. 71. The commutation circuit 9 outputs the driving signals $9a$, $9b$ and $9c$, $9d$, $9e$ and $9f$ by referring the output $301a$ of the hold circuit and the count numbers $7a$, $7b$ and $7c$. FIG. 70 shows a relationship between the output $301a$ of the hold circuit, the count numbers $7a$, $7b$ and $7c$ and the driving signals $9a$, $9b$, $9c$, $9d$, $9e$ and $9f$ of the embodiment 22.

Figure 71:
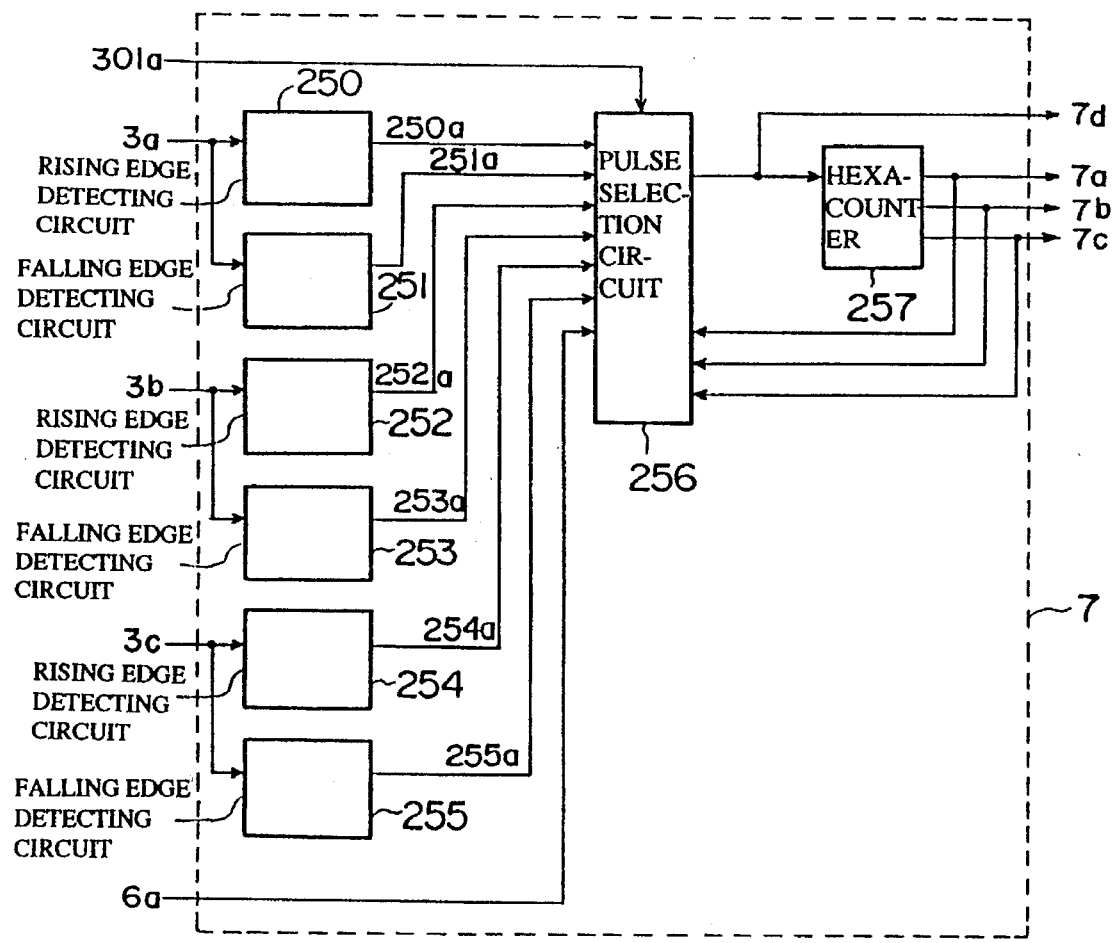
FIG. 71 shows a concrete construction of a counter circuit of embodiment 22.

FIG. 71 shows a concrete construction of a counter circuit 7 of embodiment 22. The rising edge detecting circuits 250, 252, 254, the falling edge detecting circuits 251, 253 and 255 and the hexa counter 257 are similar to the above mentioned embodiment. The rising the edge pulses $250a$, $252a$, $254a$ and the falling the edge pulses $251a$, $253a$ and $255a$ of the location signals $3a$, $3b$ and $3c$ and the pseudo pulse $6a$ and the output $301a$ of the hold circuit are inputted into the pulse selection circuit 256. The pulse selection circuit 256 refers the current count numbers $7a$, $7b$ and $7c$ and the output $301a$ of the hold circuit, and outputs an edge pulse or a pseudo pulse $6a$ of theoretical location signal which should be detected next at normal rotation. FIG. 72 shows a relationship between the count numbers $7a$, $7b$ and $7c$, the output $301a$ of the hold circuit and the edge pulses $250a$, $252a$, $254a$, $251a$, $253a$ and $255a$ of theoretical location signals which should be detected next at normal rotation. From FIG. 72, for example, the count numbers $7a$, $7b$ and $7c$ is at L-L-L, and the output $301a$ of the hold circuit is at H, the edge pulse $253a$ or the pseudo pulse $6a$ outputs and they are not outputted even if other pulse, for example, the edge pulse $250a$ is inputted.

An operation of the brushless motor of the embodiment is explained below.

Figure 73:
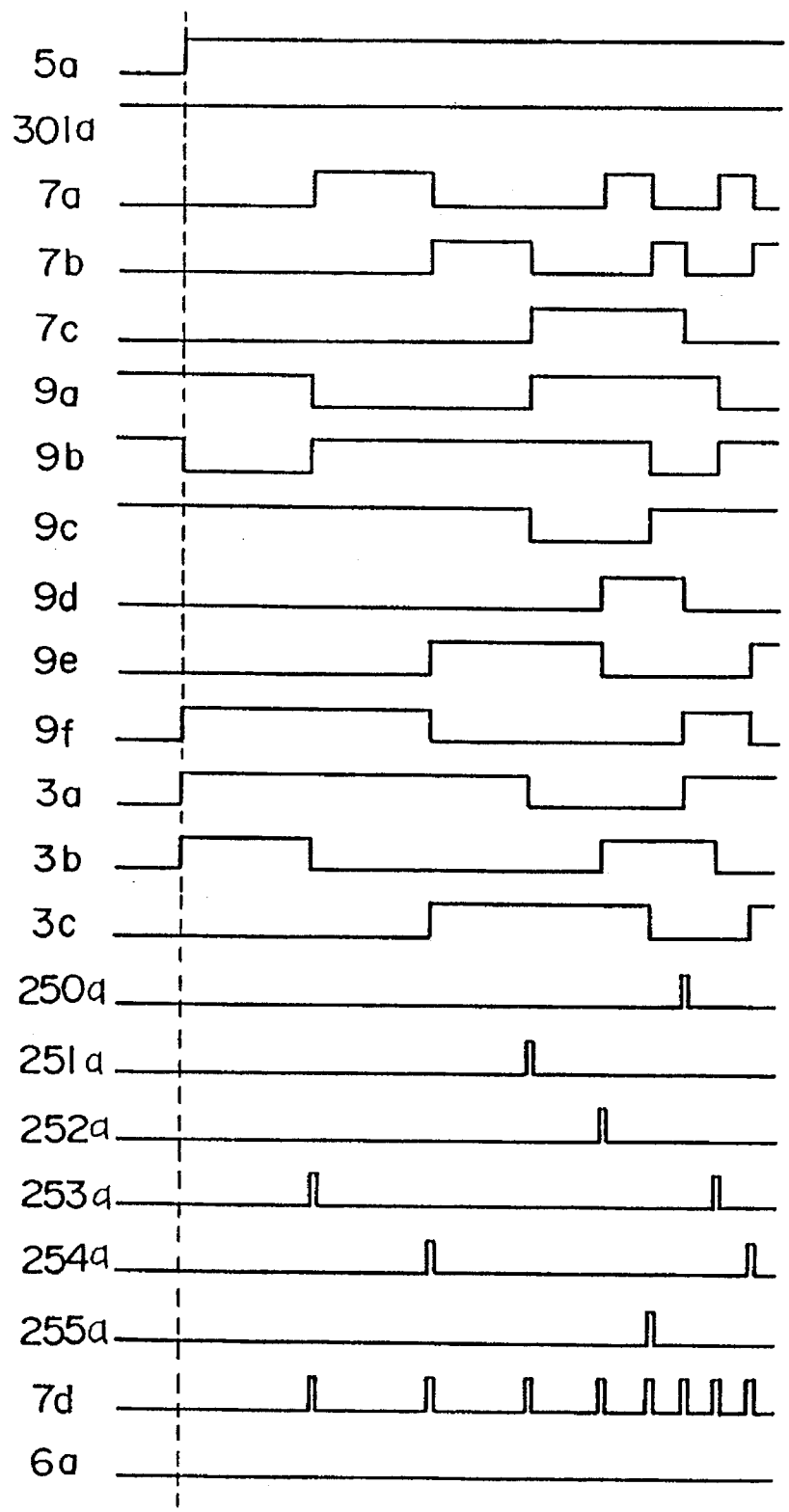
FIG. 73 is a timing chart which explains an operation of embodiment 22.

First, an operation, just after the motor rotation signal $5a$ becomes H and the output 301 a of the hold circuit is H, is explained using FIG. 73. Since the output 301 a of the hold circuit is H, the commutation circuit 9 sets the driving signals $9a$, $9b$, $9c$, $9d$, $9e$ and $9f$ to H-L-H-L-L-H as shown in FIG. 70. Then the rotor of the brushless motor rotates toward normal rotational direction and the sequential current is supplied to the rotor to start the motor.

Figure 74:
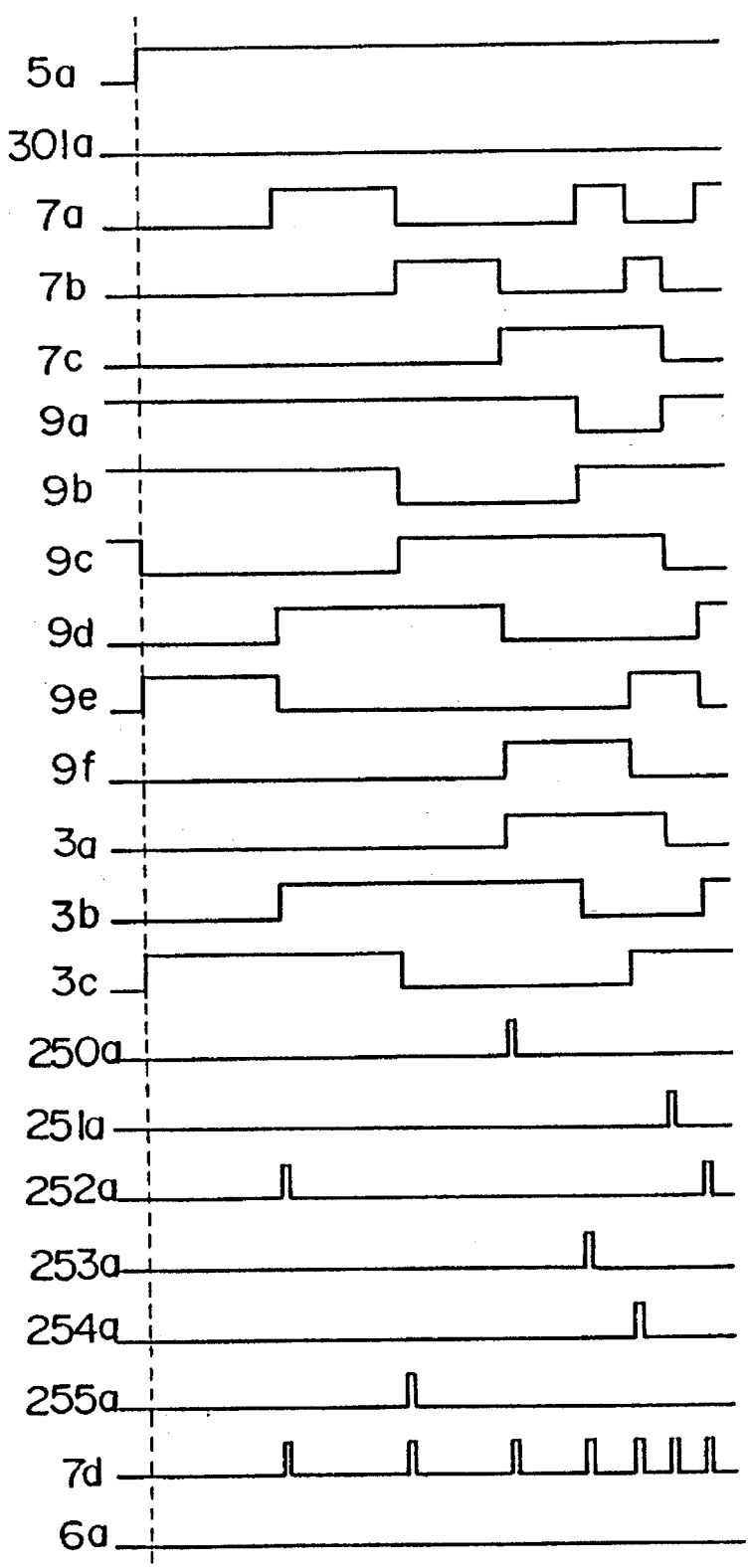
FIG. 74 is a timing chart which explains an operation of embodiment 22.

Next, an operation, just after the motor rotation signal $5a$ becomes H and the output $301a$ of the hold circuit is L, is explained using FIG. 74. Since the output $301a$ of the hold circuit is L, the commutation circuit 9 sets the driving signals $9a$, $9b$, $9c$, $9d$, $9e$ and $9f$ to H-L-H-L-L-H as shown in FIG. 70. Then the rotor of the brushless motor rotates toward normal rotational direction and the sequential current is supplied to the rotor to start the motor.

Embodiment 23

In this embodiment, the driving is more assured at starting or at restarting.

Figure 75:
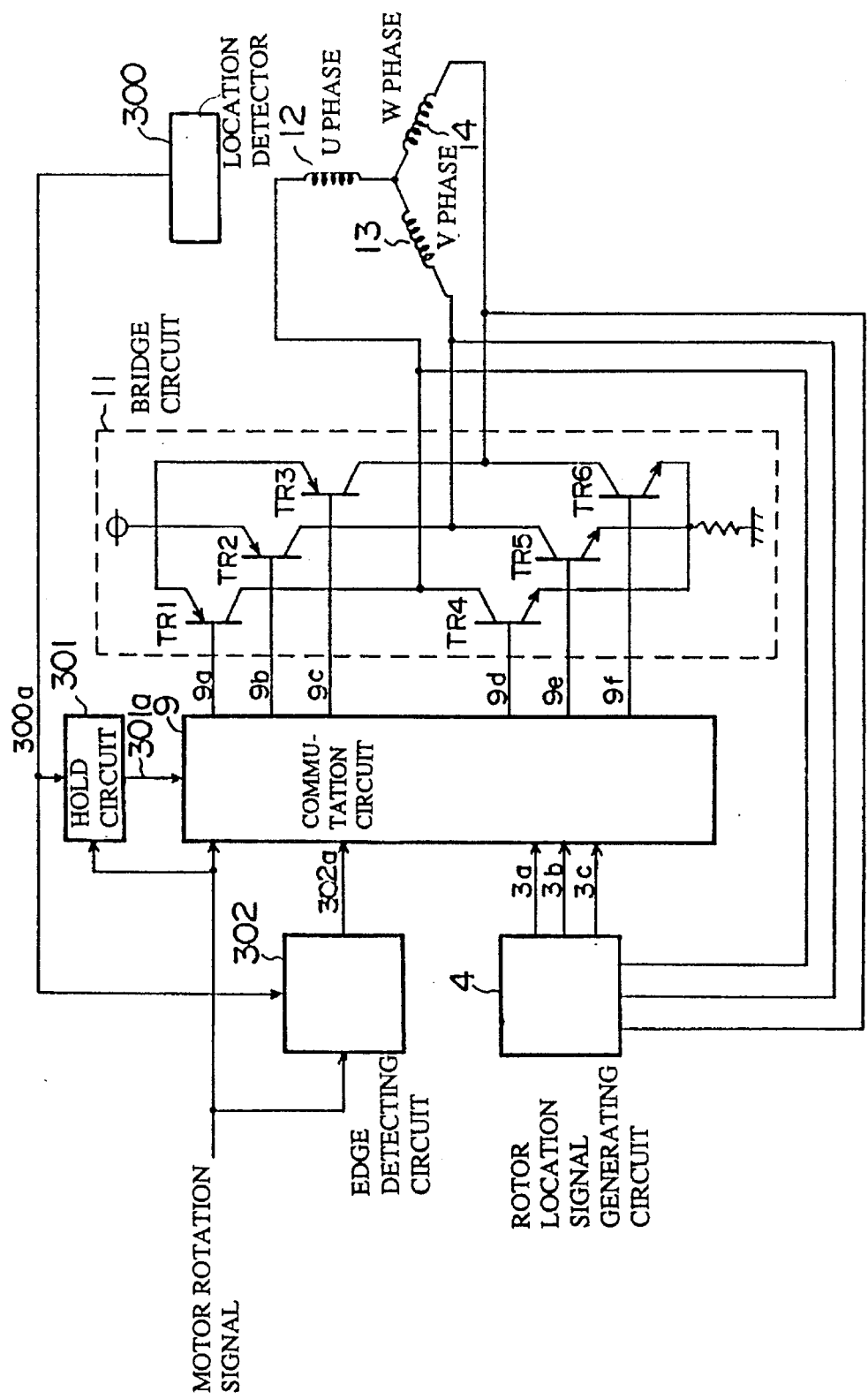
FIG. 75 is a block diagram of a twenty third embodiment of the present invention which shows a general construction a brushless motor driving device.

FIG. 75 is a block diagram of a twenty third embodiment of the present invention which shows a general construction a three phase brushless motor driving device. The numeral 302 denotes an edge detecting circuit for detecting a rising edge or falling edge of input signal.

The commutation circuit 9 supplies current just after the motor rotation signal $5a$ becomes H according to the output $301a$ of the hold circuit. The current is supplied to V-W phase when the output $301a$ of the hold circuit is H, and to W-V phase when the output $301a$ of the hold circuit is L. The first commutation is carried out according to the output pulse 302a of the edge detecting circuit 302 and the output 301a of the hold circuit. The current is supplied to U–W phase when the output 301a of the hold circuit is H, and to W–U phase when the output 301a of the hold circuit is L. After then, the commutation is carried out by outputting the driving signals 9a, 9b, 9c, 9d, 9e and 9f by referring the location signals 3a, 3b and 3c. The logical relation between the location signals 3a, 3b and 3c and the driving signals 9a,9b, 9c, 9d, 9e and 9f is similar to FIG. 22.

An operation of the brushless motor of the present embodiment is explained below.

Figure 76:
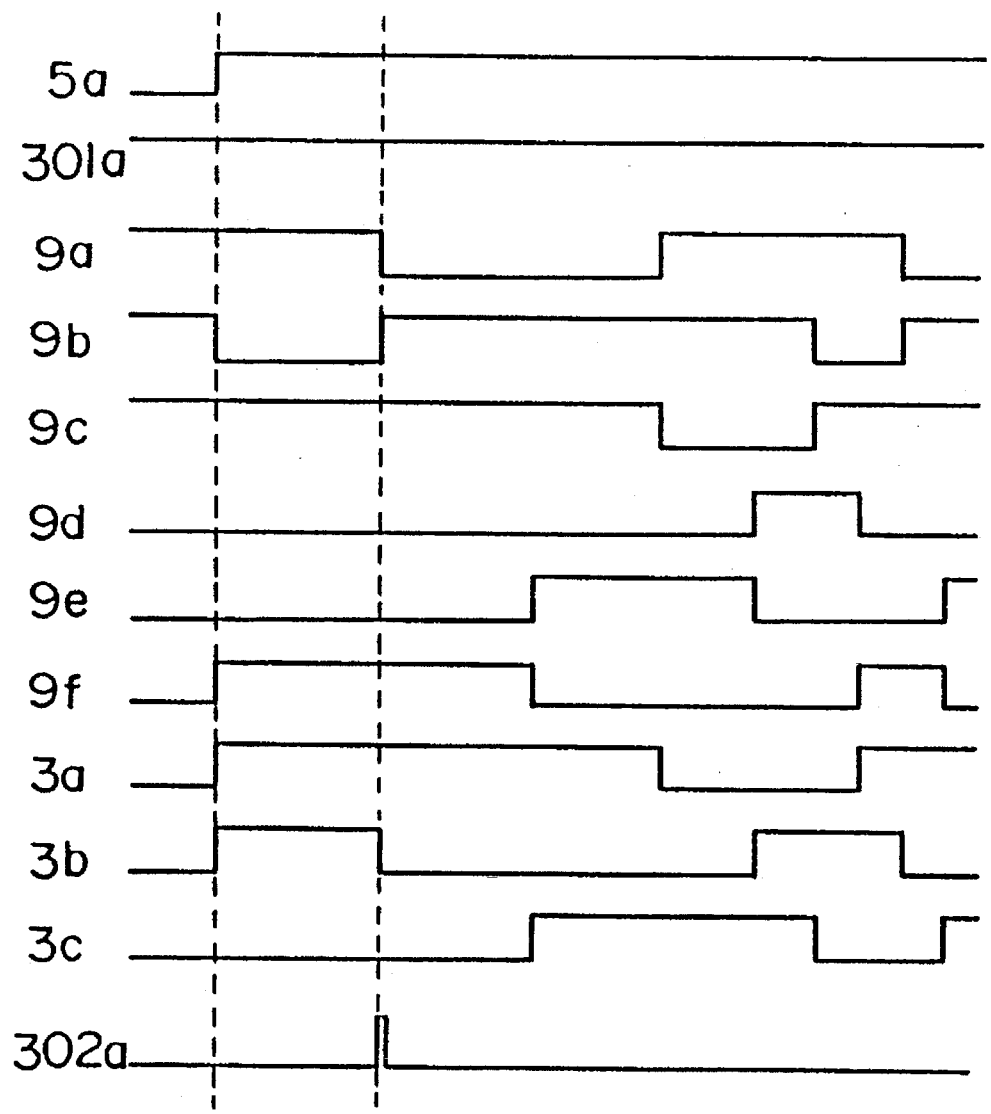
FIG. 76 is a timing chart which explains an operation of embodiment 23.

First, an operation, just after the motor rotation signal 5a becomes H and the output 301a of the hold circuit is H, is explained using FIG. 76. Since the output 301a of the hold circuit is H, the commutation circuit 9 sets the driving signals 9a, 9b, 9c, 9d, 9e and 9f to H-L-H-L-L-H as shown in FIG. 21 to supply current to V-W phase. When the rotor rotates toward normal rotational direction and a pulse 302a of edge detecting circuit 302 has been detected, a first commutation is carried out.

Since the output 301a of the hold circuit is H, the commutation circuit 9 sets the driving signals 9a, 9b, 9c, 9d, 9e and 9f to L-H-H-L-L-H as shown in FIG. 21 to supply current to U-W phase. Then the rotor of the brushless motor rotates toward normal rotational direction by sequentially switching current referring the location signals 3a, 3b and 3c.

Figure 77:
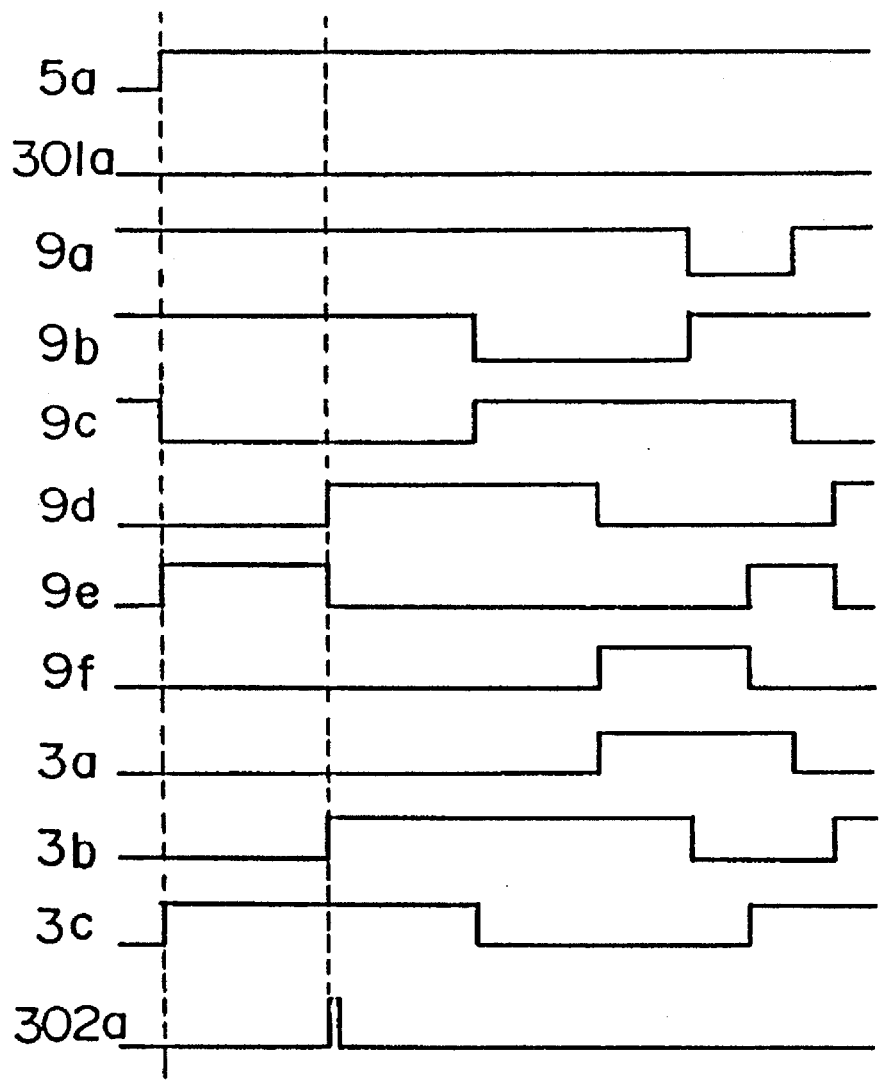
FIG. 77 is a timing chart which explains an operation of embodiment 23.

Next, an operation, just after the motor rotation signal 5a becomes H and the output 301a of the hold circuit is L, is explained using FIG. 77. Since the output 301a of the hold circuit is L, the commutation circuit 9 sets the driving signals 9a, 9b, 9c, 9d, 9e and 9f to H-H-L-L-H-L as shown in FIG. 21 to supply current to W-V phase. When the rotor rotates toward normal rotational direction and a pulse 302a of edge detecting circuit 302 has been detected, a first commutation is carried out.

Since the output 301a of the hold circuit is L, the commutation circuit 9 sets the driving signals 9a, 9b, 9c, 9d, 9e and 9f to H-H-L-H-L-L as shown in FIG. 21 to supply current to W-U phase. Then the rotor of the brushless motor rotates toward normal rotational direction by sequentially switching current referring the location signals 3a, 3b and 3c.

Embodiment 24

Figure 78:
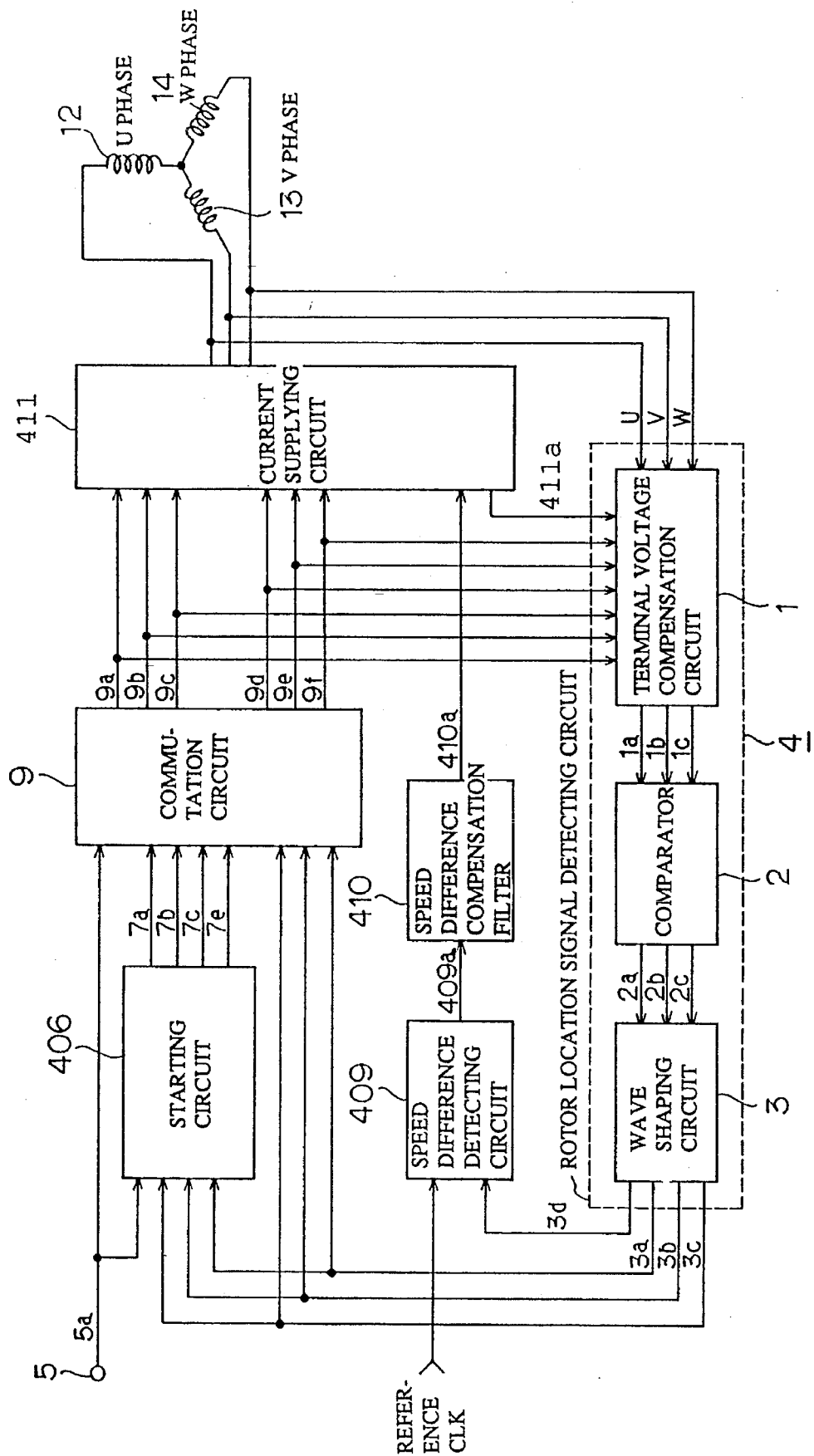
FIG. 78 is a block diagram of a twenty fourth embodiment of the present invention which shows a general construction a brushless motor driving device.

FIG. 78 is a block diagram of a twenty fourth embodiment of the present invention which shows a general construction a brushless motor driving device. In FIG. 78, the same elements are indicated by the same numerals as shown in FIG. 1. In FIG. 78, the numeral 406 denotes a starting circuit, the numeral 409 denotes a speed difference detecting circuit for counting a period of the speed signal 3d by the counter and for outputting a period difference between the indicated value and the measured value as a speed difference detection signal 409a. The numeral 410 denotes a speed difference compensation filter for supplying a current indication value 410a to a current supplying circuit 411 so that the speed difference detection signal 409a become zero. A current supplying circuit 411 comprises a resistor 10, a bridge circuit 11, a buffer amplifier 212, a resistor 213 and a driving transistor 214, and supplies a predetermined driving current to the armature windings 12, 13 and 14 according to the driving signals 9a–9f.

Figure 79:
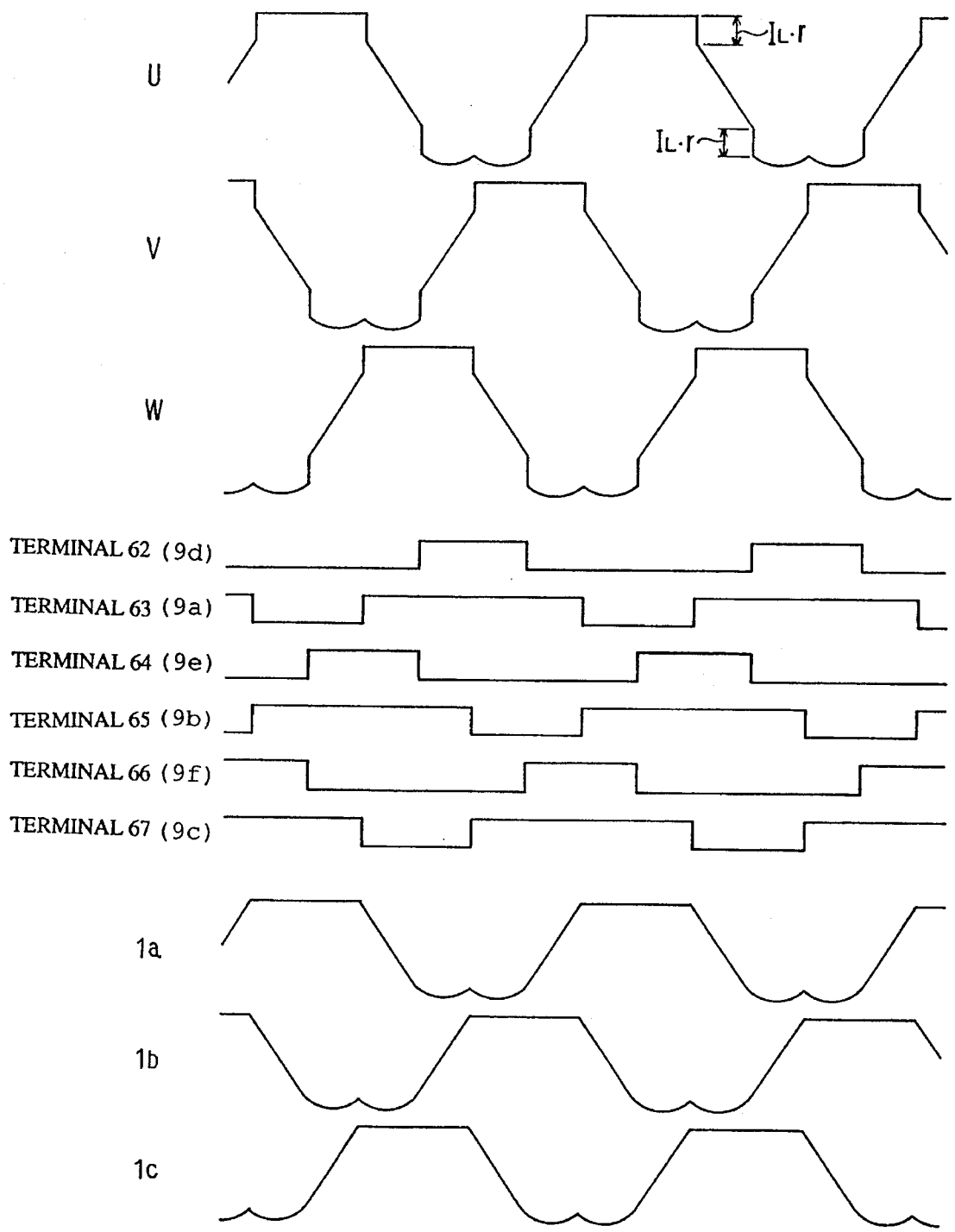
FIG. 79 shows a signal wave of respective portion of the terminal voltage compensation circuit at a normal rotation state of a brushless motor driving device of the present invention.

The construction and the operation of the terminal voltage compensation circuit 1, the comparator 2 and the waveform shaping circuit 3 which constitute the rotor location signal generating circuit 4 which are the important means of the invention, are already disclosed in the embodiment 1. FIG. 79 shows a signal wave of respective portion of the terminal voltage compensation circuit 1 at a normal rotation state of a brushless motor driving device of the present invention. The concrete compensation operation of this terminal voltage compensation circuit 1 is already explained in the embodiment 1 using the equation (1)~(3).

Spike shaped voltage fluctuation generated when the mode is switched from current supply state to no-current supply state, causes a false detection of the rotor location and a noise generation, therefore it is necessary to use a shaping circuit 3 for avoiding these causes. An example of the waveform shaping circuit is shown in FIG. 17 of the embodiment 7.

Figure 80:
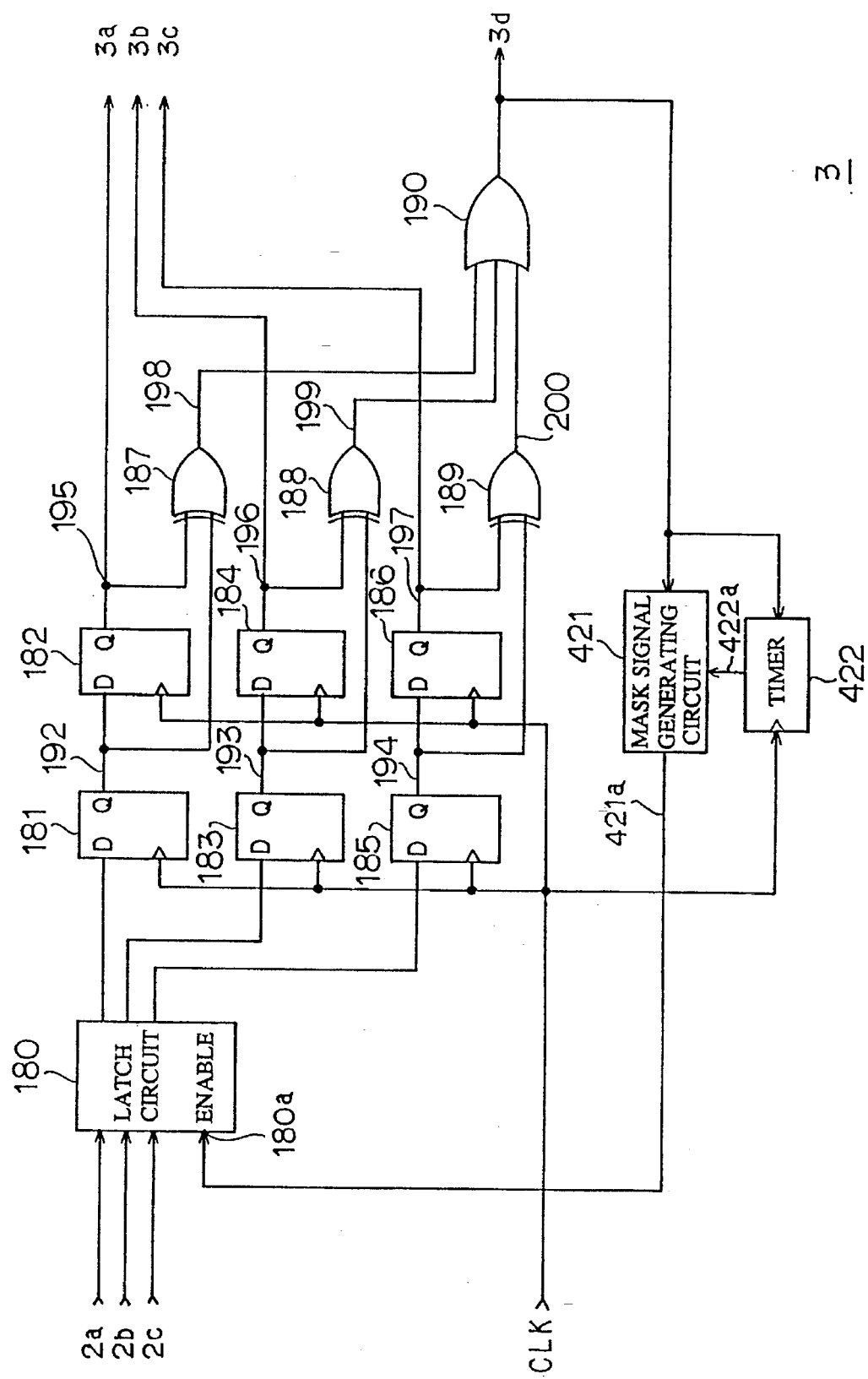
FIG. 80 shows a construction example of a waveform shaping circuit of embodiment 24.

FIG. 80 shows another construction example of a waveform shaping circuit 3. In FIG. 80, the numeral 180 denote a latch circuit, the numerals 181~186 denote D flip-flops, the numerals 187~189 denote EOR circuits, and the numeral 190 denotes an OR circuit, the numeral 421 denotes a mask signal generating circuit and the numeral 422 denotes a timer.

Figure 81:
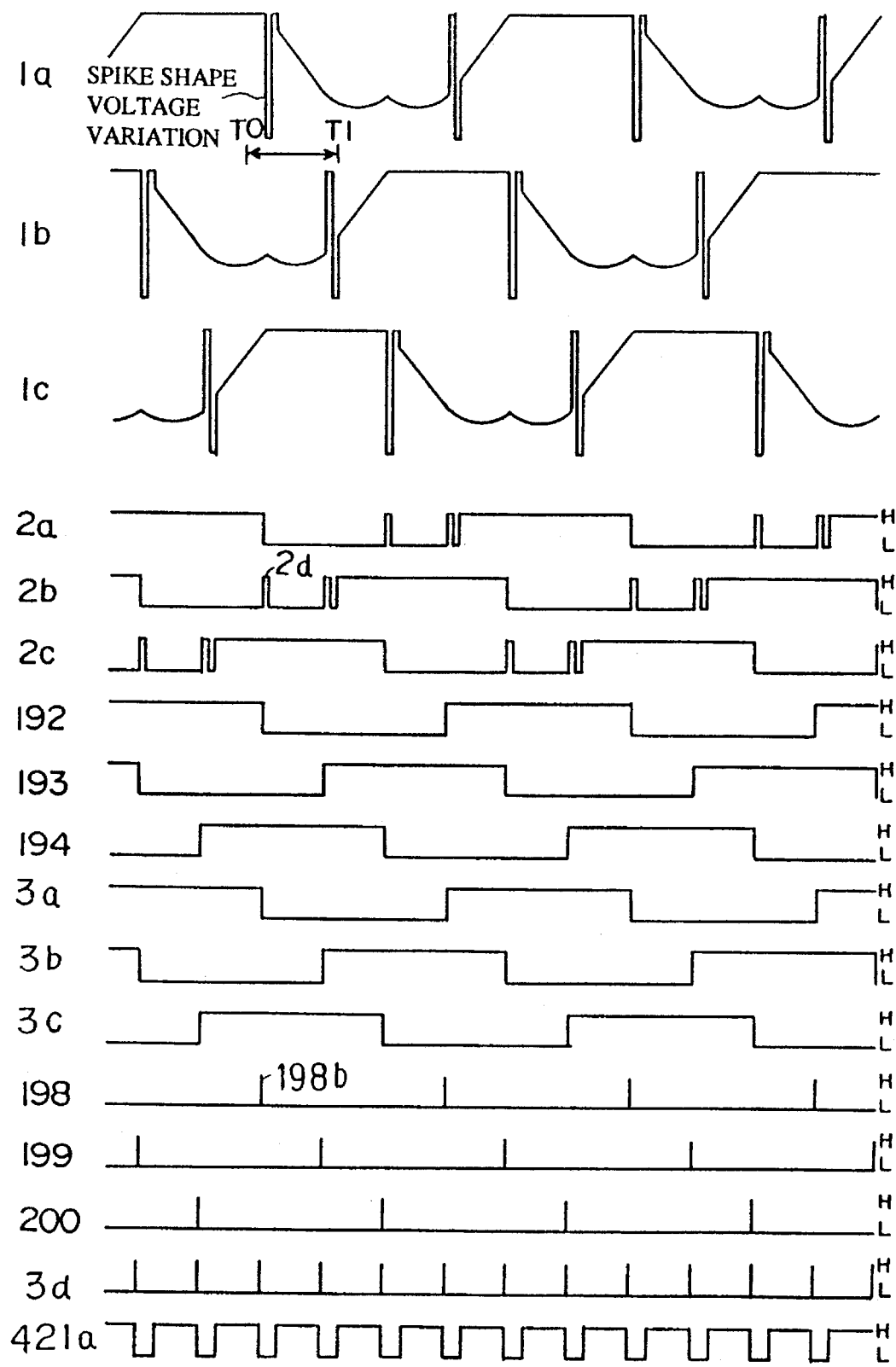
FIG. 81 shows the terminal voltage waveform and signal waveform of respective portion of the waveform shaping circuit.

FIG. 81 shows the terminal voltage waveform and signal waveform of respective portion of the waveform shaping circuit at a normal rotation state.

Figure 82:
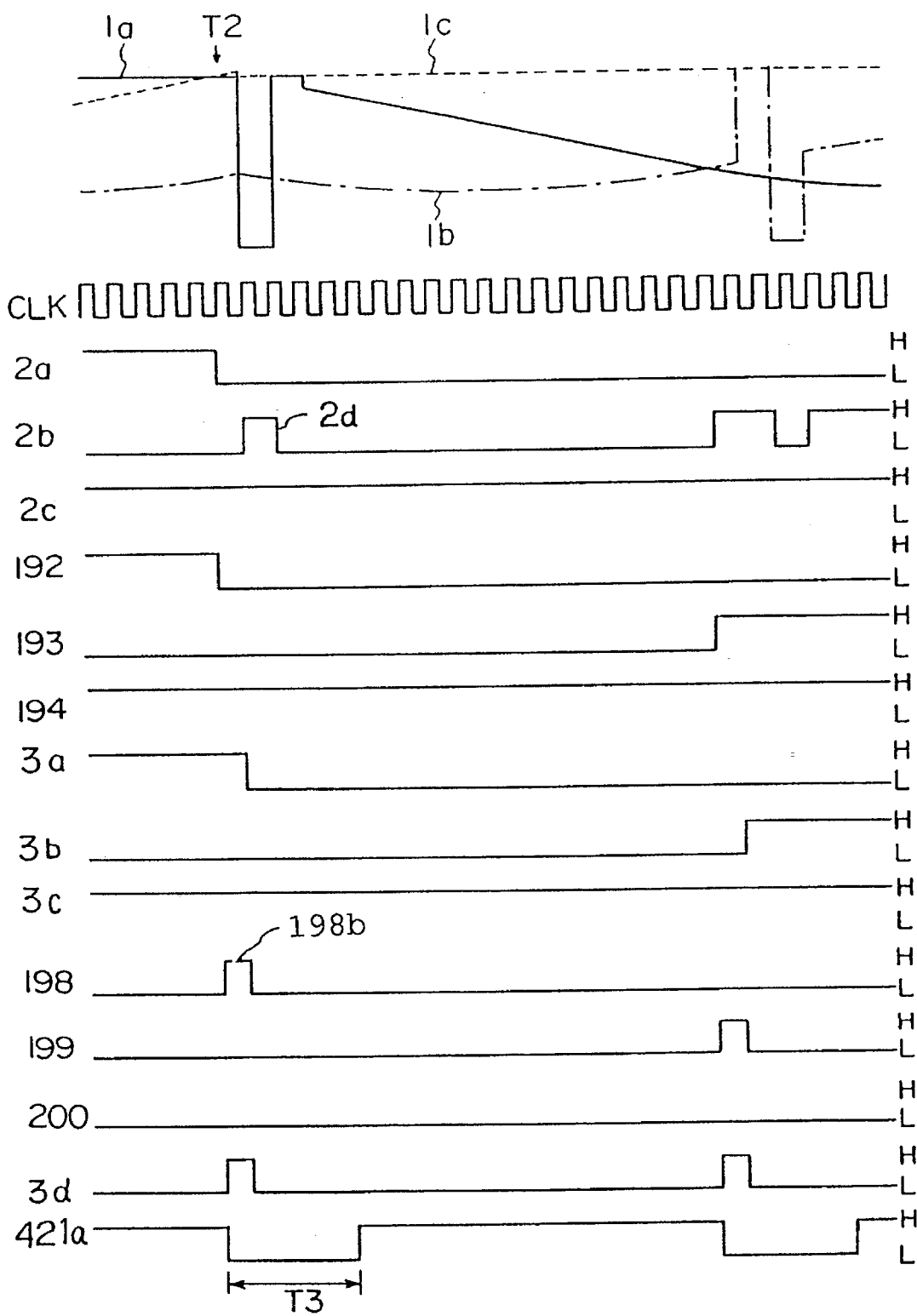
FIG. 82 is an enlarged signal waveforms of FIG. 81.

FIG. 82 is an enlarged signal waveforms of timings $t_0$~$t_1$ of FIG. 81.

(0179)

An concrete operation of the waveform shaping circuit of this embodiment is explained below.

Input signals into the waveform shaping circuit are logic signals 2a, 2b and 2c outputted from the comparator 2. Since the logic signals 2a, 2b and 2c are obtained by comparing respective terminal voltages, they causes chattering as shown in FIG. 81. The logic signals 2a, 2b and 2c are inputted into latch circuit 180 at first. The latch circuit 180 carries out a latch operation according to a state of enable terminal 180a. In an initial state, the mask signal 421a outputted from the mask signal generating circuit 421 is at H level. Therefore, the logic signals 2a, 2b and 2c are inputted into the D flip-flops 181,183 and 185 as they are. The D flip-flops 181~186 and EOR circuits 187~189 constitutes a both edge differentiation circuit. EOR circuits 187~189 outputs differential pulses 198, 199 and 200 at the timing of rising and falling edge of the logic signals 2a, 2b and 2c.

(0180)

At timing T2, when the compensated terminal voltages of 1a coincides with the compensated terminal voltages 1c and the polarity of 2a changes, the edge is detected at the both edged differentiation circuit and then a differential pulse 198b is generated. The output signal of EOR circuits 187~189 are summed in OR circuit 190 and its output logic pulse signal 3d is inputted into the mask signal generating circuit 421 and the timer 422. The mask signal generating circuit 421 changes the mask signal 421a to L level by a trigger pulse of the rising edge of logic pulse signal 3d. Timer 422 is initialized at the rising edge of the logic pulse signal 3d and the timer value 422a becomes zero. Then, the timer 422 carries out a count-up operation in synchronism with the clock input. When the enable terminal 180a became L level, the latch circuit 180 latches the logic signals 2a, 2b and 2c.

Then, the mask signal generating circuit 421 monitors a timer value of the timer 422, and changes the mask signal 421a to H level when the timer value 422a reaches a predetermined value. The latch circuit 180 releases the latch when the enable signal 180a becomes H level.

The output signal of D flip-flops 182, 184 and 186 are supplied as waveform shaped rotor location signals 3a, 3b and 3c which are inputted into the next stage commutation circuit 9, and then the commutation operation is carried out according to the rotor location signals 3a, 3b and 3c. When commutation operation is carried out, the driving transistor is switched, then spike shaped voltage fluctuation is caused. As a result, a spike shaped noise 2d is generated at an undesired location in the logic signal 2b. But, at a point where the spike shaped noise 2d is generated, a data inputted into the latch circuit is disabled by the mask signal 421a outputted from the mask signal generating circuit 421. Accordingly, the spike shaped noise 2d is masked in the latch circuit 180, therefore the spike shaped noise is not generated in the waveform shaped rotor location signals 3a, 3b and 3c. Therefore, in the present embodiment, stable rotor location signals 3a, 3b and 3c are provided. These stable rotor location signals 3a, 3b and 3c are applied to the armature windings to rotate the rotor stably.

Further, although an example of three phase brushless motor was explained in this embodiment, but it is apparent that this invention can be applied generally to a brushless motor having a plurality of phases.

Embodiment 25

In this embodiment, a period T3 where the mask signal 421a is maintained at L level changes in proportion to an indicated rotation speed when the indicated rotation speed for the motor is changed. General construction of the brushless motor driving circuit of this embodiment is similar to the embodiment 24. But, a construction for changing the indicated rotation speed (CLK) for the timer is different from the embodiment 24.

An operation of the mask signal generating circuit 421 and the timer 422 of this embodiment is explained below using FIG. 83, FIG. 84 and FIG. 85.

As explained in the embodiment 24, a rising edge or a falling edge of the logic signal 2a, 2b and 2c are detected and then a logic pulse signal 3d is generated, therefore the mask signal generating circuit 421 changes the mask signal 421a~L level by a trigger pulse of the rising edge of logic pulse signal 3d. Timer 422 is initialized at the rising edge of the logic pulse signal 3d and the timer value 422a becomes zero. Then, the timer 422 carries out a count-up operation in synchronism with the clock input. Then, the mask signal generating circuit 421 monitors a timer value 422a of the timer 422, and changes the mask signal 421a~H level when the timer value 422a reaches a predetermined value N (N=10 in FIG. 83). Assume that the clock period is T4, the mask signal 421a maintains L level during T4×10.

Figure 83:
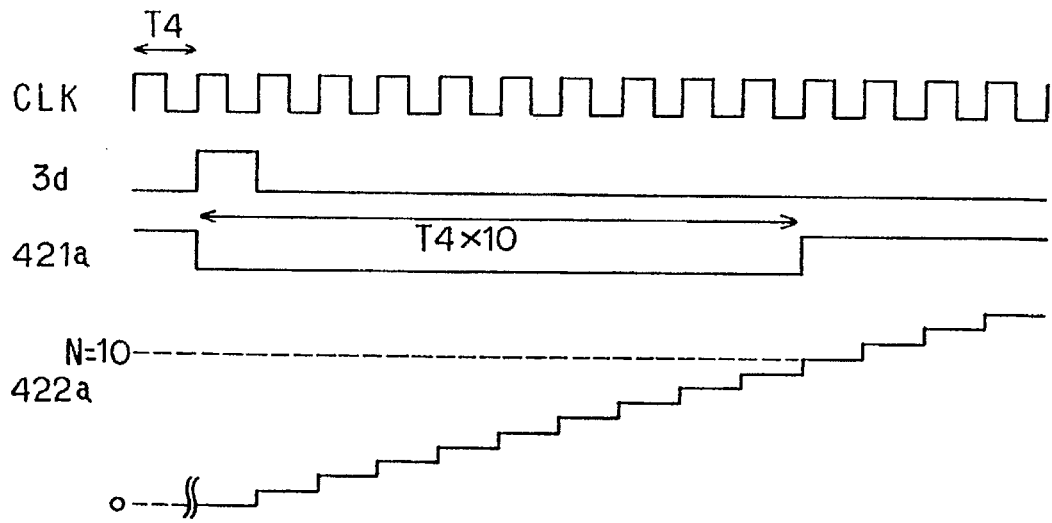
FIG. 83 is a signal waveform which explains an operation of a mask signal generating circuit and a timer of embodiment 25.

Next, an operation is explained when the indicated rotation speed becomes twice from the state of FIG. 83.

Figure 84:
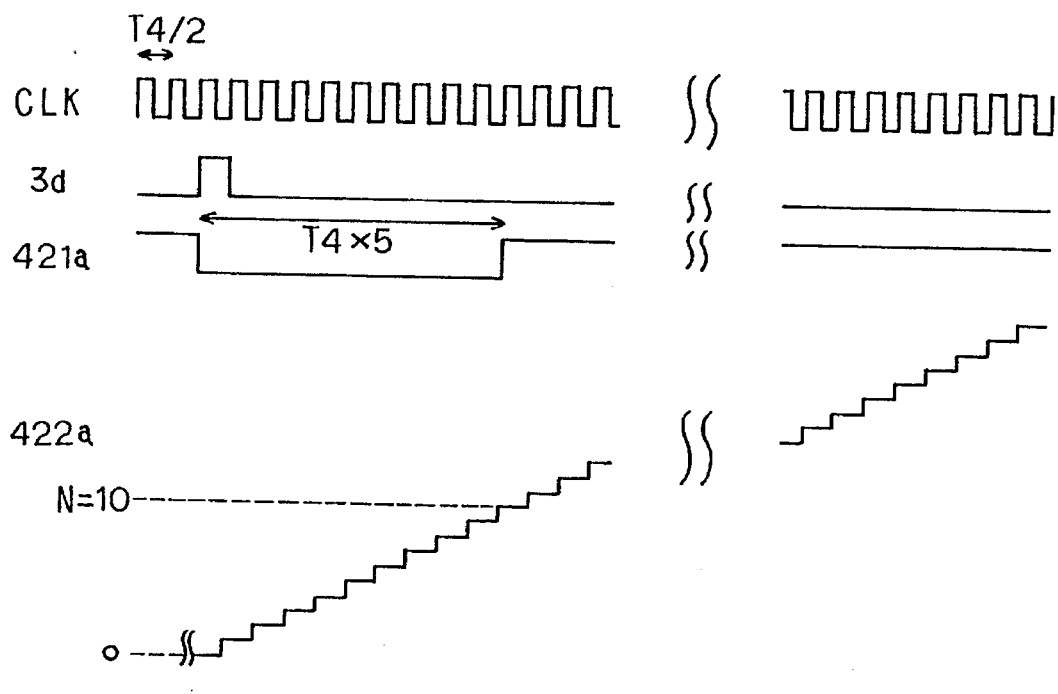
FIG. 84 is a signal waveform which explains an operation of a mask signal generating circuit and a timer of embodiment 25.
Figure 85:
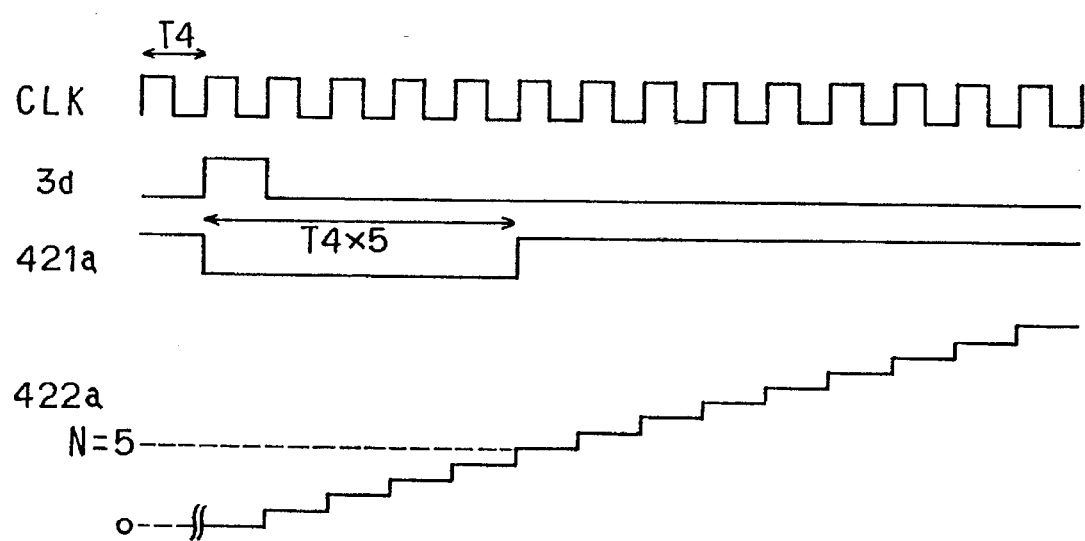
FIG. 85 is a signal waveform which explains an operation of a mask signal generating circuit and a timer of embodiment 25.

As illustrated in FIG. 84, a period of CLK (inputted from the outside of the driving circuit of the brushless motor) is set to T4/2. Thereby, the period where the mask signal 421a is maintained to L level becomes T4×5. Or as shown in FIG. 85, the clock period inputted into the timer remains T4 and only a value of N is changed to 5. Thereby, the period where the mask signal 421a is maintained to L level becomes T4×5, which is the same as when the clock period is changed. As described above, in the embodiment, the period where the mask signal maintains L level is changed according to the indicated rotation speed.

Embodiment 26

An operation of the brushless motor which restarts stably in a short time without influenced by the load at a starting even when the brushless motor stops by some reasons and needs to restart. This subject is explained in the embodiment 8, but here an operation at starting or restarting is mainly explained in this embodiment. General construction of the driving circuit of the brushless motor of this embodiment is similar to FIG. 78.

Here, a construction and an operation of a starting circuit which is the important means for realizing the invention is explained below. New elements of the embodiment are a pseudo pulse generating circuit 431 and a restart pulse generating circuit 432. Other elements in the present embodiment are the same as that of shown in FIG. 23 of embodiment 8.

The motor rotation signal 5a in FIG. 78 is a signal inputted from outside of the brushless motor driving circuit, which indicates "rotation" when enable state and "stop" when disable state. In this embodiment, "enable" indicates H level and "disable" indicates L level.

Figure 86:
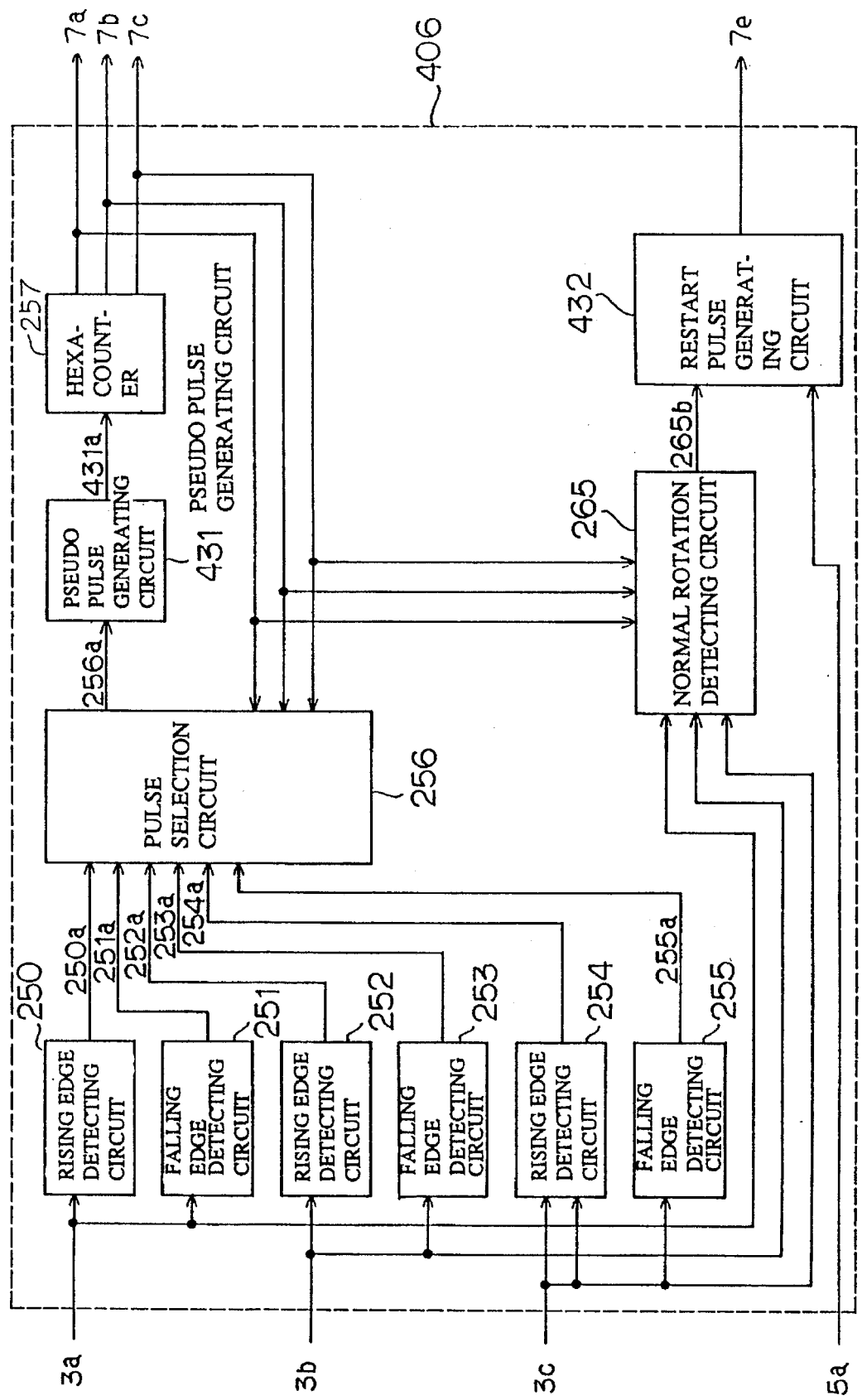
FIG. 86 shows a construction of a starting circuit of embodiment 26.

FIG. 86 shows a concrete construction example of a starting circuit 406. The rotor location signals 3a, 3b and 3c are inputted into respective rising edge detecting circuits 250, 252 and 254, the falling edge detecting circuits 251, 253 and 255 and the normal rotation detecting circuit 265. The rising edge detecting circuits 250, 252 and 254 and the falling edge detecting circuits 251, 253 and 255 output rising edge pulses and falling the edge pulses 250a~255a, respectively.

These detected edge pulses are inputted into the pulse selection circuit 256. The select pulse 256a outputted from the pulse selection circuit 256 is inputted into the pseudo-pulse generating circuit 431.

The pulse train 431a outputted from the pseudo-pulse generating circuit 431 is inputted into the hexa counter 257. The logical relation example of an input pulse number and an output pulse number of the hexa counter 257 is similar to FIG. 24.

In the FIG. 24, when the input pulse number is more than six, the count numbers 7a, 7b and 7c are counted again from L-L-L states. The count numbers outputted from the hexa counter 257 is inputted into the pulse selection circuit 256, the normal rotation detecting circuit 265 and the commutation circuit 9 shown in FIG. 78. An abnormal rotation signal 265b outputted from the normal rotation detecting circuit 265 is inputted into the restart pulse generating circuit 432. The motor rotation signal 5a is also inputted into the restart pulse generating circuit 432. The restart pulse 7e outputted from the restart pulse generating circuit 432 is inputted into the commutation circuit 9 shown in FIG. 78.

The pulse selection circuit 256 outputs edge pulses 250a~255a as a pulse train without changing when the rotor rotates toward normal rotational direction defined by the logic of FIG. 7. That is, if the relationship between kinds of inputted edge pulses and the count numbers 7a, 7b and 7c satisfies the relationship of FIG. 25, the edge pulses are outputted without being changed, and the inputted edge pulse is masked when not being satisfied. Accordingly, at a reverse rotation state, inputted edge pulses are masked since the relation between the count numbers 7a, 7b and 7c and the edge pulses is different from that of the normal rotation state.

Figure 87:
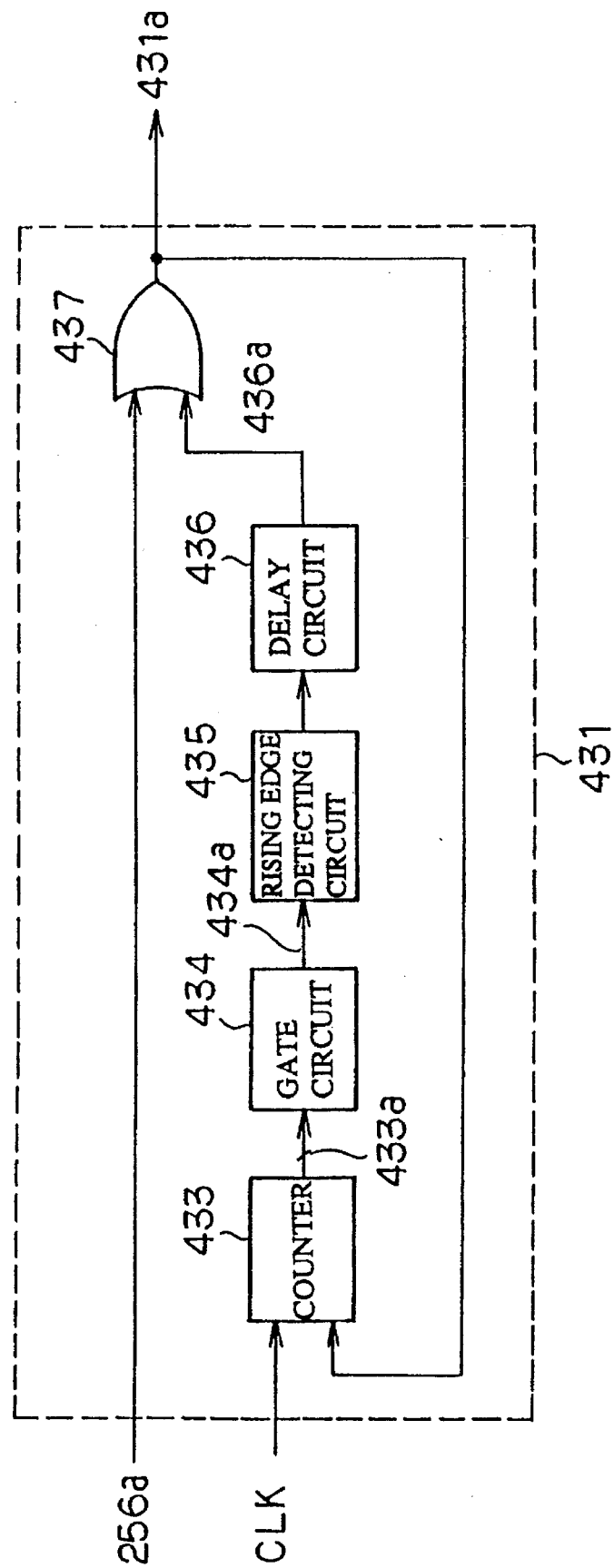
FIG. 87 shows a construction of a pseudo-pulse generating circuit of embodiment 26.
Figure 88:
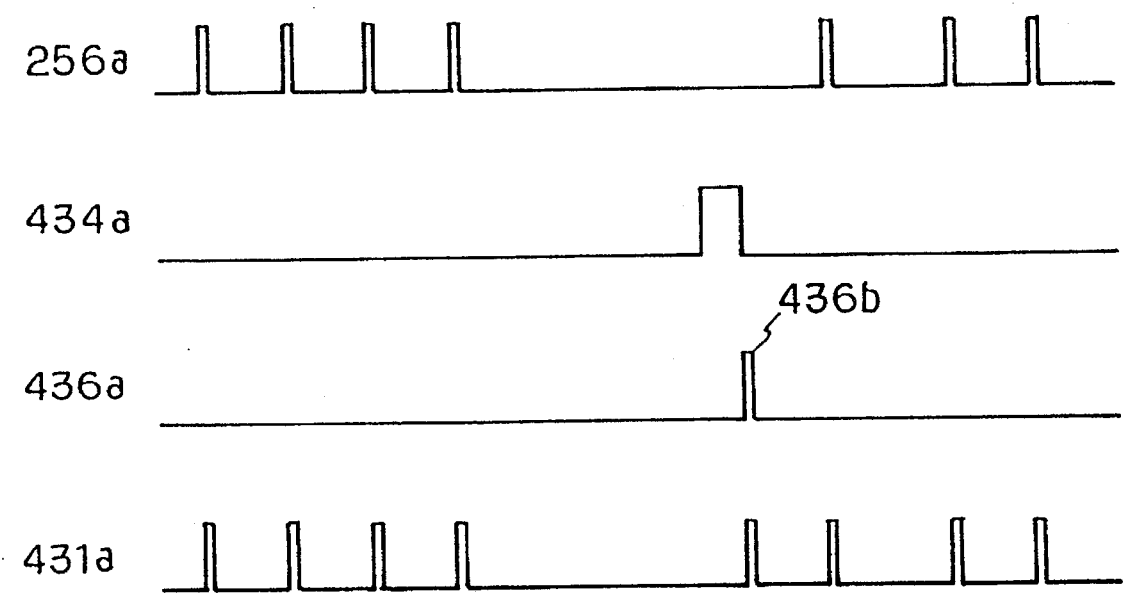
FIG. 88 is a signal waveform which explains an operation of a pseudo-pulse generating circuit of embodiment 26.

The pseudo-pulse generating circuit 431 outputs a pulse train without changed when a select pulse train 256a is inputted from the pulse selection circuit 256 within a predetermined time, and generates a pseudo-pulse when the pulse train is not inputted for a predetermined period. FIG. 87 shows a concrete construction example of a pseudo-pulse generating circuit 431. FIG. 88 is an example of timing chart showing an operation of pseudo-pulse generating circuit 431.

In FIG. 87, the numeral 433 denotes a counter, the numeral 434 denotes a gate circuit, the numeral 435 denotes a rising edge detecting circuit, the numeral 436 denotes a delay circuit, the numeral 437 denotes an OR circuit. The counter 433 is initialized by the pulse train 431a and is counted up in synchronism with the input clock. The gate circuit 434 decodes the count number 433a, and changes the output signal 434a of the gate circuit to L-level when the decoded value is smaller than the predetermined set value and to H level when the decoded value is larger than the predetermined set value. Accordingly, if the select pulse 256a is not inputted from the pulse selection circuit 256 within a predetermined period, the output signal 434a of the gate circuit changes to H level. Therefore, the rising edge detecting circuit 435 detects a rising edge, and the delay circuit 436 delays the detected edge pulse and outputs as a pseudo-pulse 436b shown in FIG. 88.

The normal rotation detecting circuit 265 monitors whether the rotor explained in embodiment 9 rotates toward normal rotational direction. The restart pulse generating circuit 432 masks an abnormal rotation signal 256b until a predetermined period has passed after starting or restarting, detects a rising edge of the abnormal rotation signal after a predetermined period has passed and outputs it as a restart pulse.

Figure 89:
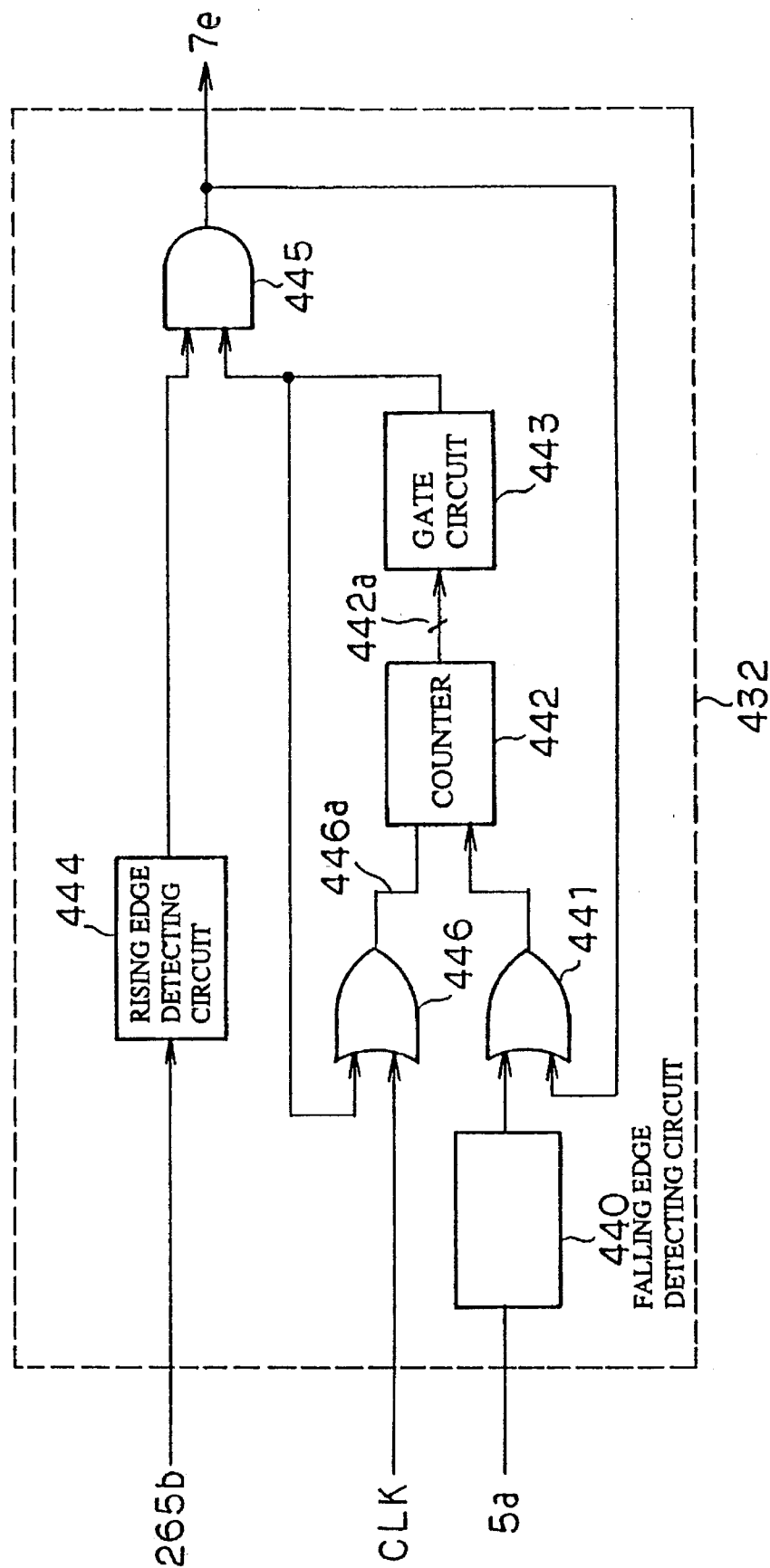
FIG. 89 shows a construction example of a restart the pulse generating circuit of embodiment 26.

FIG. 89 shows a construction example of a restart the pulse generating circuit 432. In FIG. 89, the numerals 440, 444 denote a rising edge detecting circuits, respectively, the numerals 441, 446 denote OR circuits, respectively, the numeral 442 denotes a counter, the numeral 443 denotes a gate circuit and the numeral 445 denotes AND circuit. The counter 442 is initialized by the rising edge of the motor rotation signal 5a, or restart pulse 7e and count-up in synchronism with the OR circuit output 446a. The gate circuit 443 decodes the count number 442a, and outputs L-level when the decoded value is smaller than the predetermined set value and to H level when the decoded value is larger than the predetermined set value. Accordingly, the abnormal rotation signal 265b is masked until a predetermined period has passed after starting or restarting, and the rising edge of the abnormal rotation signal is outputted as a restart pulse after a predetermined period has passed.

A starting operation of the brushless motor in this embodiment is explained below. Just after the motor rotation signal 5a becomes H level, since the count numbers 7a, 7b and 7c become L-L-L, then the driving signals 9b becomes L and 9f becomes H as seen from FIG. 27, and therefore current is supplied to V-W phase from FIG. 7. Therefore, there are three modes such as (1) the rotor of the brushless motor rotates toward normal rotational direction and then the rotor location signal varies, (2) the rotor of the brushless motor rotates toward reverse direction and then the rotor location signal varies, (3) the rotor of the brushless motor stops at a current supply stability point and then the rotor location signal does not change.

First, when the rotor rotates normal rotational direction is explained below. In this case, the signal waveform of the respective portions are illustrated in FIG. 28. As explained at the corresponding portions of the embodiment 8, the hexa counter 257 begins to count only when the edge pulse 253a is detected or when the pseudo-pulse 436b is generated in the pseudo-pulse generating circuit. When the rotor rotates to normal rotational direction, the terminal voltages U, V and W vary according to counter electromotive voltage induced in the armature windings. Then, the rotor location signals 3a, 3b and 3c become H-L-L, and the edge pulse 253a is detected at (A) of FIG. 28. Accordingly, the hexa counter 257 is counted up and the counted count numbers 7a, 7b and 7c become H-L-L. Therefore, the commutation circuit 9 sets the driving signals 9a–9f to L-H-H-L-L-H so that the current is supplied to U–W phase as seen from FIG. 7 and FIG. 27. The pseudo-pulse generating circuit 431 continue to output a waveform 7d shown in FIG. 28 as its output 431a. After then the brushless motor is accelerated by switching the current sequentially until the rotation speed reaches to a normal value by referring the combination of the count numbers 7a, 7b and 7c according to the relation shown in FIG. 27.

Next, when the rotor rotates reverse rotational direction is explained below. In this case, the signal waveform of the respective portions are also illustrated in FIG. 29. As explained in the embodiment 8, when the rotor rotates toward reverse rotational direction, the rotor location signals 3a varies and the edge pulse 251a is detected at (B) in the FIG. 29. But the edge pulse 251a is masked by the pulse selection circuit 256 from the relationship of the count numbers. And if the edge pulse 253a can not be detect within a predetermined time $t_1$ which is set in the gate circuit 434 of the pseudo-pulse generating circuit 431, a pulse 431a corresponding to the pseudo-pulse 6a is outputted from the pseudo-pulse generating circuit 431 at (C) in FIG. 29. The hexa counter 257 is counted up by this pseudo-pulse 431a, then the count numbers 7a, 7b and 7c change to H-L-L. Therefore, the commutation circuit 9 sets the driving signals 9a–9f to L-H-H-L-L-H so that the current is supplied to U-W phase according to the count numbers 7a, 7b and 7c. Thereby, the rotor rotates toward normal rotational direction, after then the brushless motor is accelerated by switching the current sequentially until the rotation speed reaches to a normal value by referring the combination of the count numbers 7a, 7b and 7c according to the relation shown in FIG. 27.

Next, when the rotor stops at a current supply stability point and then the rotor location signal does not change is explained below. In the same way as the reverse rotation, since the edge pulse 253a can not be detected within a predetermined time $t_1$, a pseudo-pulse (corresponds to 6a) is outputted from the pseudo-pulse generating circuit 431. The hexa counter 257 counts its pseudo-pulses in the same way as the reverse rotation, then the commutation circuit switches the current supplying phase to U–W phase, and switches the current supply by the relationship of FIG. 27 according to combination of the count numbers 7a, 7b and 7c until the rotor becomes a normal rotation state.

Figure 90:
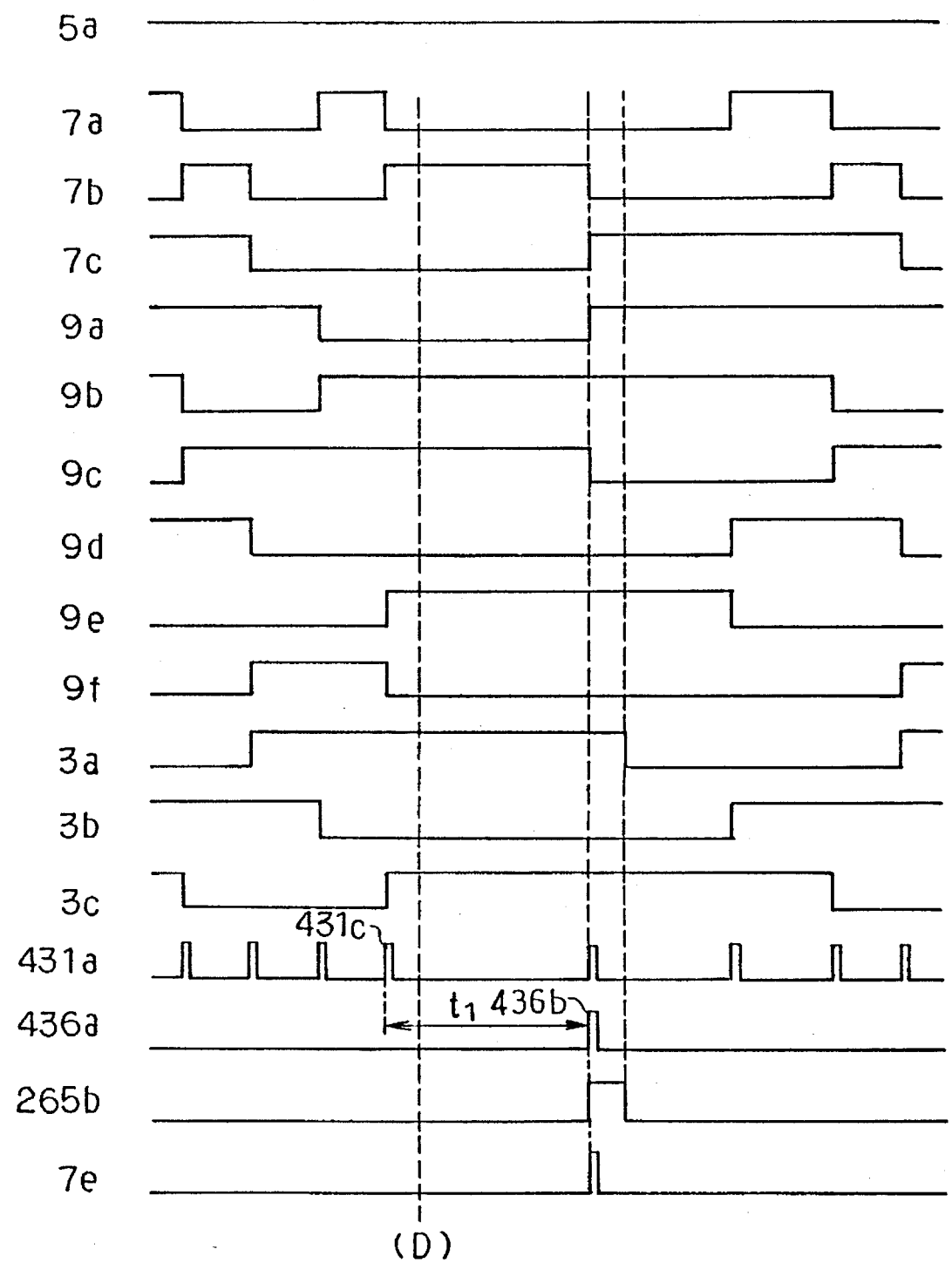
FIG. 90 is a signal waveform which explains an operation of embodiment 26.

In such construction, an example where a rotor has stopped during a normal rotation by any causes is explained using FIG. 90.

Assume that the rotor stopped at (D) in FIG. 90. In this case, the pseudo-pulse 436b is outputted from the delay circuit 436 in the pseudo-pulse generating circuit 431 after the period $t_1$ is expired which is set in the gate circuit 434 of the pseudo-pulse generating circuit 431. A pseudo-pulse 436b is outputted as a pulse train 431a from the pseudo-pulse generating circuit 431, the count numbers 7a, 7b and 7c change from L-H-L to L-L-H. As explained above, since the driving signals 9a–9f are outputted according to the combination of the rotor location signals 3a, 3b and 3c during a normal rotation, the current phase is not switched even if the count numbers 7a, 7b and 7c are changed. Accordingly, the relationship between the count numbers 7a, 7b and 7c and the rotor location signals 3a, 3b and 3c do not satisfy the relationship of FIG. 31. Therefore, an abnormal rotation signal 265b outputted from the normal rotation detecting circuit 265 becomes H level.

At the time, if a predetermined time has passed after starting and restarting, a rising edge of the abnormal rotation signal is detected in the restart pulse generating circuit 432 and the rising edge of the abnormal rotation signal is outputted as a restart pulse 7e. The restart pulse is inputted into the commutation circuit 9 and then the commutation circuit changes to a starting mode. The commutation circuit outputs the driving signals 9a–9f at starting mode according to the combination of the count numbers 7a, 7b and 7c, then the driving signals 9a–9f becomes H-H-L-L-H-L as seen from FIG. 7, FIG. 27 and the current is supplied to W-V phase. Since the current is supplied to W-V phase, the rotor rotates toward normal rotational direction. And when the rotor location signals 3a, 3b and 3c change to L-L-H, the relationship between the count numbers 7a, 7b and 7c and the rotor location signal 3a, 3b and 3c satisfies the relationship of FIG. 31, then the abnormal rotation signal 265b becomes L level. After then, the commutation circuit switches the current supply by the relationship of FIG. 27 according to combination of the count numbers 7a, 7b and 7c until the rotor becomes a normal rotation state.

Embodiment 27

In this embodiment, a construction and an operation of a brushless motor driving circuit having a switching means for switching modes from the starting mode to a normal rotation mode is explained below.

Figure 91:
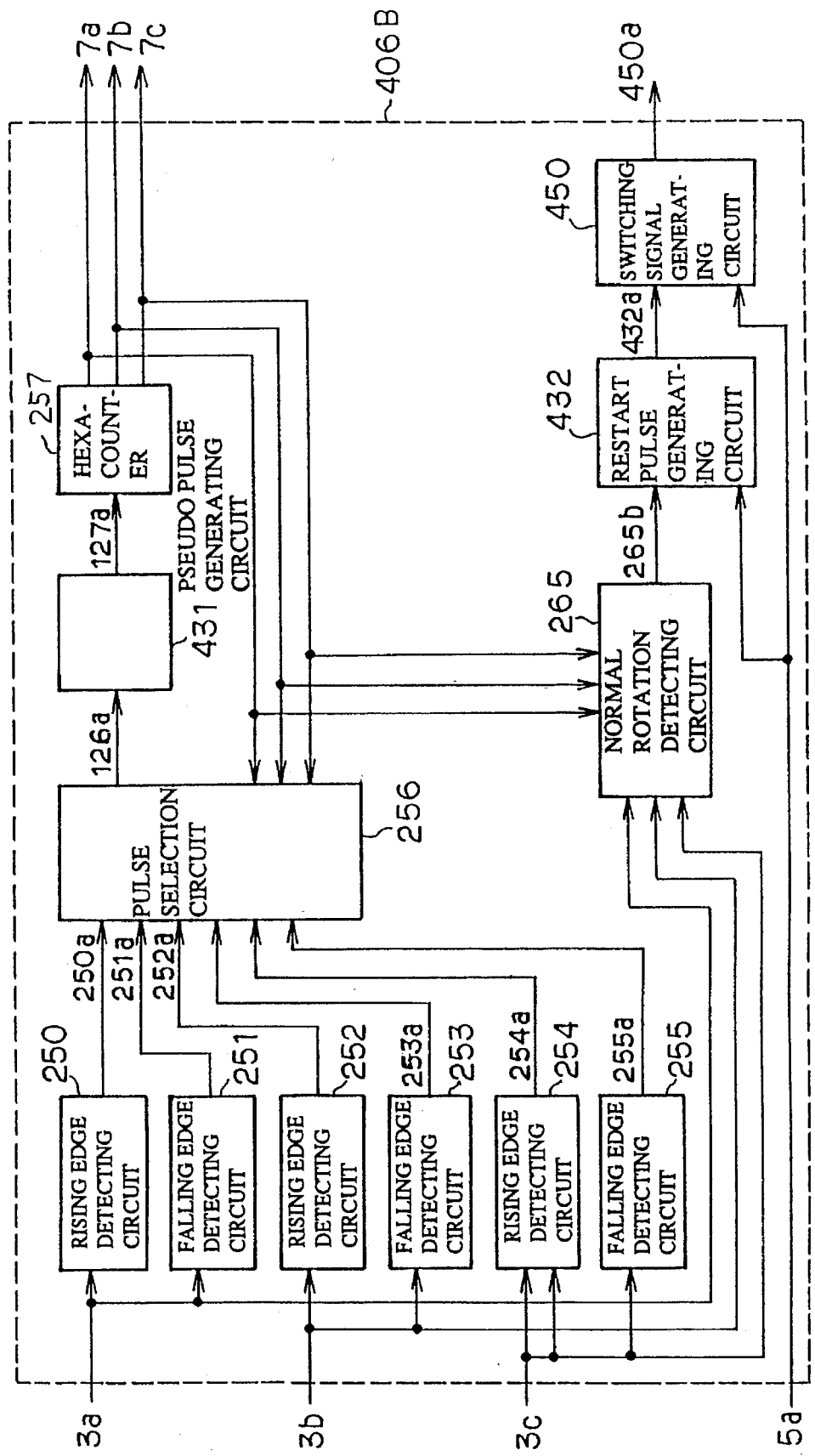
FIG. 91 shows a construction of a starting circuit of an embodiment 27.

FIG. 91 shows a concrete construction example of a starting circuit 406b. In FIG. 91, the rising edge detecting circuit, the falling edge detecting circuit, the pulse selection circuit, the pseudo-pulse generating circuit, the hexa counter, the normal direction detecting circuit, the restart pulse generating circuit are the same as those of embodiment 26. The new element 450 is a switching signal generating circuit for outputting a switching signal 450a which selects the count numbers 7a, 7b and 7c or the rotor location signals 3a, 3b and 3c when the commutation circuit 9 outputs the driving signal 9a–9f. Here, the commutation circuit 9 of this embodiment refers the count numbers 7a, 7b and 7c when the switching signal 450a is at L level, and refers the rotor location signals 3a, 3b and 3c when the switching signal 450a is at H level. The switching signal generating circuit 450 is explained below.

In this embodiment, a motor rotation signal 5a and a restart pulse 432a are inputted into the switching signal generating circuit 450. The switching signal 450a is inputted into the commutation circuit 9.

Figure 92:
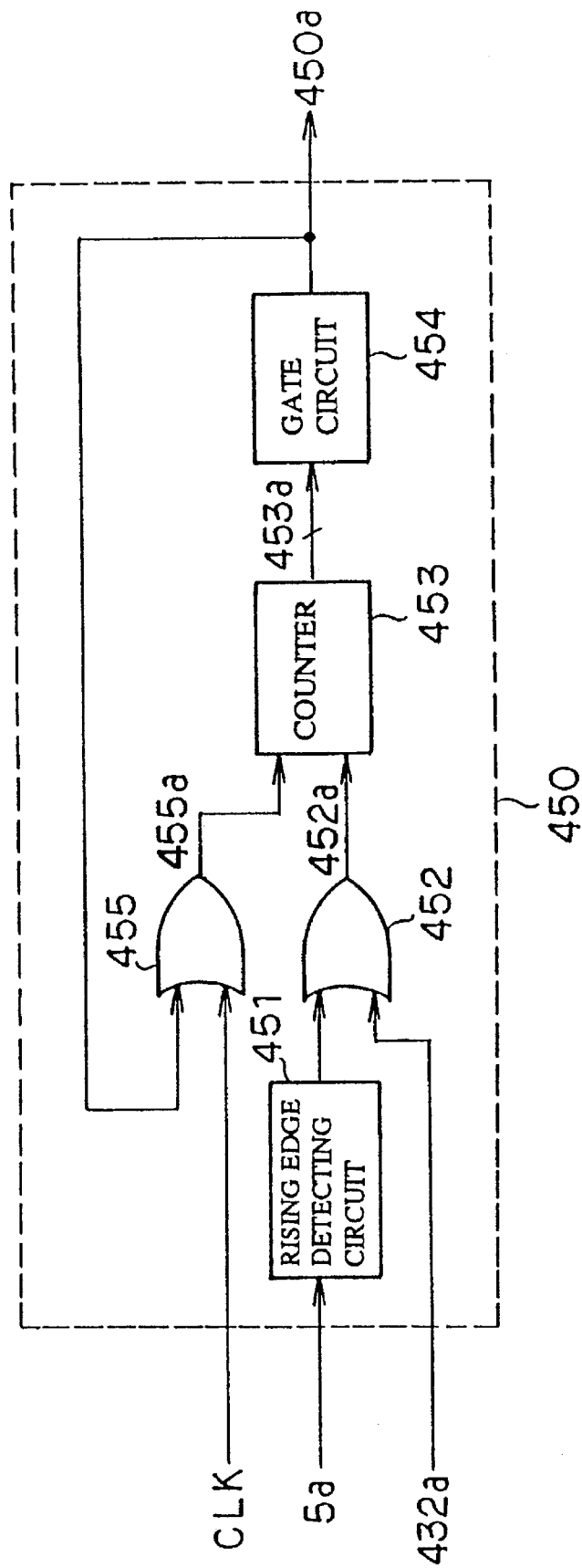
FIG. 92 shows a construction of a switching signal generating circuit of embodiment 27.

FIG. 92 shows a concrete construction of a switching signal generating circuit 450. In FIG. 92, the numeral 451 denotes a rising edge detecting circuit, the numerals 452, 455 denote OR circuits, the numeral 453 denotes a counter, the numeral 454 denotes a gate circuit.

Figure 93:
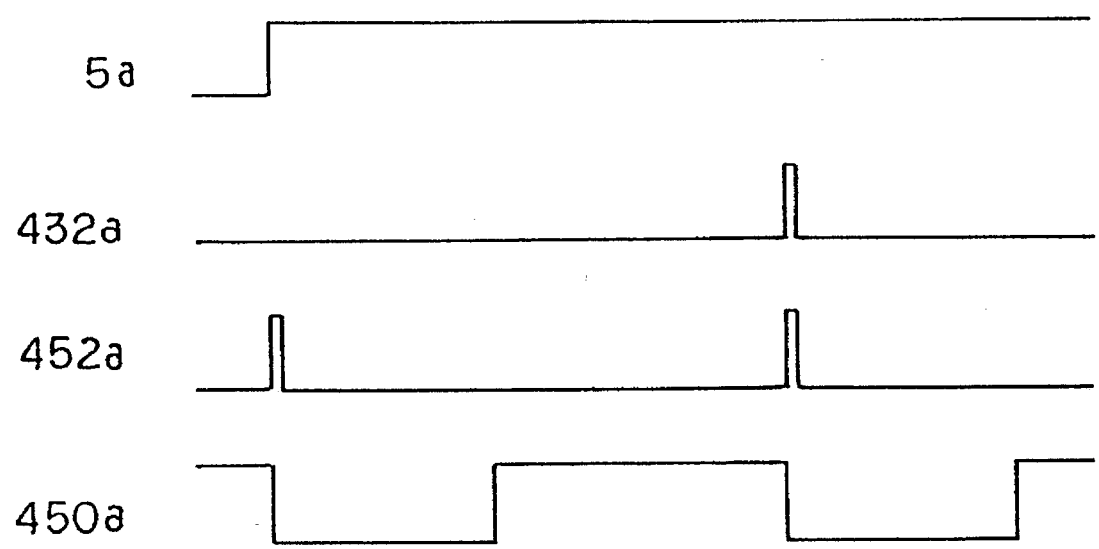
FIG. 93 is a signal waveform which explains an operation of switching signal generating circuit.

FIG. 93 shows respective portions of signal waveforms for explaining an operation of the switching signal generating circuit 450. The counter 453 is initialized by a rising edge of the motor rotation signal 5a or a restart pulse 432a and is counted up in synchronism with the output 455a of the OR circuit 455. The gate circuit 454 decodes the count number 453a and outputs L level when the decoded value is smaller than a predetermined value, and outputs H level when the decoded value is larger than a predetermined value. Accordingly, the switching signal 450a is at L level until the predetermined period expires after starting or restarting, and at H level other than the above period.

The switching signal 450a is inputted into the commutation circuit 9, and the commutation circuit 9 switches the referring means according to the switching signal 450a.

Embodiment 28

In this embodiment, a brushless motor having a speed difference compensation filter in which a low pass gain characteristics is improved in comparison with the conventional speed difference compensation filter is explained below. The general construction of the brushless motor driving circuit of this embodiment is the same as those in FIG. 1 or FIG. 78 the description is omitted. A construction of the speed difference compensation filter which is important for realizing the invention is explained below.

Figure 94:
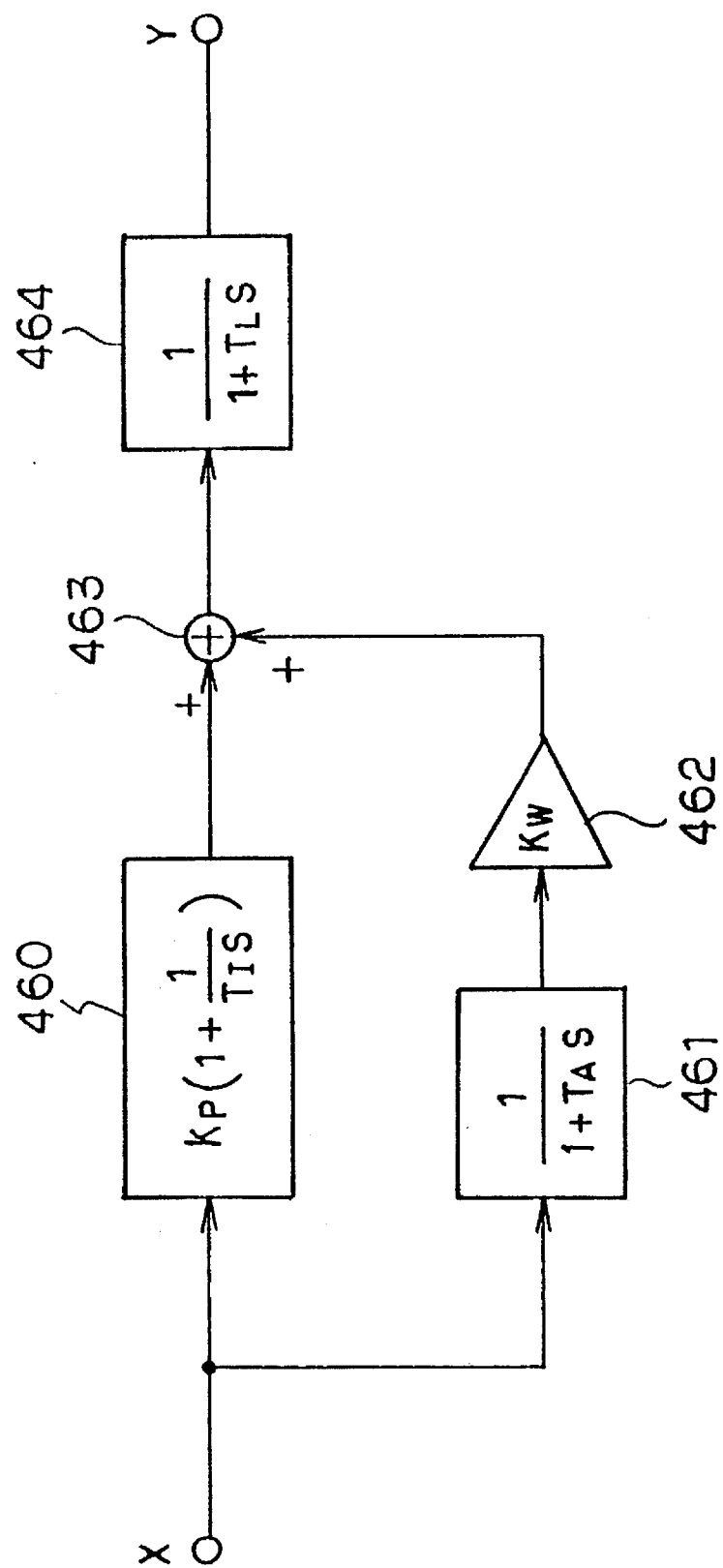
FIG. 94 is a block diagram of a speed difference compensation filter of an embodiment 28.
Figure 123:
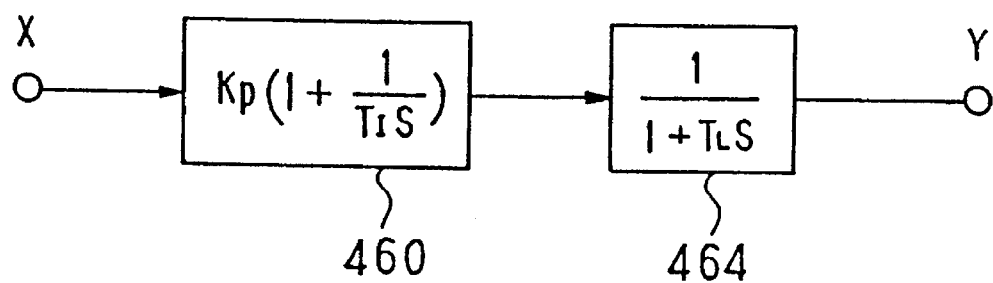

FIG. 94 is a transfer block diagram in which the speed difference compensation filter is comprised of analog filter. In FIG. 94, the numeral 460 denotes a proportion—integration (PI) filter, the numeral 461 denotes a first order delay filter, the numeral 462 denotes a gain element or coefficient multiplier, the numeral 463 denotes an adder, the numeral 464 denotes a first order delay filter. A speed difference detection signal 409a which is outputted from the speed difference detecting circuit 409 is inputted to an input terminal X of the speed difference compensation filter. An output signal outputted from the terminal Y is supplied to the current supplying circuit 411 as a current indication value 410a for the armature winding. This speed difference compensation filter 94 is different from the conventional speed difference compensation filter shown in FIG. 123 in that the present filter adds the speed difference detection signal 409a to the output of the PI filter 460 through the first order delay filter 461.

In this configuration, the transfer function $G_C(s)$ of the speed difference compensation filter is given by an equation (6).

$$G_C(s) = \{K_P(1+1/T_F s) + K_W/(1+T_A s)\} \times 1/(1+T_L s) \quad (6)$$

Figure 95:
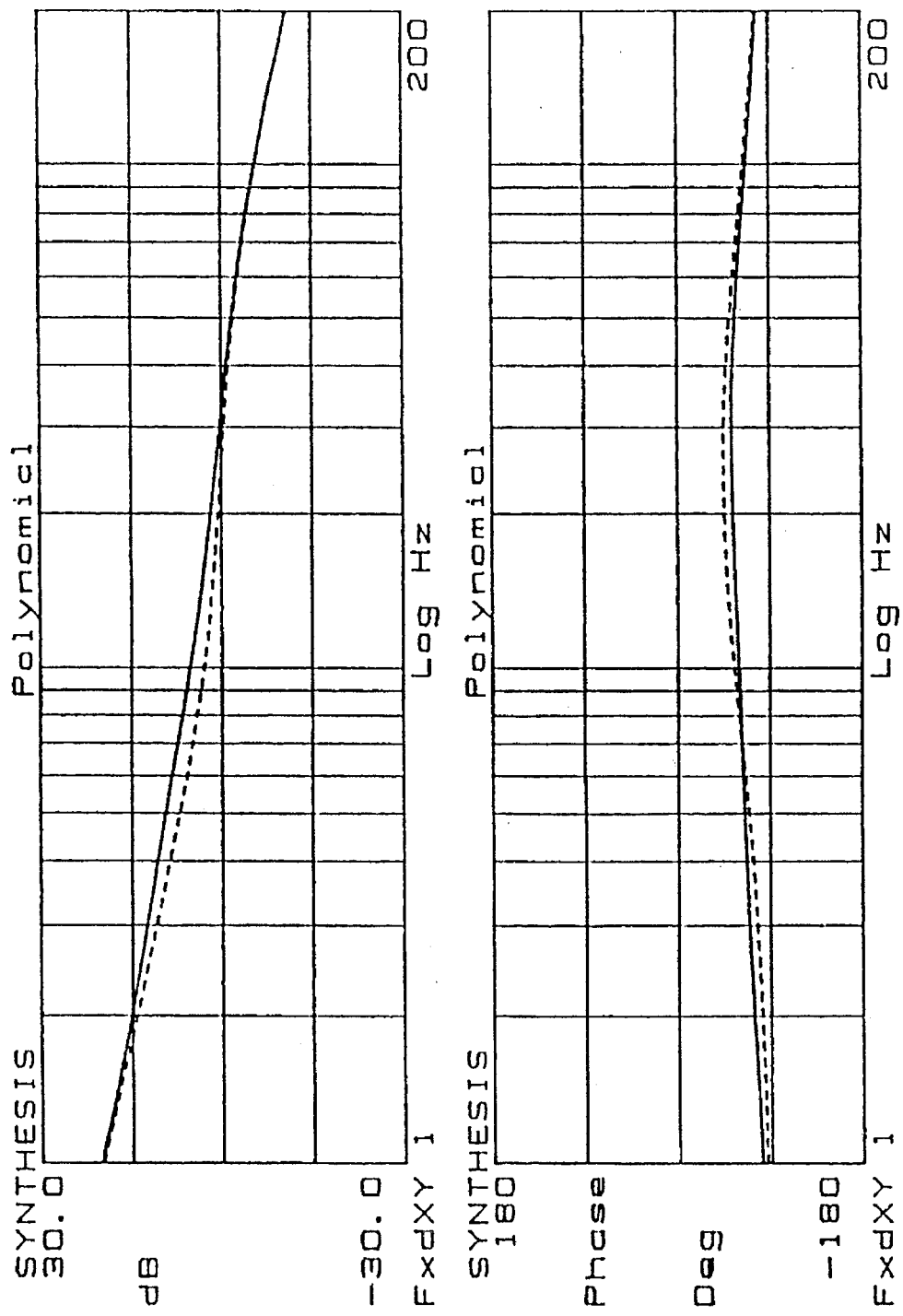
FIG. 95 shows frequency characteristic of a speed difference compensation filter of an embodiment 28.

FIG. 95 shows a simulation result of open loop characteristics of the speed difference compensation filter when $$K_P=1, T_F=1/\sim 2\pi \times 10), K_W=1, T_A=1/(2\pi \times 5), T_L=1/(2\pi \times 60).$$

The broken line in FIG. 95 shows a simulation result of the conventional speed difference compensation filter when $$K_P=1, T_F=1/(2\pi \times 10), T_L=1/(2\pi \times 60).$$

This FIG. 95 shows that the filter of the present invention provides a improved low pass gain characteristic.

FIG. 94 shows an example comprised of an analog filter, but it is possible to be comprised of digital filter.

Figure 96:
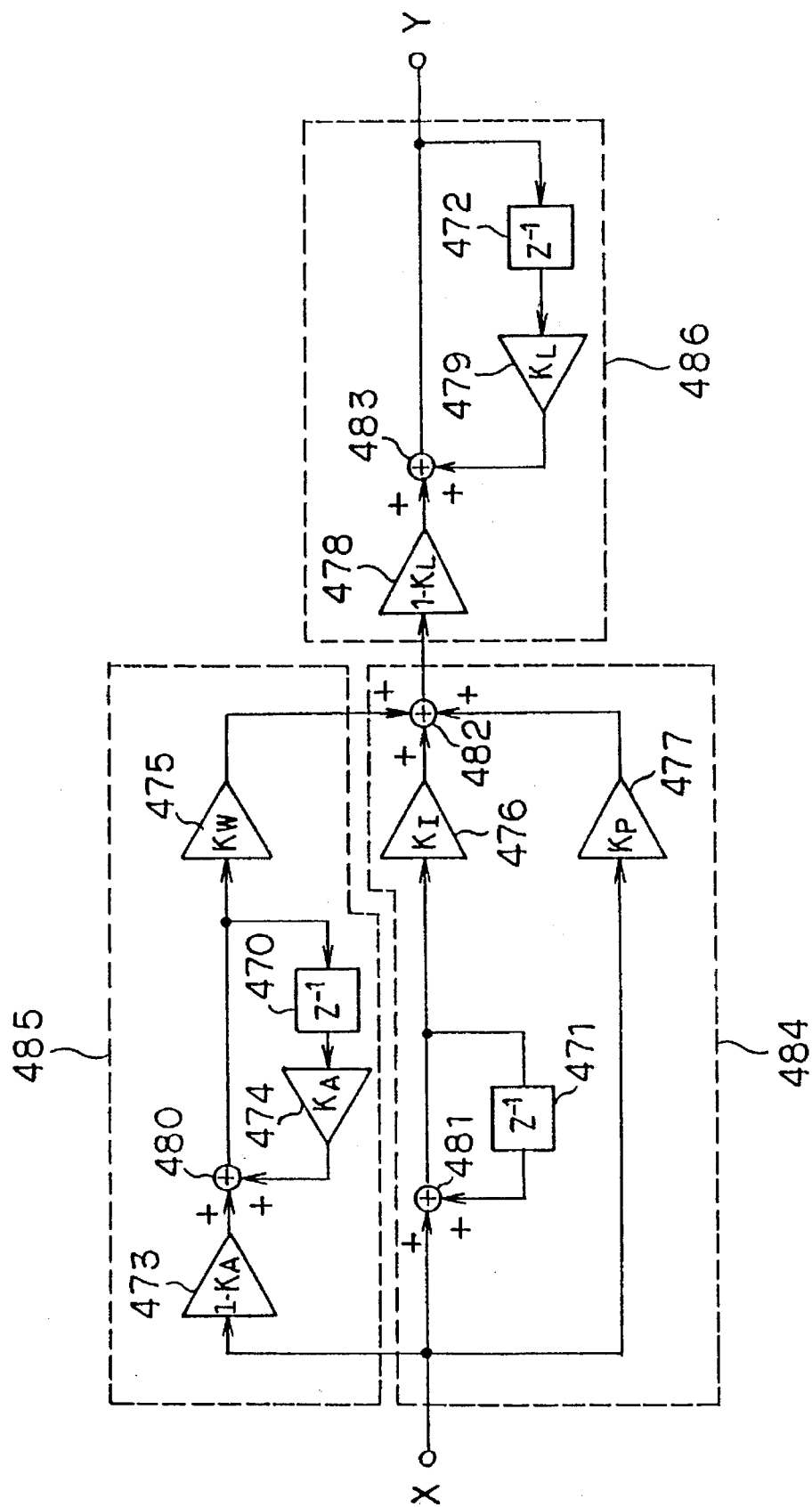
FIG. 96 is a block diagram of a speed difference compensation filter for digital system of an embodiment 28.

FIG. 96 shows a transfer block diagram in which the speed difference compensation filter is comprised of the digital filter. In FIG. 96, the numerals 470–472 denote delay elements which causes the signal to delay by one sampling period, the numerals 473–479 denote gain elements, the numerals 480–483 denote adder.

The delay element 471, the gain elements 476, 477 and the adders 481, 482 constitute a PI filter 484. The delay element 470, the gain elements 473–475, the adder 480 constitutes a first order delay filter 485. The delay element 472, the gain elements 478, 479, the adder 483 constitutes a first order delay filter 486. In this configuration, the transfer function $G_C(z)$ of the speed difference compensation filter is given by an equation (7).

$$G_C(z) = \{K_P + K_I/(1-z^{-1}) + K_W(1-K_A)/(1-K_A z^{-1})\} \times (1-K_L)/(1-K_L z^{-1}) \quad (7)$$

Embodiment 29

In the embodiment, another speed difference compensation filter which has a improved low pass gain characteristics in comparison with the conventional speed difference compensation filter is explained.

Figure 97:
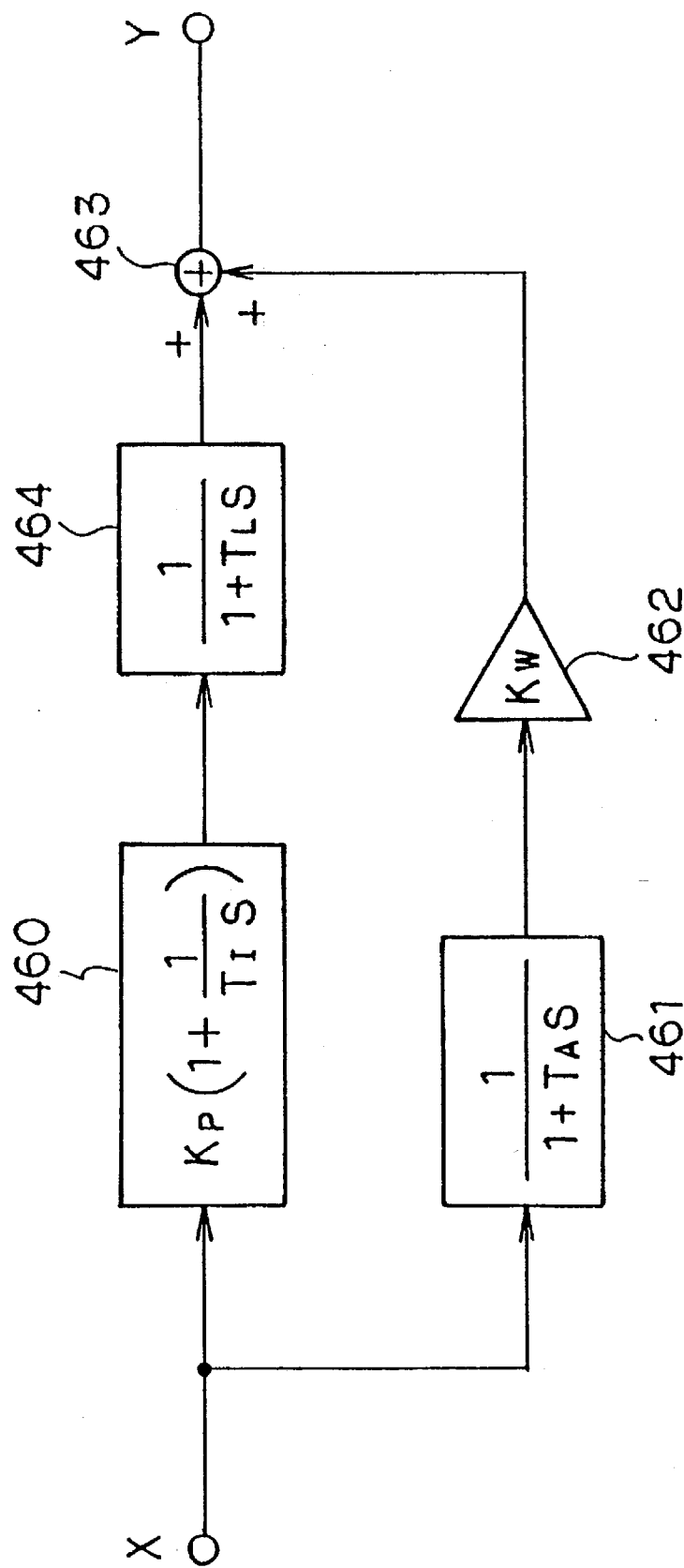
FIG. 97 is a block diagram of a speed difference compensation filter of an embodiment 29.

FIG. 97 is a transfer block diagram where a speed difference compensation filter is comprised of analog filter.

In FIG. 97, the same elements as those in FIG. 94 are indicated by the same numerals. This speed difference compensation filter is different from the conventional speed difference compensation filter in that the output of the first order delay filter 461 which is supplied by the speed difference detection signal 409a is applied to an output of serial circuit of the PI filter 460 and the first order delay filter 464. In this configuration, the transfer function $G_C$ (s) of the speed difference compensation filter is given by an equation (8).

$$G_C(s)=K_P(1+1/T_I s)\times 1/(1+T_L s)+K_W/(1+T_A s) \tag{8}$$

Figure 98:
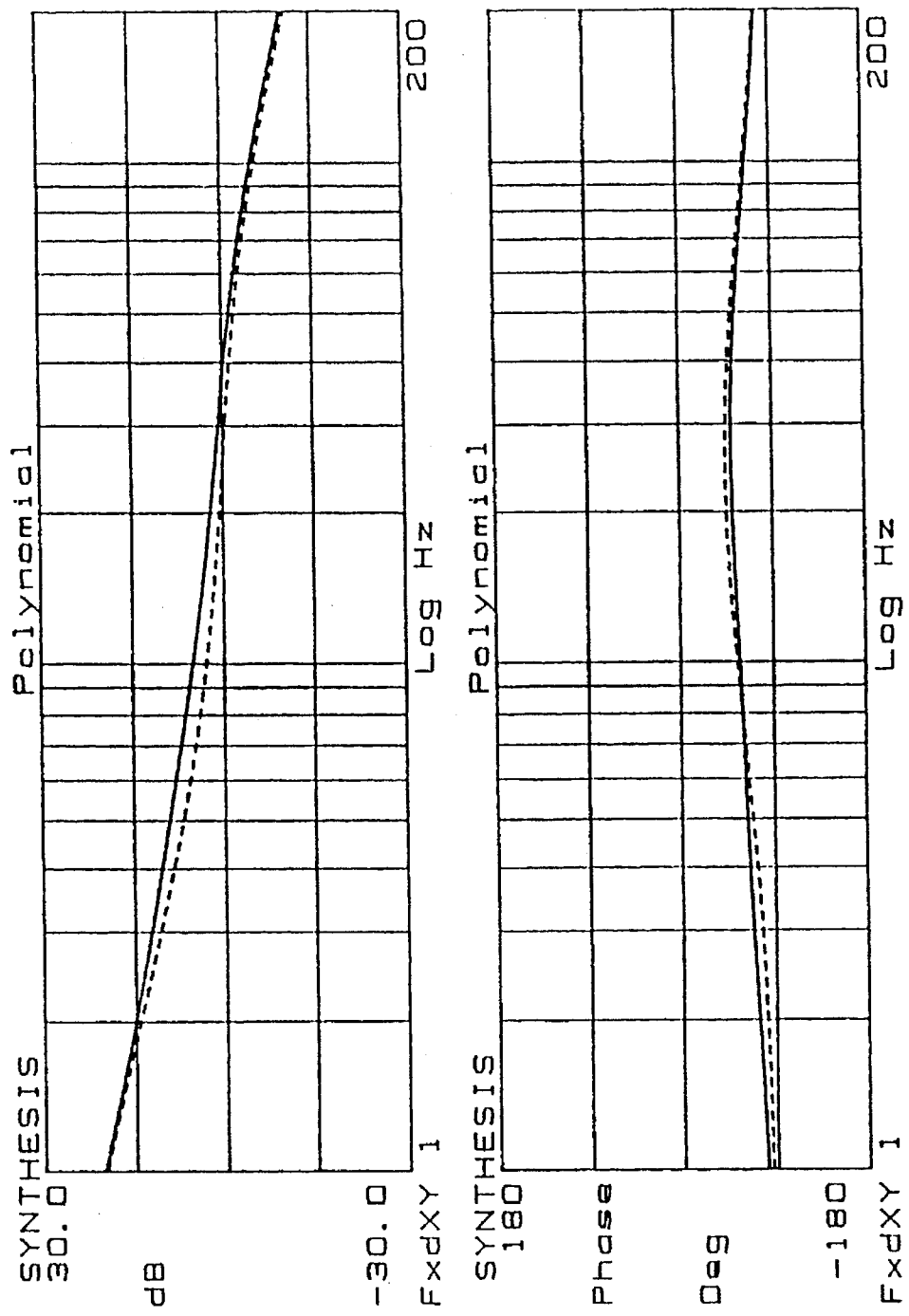
FIG. 98 shows frequency characteristic of a speed difference compensation filter of an embodiment 29.

FIG. 98 shows a simulation result of open loop characteristics of the speed difference compensation filter when $$K_P=1, T_I=1/(2\pi\times 10), K_W=1, T_A=1/(2\pi\times 5), T=1/(2\pi\times 60).$$

The broken line in FIG. 98 shows a simulation result of the conventional speed difference compensation filter when $$K_P=1, T_I=1/(2\pi\times 10), T_L=1/(2\pi\times 60).$$

This FIG. 96 shows that the filter of the present invention provides a improved low pass gain characteristic.

FIG. 97 shows an example comprised of an analog filter, but it is possible to be comprised of digital filter.

Figure 99:
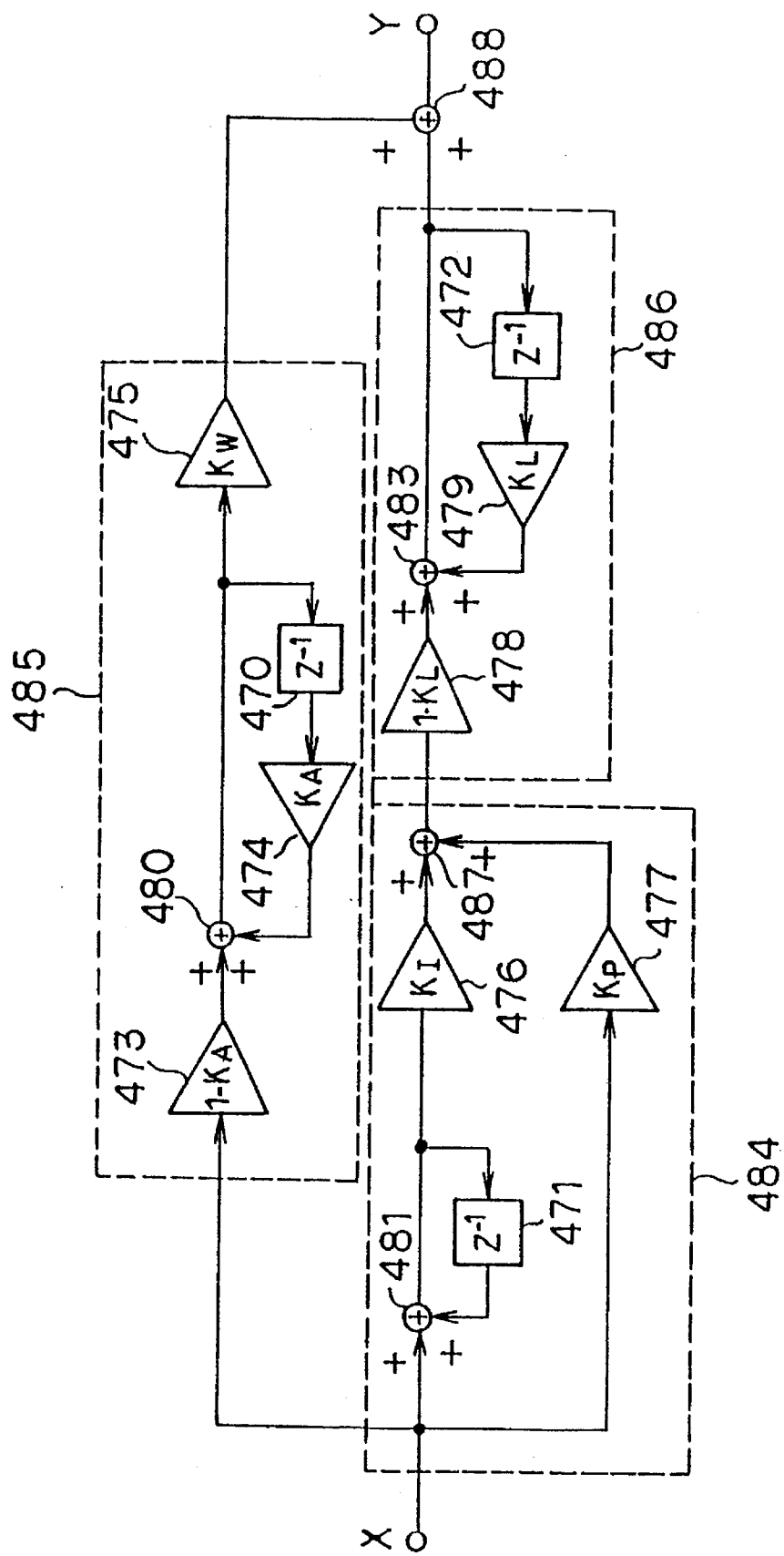
FIG. 99 is a block diagram of a speed difference compensation filter for digital system of an embodiment 29.

FIG. 99 shows a transfer block diagram in which the speed difference compensation filter is comprised of the digital filter. In FIG. 99, the same elements as those in FIG. 78 are indicated by the same numerals. The numerals 487, 488 denote adders. In this configuration, the transfer function $G_C$ (z) of the speed difference compensation filter is given by an equation (9).

$$G_C(z)=\{K_P+K_I/(1-z^{-1})\}\times(1-K_L)/(1-K_L z^{-1})+ K_W(1-K_A)/(1-K_A z^{-1}) \tag{9}$$

Embodiment 30

In this embodiment, a brushless motor driving circuit which switches a target rotation speed of the speed difference detecting circuit and a gain of the gain element in the speed difference compensation filter when the indicated rotation speed has changed is explained.

Figure 100:
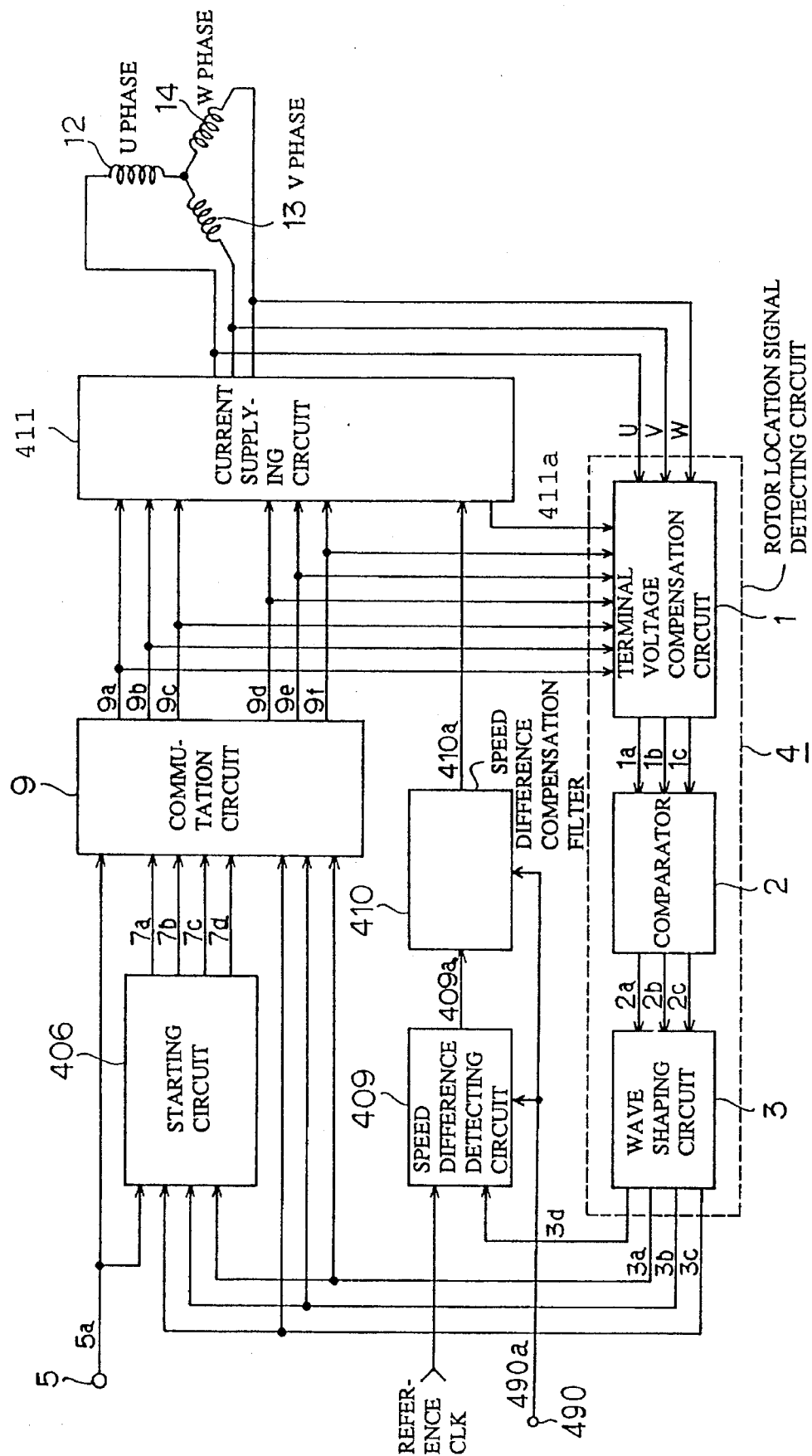
FIG. 100 is a block diagram of a thirtieth embodiment of the present invention which shows a general construction a brushless motor driving device.

FIG. 100 is a block diagram which shows a general construction of a brushless motor driving circuit of the embodiment 30. In FIG. 100, the same elements as those in FIG. 78 are indicated by the same numerals. The numeral 490 denotes an input terminal where a mode switching signal 490a is inputted. A mode switching signal 490a is inputted from outside of the brushless motor driving circuit and is comprised of binary signal for switching the motor rotation speed.

In the above mentioned waveform shaping circuit 3, the logic pulse signal 3d outputted from OR circuit is supplied for a predetermined period at a normal rotation. Accordingly, this logic pulse signal 3d can be used as a speed signal for controlling the rotation speed.

Figure 101:
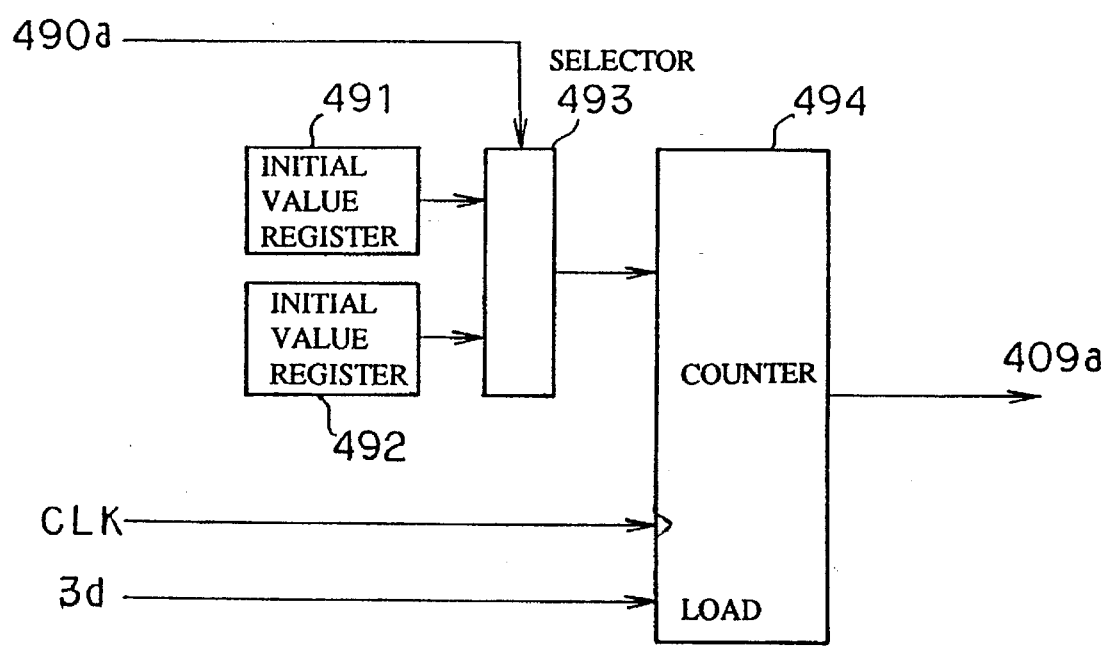
FIG. 101 shows a construction of a speed difference detecting circuit of an embodiment 30.

FIG. 101 is concrete construction example of the speed difference detecting circuit 409. In FIG. 101, the numerals 491, 492 denote initial value registers, the numeral 493 denotes a selector, the numeral 494 denotes a counter. The initial value registers 491, 492 provide initial values of target rotation speeds. In this embodiment, there are two initial value registers in order to respond to two kinds of indicated rotation speed. The selector 493 switches the two kinds of initial registers 491, 492 according to the logic level of the mode switching signal 490a. The counter 494 loads an initial value selected by these selector 493 at the timing of rising edge of the logic pulse signal 3d, and counts up in synchronism with the clock.

For example, a period of the logic pulse signal 3d which is 1 (m sec) or 0.5 (m sec) at normal rotation is explained in correspondence with the two indicated rotation speed (the indicated rotation speeds are expressed A and B, respectively).

Here, assume that the clock frequency is 1 (MHz), and the indicated rotation speed A corresponds to H level of the mode switching signal 490a and the indicated rotation speed B corresponds to L level of the mode switching signal 490a. −1000 is set to the initial value register 491, and −500 is set to the initial value register 492.

In such construction, when the mode switching signal 490a is at H level, the selector 493 selects the initial value register 491 and the counter 494 loads −1000 for a initial value at a timing of rising edge of logic pulse signal 3d. Then, the counter 494 counts up in synchronism with to the clock and outputs a negative value when the period of logic pulse signal 3d is less than 1 (m sec) and positive value when the period of logic pulse signal 3d is larger than 1 (m sec) as a speed difference detection signal 409a.

On the other hand, the mode switching signal 490a is at L level, the selector 493 selects the initial value register 492 and the counter 494 loads−500 for a initial value at a timing of rising edge of logic pulse signal 3d. Then, the counter 494 counts up in synchronism with to the clock and outputs a negative value when the period of logic pulse signal 3d is less than 0.5 (m sec) and positive value when the period of logic pulse signal 3d is larger than 0.5 (m sec) as a speed difference detection signal 409a.

Embodiment 31

In the above embodiments, an operation of the speed difference detecting circuit 409 in case of the indicated rotation speed is changed is explained. But, since the target rotation speed is switched, there is a problem that the detection sensitivity varies by the difference of indicated rotation speed. In this embodiment, in order to solve the above problem, the gain element of the speed difference compensation filter is also switched.

Figure 102:
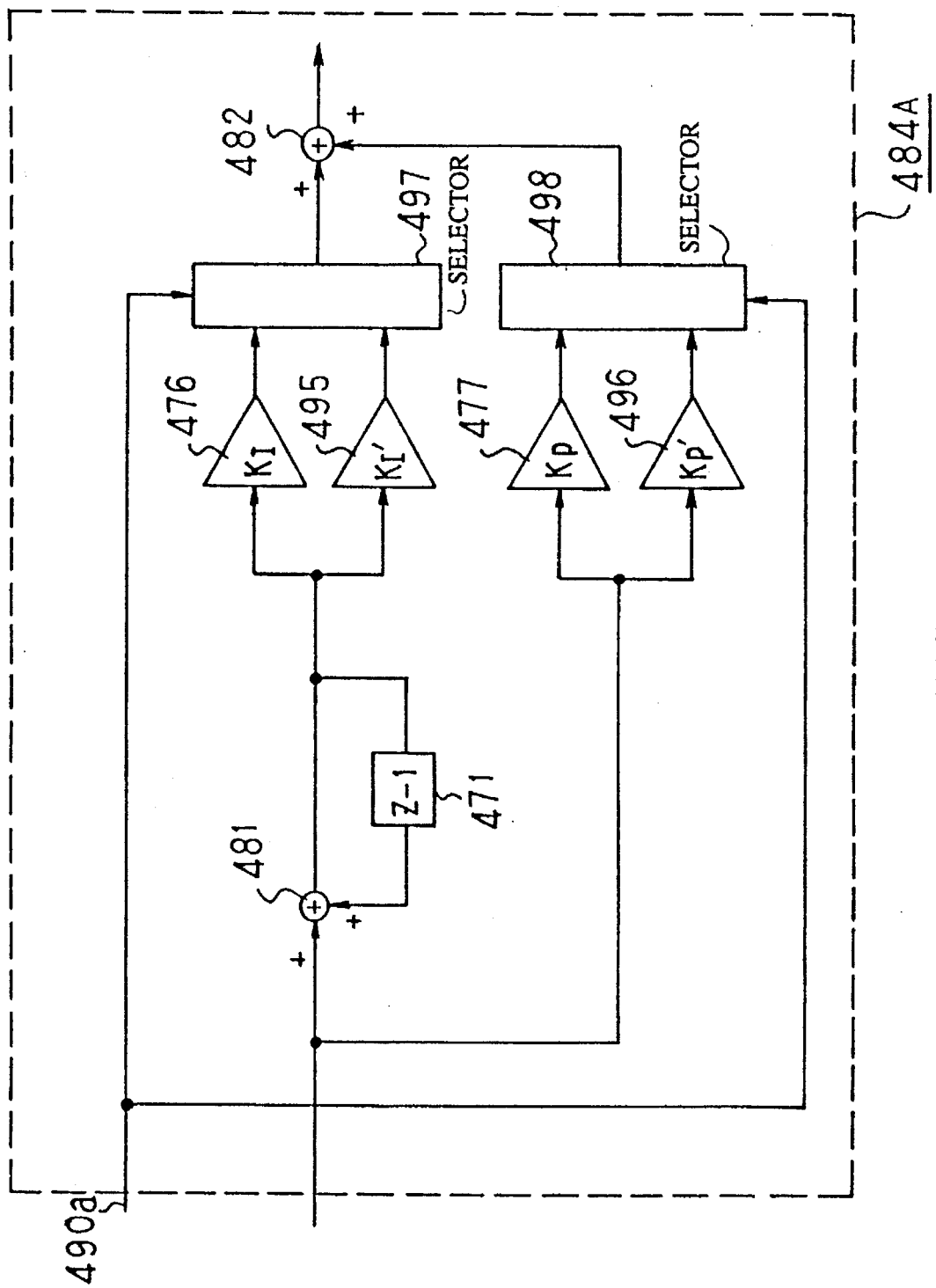
FIG. 102 is a block diagram of a PI filter of an embodiment 31.

FIG. 102 is a block diagram of PI filter 484A when the speed difference compensation filter is switched. In FIG. 102, the same elements as those in FIG. 96 of the embodiment 28 are indicated by the same numerals. The numerals 495, 496 denote new gain elements which respond to the other indicated rotation speed, the numerals 497, 498 denote selectors. The selectors 497, 498 selects gain element 476 or 495 and gain element 477 or 496, respectively, according to the logic level of the mode switching signal 490a. In the same way, the gain elements of the first order delay filters 485, 486 are also switched by the mode switching signal 490a. Of course, other general methods for switching the gain may be used.

Further, in this embodiment, an example for switching the indicated rotation speed by binary signal of one bit, but it is possible to switch the indicated rotation speed by the binary signal of N bit when a plurality of indicated rotation speeds are used.

Embodiment 32

In this embodiment, a relation is explained between the switching timing for switching the current supplying phase and the timing for increasing or decreasing the to supply current to the armature windings of the brushless motor driving circuit of the present invention. The general construction of brushless motor driving circuit of this embodiment is similar to FIG. 78.

Figure 103:
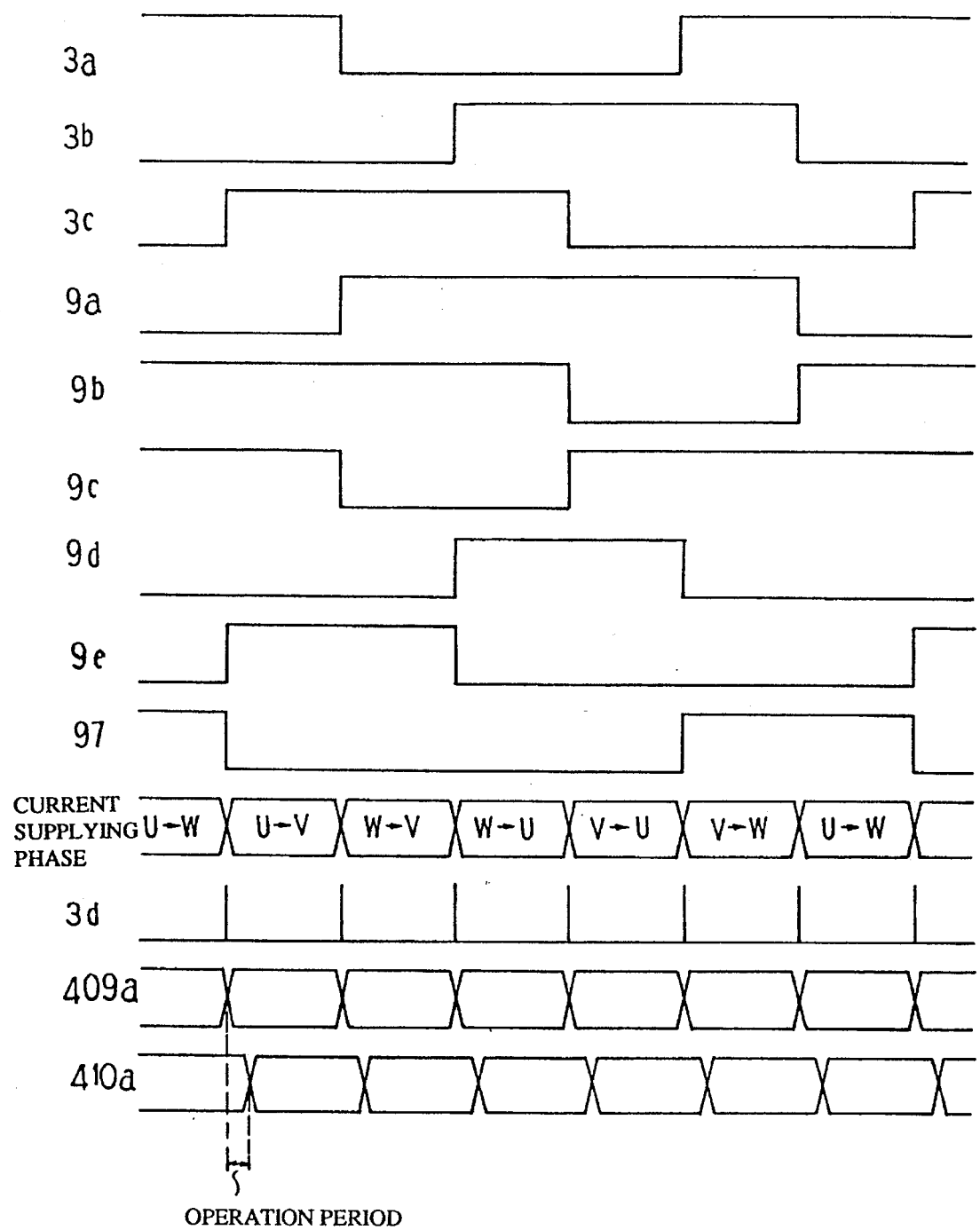
FIG. 103 is a signal waveform which explains an operation of a driving circuit for the brushless motor of an embodiment 32.

FIG. 103 shows a timing chart for explaining an operation of the brushless motor driving circuit at a normal direction.

In FIG. 103, the numerals 3a, 3b and 3c represent rotor location signals, the numerals 9a~9f represent driving signals, the numeral 3d represents a logic pulse signal indicating a speed, the numeral 409a represents a speed difference signal, the numeral 410a represents a current indication value. At a normal rotation, the driving signals 9a~9f is generated by the rotor location signals 3a, 3b and 3c. Accordingly, at a normal rotation, the switching of the current supplying phase is carried out at the timing shown in FIG. 103.

The logic pulse signal 3d is a both edge differential pulse of the rotor location signals 3a, 3b and 3c. The speed difference detecting circuit 409 measures a period of the speed signal 3d, and outputs a period difference which is a difference between the target value and the measured value as a speed difference detection signal 409a at a timing shown in FIG. 103. The speed difference detection signal 409a is inputted into the speed difference compensation filter 410. The speed difference compensation filter 410 carries out a filter arithmetic operation so that the speed difference detection signal 409a becomes zero.

Since it takes a certain time to carry out the filter arithmetic operation, change of the current indication value 410a delays by the operation time period after the speed difference detection signal 409a has changed. The current supplying circuit 411 regulates the current quantity which is supplied to the armature winding.

As mentioned above, in the brushless motor driving circuit of the invention, a switching timing is synchronized with a timing for increasing and decreasing the armature winding. Therefore, the timing for increasing and decreasing the current supplied to the armature winding is delayed for a period in corresponding to the arithmetic operation after the commutation has carried out.

Embodiment 33

In this embodiment, a brushless motor driving circuit for supplying a maximum current to the armature winding during the starting and restarting is explained.

Figure 104:
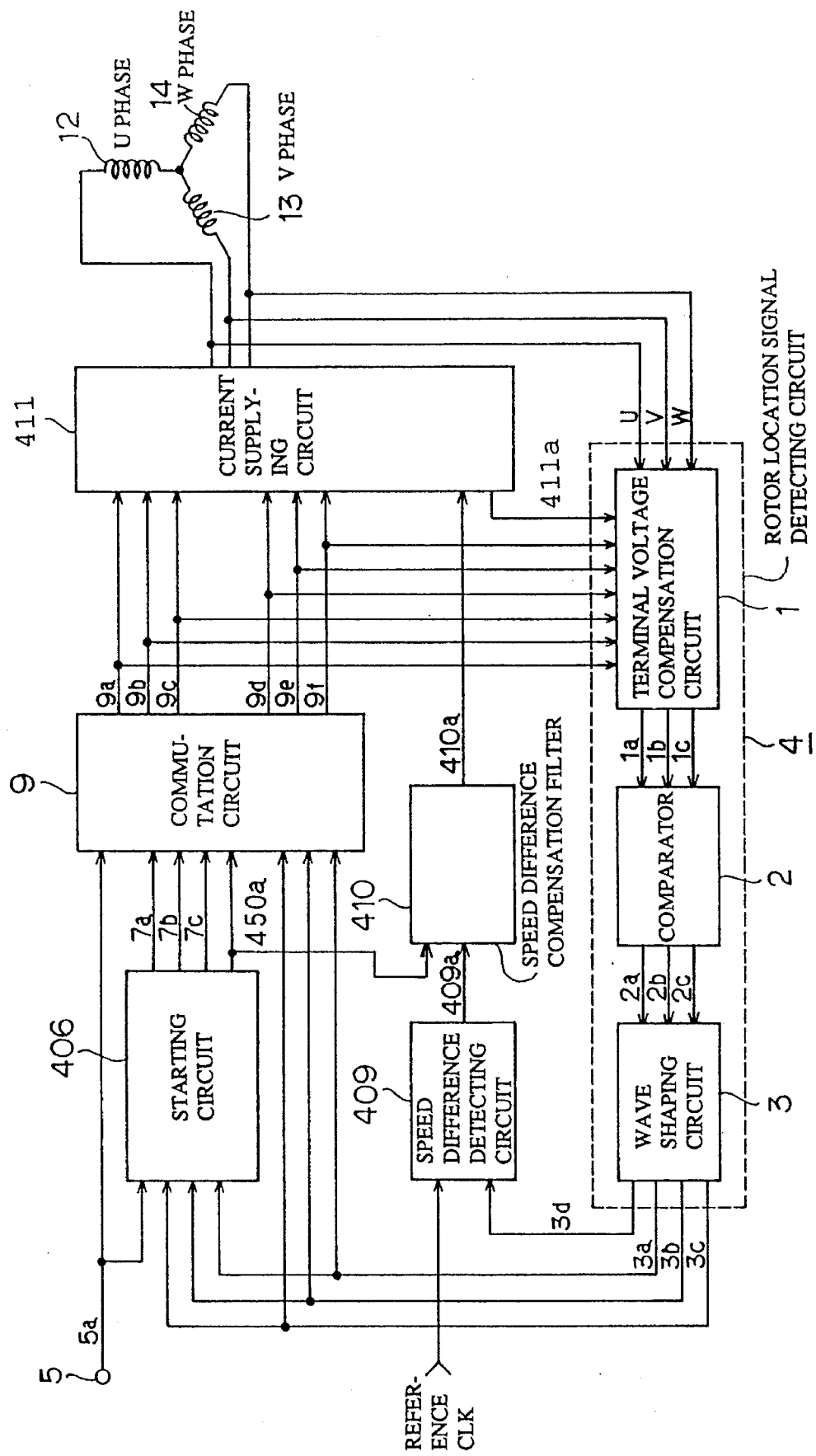
FIG. 104 is a block diagram of a thirty third second embodiment of the present invention which shows a general construction a brushless motor driving device.

FIG. 104 is a block diagram which shows a general construction of a brushless motor driving circuit. That is, in this construction, the switching signal 450a is input into the speed difference compensation filter 410 as explained in embodiment 27.

Figure 105:
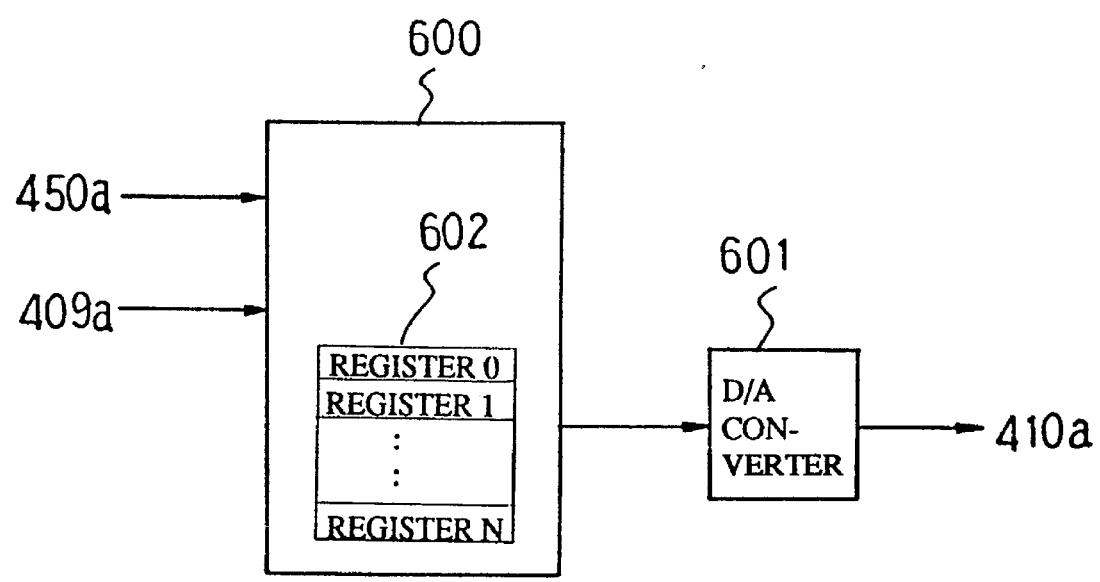
FIG. 105 shows a construction of a speed difference compensation filter of an embodiment 33.

FIG. 105 shows a construction example of a speed difference compensation filter. In FIG. 105, the numeral 600 denotes a micro controller, the numeral 601 denotes a D/A converter, the numeral 602 denotes a register group comprised of registers 0~N in the micro controller 600. A speed difference detection signal 409a inputs into the micro controller 600. The micro controller 600 carries out a filter arithmetic operation as shown in the embodiment 28 and embodiment 29 and stores the result into the register N. Further, the micro controller 600 outputs the value which is stored in the register N to the D/A converter 601 at a predetermined timing. The digital value stored in the register N is converted into an analog value in the D/A converter 601 and outputted to the current supplying circuit 411 as a current indication value 410a.

The switching signal 450a for switching the starting mode and the normal rotation mode is inputted into the micro controller 600. The switching signal 450a is at L level until the predetermined period passed and at H level after then as explained in the embodiment 27. The micro controller 600 initiates the register N, when the switching signal 450a becomes L level, and then set the value of register N to maximum.

Accordingly, the current indication value 410a is set to maximum value during the switching signal 450a is at L level, then a maximum current is supplied to the armature winding during a period of starting and restarting.

Embodiment 34

Figure 106:
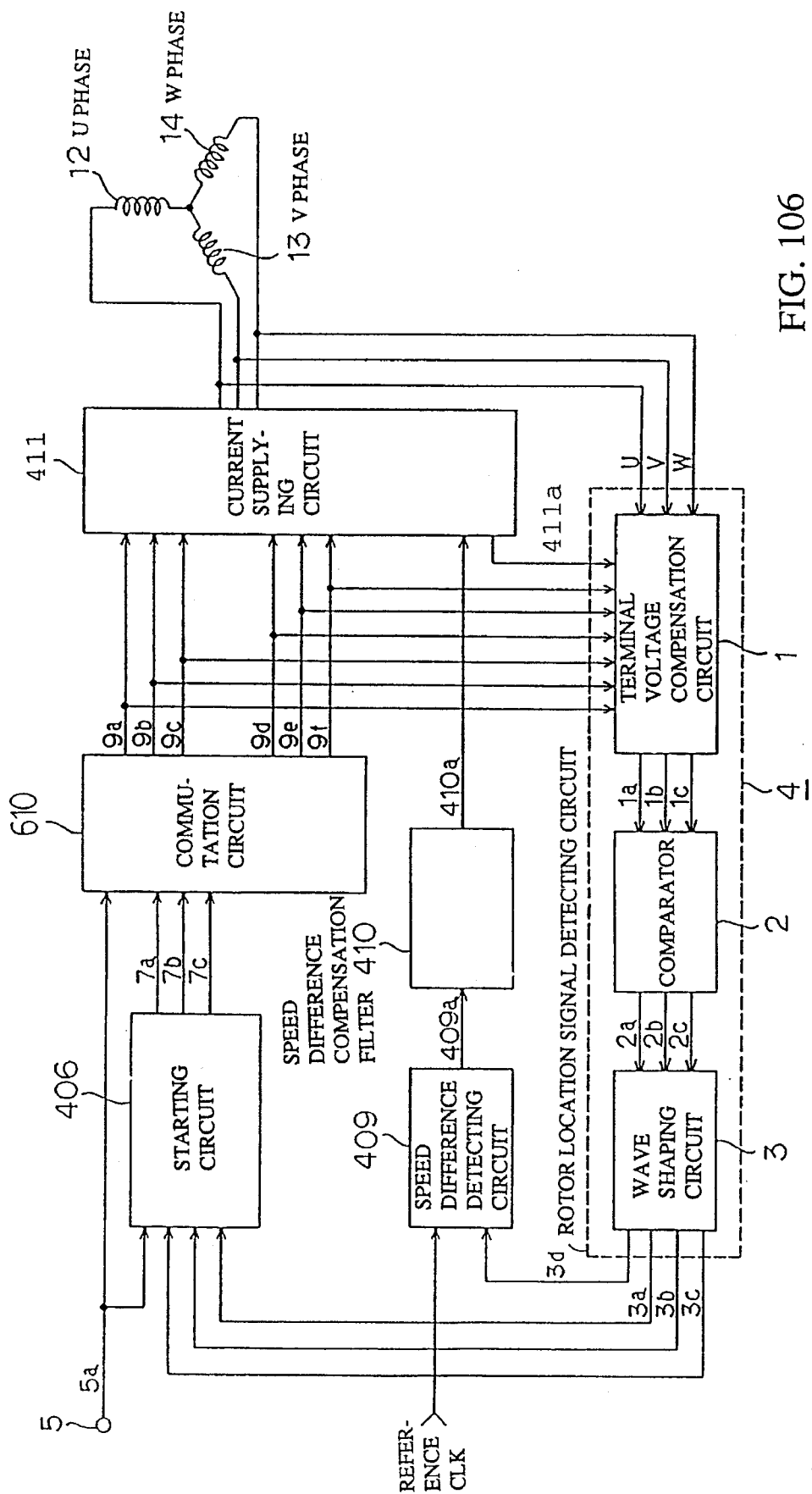
FIG. 106 is a block diagram of a thirty fourth embodiment of the present invention which shows a general construction a brushless motor driving device.

FIG. 106 is a block diagram of a thirty fourth embodiment of the present invention which shows a general construction a brushless motor driving device. In FIG. 106, the same elements as those in FIG. 78 are indicated by the same numerals.

The commutation circuit 9 explaining in embodiment 27 refers the count numbers 7a, 7b and 7c at starting, and refers the rotor location signals 3a, 3b and 3c at normal rotation mode and outputs driving signals 9a~9f. A commutation circuit 610 of this embodiment refers the count numbers 7a, 7b and 7c and outputs driving signals 9a~9f at both starting mode and normal rotation mode. The logical relationship between the count numbers 7a, 7b and 7c and the driving signals 9a~9f is similar to FIG. 27.

In this embodiment, another construction example of a pulse selection circuit is explained.

Figure 107:
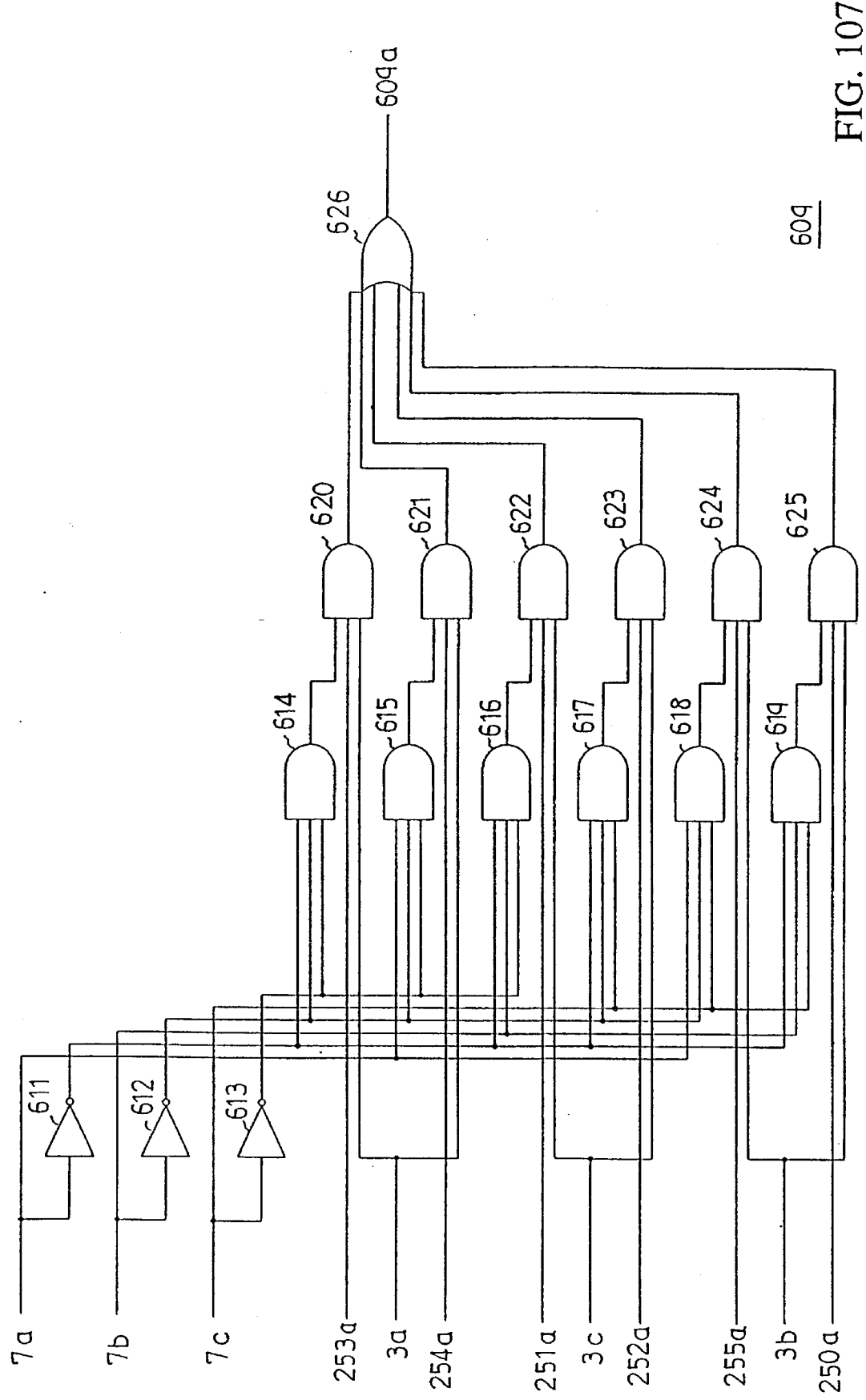
FIG. 107 shows a pulse selection circuit of embodiment 34.

FIG. 107 shows a concrete construction example of a pulse selection circuit 609 having another construction of a pulse selection circuit 256. In FIG. 107, the numerals 611–613 denotes inversion circuits, the numerals 614–625 denote three inputs AND circuits, the numeral 626 denotes six inputs OR circuit.

The operation of the pulse selection circuit 609 shown in this embodiment and the pulse selection circuit 256 shown in embodiments 8, 26 is compared below.

Figure 108:
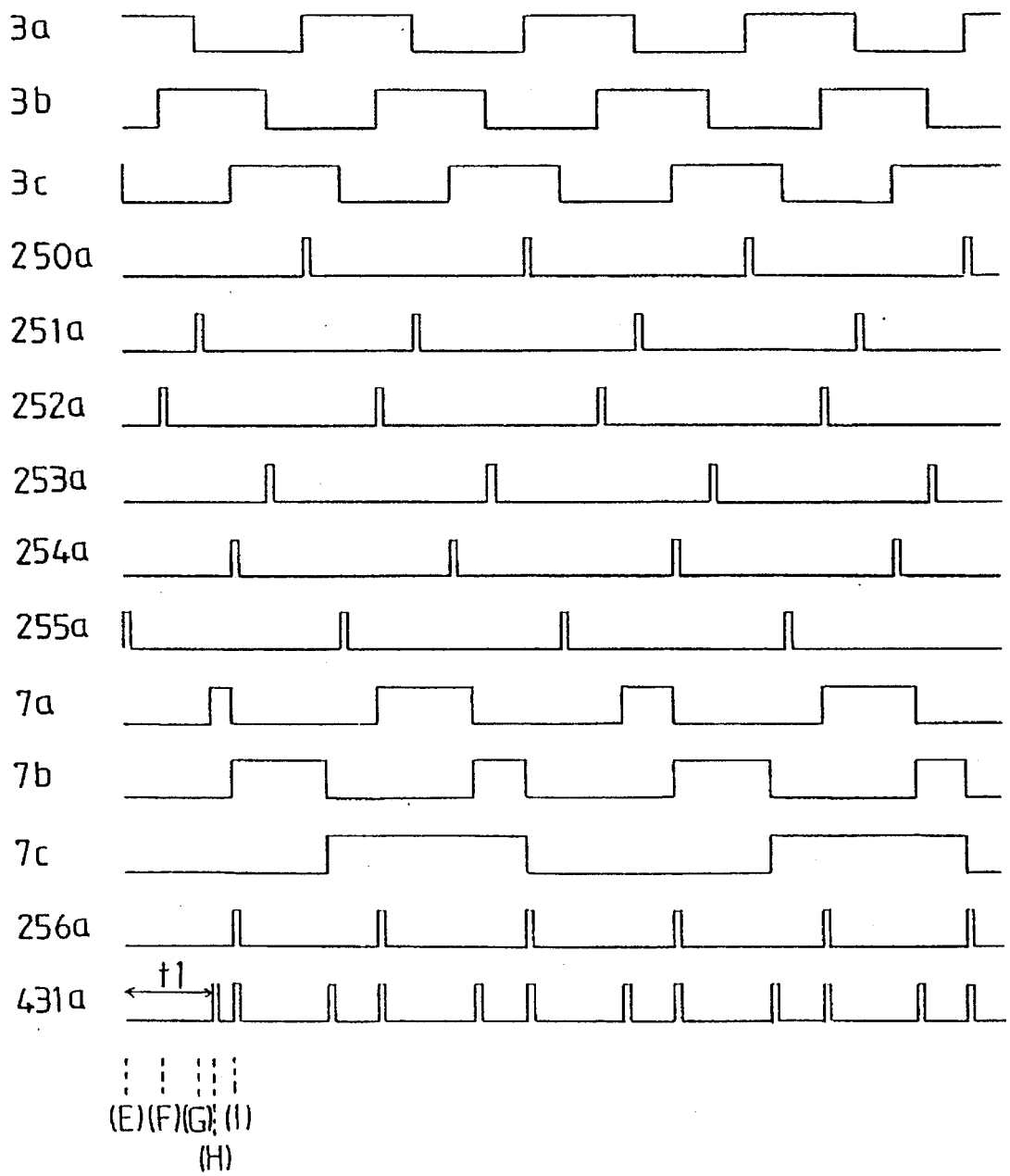
FIG. 108 is a timing chart which explains an operation of embodiment 34.

FIG. 108 shows a timing chart of the rotor location signals 3a, 3b and 3c, the rising and falling edge pulses 250a~255a, the count numbers 7a, 7b and 7c, the output signal 256a of the pulse selection circuit 256, the output signal 431a of the pseudo-pulse generating circuit 431 at reverse rotation of constant speed.

Figure 109:
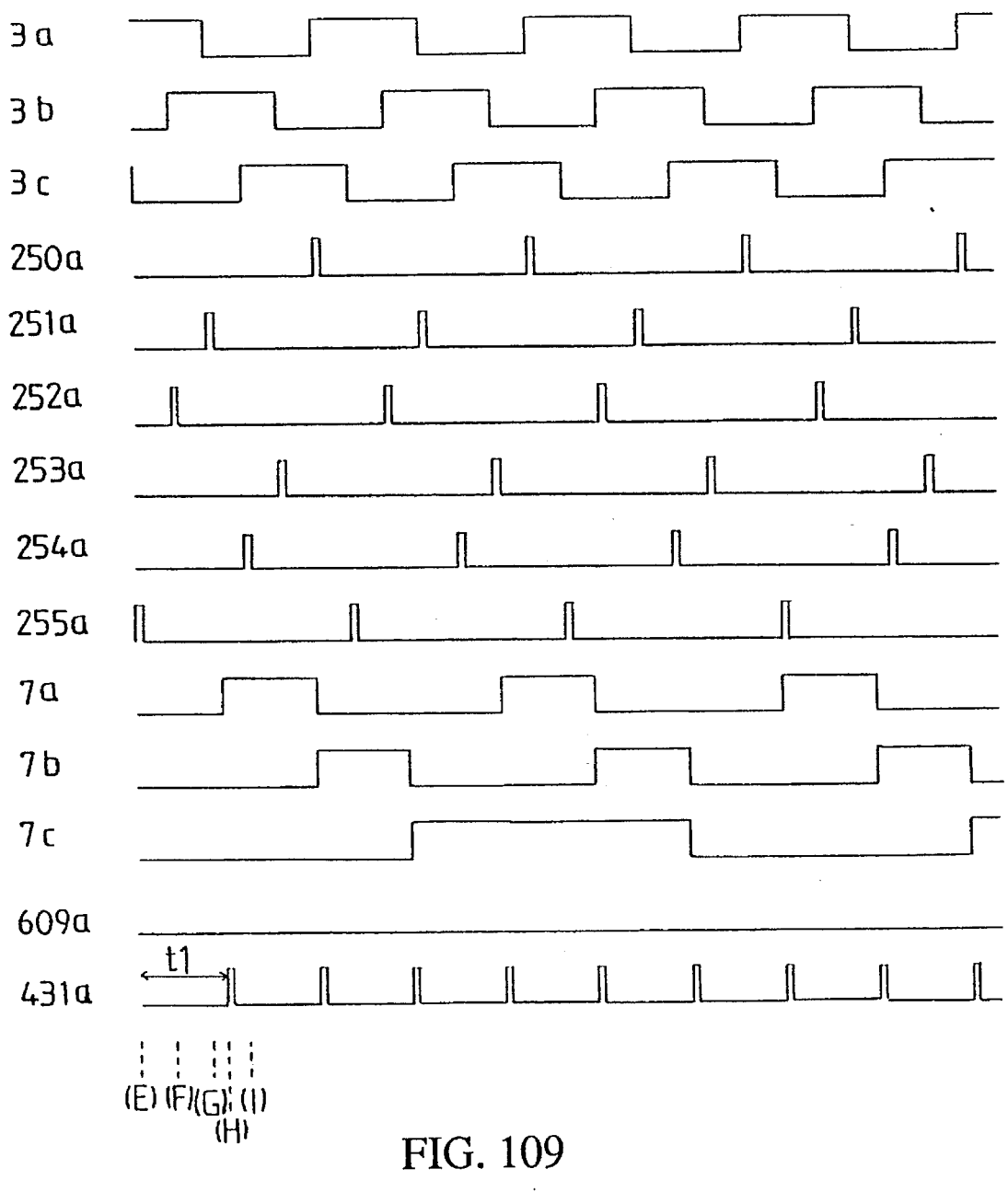
FIG. 109 is a timing chart which explains an operation of embodiment 34.

On the other hand, FIG. 109 shows a timing chart of the rotor location signals 3a, 3b and 3c, the rising and failing edge pulses 250a~255a, the count numbers 7a, 7b and 7c, the output signal 609a of the pulse selection circuit 609, the output signal 431a of the pseudo-pulse generating circuit 431 at reverse rotation of constant speed.

The pulse selection circuit 256 shown in embodiment 8, 26, outputs inputted edge pulses without changing then when the relation between the inputted edge pulse 250a~255a and the count numbers 7a, 7b and 7c satisfies a relation shown in FIG. 25, and masks the edge pulse when they do not satisfy the relation shown in FIG. 25.

The operation is explained using FIG. 108 and 109 below. Assume that the initial value of the count number is L-L-L. The edge pulses 255a, 252a and 251a are sequentially detected in (E), (F), (G) of FIG. 108, FIG. 109. Since the count numbers are L-L-L, the pulse selection circuit 256 masks the edges other than 253a. Accordingly, the edge pulses 255a, 252a and 251a detected at (E), (F), (G) are masked.

In the same way, these edge pulses are masked in the pulse selection circuit 609. Since there is no input to the pseudo-pulse generating circuit 431 after a predetermined time $t_1$ which is set in the pseudo-pulse generating circuit 431 is passed, the pseudo-pulse generating circuit 431 generates a pseudo-pulse as shown in (H). The hexa counter 257 is counted up by this pseudo-pulse, and therefore the count number becomes H-L-L. Edge pulse 254a is detected in (I) in the figure. Since count numbers are H-L-L, the edge pulse 254a detected at (I) in the figure is outputted without masked at the selection circuit 256. As described above, the pulse selection circuit 256 can not mask completely the edge pulses 250a~255a at a reverse rotation.

On the other hand, in the present pulse selection circuit 609, since the rotor location signal 3a is L at (I) in the figure, the edge pulse 254a detected at (I) in the figure is masked. As described above, the pulse selection circuit 609 of this embodiment selects edge pulses according to a logical combination of the rotor location signals 3a, 3b and 3c in addition to a combination of the count number and inputted edge pulses. Therefore, as shown in FIG. 109, it is possible to mask completely the edge pulses 250a–255a at reverse rotation.

Embodiment 35

Next, an example for reducing noise using trapezoidal shaped rotor driving signal is explained.

Figure 110:
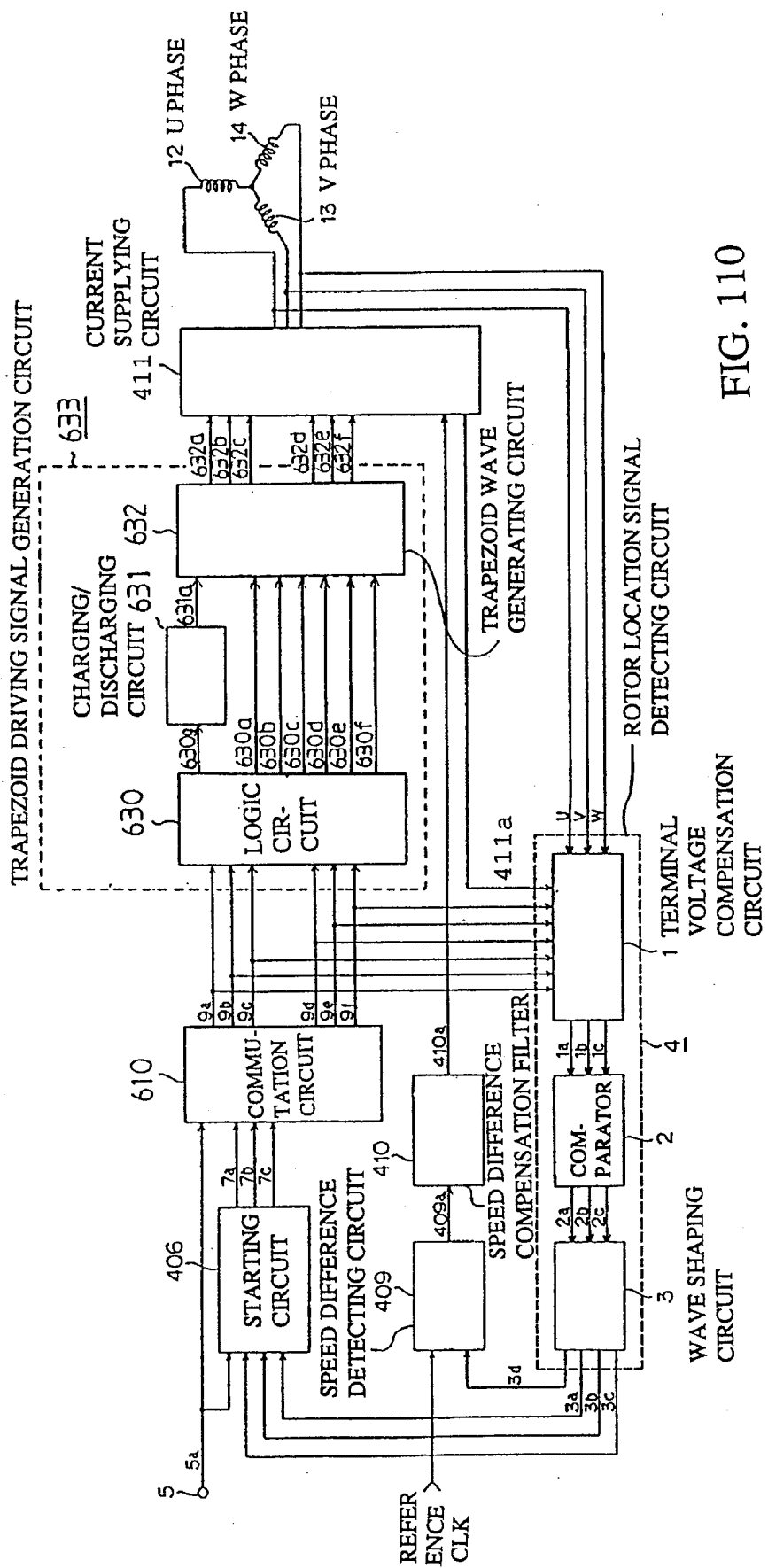
FIG. 110 is a block diagram of a thirty fifth embodiment of the present invention which shows a general construction a brushless motor driving device.

FIG. 110 is a block diagram of a thirty fifth embodiment of the present invention which shows a general construction a brushless motor driving device. In FIG. 110, the same elements as those in FIG. 106 are indicated by the same numerals.

The numeral 630 denotes a logic circuit for outputting a plurality of logic signals 630a–630g which are necessary to compose a trapezoid shaped driving signal, the numeral 631 is a charging/discharging circuit for charging and discharging to/from capacitor 632 according to an output signal 630g from the logic circuit, the numeral 632 denotes a trapezoid wave combination circuit for composing trapezoid shaped driving signals 632a–632f from output signals 631a of the charging/discharging circuit and an output signal 630a–630f of the logic circuit.

The trapezoid driving signal generating circuit 633 is constituted by the logic circuit 630, the charging/discharging circuit 631, the trapezoid wave combination circuit 632.

Figure 111:
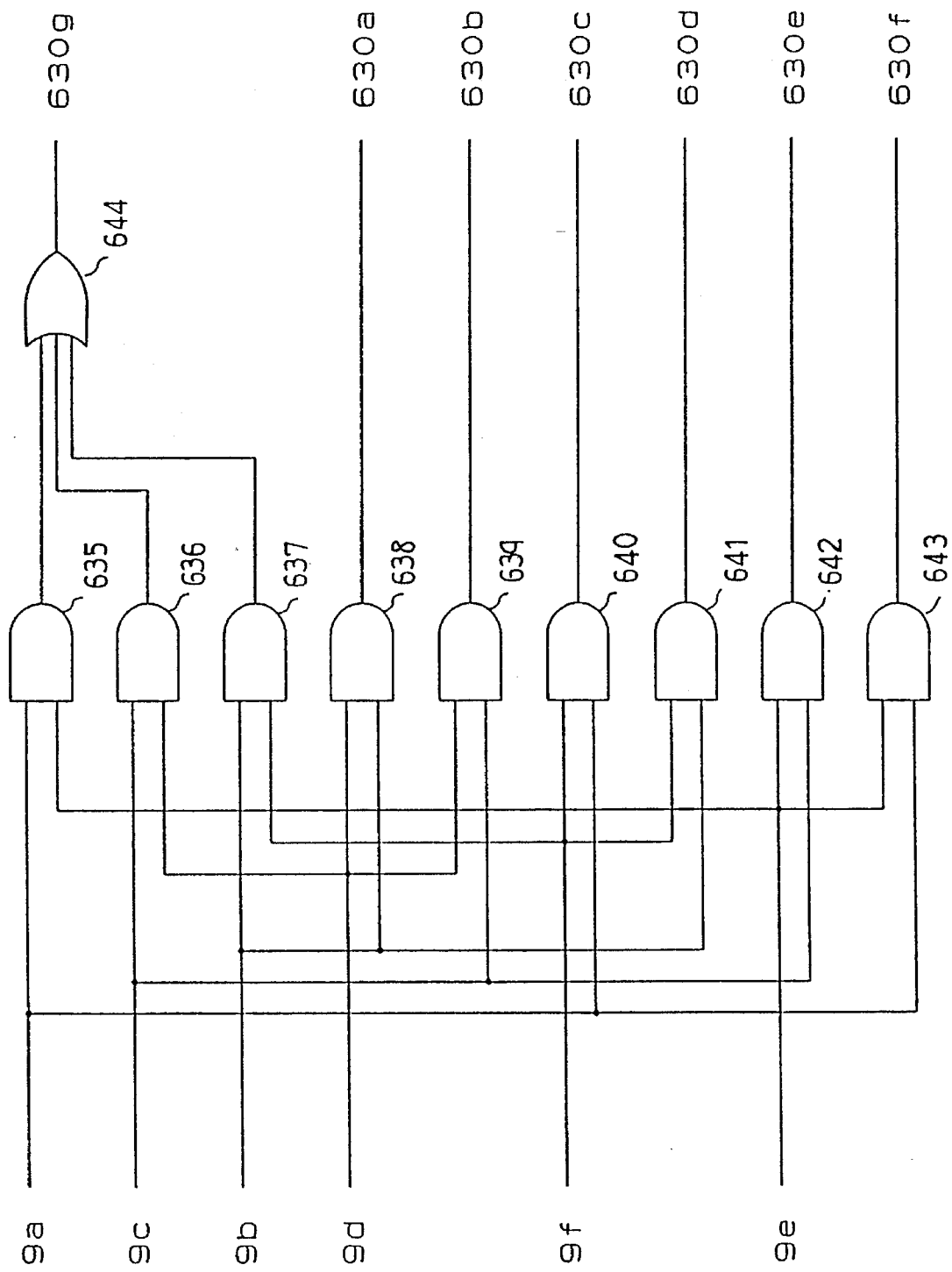
FIG. 111 shows a logic circuit in trapezoid driving signal generating circuit.
Figure 113:
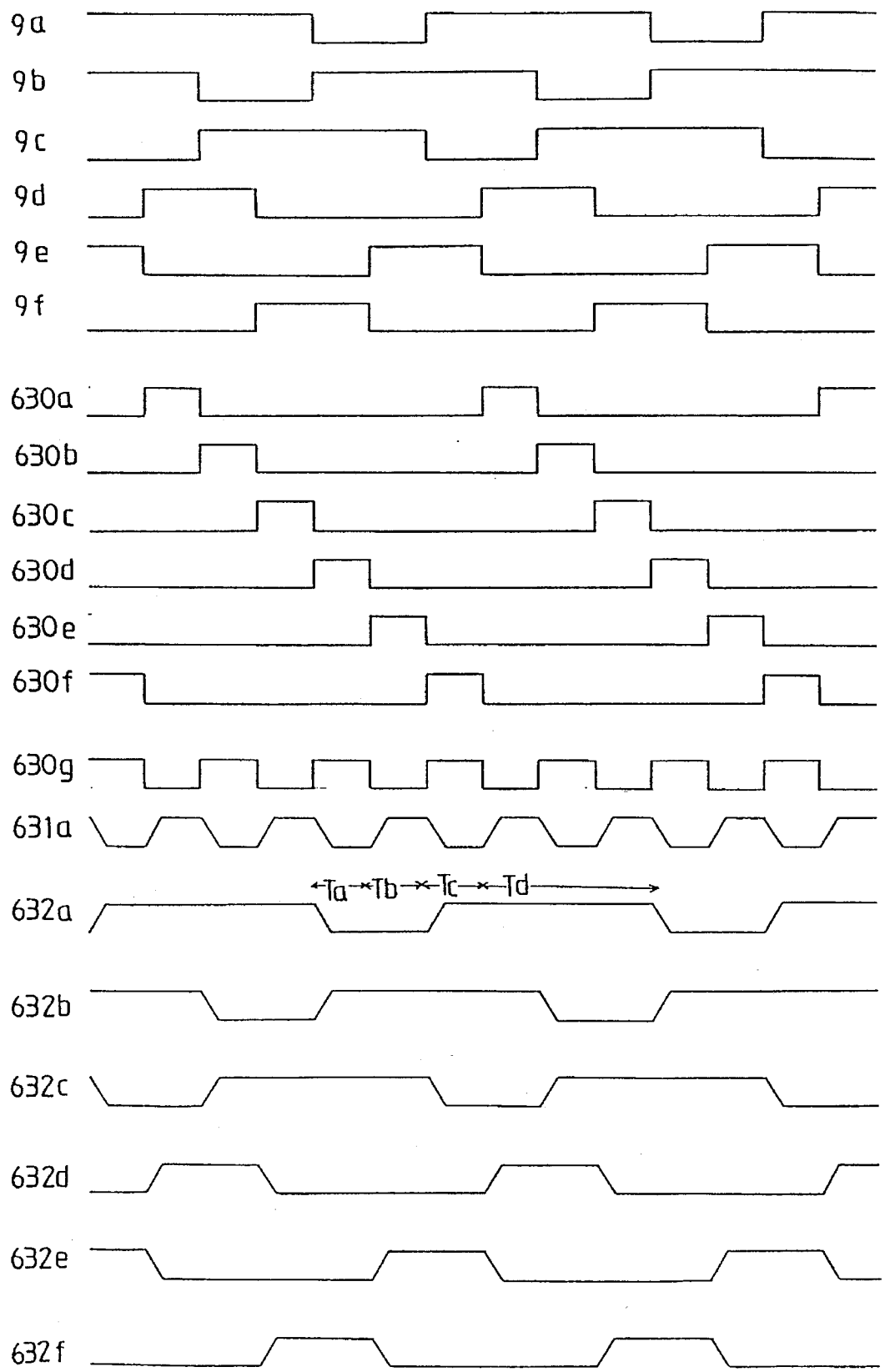
FIG. 113 is a timing chart which explains an operation of embodiment 35.

FIG. 111 shows a concrete logic circuit in trapezoid driving signal generating circuit 630. In FIG. 111, the numerals 635–643 denote an AND circuit, the numeral 644 denotes three input OR circuit. The operating waveform of the output signal 630a–630g of the logic circuit 630 is shown in FIG. 113.

Figure 112:
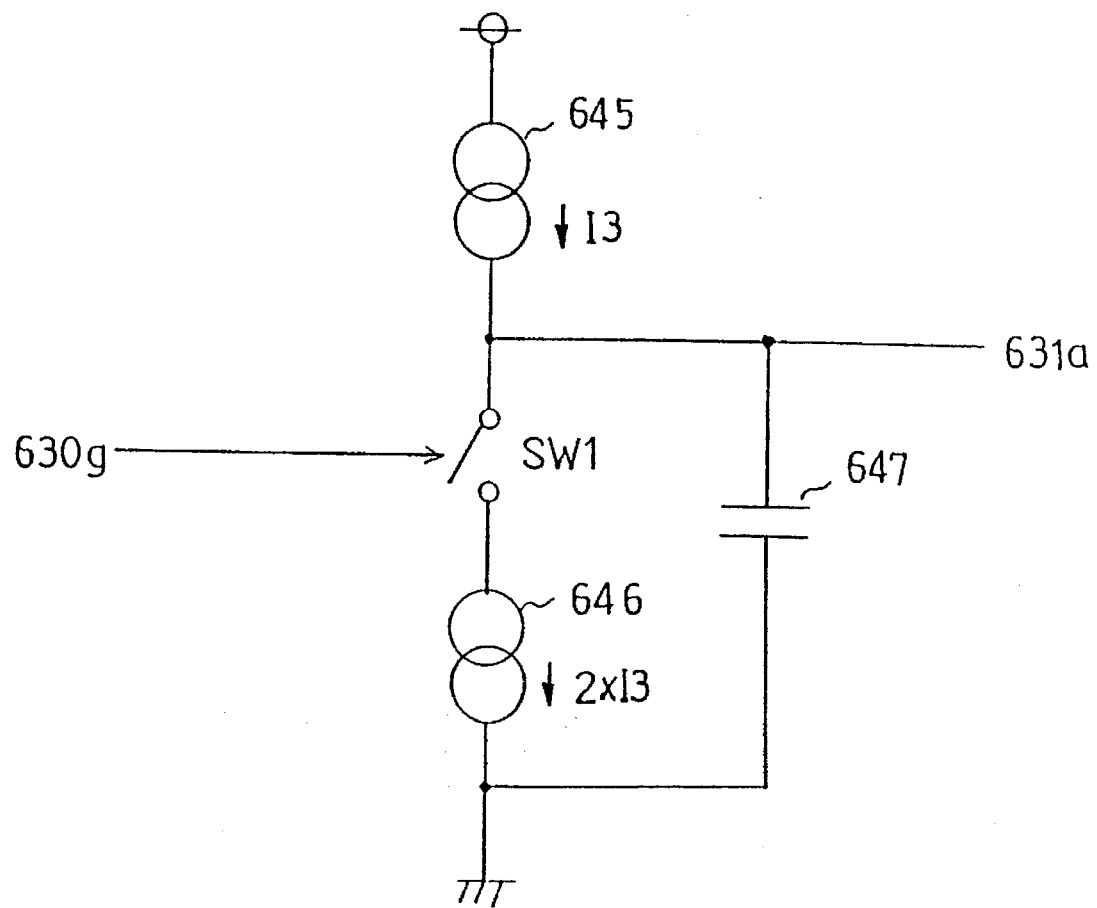
FIG. 112 shows a construction of charging and discharging circuit of the embodiment 35.

FIG. 112 shows a concrete construction of charging and discharging circuit 631. In FIG. 112, the numerals 645, 646 are constant current source, the numeral 647 denotes a capacitor. SW1 turns ON when the output signal 630g of the logic circuit 630 is at H level, and turns OFF when the output signal 630g of the logic circuit 630 is at L level.

An operation of charging/discharging circuit 631 is explained below. When the output signal 630g of logic circuit is at L level, SW1 turns OFF, and the capacitor 647 is charged by the constant current I3. On the other hand, the output signal 630g of logic circuit is at H level, SW1 turns ON, and the capacitor 647 is discharged by the constant current I3. Therefore, the output signal 631a of the charging/discharging circuit 631 becomes a trapezoid shaped signal as shown in FIG. 113.

The output signal 631a of charging/discharging circuit 631, the output signals 630a–630f of the logic circuit 630 are inputted into the trapezoid wave combination circuit 632.

Figure 114:
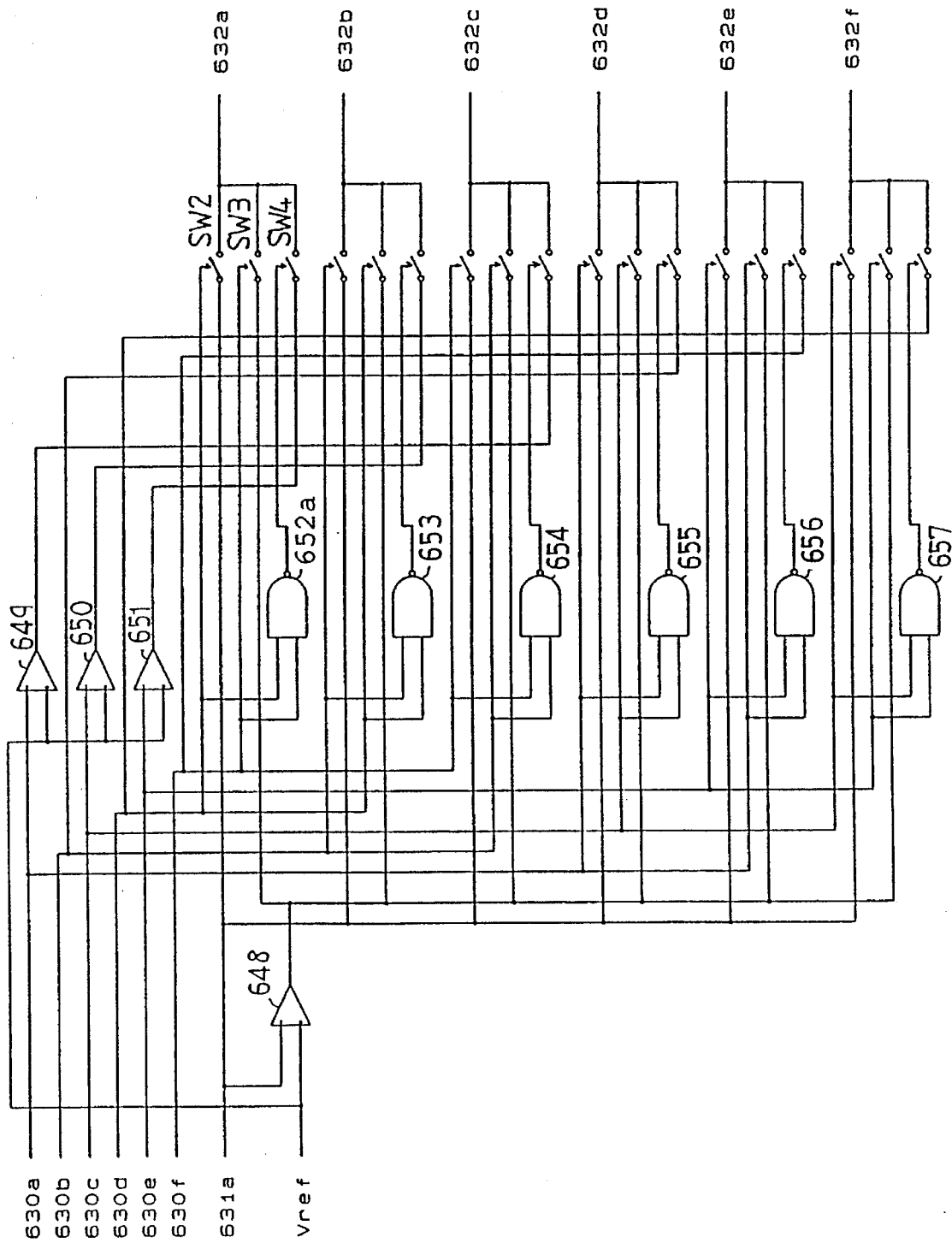
FIG. 114 shows a construction of trapezoid wave combination circuit in driving signal generating circuit.

FIG. 114 shows a concrete construction of trapezoid wave combination circuit 632. In FIG. 114, the numerals 648–651 denotes inverted amplifier circuits, the numerals 652–657 denote NAND circuits. Assume that an operation voltage range of an output signal 631a of the charging/discharging circuit 631 and output signals 630a–630f of the logic circuit 630 are the same, and Vref is the center voltage of operation voltage range.

The output signal and 631a of the charging/discharging circuit 631 is inputted into a inverted input terminal of the inverted amplifier circuit 648, and the reference voltage Vref is inputted into the non-inverted input terminal to obtain a trapezoidal wave which is an inverted output signal 631a against the reference voltage Vref. In the same way, the inverted amplifier circuits 649, 650 and 651 obtain a inverted signal by inverting each 630a, 630c and 630e signal against the reference voltage Vref.

An concrete operation of the trapezoidal wave combination circuit 632 is explained. Here, portions for composing the trapezoid driving signal 632a here are mainly explained. SW2, SW3 and SW4 turn ON when each 630d, 630f, 652a is at H level, and turn OFF when at L level. The numeral number 652a is an output signal of the NAND circuit 652. During the period Ta shown in FIG. 113, since 630d is at H level, 630f is at L level, 652a is at L level, only SW2 turns ON, the trapezoid driving signal 632a becomes an output the signal 631a of the charging and discharging circuit 631. During the period Tb, since 630d is at L level, 630f is at L level, 652a is at H level, only SW4 turns ON, and the trapezoid driving signal 632a becomes an inverted signal of 630e against Vref. During the period Tc, since 630d is at L level, 630f is at H level, 652a is at L level, only SW3 turns ON, and the trapezoid driving signal 632a becomes an inverted signal of 631a against Vref. During the period Td, since 630d is at L level, 630f is at L level, 652a is at H level, only SW4 turns ON, and the trapezoid driving signal 632a becomes an inverted signal of 630e against Vref. As described above, the trapezoid driving signal 632a is composed.

The trapezoid driving signals 632b–632f are composed in a similar step. In this way, the trapezoid driving signal generating circuit 633 generates trapezoid driving signals 632a–632f, rising and falling gradient potions of which begin from the rising and falling edge point of the driving signals 9a–9f.

Embodiment 36

In this embodiment, a driving circuit for brushless motor which changes gradient time of the trapezoid driving signals 632a–632f corresponding to the indicated rotation speed inputted from outside.

Figure 115:
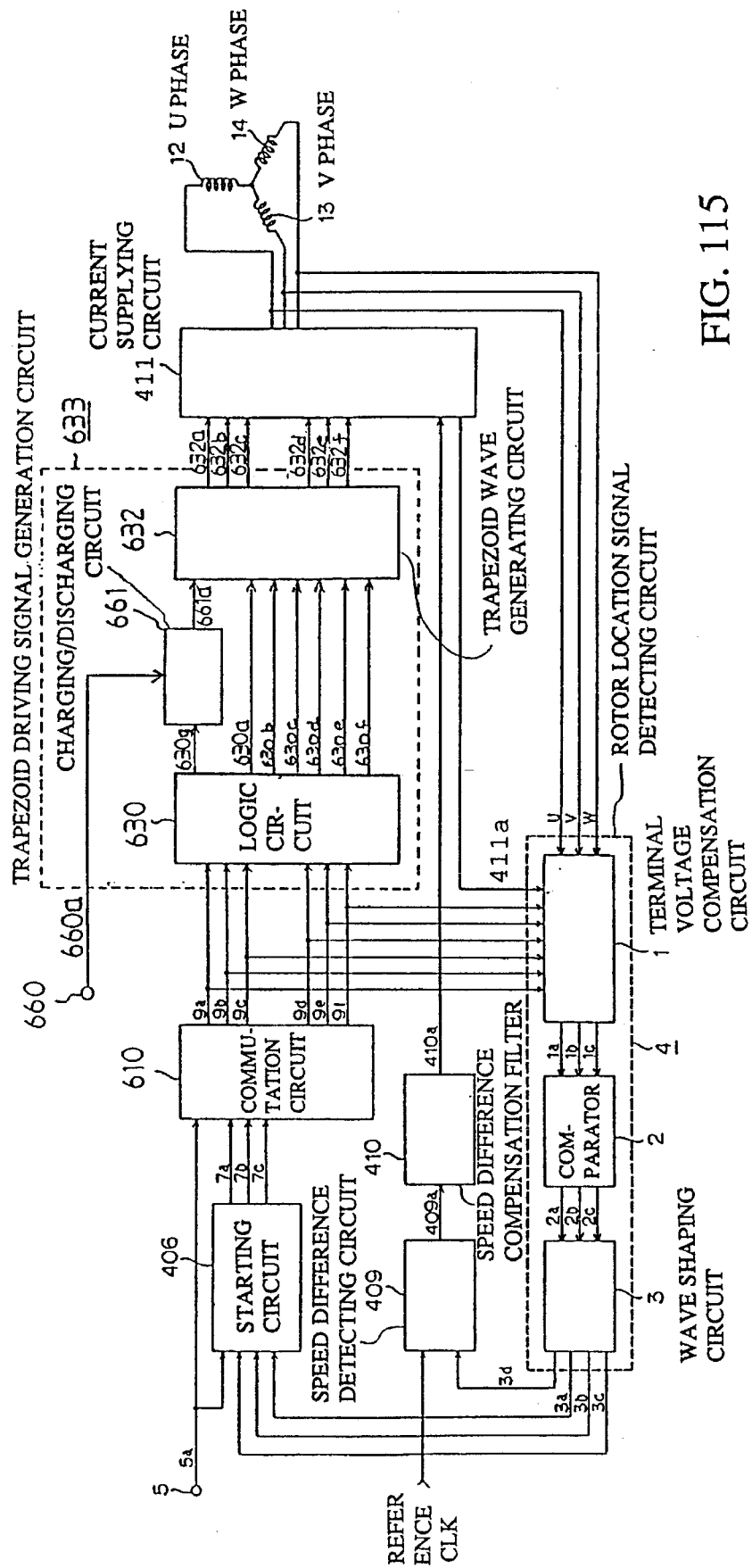
FIG. 115 is a block diagram of a thirty sixth embodiment of the present invention which shows a general construction a brushless motor driving device.

FIG. 115 is a block diagram of a thirty sixth embodiment of the present invention which shows a general construction a brushless motor driving device. In FIG. 115, the same elements as those in FIG. 110 are indicated by the same numerals. In FIG. 115, the numeral 660 denotes a terminal where a mode switching signal 660a is inputted, the numeral 661 denotes another charging and discharging circuit which is different from the charging and discharging circuit 631. The mode switching signal 660a is a binary signal which polarity changes corresponding to the indicated rotation speed and is inputted from outside of the brushless motor driving circuit.

Figure 116:
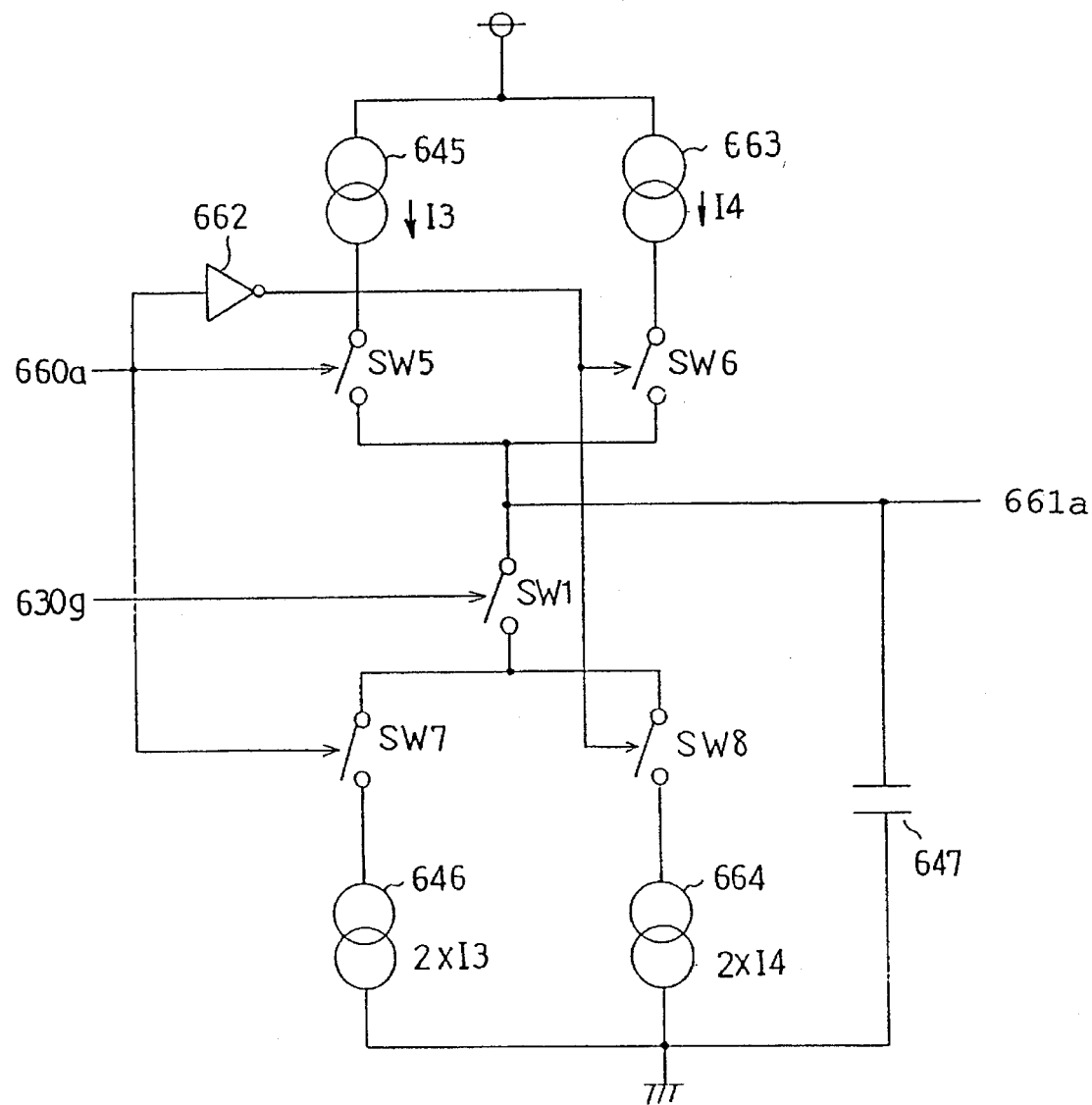
FIG. 116 shows a construction of charging and discharging circuit of the embodiment 36.

FIG. 116 shows a concrete construction of charging and discharging circuit 661. In FIG. 116, the numeral 662 is an inverted circuit, the numerals 663, 664 is constant current source. SW5, SW7 turns ON when the mode switching signal 660a is at H level, and turns OFF when the mode switching signal 660a is at L level. SW6, SW8 turns ON when the mode switching signal 660a is at L level, and turns OFF when the mode switching signal 660a is at H level.

Next, an operation of charging and discharging circuit 661 is explained when the mode switching signal 660a is at H level. When the output signal 630g of the logic circuit is at L level, SW1 turns OFF and the capacitor 647 is charged by the constant current I3. On the other hand, when the output signal 630g of the logic circuit is at H level, SW1 turns ON and the capacitor 647 is discharged by the constant current I3. The relation between the output signal 630g of the logic circuit 630 and the output signal 661a of the charging and discharging circuit 661 is shown at H level of 632a in FIG. 117.

When the mode switching signal 660a is at L level, the capacitor 647 is charged through the constant current I4 when the output signal 630g of the logic circuit is at L level and the capacitor 647 is discharged through the constant current I4 when the output signal 630g of the logic circuit is at H level.

Figure 117:
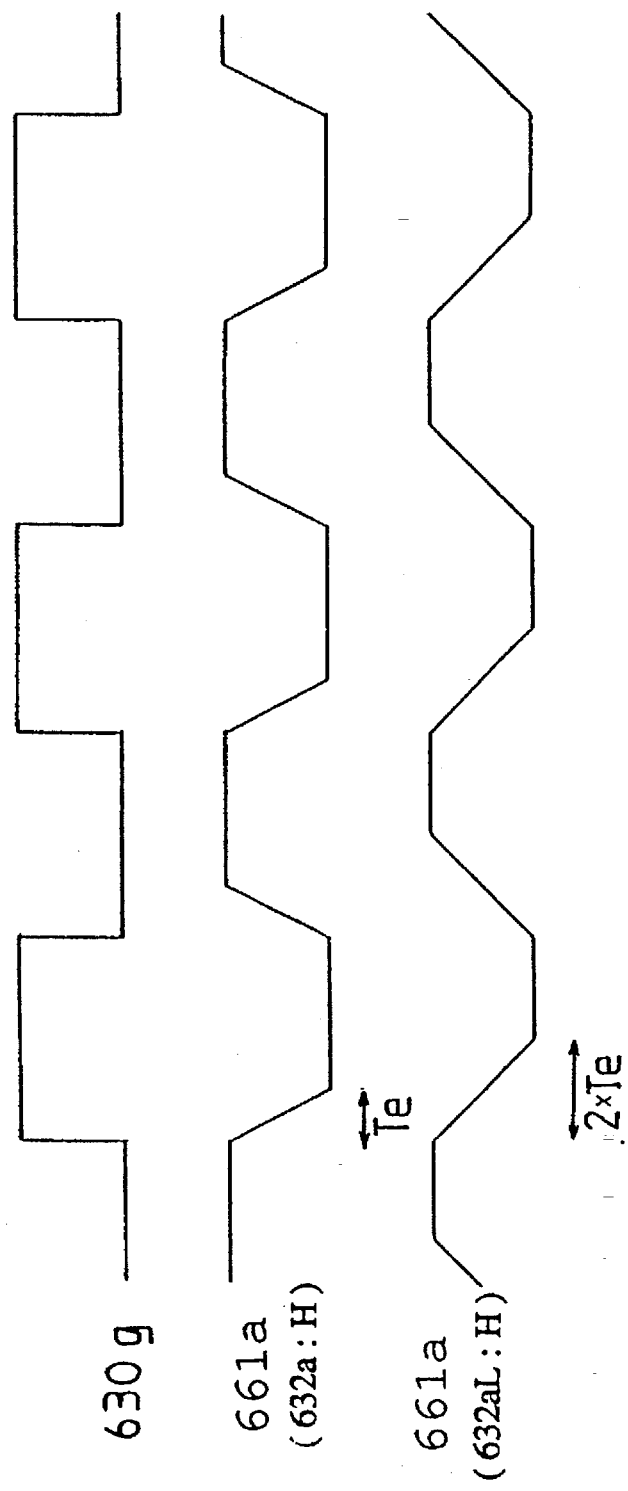
FIG. 117 shows a signal wave which explains an operation of embodiment 36.

When I4 is set such as I4=0.5×I3, the output signal 661a of the charging and discharging circuit 661 is shown at L level of 632a in FIG. 117, the gradient time of trapezoidal wave becomes twice. The output signal 661a of the charging and discharging circuit 661 is inputted into trapezoid wave combination circuit 632 which output trapezoid driving signals 632a~632f as described in the manner of embodiment 35. When the mode switching signal 660a is switched according to the indicated rotation speed, it is possible to change gradient time of the trapezoid driving signals 632a~632f corresponding to the indicated rotation speed inputted from outside.

Embodiment 37

The rising and falling gradient potions of trapezoid driving signals 632a~632f generated in the trapezoid driving signal generating circuit 633 begin from the rising and falling edge point of the driving signals 9a~9f. Accordingly, the switching point of the driving current delays from the ideal commutating timing, therefore, torque generation efficiency decreases. In this embodiment, a construction and operation of brushless motor driving circuit in which the phase of rotor location signal detected from each phase terminal voltage or the inter-terminal voltage differences of respective phases is put in a leading phase against the gradient time of the trapezoid driving signal is explained.

Figure 118:
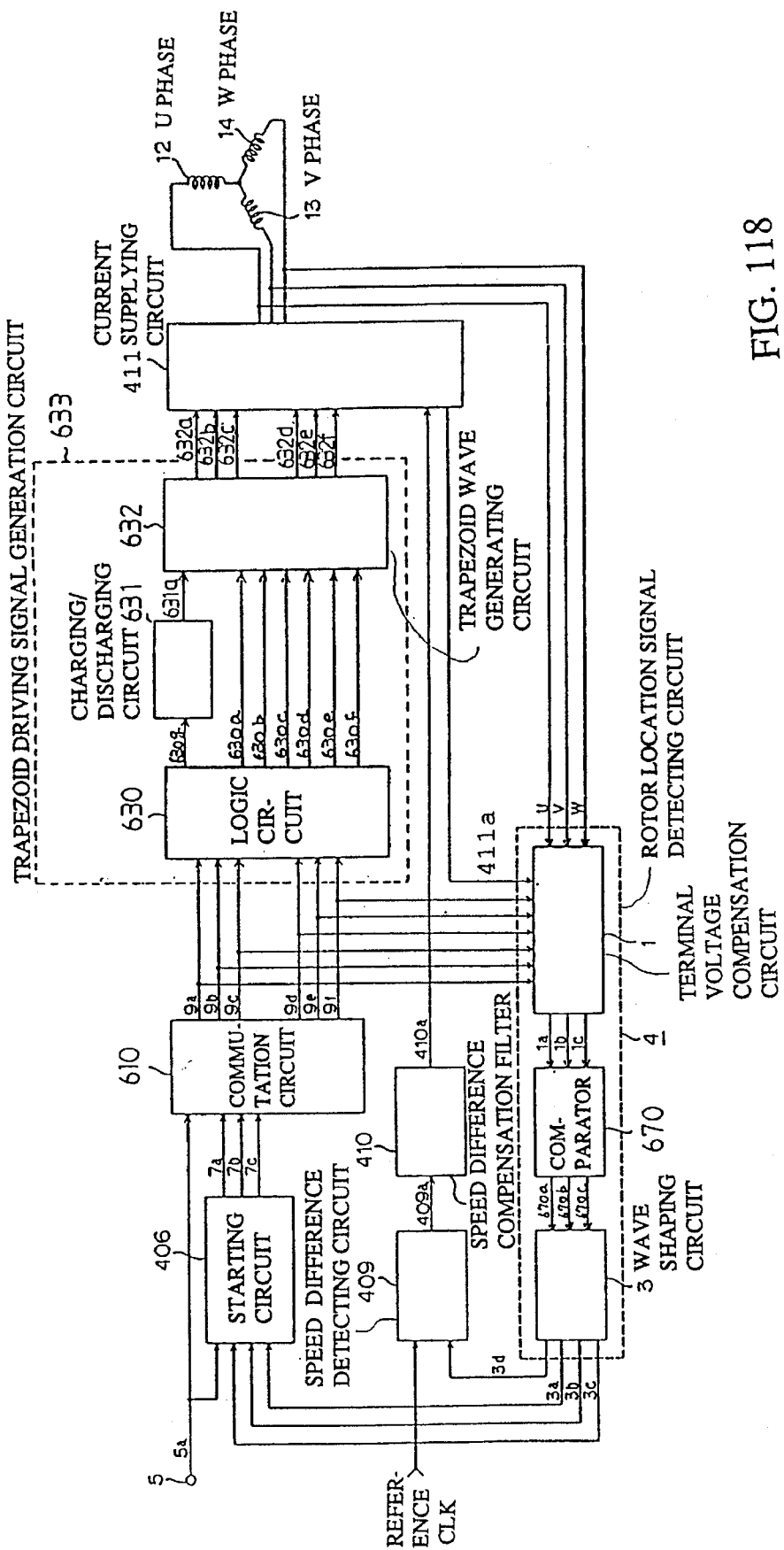
FIG. 118 is a block diagram of a thirty seventh embodiment of the present invention which shows a general construction a brushless motor driving device.

FIG. 118 is a block diagram of a thirty seventh embodiment of the present invention which shows a general construction a brushless motor driving device. In FIG. 118, the same elements as those in FIG. 110 are indicated by the same numerals. In FIG. 118, the numeral 670 denotes another new comparator which is different from the comparator 2 in FIG. 110.

Figure 119:
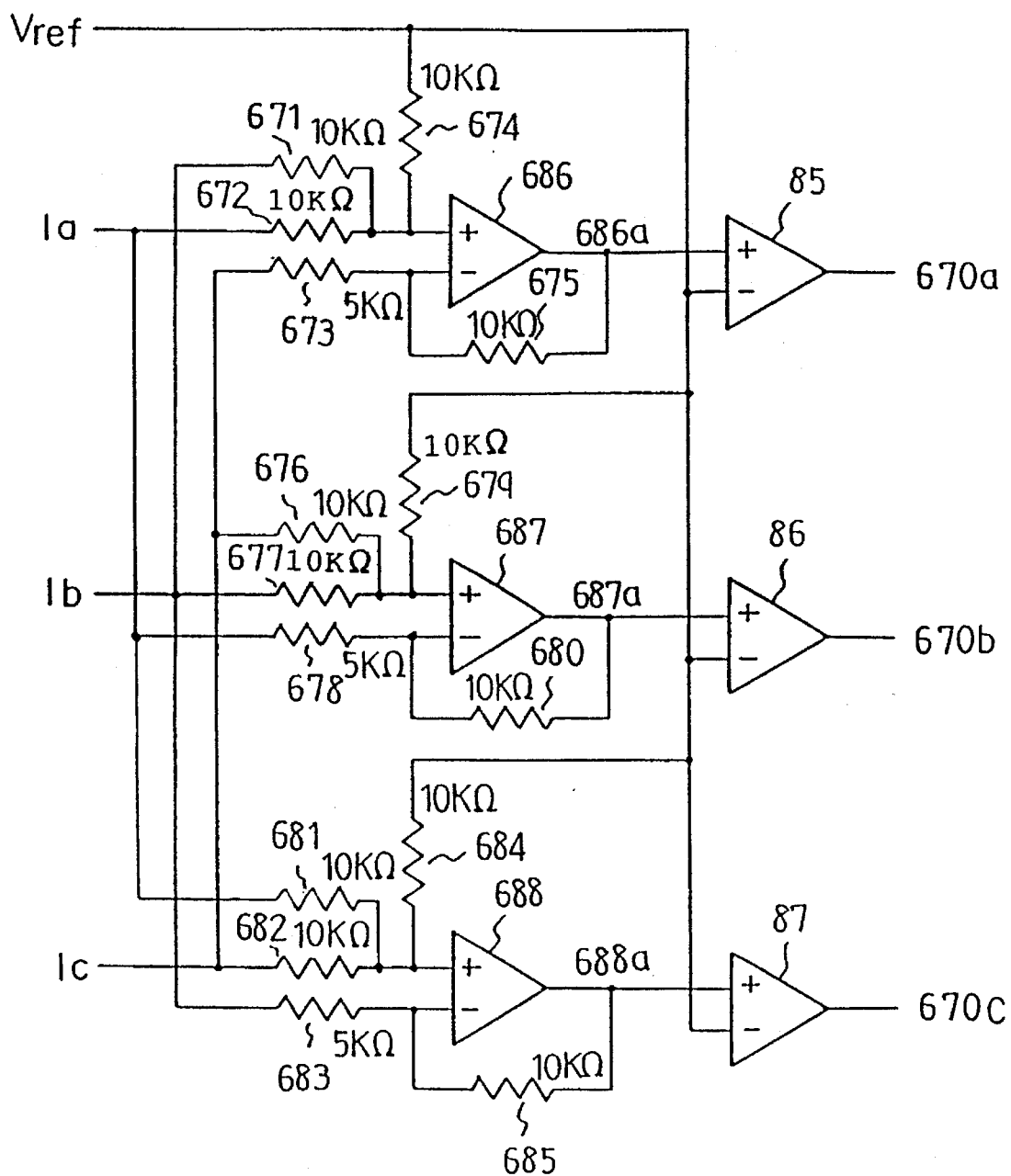
FIG. 119 shows a construction of comparator of the embodiment 37.
Figure 120:
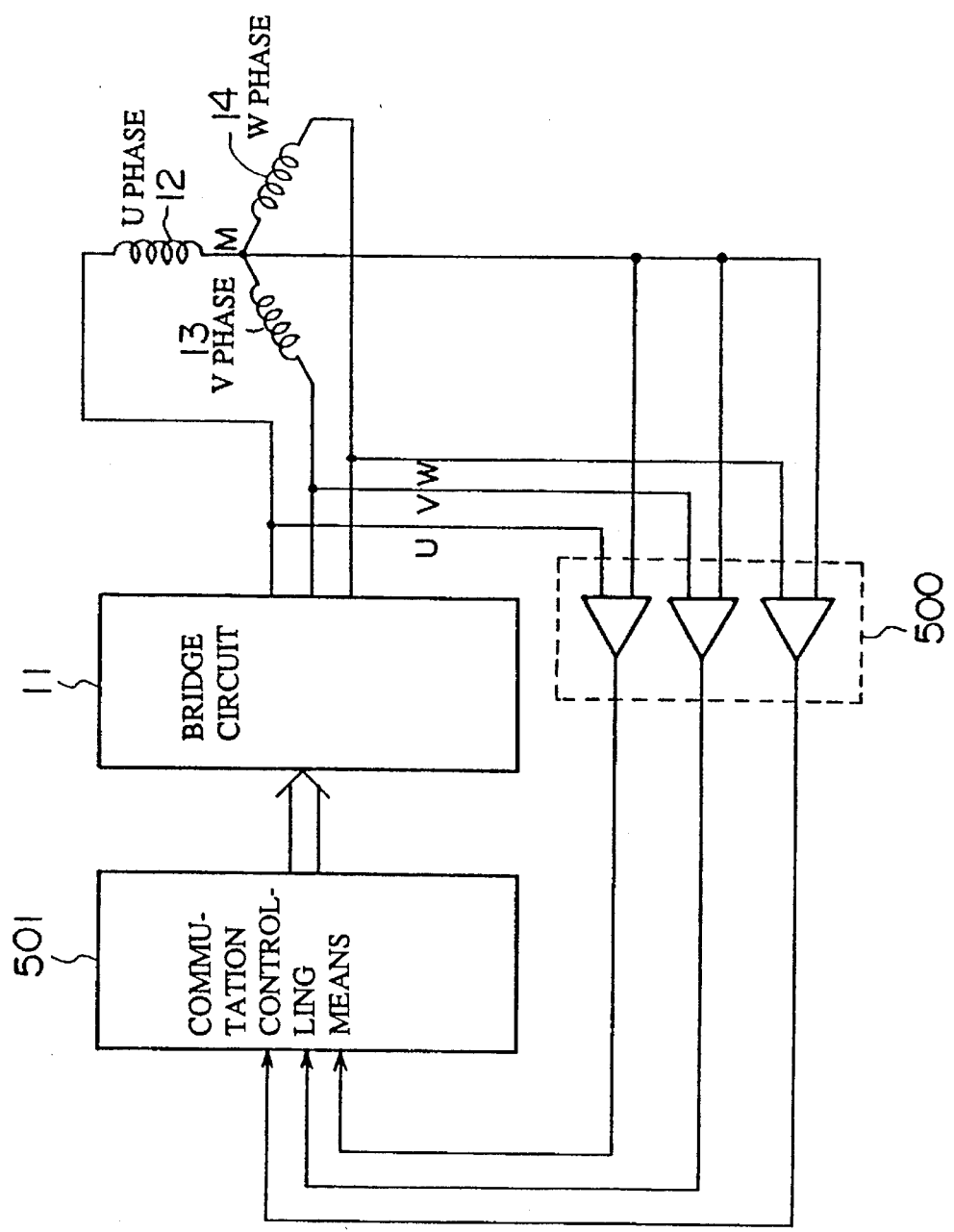
Figure 122:
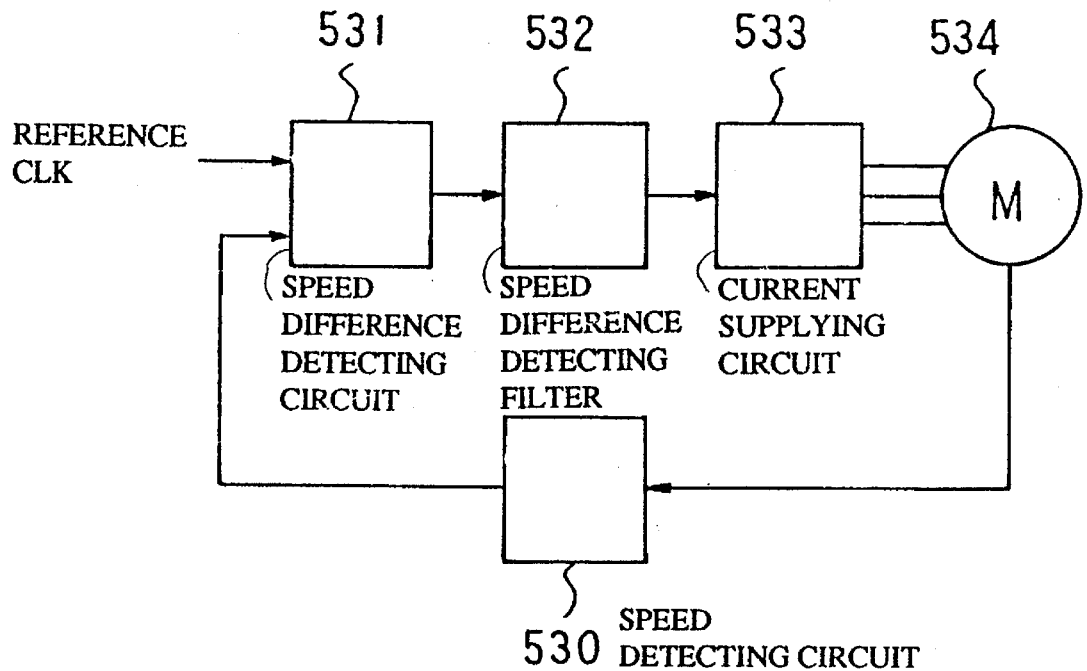

FIG. 119 shows a concrete construction of comparator 670. In FIG. 119, the numerals 671–685 denotes resistors, the numerals 686~688 denote differential amplifier circuit.

An concrete operation of the comparator 670 is explained below. For one example, assume that the resistance values of the resistors 671~685 are set as shown in FIG. 119. At this time, the output signal 686a of the differential amplifier circuit 686 becomes 1a+1b−2×1c, the output signal 687a of the differential amplifier circuit 687 becomes 1b+1c−2×1a and the output signal 688a of the differential amplifier circuit 688 becomes 1c+1a−2×1b.

Now, 1a, 1b and 1c are three signals each of which are shifted by 2π/3, the output signal 686a, 687a and 688a of the differential amplifier circuits 686, 687 and 688 are obtained by equations (11), (12) and (13). The output signal 686a, 687a and 688a of the differential amplifier circuits 686, 687 and 688 are compared with Vref at each comparator 85, 86 and 87 and obtained logic signals 670a, 670b and 670c.

$$1a = \sin\theta \quad (10)$$
$$1b = \sin(\theta + 2\pi/3)$$
$$1c = \sin(\theta - 2\pi/3)$$

$$686a = \sin\theta + \sin(\theta + 2\pi/3) - 2\times\sin(\theta - 2\pi/3) = 3\times\sin(\theta + \pi/3) \quad (11)$$

$$687a = \sin(\theta + 2\pi/3) + \sin(\theta - 2\pi/3) - 2\times\sin\theta = 3\times\sin(\theta + \pi) \quad (12)$$

$$688a = \sin(\theta - 2\pi/3) + \sin\theta - 2\times\sin(\theta + 2\pi/3) = 3\times\sin(\theta - \pi/3) \quad (13)$$

Here, a concrete operation of the comparator 2 is explained once again. For one example, assume that the resistance values of all resistors 70–81 are set to 10 KΩ as shown in FIG. 110.

At this time, the output signal 82a of the differential amplifier circuit 82 becomes 1a−1c, the output signal 83a of the differential amplifier circuit 83 becomes 1b−1a and the output signal 84a of the differential amplifier circuit 84 becomes 1c−1b and the above outputs are obtained by equations (14), (15) and (16), respectively.

The output signal 82a, 83a and 84a of the differential amplifier circuits 82, 83 and 84 are compared with Vref at each comparator 85, 86 and 87 and obtained logic signals 2a, 2b and 2c.

$$82a = \sin\theta - \sin(\theta - 2\pi/3) \quad (14)$$
$$= \sqrt{3} \times \sin(\theta + \pi/6)$$

$$83a = \sin(\theta + 2\pi/3) - \sin\theta \quad (15)$$
$$= \sqrt{3} \times \sin(\theta + 5\pi/6)$$

$$84a = \sin(\theta - 2\pi/3) - \sin(\theta + 2\pi/3) \quad (16)$$
$$= \sqrt{3} \times \sin(q - \pi/2)$$

The output signal 686a, 687a and 688a of the differential amplifier circuits 686, 687 and 688 are leading by π/6 against the output signal 82a, 83a and 84a of the differential amplifier circuits 82, 83 and 84. Accordingly, the comparator 670 obtains logic signals 670a, 670b, 670c which is leading by π/6 against the logic signal 2a, 2b and 2c obtained from the comparator 2.

In this embodiment, the resistance value of the resistors 671~685 are set such as shown in FIG. 119, it is possible to change the resistance value of the resistors 671~685 to get another leading phase. As described above, it is possible to coincide the current switching point with the ideal commutation timing by leading the phase of rotor location signal.

In this embodiments, a circuit using a charging/discharging circuit is used for the trapezoid driving signal generation circuit but it is possible to use a charging/discharging circuit 661.

In this specification, the embodiments 1~37 are separated each other, but it is apparent that the same effect can be obtained even if these embodiments are combined.

What is claimed is:

1. A brushless motor driving circuit for driving a plurality of armature windings of a brushless motor, comprising:

a plurality of the terminal voltage detectors, each being coupled to a respective one of the plurality of armature windings so that the plurality of terminal voltage detectors provide a plurality of terminal voltages corresponding to the plurality of armature windings;

a terminal voltage compensation circuit having a plurality of inputs, each of the plurality of inputs receiving a respective one of the plurality of terminal voltages, the terminal voltage compensation circuit modifying at least one of the plurality of terminal voltages by a compensation value to generate a plurality of compensated terminal voltages, said compensation value being determined by a winding current of the brushless motor; and a comparator having inputs that receive the plurality of compensated terminal voltages, the comparator comparing the plurality of compensated voltages with one another to generate a rotor location signal;

said armature windings being driven by said rotor location signal generated by said comparator.

2. A brushless motor driving circuit for driving a plurality of the armature windings of a brushless motor, comprising:

a plurality of the terminal voltage detectors, each being coupled to a respective one of the plurality of armature windings so that the plurality of terminal voltage detectors provide a plurality of terminal voltages corresponding to the plurality of armature windings;

a terminal voltage difference compensation circuit having a plurality of inputs, each of the plurality of inputs receiving a respective one of the plurality of terminal voltages, the terminal voltage difference compensation circuit generating a plurality of voltage differences between respective terminal voltages and modifying at least one of the plurality of voltage differences to generate a plurality of compensated voltage differences; and a comparator having inputs that receive the plurality of compensated terminal voltage differences, the comparator comparing the plurality of compensated voltage differences with one another to generate a rotor location signal;

said armature windings being driven by said rotor location signal generated by said comparator.

3. The brushless motor driving circuit of claim 1 or 2 further comprising:

a rising and falling signal detection means for detecting a rising and falling signal of the rotor location signal to generate a detected speed signal.

4. The brushless motor driving circuit of claim 1 wherein a plurality of driving signals are applied, in response to the rotor location signal, to a bridge circuit that is coupled to the brushless motor for exciting and driving the armature windings.

5. The brushless motor driving circuit of claim 2 wherein a plurality of driving signals are applied, in response to the rotor location signal, to a bridge circuit that is coupled to the brushless motor for exciting and driving the armature windings.

6. The brushless motor driving circuit of claim 1 further comprising:

an actual current detection resistance connected serially to a bridge circuit for exciting the armature windings, so that a current flowing through the bridge circuit also flows through the actual current detection resistance;

the current flowing in the detection resistor being applied to the terminal voltage compensation circuit as the winding current.

7. The brushless motor driving circuit of claim 2 further comprising:

an actual current detection resistance connected serially to a bridge circuit for exciting the armature windings, so that a current flowing through the bridge circuit also flows through the actual current detection resistance;

the current flowing in the detection resistor being applied to the terminal voltage difference compensation circuit as the winding current.

8. A brushless motor driving circuit for driving a plurality of the armature windings of a brushless motor, comprising:

a plurality of the terminal voltages detection means located at every phase of the armature windings;

a terminal voltage compensation means for adding or subtracting a compensation value to/from the terminal voltage of an armature windings detected at respective phases during actual driving period, said compensation value is determined by a resistor of said armature winding and a winding current;

a comparator means for comparing respective terminal voltages after compensation has carried out to obtain a rotor location signal;

a differentiation circuit for detecting a rising and falling edge of comparison signal of the terminal voltages and a voltage differences between respective phases; and a latch circuit for latching the comparison signal at the timing when the edge is detected in the differentiation circuit;

said armature windings of respective phases are driven as a rotor location signal by combining said output signals of latch circuit.

9. A brushless motor driving circuit comprising:

a rotor location signal generation means for detecting a rotor location signal of the brushless motor from the terminal voltages or a voltage differences between respective phases;

a counter for detecting edges of the rotor location signal and for counting the edges to provide an output count signal;

a pulse generating circuit, an input of which is connected to the output of the counter, for counting up the counter when the input is not obtained for a predetermined period;

a switching means for switching the armature windings of respective phases in response to the counter output during a starting period; and a timer or a rotor speed signal detection means;

an output count signal of said counter being applied to the armature winding at starting for driving the rotor of the brushless motor;

said switching means switching the armature windings as the starting or restarting period is completed when all following conditions are satisfied, that is, when a setting time of the timer expires, when a detected speed signal reaches a predetermined value, when a counter output reaches a predetermined value, when a detected the rotor location signal reaches a predetermined combined value, when a driving signals supplied to the respective armature winding reaches a predetermined combined value.

10. A brushless motor driving circuit comprising:

a rotor location signal generation means for detecting a rotor location signal of the brushless motor from the terminal voltages or a voltage differences between respective phases;

a counter for detecting edges of the rotor location signal and for counting the edges to provide an output count signal;

a pulse generating circuit, an input of which is connected to the output of the counter, for counting up the counter when the input is not obtained for a predetermined period;

a normal rotation detecting means for monitoring motor rotation by combining the rotor location signal with the counter output count signal;

a switching means for switching the armature windings of respective phases in response to the counter output during a starting period; and a timer or a rotor speed signal detection means;

said switching means switching the armature windings as the starting or restarting period is completed when all following conditions are satisfied, that is, when a setting time of the timer expires, when a detected speed signal reaches a predetermined value, when a counter output reaches a predetermined value, when a detected the rotor location signal reaches a predetermined combined value, when a driving signals supplied to the respective armature winding reaches a predetermined combined value;

said normal rotation detecting means generating a restart pulse for restarting the motor so that the output of the counter is applied to the armature windings for driving the rotor of the brushless motor during abnormal rotation.

11. The brushless motor driving circuit of claim 9 or 10 further comprising:

a switching means for switching the armature windings of respective phases in response to the counter output during a starting period; and a timer;

the switching means switching a starting period according the timer output.

12. The brushless motor driving circuit of claim 9 or 10 further comprising:

a switching means for switching the armature windings of respective phases in response to the counter output during a starting period;

said switching means switching the armature windings when a counter output reaches a predetermined value as the starting period is completed.

13. The brushless motor driving circuit of claim 9 or 10 further comprising:

a switching means for switching the armature windings of respective phases in response to the counter output during a starting period; and a rotor speed signal detection means;

said switching means switching the armature windings when a detected speed signal reaches a predetermined value as the starting period is completed.

14. The brushless motor driving circuit of claim 9 or 10 further comprising:

a switching means for switching the armature windings of respective phases in response to the counter output during a starting period;

said switching means switching the armature windings when a detected rotor location signal reaches a predetermined combined value as the starting period is completed.

15. The brushless motor driving circuit of claim 9 or 10 further comprising:

a switching means for switching the armature windings of respective phases in response to the counter output during a starting period; and said switching means switching the armature windings when driving signals supplied to the respective armature winding reaches a predetermined combined value as the starting period is completed.

16. A brushless motor driving circuit comprising:

a rotor location signal generation means for detecting a rotor location signal of the brushless motor from the terminal voltages or a voltage differences between respective phases;

a counter for detecting edges of the rotor location signal and for counting the edges to provide an output count signal;

a pulse generating circuit, an input of which is connected to the output of the counter, for counting up the counter when the input is not obtained for a predetermined period; and an output count signal of said counter being applied to the armature winding at starting for driving the rotor of the brushless motor;

wherein the counter outputs a restart pulse to make the rotor start as an abnormal rotation when the rotor location signal at the input has not changed for a predetermined period and counts up the counter forcefully.

17. A brushless motor driving circuit comprising:

a rotor location signal generation means for detecting a rotor location signal of the brushless motor from the terminal voltages or a voltage differences between respective phases;

a counter for detecting edges of the rotor location signal and for counting the edges to provide an output count signal;

a pulse generating circuit, an input of which is connected to the output of the counter, for counting up the counter when the input is not obtained for a predetermined period;

an output count signal of said counter being applied to the armature winding at starting for driving the rotor of the brushless motor;

a location detector for detecting a location deviated by electrical angle $\pi/6$ against the rotor location signal which is detected from the terminal voltages or the voltage difference between respective phases;

a hold circuit for outputting a selection signal defined by an output of the location detector and a starting indication signal;

said counter determining a combination of the driving signals to be supplied to the armature of respective phases in response to said selection signal.

18. A brushless motor driving circuit comprising:

a rotor location signal generation means for detecting a rotor location signal of the brushless motor from the terminal voltages or a voltage differences between respective phases;

a counter for detecting edges of the rotor location signal and for counting the edges to provide an output count signal;

a pulse generating circuit, an input of which is connected to the output of the counter, for counting up the counter when the input is not obtained for a predetermined period;

an output count signal of said counter being applied to the armature winding at starting for driving the rotor of the brushless motor;

a location detector for detecting a location deviated by electrical angle $\pi/6$ against the rotor location signal which is detected from the terminal voltages or the voltage difference between respective phases;

a hold circuit for outputting a selection signal defined by an output of the location detector and a starting indication signal; and an output of the location detector is used as a driving signals supplied to armature of respective phases using said selection signal after starting;

said counter determining a combination of the driving signals to be supplied to the armature of respective phases in response to said selection signal after starting.

19. The brushless motor driving circuit of claim 1 or 2 further comprising:

a differentiation circuit for detecting an edge of a comparison signal generated from the plurality of terminal voltages; and a timer that begins to count in response to the detected edge and that stops counting after a predetermined period; and a latch circuit for latching each of the comparison signals to provide a plurality of latched signals when the detected edge is detected in the differentiation circuit and for releasing the plurality of latched signals when the timer has stopped counting;

said armature windings of respective phases being driven in response to a rotor location signal generated by logically combining said plurality of latched signals.

20. The brushless motor driving circuit of claim 19 wherein the predetermined period is switched according to the indicated rotation speed to the armature.

21. A brushless motor driving circuit for driving a motor having a plurality of phase windings, the brushless motor driving circuit comprising:

a rotor location signal generation means for generating a rotor location signal from a plurality of terminal voltages corresponding to the plurality of phase windings;

a pulse generating means for detecting edges of the rotor location signal to provide a series of edge detection signals and for generating an output pulse train, the output pulse train being generated from the series of edge detection signals when a predetermined number of edges are detected during a predetermined amount of time, the output pulse train being a pseudo-pulse train when the predetermined number of edges are not detected during a predetermined amount of time;

a counter for counting an output of the pulse generation means;

a normal rotation detection means for outputting an abnormal rotation signal when the rotor location signal and the output pulse train do not have a predetermined relationship; and a restart pulse generating means for masking the abnormal rotation signal outputted from the abnormal rotation detection means during a predetermine period after starting and restarting and for outputting a restart pulse according to the abnormal rotation signal after the predetermined period;

an output of the counter being applied to the armature winding for driving the rotor of the brushless motor at starting and during the predetermined period set by the restart pulse at restarting.

22. A brushless motor driving circuit for driving a motor having a plurality of phase windings, the brushless motor driving circuit comprising:

a rotor location signal generation means for generating a rotor location signal from a plurality of terminal voltages corresponding to the plurality of phase windings;

a pulse generating means for detecting edges of the rotor location signal to provide a series of edge detection signals and for generating an output pulse train, the output pulse train being generated from the series of edge detection signals when a predetermined number of edges are detected during a predetermined amount of time, the output pulse train being a pseudo-pulse train when the predetermined number of edges are not detected during a predetermined amount of time;

a counter for counting an output of the pulse generation means;

a normal rotation detection means for outputting an abnormal rotation signal when the rotor location signal and the output pulse train do not have a predetermined relationship; and a restart pulse generating means for masking the abnormal rotation signal outputted from the abnormal rotation detection means during a predetermine period after starting and restarting and for outputting a restart pulse according to the abnormal rotation signal after the predetermined period;

a switching means for switching the armature windings of respective phases according to a value of the counter at starting or restarting and according to the rotor location signal during a steady period after starting or restarting; and a timer;

an output of the counter being applied to the armature winding for driving the rotor of the brushless motor at starting and during the predetermined period set by the restart pulse at restarting;

the switching means switches a starting or restarting period according the timer output.

23. A brushless motor driving circuit comprising:

a speed detection means for detecting a detected actual rotation speed of a rotor of the brushless motor;

a speed difference detecting means for outputting a difference between the detected actual rotation speed of the rotor and a target rotation speed as a speed difference signal; and a speed difference compensation filter comprising:

a proportion—integration (P/I) filter connected in parallel with a first first order delay filter to form a parallel circuit, the input of parallel circuit being the speed difference signal, the outputs of the parallel circuit being added to form a summation signal; and a second first order delay filter having an input that receives the summation signal and an output that is supplied to armature windings of the brushless motor as a current indication value.

24. A brushless motor detector circuit comprising:

a speed detection means for detecting a detected actual rotation speed of a rotor of the brushless motor;

a speed difference detecting means for outputting a difference between the detected actual rotation speed of the rotor and a target rotation speed as a speed difference signal; and a speed difference compensation filter comprising:

a serial circuit including a proportion—integration (P/I) filter and a first first order delay filter coupled in serial to form a serial circuit, the input of the serial circuit being the speed difference signal, the serial circuit having an output; and a second first order delay filter having an input that receives the output of the serial circuit and an output that is supplied to the armature windings of the brushless motor as a current indication value.

25. A brushless motor driving circuit comprising:

a speed detection means for detecting a detected actual rotation speed of a rotor of the brushless motor;

a speed difference detecting means for outputting a difference between the detected actual rotation speed of the rotor and a target rotation speed as a speed difference signal; and a speed difference compensation filter for obtaining a current indication value from the detected speed difference signal which is supplied to the armature windings, the speed difference compensation filter receiving having an adjustable gain;

said target rotation speed of the speed difference detecting means and the adjustable gain of the speed difference compensation filter being changed in response to a selection signal, the selection signal being supplied to the brushless motor driving circuit.

26. A brushless motor driving circuit comprising:

a rotor location detection means for detecting a relative location of armature windings of the brushless motor with respect to a rotor of the brushless motor;

a commutation control means for switching a current to the armature windings at respective detected rotor locations;

a speed detecting means for detecting an actual rotor speed;

a speed difference detecting means for outputting a difference between the actual rotor speed and a target rotation speed as a speed difference signal; and a speed difference compensation filter for obtaining a current indication value from the speed difference signal to drive the armature winding;

said commutation control means switching the current in response to the current indication value after a predetermined period.

27. The brushless motor driving circuit of any one of the claims 1–2, 4–10, 16–18, 21–26 wherein a maximum current is supplied to the armature windings during a period of starting and restarting.

28. The brushless motor driving circuit for driving a motor having a plurality of phase windings, the brushless motor circuit comprising:

a rotor location signal generation means for generating a rotor location signal from a plurality of phase terminal voltages corresponding to the plurality of phase windings;

a pulse generation means for detecting edges of the rotor location signal to provide a series of edge detection signals and for generating an output pulse train, the output pulse train being generated from the series of edge detection signals when a predetermined number of edges are detected during a predetermined amount of time, the output pulse train being a pseudo-pulse train when the predetermined number of edges are not detected for a predetermined amount of time; and a counter for counting pulses of the output pulse train generated by the pulse generation means, to provide a counter output;

the counter output being supplied to drive the armature winding.

29. A brushless motor driving circuit for driving a plurality of the armature windings of a brushless motor, comprising;

a plurality of the terminal voltages detection means located at every phase of the armature windings;

a terminal voltage compensation means for adding or subtracting a compensation value to/from the terminal voltage of an armature windings detected at respective phases during actual driving period, said compensation value is determined by a resistor of said armature winding and a winding current;

a comparator means for comparing respective terminal voltages after compensation has carried out to obtain a rotor location signal;

a commutation circuit for obtaining an armature winding driving signal from a rotor location signal detected in the rotor location signal detection means which includes a compensation means for compensating each terminal voltage or voltage differences of respective phases and a comparing means for comparing each terminal voltage or voltage differences between respective phases; and a trapezoid driving signal generation circuit for forming a trapezoid driving signal from the output of the commutation circuit;

said armature windings are driven by said rotor location signal detected at said comparator means;

the trapezoid driving signal is supplied to drive the armature winding.

30. The brushless motor driving circuit of claim 29 further comprising:

a charging/discharging circuit in the trapezoid driving signal generating circuit for changing the gradient of the trapezoid driving signal by changing the time constant of the charging/discharging circuit using a control signal inputted from outside.

31. The brushless motor driving circuit of claim 29 further comprising:

a phase leading circuit for leading a phase of the rotor location signal, the leading quantity of the phase leading circuit is set to substantially ½ of the gradient time of the trapezoid driving signal for driving the armature winding.

32. A brushless motor driving circuit for driving a plurality of the armature windings of a brushless motor, comprising:

a plurality of the terminal voltages detection means located at every phase of the armature windings;

a terminal voltage difference compensation means between respective phases for adding or subtracting a compensation value to/from the terminal voltage difference of respective phases detected between the armature windings during actual driving period, said compensation value is determined by a resistor of said armature winding and a winding current;

a comparator means for comparing respective terminal voltage difference between respective phases after compensation has carried out to obtain a rotor location signal;

a differentiation circuit for detecting a rising and falling edge of comparison signal of the terminal voltages and a voltage differences between respective phases; and a latch circuit for latching the comparison signal at the timing when the edge is detected in the differentiation circuit;

said armature windings of respective phases are driven as a rotor location signal by combining said output signals of latch circuit.

33. A brushless motor driving circuit for driving a plurality of the armature windings of a brushless motor, comprising:

a plurality of the terminal voltages detection means located at every phase of the armature windings;

a terminal voltage difference compensation means between respective phases for adding or subtracting a compensation value to/from the terminal voltage difference of respective phases detected between the armature windings during actual driving period, said compensation value is determined by a resistor of said armature winding and a winding current;

a comparator means for comparing respective terminal voltage difference between respective phases after compensation has carried out to obtain a rotor location signal;

a commutation circuit for obtaining an armature winding driving signal from a rotor location signal detected in the rotor location signal detection means which includes a compensation means for compensating each terminal voltage or voltage differences of respective phases and a comparing means for comparing each terminal voltage or voltage differences between respective phases; and a trapezoid driving signal generation circuit for forming a trapezoid driving signal from the output of the commutation circuit;

said armature windings are driven by said rotor location signal detected at said comparator means;

the trapezoid driving signal is supplied to drive the armature winding.

34. The brushless motor driving circuit of claim 33 further comprising:

a charging/discharging circuiting the trapezoid driving signal generating circuit for changing the gradient of the trapezoid driving signal by changing the time constant of the charging/discharging circuit using a control signal inputted from outside.

35. The brushless motor driving circuit of claim 33 further comprising:

a phase leading circuit for leading a phase of the rotor location signal, the leading quantity of the phase leading circuit is set to substantially ½ of the gradient time of the trapezoid driving signal for driving the armature winding.

* * * * *